US012618007B2

(12) United States Patent
Hirschmann et al.

(10) Patent No.: US 12,618,007 B2
(45) Date of Patent: May 5, 2026

(54) LIQUID-CRYSTALLINE MEDIUM

(71) Applicant: MERCK PATENT GmbH, Darmstadt (DE)

(72) Inventors: Harald Hirschmann, Darmstadt (DE); Sabine Schoen, Darmstadt (DE)

(73) Assignee: Merck Patent GmbH, Darmstadt (DE)

(*) Notice: Subject to any disclaimer, the term of this patent is extended or adjusted under 35 U.S.C. 154(b) by 0 days.

(21) Appl. No.: 18/981,997

(22) Filed: Dec. 16, 2024

(65) Prior Publication Data

US 2025/0197723 A1 Jun. 19, 2025

(30) Foreign Application Priority Data

Dec. 19, 2023 (EP) .................................... 23218161

(51) Int. Cl.

| | |
|---|---|
| *G02F 1/1333* | (2006.01) |
| *C09K 19/30* | (2006.01) |
| *C09K 19/34* | (2006.01) |
| *C09K 19/54* | (2006.01) |
| *C09K 19/04* | (2006.01) |

(52) U.S. Cl.

CPC ...... *C09K 19/3098* (2013.01); *C09K 19/3402* (2013.01); *C09K 19/3491* (2013.01); *C09K 19/54* (2013.01); *C09K 2019/0466* (2013.01); *C09K 2019/3096* (2013.01); *C09K 2019/3422* (2013.01)

(58) Field of Classification Search

CPC .......................... C09K 19/3098; G02F 1/1333

See application file for complete search history.

(56) References Cited

U.S. PATENT DOCUMENTS

| | | | | |
|---|---|---|---|---|
| 3,814,700 | A | 6/1974 | Aviram et al. | |
| 3,953,491 | A | 4/1976 | Steinstrasser et al. | |
| 4,001,137 | A | 1/1977 | Steinstrasser | |
| 4,065,489 | A | 12/1977 | Steinstrasser et al. | |
| 4,077,900 | A | 3/1978 | Pohl et al. | |
| 4,237,026 | A | 12/1980 | Eidenschink et al. | |
| 4,398,803 | A | 8/1983 | Pohl et al. | |
| 5,576,867 | A | 11/1996 | Baur et al. | |
| 5,993,691 | A | 11/1999 | Pausch et al. | |
| 6,522,380 | B2 | 2/2003 | Lee et al. | |
| 2006/0066793 | A1 | 3/2006 | Ohmuro et al. | |
| 2024/0228877 | A1* | 7/2024 | Han | C09K 19/3003 |
| 2025/0075129 | A1* | 3/2025 | Hirschmann | C09K 19/3003 |

FOREIGN PATENT DOCUMENTS

| | | | |
|---|---|---|---|
| DE | 2209127 | A1 | 9/1973 |
| DE | 2240864 | A1 | 2/1974 |
| DE | 2338281 | A1 | 2/1974 |
| DE | 2321632 | A1 | 11/1974 |
| DE | 2450088 | A1 | 4/1976 |
| DE | 2637430 | A1 | 2/1978 |
| DE | 2853728 | A1 | 7/1980 |
| DE | 3022818 | A1 | 1/1982 |
| DE | 19528104 | A1 | 2/1997 |
| DE | 19824137 | A1 | 7/1999 |
| EP | 0588568 | A2 | 3/1994 |
| EP | 4 382 586 | A1 | 6/2024 |
| GB | 1376115 | A | 12/1974 |
| WO | 9110936 | A1 | 7/1991 |
| WO | 2023/052283 | A1 | 4/2023 |
| WO | 2023/094404 | A1 | 6/2023 |
| WO | 2023/198673 | A1 | 10/2023 |

OTHER PUBLICATIONS

Haller, Ivan, et al., "Crown Either Complex Salts as Conductive Dopants for Nematic Liquids", Molecular Crystals and Liquid Crystals, Jan. 12, 1973, vol. 24, pp. 249-258. (11 pages).

Jung, Song Hee, et al., "Analysis of Optima Phase Retardation of a Fringe Field-Driven Homogeneously Aligned Nematic Liquid Crystal Cell", Japanese Journal of Applied Physics, Mar. 10, 2004, vol. 43, No. 3, pp. 1028-1031. (5 pages).

Soref, R.A., "Field Effects in Nematic Liquid Crystals Obtained with Interdigital Electrodes," Journal of Applied Physics, Dec. 1974, vol. 45, No. 12, pp. 5466-5468. (4 pages).

Extended European Search Report issued Apr. 22, 2025, by the European Patent Office in corresponding European Patent Application No. 24219597.2-1014. (7 pages).

* cited by examiner

*Primary Examiner* — Geraldina Visconti

(74) *Attorney, Agent, or Firm* — Buchanan Ingersoll & Rooney PC

(57) ABSTRACT

Liquid-crystalline (LC) media or LC materials and to energy saving liquid-crystal displays (LCDs) containing these media, especially gaming displays and AR/VR headsets addressed by an active matrix and in particular LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type.

17 Claims, No Drawings

LIQUID-CRYSTALLINE MEDIUM

CROSS-REFERENCE TO RELATED APPLICATIONS

This application filed under 35 U.S.C. § 111(a) claims priority benefit under 35 U.S.C. § 119(a) of and to EP Patent Application No. 23218161.0, filed Dec. 19, 2023, the entire contents of which are incorporated herein by reference in their entirety and for all purposes.

BACKGROUND OF THE INVENTION

The present invention relates to liquid-crystalline (LC) media and to energy saving liquid-crystal displays (LCDs) containing these media, especially to high contrast, fast switching gaming displays and AR/VR headsets having reduced short term image sticking and reduced long term image sticking especially after light load and/or temperature load. In particular, it relates to LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type. In a preferred embodiment, the LC media have positive dielectric anisotropy.

LCDs are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which generated substantially perpendicular to the substrates and the LC layer.

Besides these modes, there are also electro-optical modes that utilise an electric field which is substantially parallel to the substrates or the LC layer. For example, WO 91/10936 discloses a LC display in which the electric signals are generated in such a way that the electric fields have a significant component parallel to the LC layer, and which has since then become known as “in-plane switching” (IPS) display. The principles of operating such a display are described, for example, by R. A. Soref in Journal of Applied Physics, Vol. 45, No. 12, pp. 5466-5468 (1974).

IPS displays contain an LC layer between two substrates with planar orientation, where the two electrodes are arranged on only one of the two substrates and preferably have interdigitated, comb-shaped structures. On application of a voltage to the electrodes an electric field with a significant component parallel to the LC layer is generated between them. This causes realignment of the LC molecules in the layer plane.

EP 0 588 568, for example, discloses various possibilities for the design of the electrodes and for addressing an IPS display. DE 198 24 137 likewise describes various embodiments of such IPS displays.

LC materials for IPS displays of this type are described, for example, in DE 195 28 104.

Furthermore, so-called “fringe-field switching” (FFS) displays have been reported (see, inter alia S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called “fringe field” is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

LCDs of the IPS and FFS electro-optical mode are, in particular, suitable for use in modern desktop monitors, TV sets and multimedia applications. The LC media according to the present invention are preferably used in displays of this type. In general, dielectrically positive LC media having rather lower values of the dielectric anisotropy are used in FFS displays, but in some cases LC media having a dielectric anisotropy of only about 3 or even less are also used in IPS displays.

A further improvement has been achieved by the HB-FFS mode. One of the unique features of the HB-FFS mode in contrast to the traditional FFS technology is that it enables higher transmittance which allows operation of the panel with less energy consumption.

Another recently developed mode is the XB-FFS mode, wherein the LC medium additionally contains a polar liquid crystal compound with low dielectric anisotropy.

FFS and IPS displays can be operated as active-matrix displays (AMD) or passive-matrix displays (PMD). In the case of active-matrix displays individual pixels are usually addressed by integrated, non-linear active elements such as, for example, thin-film transistors (TFTs), while in the case of passive-matrix displays individual pixels are usually addressed by the multiplex method as known from the prior art.

The displays according to the present invention are preferably addressed by an active matrix, preferably by a matrix of TFT. However, the LC media according to the invention can also advantageously be used in displays having other known addressing means.

Typical applications of IPS and FFS technologies are monitors, notebooks, televisions, mobile telephones, tablet PCs, etc. Both the IPS and the FFS technology have certain advantages over other LCD technologies, such as, for example, the vertical alignment (VA) technology, e.g. a broad viewing angle dependency of the contrast.

Provision of LC media and the use thereof in a display having a particularly low short-term image sticking and low long-term image-sticking in combination with short response times is a central challenge for modern FFS and IPS applications.

In addition, modern applications also require good low-temperature stability and stability against UV radiation and increased temperatures.

The present invention has the object of providing LC media, in particular for FFS and IPS displays, but also for TN, positive VA or STN displays, and in particular for active-matrix displays like those addressed by TFTs, which have low short-term image sticking and low long-term image-sticking as well as short response times.

This object was achieved by providing LC media as described and claimed hereinafter.

SUMMARY OF THE INVENTION

The LC media according to the present invention are especially suitable for use in LC displays of the FFS, HB-FFS, XB-FFS and IPS mode based on dielectrically positive liquid crystals, and polymer stabilised variants thereof.

Surprisingly, the above technical problem is solved by providing LC media as described and claimed hereinafter.

It has now been surprisingly found that LC media according to the present invention which contain one or more compounds of the Formula I

I

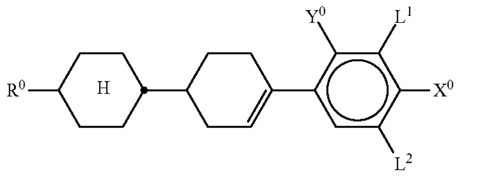

in combination with one or more antioxidant and, optionally, one or more light stabilizer, show several remarkable improvements like low short-term image sticking and low long-term image-sticking and enable short response times, especially when being used in FFS mode displays. The compounds of formulae I as such have been known in the prior art.

Additionally, the LC media according to the present invention have high clearing points, an excellent low temperature stability (LTS) and provide a best motion picture quality and an improved overall image quality, in particular a high contrast.

The present invention relates to a LC medium, characterised in that it comprises one or more compounds of the Formula I

I

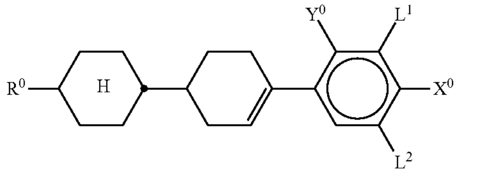

in which the individual substituents, on each occurrence identically or differently, and each, independently of one another, have the following meanings:

$R^0$ an alkyl group having 1 to 12 C atoms or an alkenyl group having 2 to 12 C atoms in which one or more $CH_2$ groups are optionally substituted by —C≡C—, —$CF_2$O—, —O$CF_2$—, —CH═CH—,

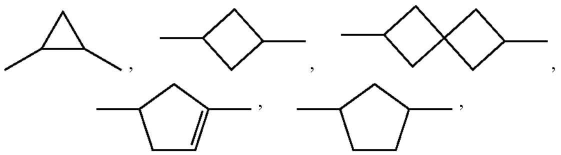

-O—, —CO—O— or —O—CO— in such a way that O atoms are not linked directly to one another, and in which one or more H atoms may be substituted by a halogen atom;

$X^0$ a halogen atom, —CN, —SCN, —NCS or an alkyl or an alkoxy group having 1 to 6 C atoms or an alkenyl or an alkenyloxy group having 2 to 6 C atoms in which one or more H atoms has been substituted by a halogen atom;

$L^1$ and $L^2$ each, independently of one another, H, F or C, wherein $L^1$ and $L^2$ do not simultaneously denote H;

$Y^0$ H or $CH_3$, one or more antioxidant and, optionally, one or more light stabilizer.

The antioxidants for use in the present invention are per se known in the prior art and are not particularly limited. The inventors found that an antioxidant described by the formula ST shown below in combination with the compound of Formula I allows achieving a particularly low rotational viscosity $\gamma_1$ and low short-term image sticking and low long-term image sticking, especially after a high radiation exposure or thermal stress:

ST

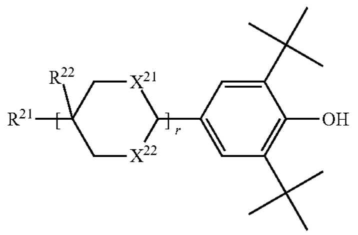

in which in which the individual substituents have the following meanings:

$X^{21}$ and $X^{22}$ each, independently of one another, denote —O—, —$CH_2$—, —$CHR^{23}$— or —N—$R^{23}$—;

$R^{21}$ and $R^{22}$ each, independently of one another, denote a H atom or an alkyl- or alkoxy group having 1 to 12 C atoms, an alkenyl, alkinyl, alkenyloxy or alkoxyalkyl group having 2 to 12 C atoms or a cycloalkyl group having 3 to 12 C atoms, in which one or more non-adjacent $CH_2$ groups are optionally substituted by —C≡C—, —$CF_2$O—, —O$CF_2$—, —CH═CH—,

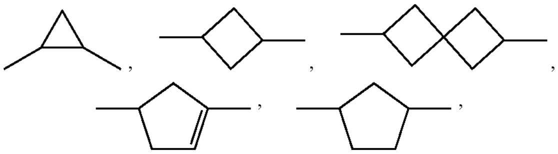

—O—, —CO—O— or —O—CO— in such a way that O atoms are not linked directly to one another, and in which one or more H atoms may be substituted by a halogen atom or a cycloalkyl or a cycloalkoxy group having 3 to 12 C atoms, in which one or more H atoms may be substituted by a halogen atom;

$R^{23}$ denotes a H atom, an alkyl or alkoxy group having 1 to 10 C atoms;

r denotes 0 or 1.

In addition to the compound of Formula I and an antioxidant, the LC medium of the present invention may comprise a light stabilizer. The presence of a light stabilizer synergistically increases the stabilizing effect of the antioxidant in terms of reduced short-term image sticking and reduced long-term image sticking resulting in significant reduction of mura defects such as star mura or edge mura. Use of one or more light stabilizer of the following Formula H showed to be particularly advantageous:

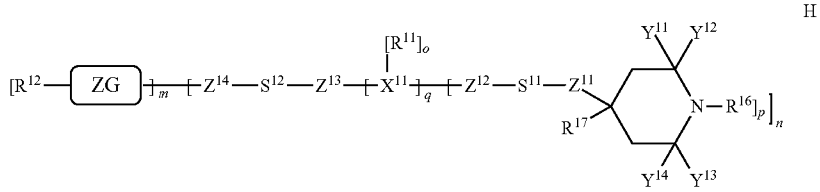

in which $R^{11}$ each, independently of one another, denote a H atom, F, an alkyl group having 1 to 20 C atoms, in which one or more $CH_2$ groups are optionally substituted by —C≡C—, —$CF_2$O—, —O$CF_2$—, —CH═CH—,

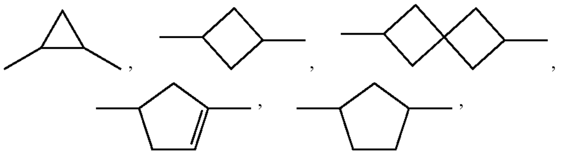

—O—, —CO—O—, —O—CO—, —$NR^{13}$—, —CO—$NR^{13}$— or —$NR^{13}$—CO— in such a way that O and N atoms are not linked directly to one another and in which one H atom or a plurality of H atoms may be substituted by F, $OR^{13}$, $N(R^{13})(R^{14})$ or $R^{15}$ $R^{12}$ each, independently of one another, denote a H atom, an alkyl group having 1 to 20 C atoms, in which one or more $CH_2$ groups are optionally substituted by —C≡C—, —$CF_2$O—, —O$CF_2$—, —CH═CH—,

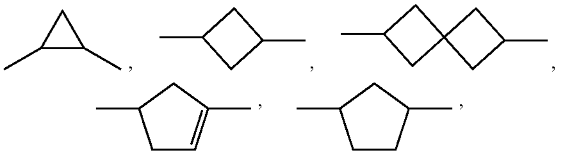

—O—, CO—O—, —O—CO—, —$NR^{13}$—, —CO—$NR^{13}$— or —$NR^{13}$—CO— in such a way that O atoms are not linked directly to one another, a hydrocarbon group which contains a cycloalkyl or alkylcycloalkyl group and in which one or more $CH_2$ groups are optionally substituted by —C≡C—, —$CF_2$O—, —O$CF_2$—, —CH═CH—,

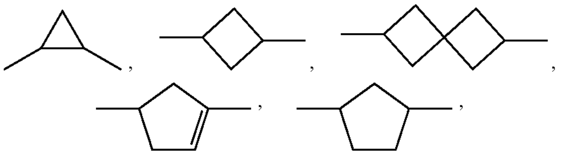

, —O—, —CO—O—, —O—CO—, —$NR^{13}$—, —CO—$NR^{13}$— or —$NR^{13}$—CO— in such a way that O atoms are not linked directly to one another, and in which one H atom or a plurality of H atoms may be substituted by F, $OR^{13}$, $N(R^{13})(R^{14})$ or $R^{15}$, or an aromatic or heteroaromatic hydrocarbon group, in which one H atom or a plurality of H atoms may be substituted by $OR^{13}$, $N(R^{13})(R^{14})$ or $R^{15}$;

$R^{13}$, $R^{14}$ each, independently of one another, denote an alkyl or acyl group and $R^{15}$ having 1 to 10 C atoms or an aromatic hydrocarbon or carboxylic acid group having 6 to 12 C atoms in which one or more $CH_2$ groups are optionally substituted by —C≡C—, —$CF_2$O—, —O$CF_2$—, —CH═CH—,

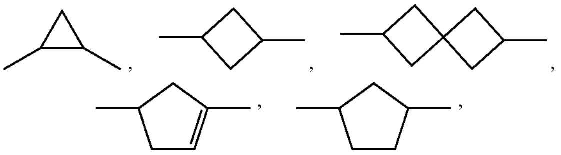

—O—, CO—O—, —O—CO—, —$NR^{13}$—, —CO—$NR^{13}$— or —$NR^{13}$—CO— in such a way that O atoms are not linked directly to one another;

$R^{16}$ each, independently of one another, denote a H atom, an alkyl group or an alkoxy group having 1 to 10 C atoms in which one or more $CH_2$ groups are optionally substituted by —C≡C—, —$CF_2$O—, —O$CF_2$—, —CH═CH—,

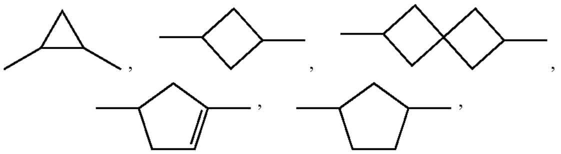

, —O—, —CO—O—, —O—CO—, —$NR^{13}$—, —CO—$NR^{13}$— or $NR^{13}$—CO— in such a way that O atoms are not linked directly to one another, O-cycloalkyl group having 3 to 12 C atoms, $O^{\bullet}$ or OH;

$R^{17}$ each, independently of one another, a H atom, an alkyl group or an alkoxy group having 1 to 10 C atoms, or an alkylene group or a single bond, wherein $R^{17}$ together with $S^{11}$ may form a ring structure;

$S^{11}$ and $S^{12}$ each, independently of one another, denote an alkylene group having 1 to 20 C atoms, in which one or more $CH_2$ groups are optionally substituted by —C≡C—, —$CF_2$O—, —O$CF_2$—, —CH═CH—,

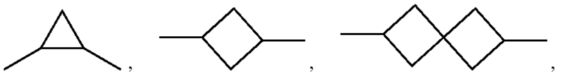

-continued

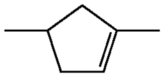 , 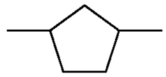 ,

—O—,
—CO—O—, —O—CO—, —$NR^{13}$—, —CO—$NR^{13}$— or —$NR^{13}$—CO— in such a way that O and N atoms are not linked directly to one another and in which one H atom or a plurality of H atoms may be substituted by F, $OR^{13}$, $N(R^{13})(R^{14})$ or $R^{15}$, or a single bond;

$Y^{11}$ to $Y^{14}$ each, independently of one another, denote methyl or ethyl;

$X^{11}$ C;

$Z^{11}$ to $Z^{14}$ each, independently of one another, denote —O—, —(C═O)—, —O—(C═O)— (C═O)—O—, —O—(C═O)—O—, —($NR^{13}$)—, —$NR^{13}$—(C═O)—, —(C═O)—$NR^{13}$— or a single bond and if $S^{11}$ is a single bond, both $Z^{11}$ and $Z^{12}$ do not simultaneously denote —O—; if $S^{12}$ is a single bond, both $Z^{13}$ and $Z^{14}$ do not simultaneously denote —O—; and, if q denotes —O—, both $Z^{12}$ and $Z^{13}$ do not simultaneously denote —O—;

p 1 or 2;

q 0 or 1;

(3−p);

n an integer from 1 to 10;

m an integer from 0 to 8; wherein n*p an integer from 1 to 10, preferably from 2 to 8, and

an organic moiety having (m+n) bonding sites.

The LC media according to the present invention are especially suitable for use in energy saving LC displays of the FFS, HB-FFS, XB-FFS and IPS mode for gaming based on dielectrically positive liquid crystals, and polymer stabilised variants thereof.

The invention further relates to the use of a LC medium as described above and below for electro-optical purposes, in particular for the use in LC displays, shutter glasses, LC windows, 3D applications, preferably in TN, PS-TN, STN, TN-TFT, OCB, IPS, PS-IPS, FFS, HB-FFS, XB-FFS, PS-HB-FFS, PS-XB-FFS, SA-HB-FFS, SA-XB-FFS, polymer stabilised SA-HB-FFS, polymer stabilised SA-XB-FFS, positive VA and positive PS-VA displays, very preferably in FFS, HB-FFS, IPS, PS-HB-FFS and PS-IPS displays.

The invention further relates to an electro-optical LC display containing a LC medium as described above and below, in particular a TN, PS-TN, STN, TN-TFT, OCB, IPS, PS-IPS, FFS, HB-FFS, XB-FFS, PS-HB-FFS, PS-XB-FFS, SA-HB-FFS, SA-XB-FFS, polymer stabilised SA-HB-FFS, polymer stabilised SA-XB-FFS, positive VA or positive PS-VA display, preferably a FFS, HB-FFS, IPS, PS-HB-FFS or PS-IPS display.

In the present application, all atoms may optionally include their isotopes. In some embodiments, one or more hydrogen atoms (H) may be optionally replaced by deuterium (D); a high degree of deuteration enables or simplifies analytical determination of compounds, in particular in the case of low concentrations.

In the Formula I, ST and H, if $R^0$, $R^{21}$, $R^{22}$, $R^{11}$, $R^{12}$ or $R^{13}$ to $R^{17}$ denote an alkyl group and/or an alkoxy group, this may be straight-chain or branched. It is preferably straight-chain, has 2, 3, 4, 5, or 6 C atoms and preferably denotes ethyl, propyl, butyl, pentyl, hexyl, ethoxy, propoxy, butoxy, pentoxy, or hexyloxy, furthermore methyl, methoxy. $R^0$ preferably denotes straight-chain alkyl having 1 to 6 C atoms or an alkenyl group having 2 to 6 C atoms.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl.

If $R^0$, $R^{21}$, $R^{22}$, $R^{11}$, $R^{12}$ or $R^{13}$ to $R^{17}$ denotes an alkoxy or oxaalkyl group it may also contain one or more additional oxygen atoms, provided that oxygen atoms are not linked directly to one another.

In another preferred embodiment, one or more of $R^0$, $R^{21}$, $R^{22}$, $R^{11}$, $R^{12}$ or $R^{13}$ to $R^{17}$ are selected from the group consisting of

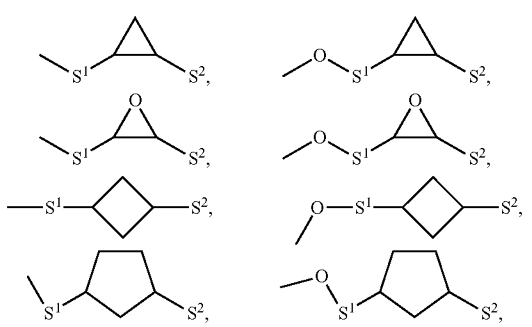

—$S^1$—F, —O—$S^1$—F, —O—$S_1$—O—$S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably one or more of $R^0$, $R^{21}$, $R^{22}$, $R^{11}$, $R^{12}$ or $R^{13}$ to $R^{17}$ are selected from the group consisting of

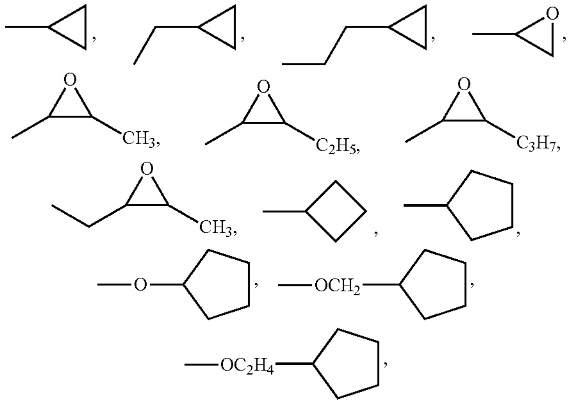

—$OCH_2$—$OCH_3$, —$O(CH_2)_2OCH_3$, —$O(CH_2)_3OCH_3$, —$O(CH_2)_4OCH_3$, —$O(CH_2)_2F$, —$O(CH_2)_3F$, —$O(CH_2)_4F$.

If $R^0$, $R^{21}$, $R^{22}$, $R^{11}$, $R^{12}$ or $R^{13}$ to $R^{17}$ denotes an alkenyl group, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^0$, $R^{21}$, $R^{22}$, $R^{11}$, $R^{12}$ or $R^{13}$ to $R^{17}$ denotes an alkyl or alkenyl group which is at least monosubstituted by halogen, this group is preferably straight-chain, and halogen is preferably F or Cl. In the case of polysubstitution, halogen is preferably F. The resultant groups also include perfluorinated groups. In the case of mono-substitution, the fluorine or chlorine substituent may be in any desired position, but is preferably in the w-position.

Particularly preferred group $R^0$ in the Formula I denotes alkyl, alkenyl, alkynyl or alkoxy having up to 12, preferably up to 8 C atoms, each of which is optionally substituted by halogen, in particular by F, particularly preferred are H, F, alkyl, alkenyl or alkynyl having up to 8 C atoms.

Preferred alkyl groups are, for example, methyl, ethyl, n-propyl, n-butyl, n-pentyl, n-hexyl, n-heptyl and n-octyl. Preferred alkenyl groups are, for example, ethenyl, propenyl, butenyl and pentenyl. Preferred alkynyl groups are, for example, ethynyl, propynyl, butynyl, pentynyl, hexynyl, heptynyl and octynyl. Preferred alkoxy groups are, for example, methoxy, ethoxy, n-propoxy, n-butoxy, n-pentoxy, n-hexoxy, n-heptoxy, n-octoxy. Halogen preferably denotes F or Cl, F being mostly preferred.

The one or more compounds of the Formula I is preferably selected from one of the following structures:

I-1

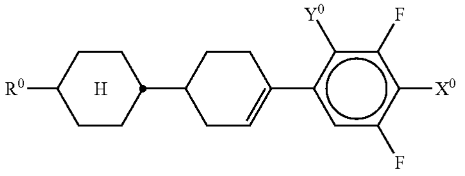

I-2

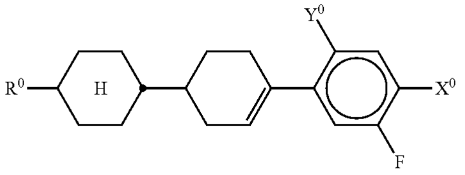

I-3

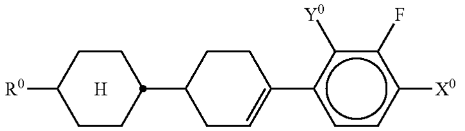

in which in which $R^0$, $X^0$ and $Y^0$ have the meanings indicated in general Formula I.

In a more preferred embodiment, $R^0$, $X^0$ and $Y^0$ are as follows:

$R^0$ an alkyl group having 1 to 6 C atoms or an alkenyl group having 2 to 6 C atoms in which one or more $CH_2$ groups are optionally substituted by —C≡C—, —$CF_2O$—, —$OCF_2$—, —CH═CH—,

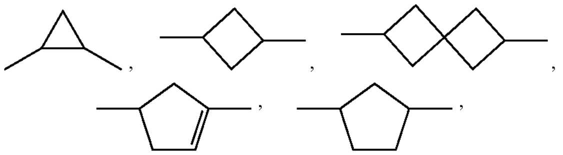

—O—, —CO—O— or —O—CO— in such a way that O atoms are not linked directly to one another, and in which one or more H atoms may be substituted by a halogen atom, very preferably methyl, ethyl or propyl, most preferably n-propyl;

$X^0$ a F atom or an alkyl or an alkoxy group having 1 to 3 C atoms or an alkenyl or an alkenyloxy group having 2 or 3 C atoms in which one or more H atoms are substituted by a F atom; and $Y^0$ H or $CH_3$.

Particularly preferred compounds of Formula I-1 are those selected from the group consisting of the following subformulae

I-1-1

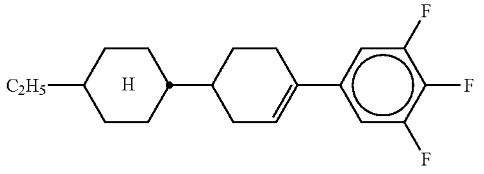

I-1-1a

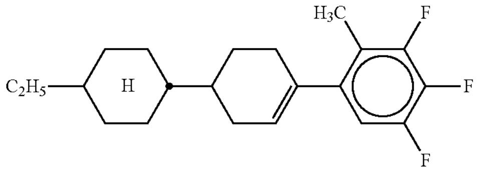

I-1-2

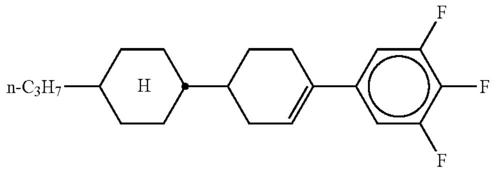

I-1-2a

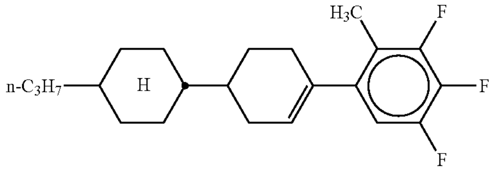

I-1-3

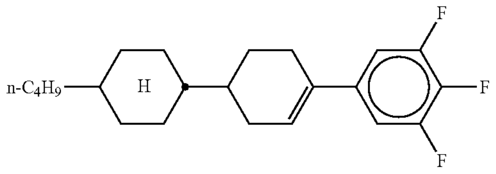

I-1-4

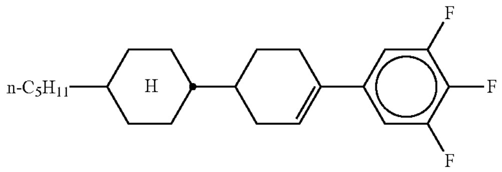

I-1-4a

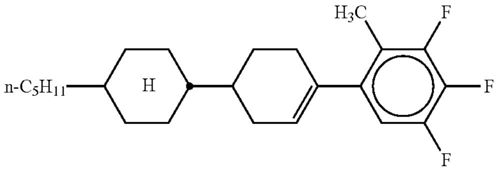

-continued
I-1-5
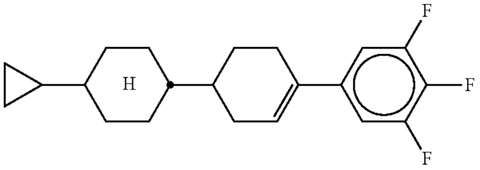
I-1-6
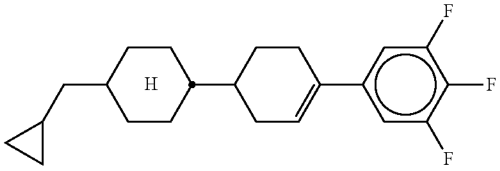
I-1-7
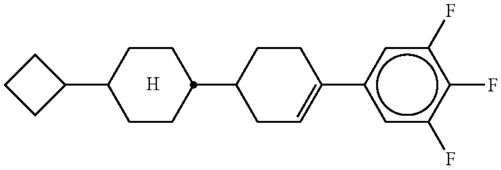
I-1-8
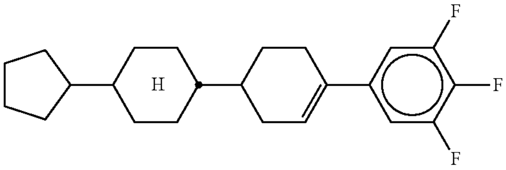
I-1-9
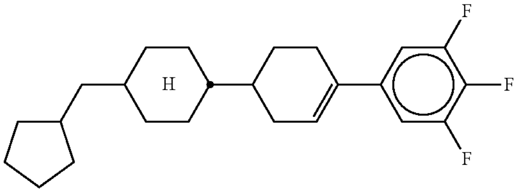
I-1-10
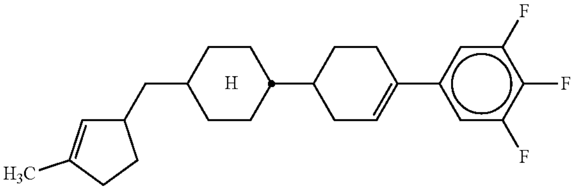
I-1-11
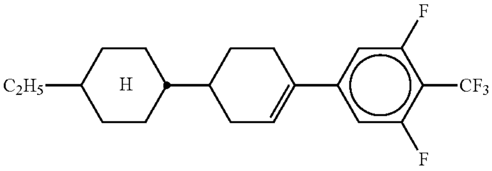
I-1-12
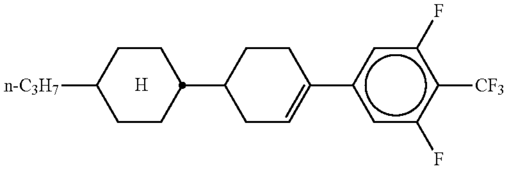
-continued
I-1-13
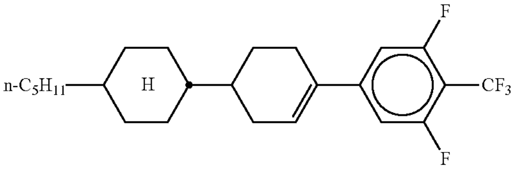
I-1-14
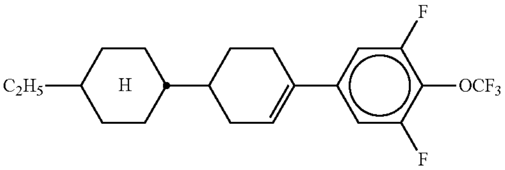
I-1-15
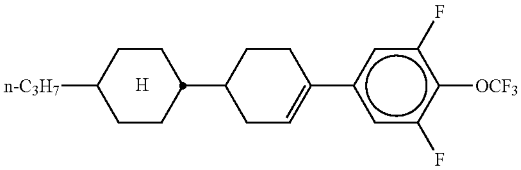
I-1-16
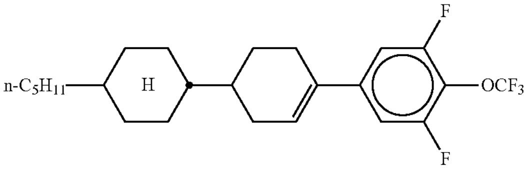
Very preferred are the compounds of formulae I-1-1, I-1-2, I-1-3 and I-1-4, most preferred is the compound formula I-1-2.
Preferred compounds of Formulae I-2 and I-3 are as follows:
I-2-1
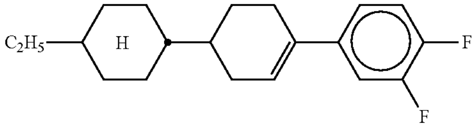
I-2-1a
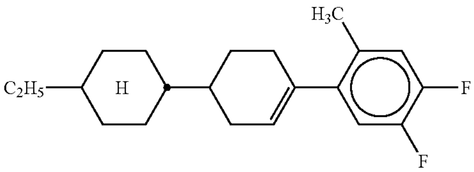
I-3-1a
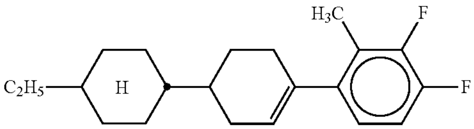
I-2-2
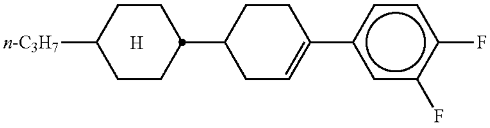

-continued

I-2-2a

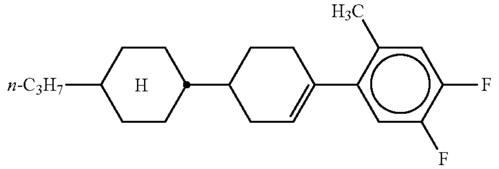

I-3-2a

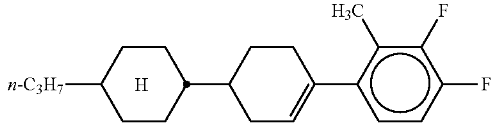

I-2-3

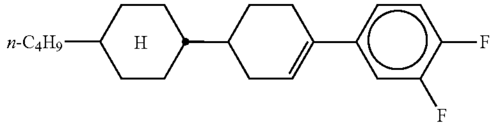

I-2-4

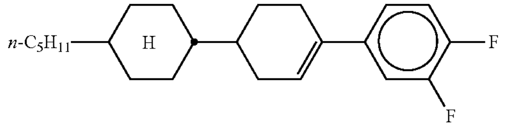

I-2-4a

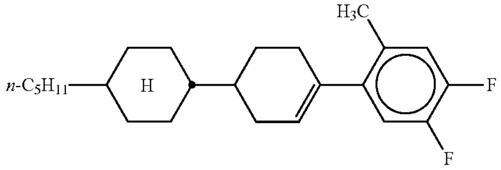

I-2-5

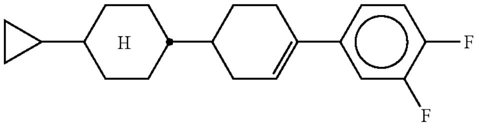

I-2-6

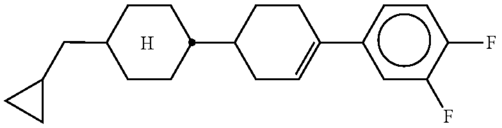

I-2-7

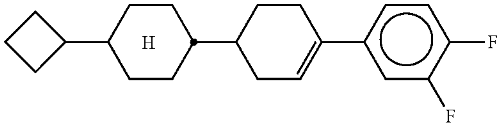

I-2-8

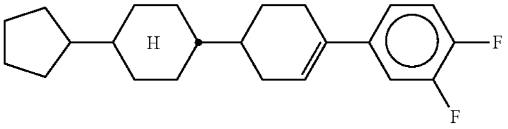

I-2-9

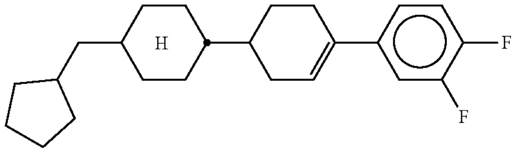

-continued

I-2-10

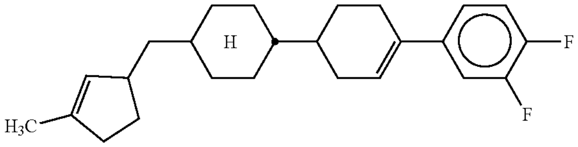

I-2-11

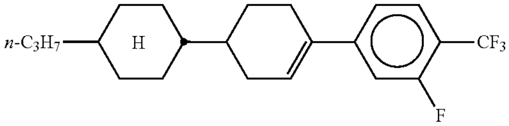

I-2-11a

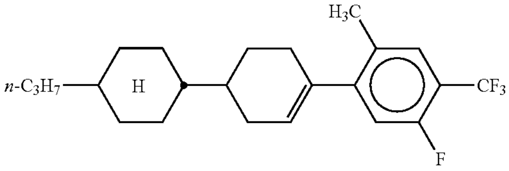

I-3-11

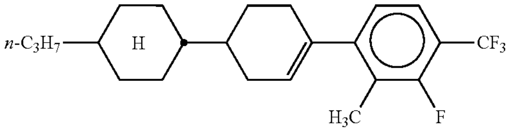

I-2-12

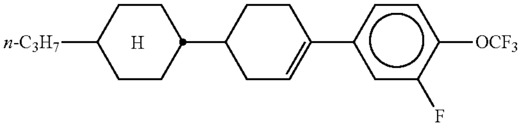

I-2-12a

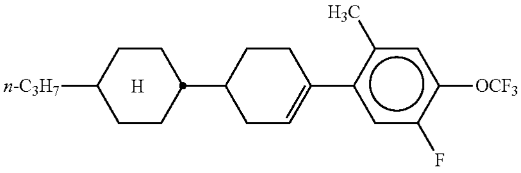

I-3-12

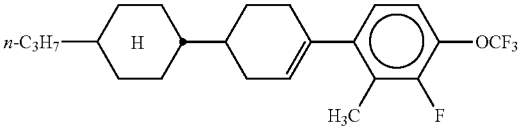

The proportion of the compounds of Formula I or its subformulae in the LC medium is preferably from 2 to 35%, very preferably from 3 to 30%, most preferably from 4 to 20% by weight.

Preferably, the LC medium contains 1, 2 or 3 compounds of Formula I or its subformulae.

DETAILED DESCRIPTION OF THE INVENTION

Antioxidant

The term "antioxidant" as used in the present application is well known to a skilled person and refers to a compound added to a LC medium which is capable of retarding autooxidation. The antioxidants for use in the present invention are not particularly limited as long as they do not substantially deteriorate physical properties of the LC medium, in particular, in terms of their voltage holding ratio and mesogenic behaviour.

In one preferred embodiment, the antioxidant in the LC medium of the present invention is described by the general Formula ST as specified above. LC media comprising compounds of the following sub-formulae ST-1, ST-2 and ST-3 showed a particularly high long-term thermal and UV stability:

ST-1

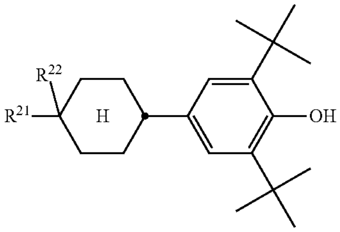

ST-2

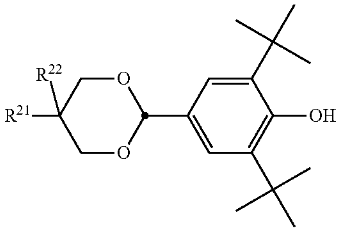

ST-3

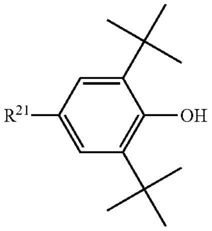

in which $R^{21}$ and $R^{22}$ each, independently of one another, denote a H atom or an alkyl or alkoxy group having 1 to 7 C atoms.

In particularly preferred embodiments, the compounds of the general Formula ST can be selected from the following specific structures:

ST-1-1

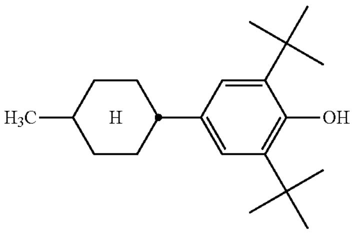

-continued

ST-1-2

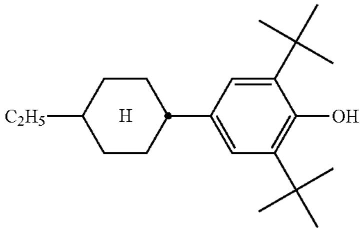

ST-1-3

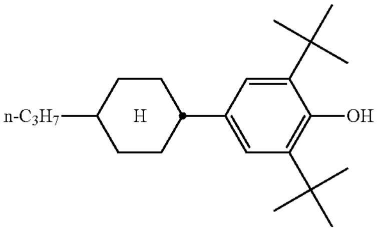

ST-1-4

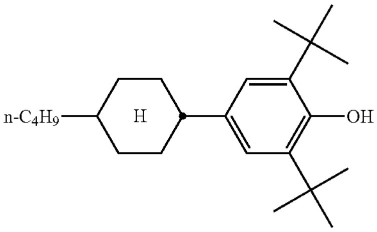

ST-1-5

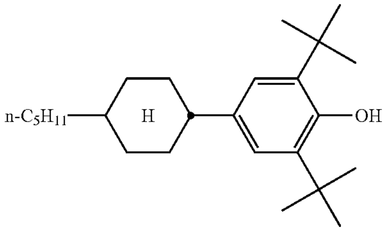

ST-1-6

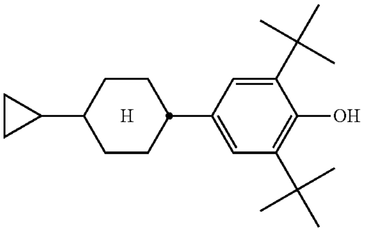

ST-1-7

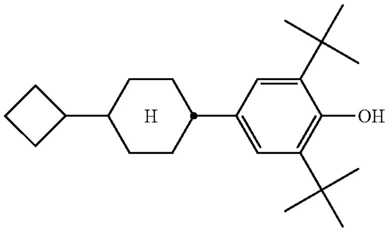

-continued
ST-1-8
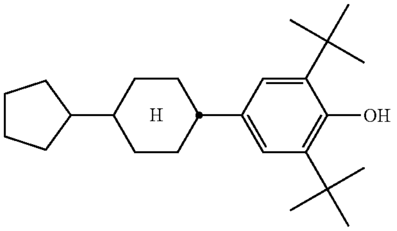
ST-2-1
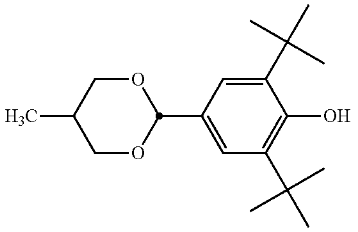
ST-2-2
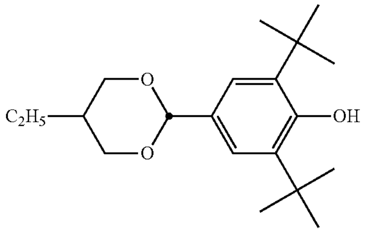
ST-2-3
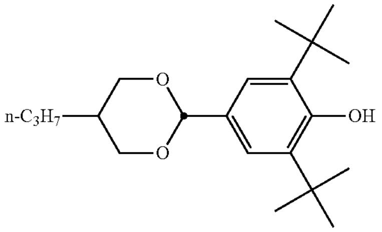
ST-2-4
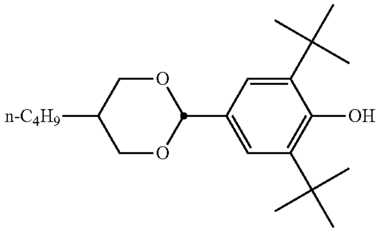
ST-2-5
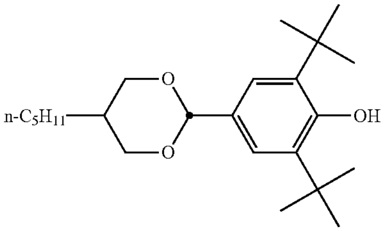
-continued
ST-2-6
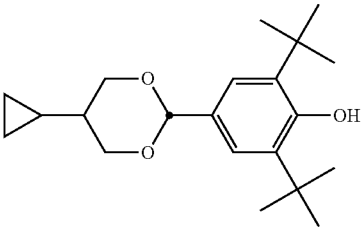
ST-2-7
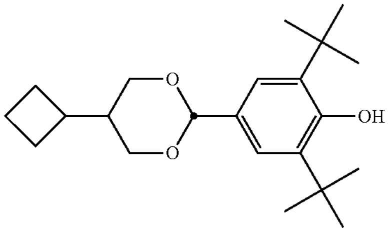
ST-2-8
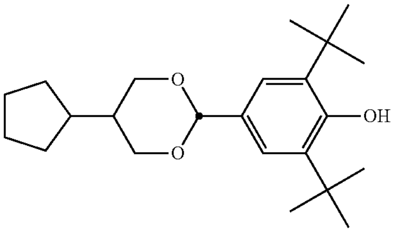
ST-2-9
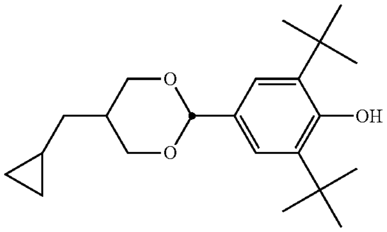
ST-2-10
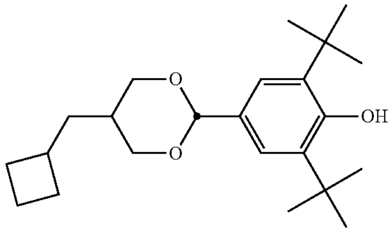
ST-4-1
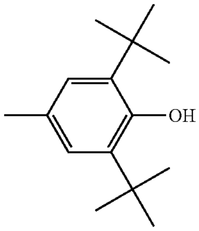

-continued

ST-4-2

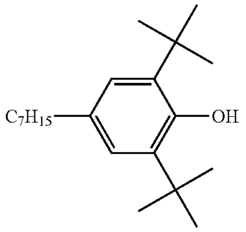

In a further preferred embodiment, the LC medium according to the present invention may comprise at least one further sterically hindered phenol as an additional antioxidant, which is mentioned in Table B below.

The preferred content of the one or more compounds of Formula ST in the LC medium depends inter alia on the inherent chemical stability of the LC medium as well as on the nature of the compound of Formula ST. They are preferably used in proportion ranging from 10 ppm to 10000 ppm, more preferably from 20 ppm to 2000 ppm, based on the weight of the LC medium.

Compounds of Formula H

The term "light stabilizer" as used in the present application is well known to a skilled person and refers to a compound added to a LC medium which is capable of protecting it against degradation resulting from a long term exposure to UV radiation. Suitable light stabilizers include, inter alia, hindered amine light stabilizers (HALS) and ultraviolet (UV) absorbers as well as a combination thereof. The light stabilizers for use in the present invention are not particularly limited as long as they do not substantially deteriorate physical properties of the LC medium, in particular, in terms of voltage holding ratio and mesogenic behaviour.

In one preferred embodiment, the light stabilizer in the LC medium of the present invention is described by the general Formula H as described above. In some preferred embodiments of the present invention, in the compounds of the Formula H,

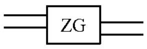

denotes

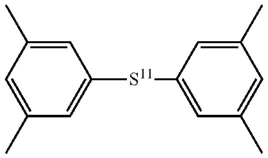

,

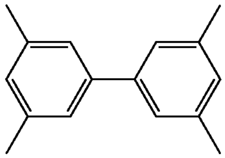

or (biphenyl-1,1′,3,3′-tetrayl)

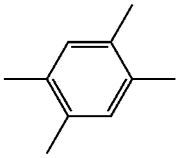

(benzene-1,2,4,5-tetrayl)

-continued

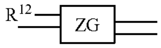

denotes

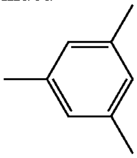

or (benzene-1,3,5-triyl)

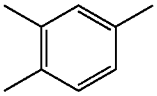

, (benzene-1,2,4-triyl)

denotes $—(CH_2—)_2$,
$—(CH_2—)_3$,
$—(CH_2—)_4$,
$—(CH_2—)_5$,
$—(CH_2—)_6$,
$—(CH_2—)_7$,
$—(CH_2—)_8$, i.e.

ethane-1,2-diyl, propane-1,3-diyl, butane-1,4-diyl, pentane-1,5-diyl, hexane-1,6-diyl, heptane-1,7-diyl, octane-1,8-diyl,

(1,4-phenylene)

,

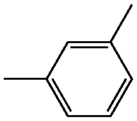

(1,3-phenylene)

,

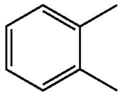

(1,2-phenylene)

or

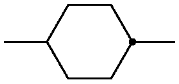

(trans-1,4-cyclohexylene)

and/or wherein $—Z^{12}—S^{11}—Z^{11}—$ on each occurrence, independently of one another, denotes —O—, $—S^{11}—O—$, $—O—S^{11}—O—$, $—(C{=}O)—O—S^{11}—O—$, $—O—(C{=}O)—S^{11}—O—$, $—O—(C{=}O)—S^{11}—(C{=}O)—O—$, $—O—S^{11}—(C{=}O)—O—$, $—(C{=}O)—O—S^{11}—C$, $—(C{=}O)—O—S^{11}—O—(C{=}O)—$ or $—(N—R^{13})—S^{11}—O—$, $—(N—R^{13}—C({=}O)—S^{11}—(C{=}O)—O$ or a single bond, preferably —O—, $—S^{11}—O—$, $—O—S^{11}—O—$, $—(C{=}O)—O—S^{11}—O—$, $—O—(C{=}O)—S^{11}—O—$ or $—O—S^{11}—(C{=}O)—O—$, and/or $S^{11}$ preferably denotes an alkylene group having 1 to 20 C atoms, and/or $R^{11}$ if present, denotes alkyl, alkoxy or H, preferably H or alkyl, and/or $R^{12}$ denotes H, methyl, ethyl, propyl, isopropyl or 3-heptyl, or cyclohexyl.

In a preferred embodiment of the present application, in the compounds of the Formula H,

denotes a group selected from the group of the formulae:

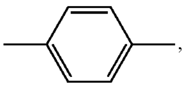, 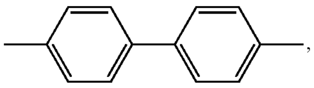,

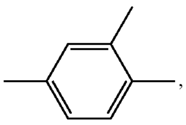, 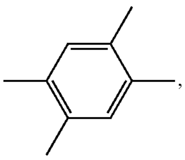,

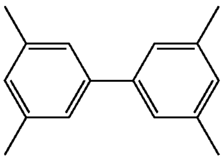, 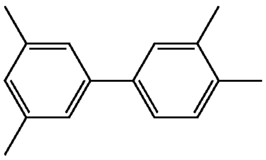

or

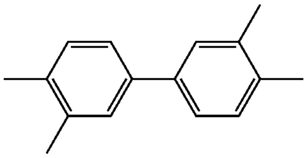

$-(CH_2)_n-$

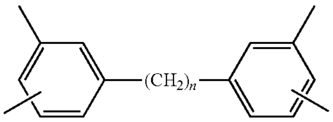

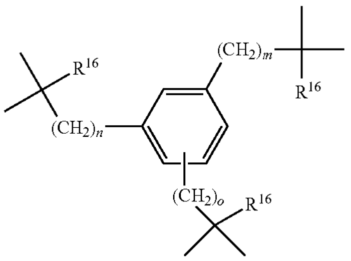

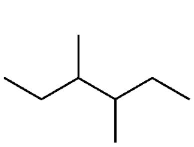

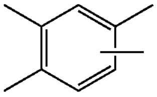

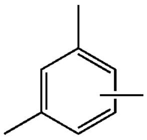

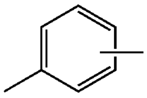

In a further preferred embodiment of the present application, in the compounds of the Formula H,

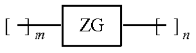

denotes a group selected from the group of the formulae

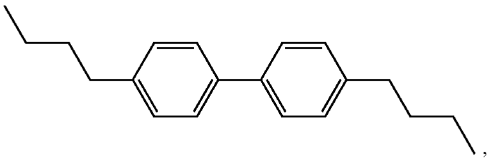,

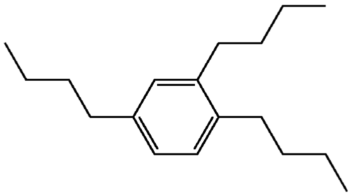

or

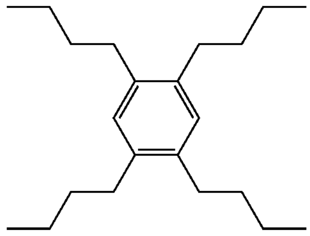.

In yet a further preferred embodiment of the present invention, in the compounds of the Formula H in which p preferably denotes 1,

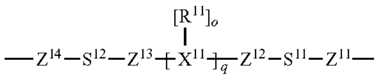

denotes $-Z^{12}-S^{11}-Z^{11}-$, preferably $-O-S^{11}-O-$, $-S^{11}-O-$ or $-O-S^{11}$, particularly preferably $-O-S^{11}-O-$ or $-S^{11}-O-$.

In a further preferred embodiment of the present invention, in the compounds of the Formula H, the group

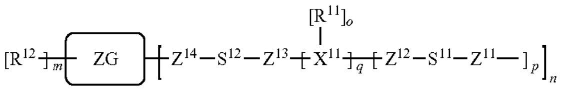

denotes a group selected from the group of the formulae

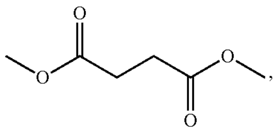,

-continued

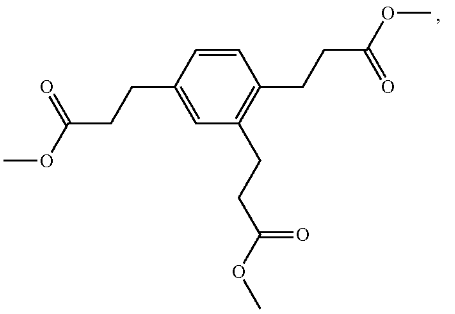

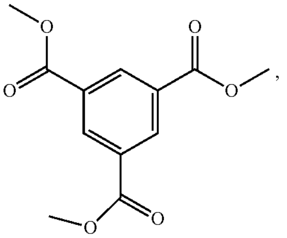

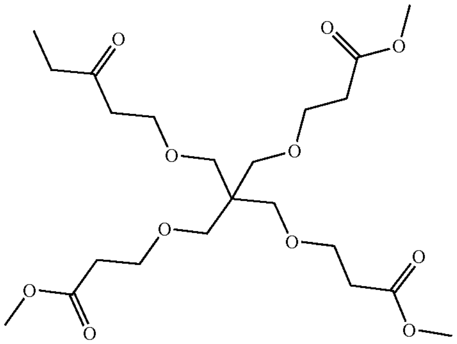

or

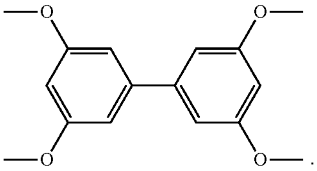

In a further preferred embodiment of the present invention, in which p is 2, which may be identical to or different from those described above, in the compounds of the Formula H,

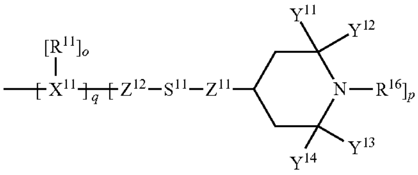

denotes a group selected from the group of the formulae

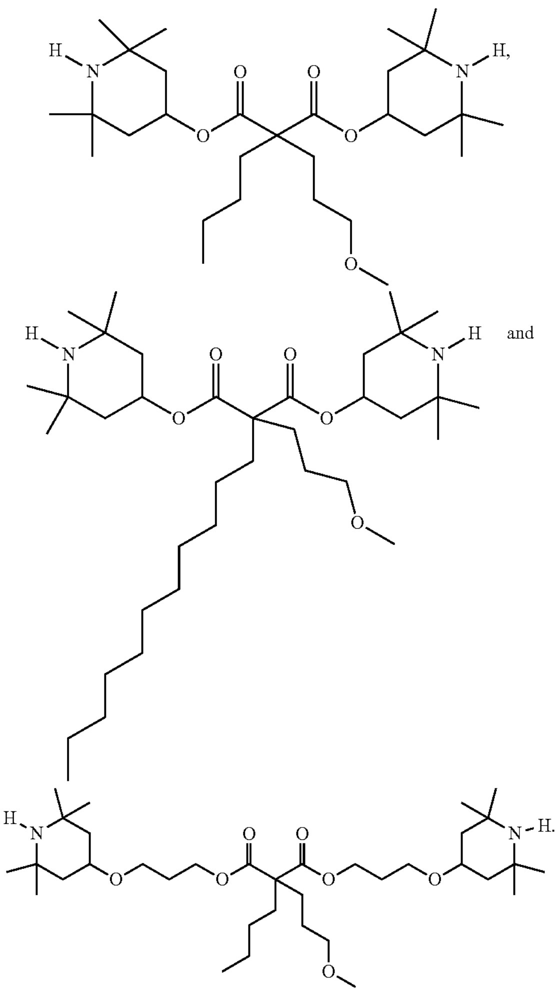

and

In yet a further preferred embodiment of the present invention, which may be identical to or different from those described above, in the compounds of the Formula H, the group

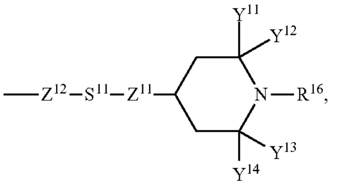

on each occurrence, independently of one another, denotes

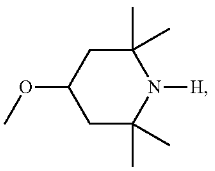

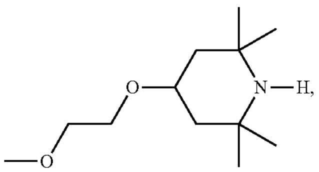

-continued

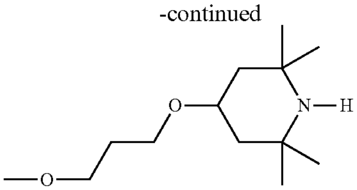

or

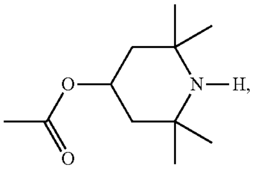

preferably

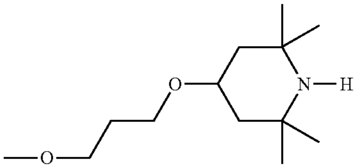

or

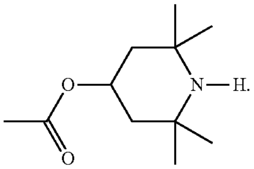

Compounds of the following general Formulae H-1-1, H-1-2 and H-1-3, showed to be particularly efficient UV stabilisers in LC mixtures, in particular, in terms of VHR stability:

H-1-1

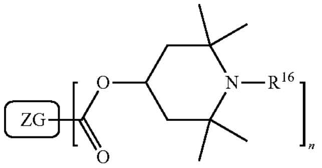

H-1-2

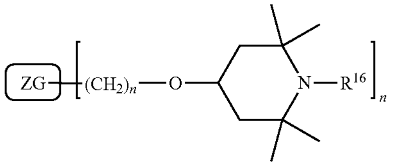

H-1-3

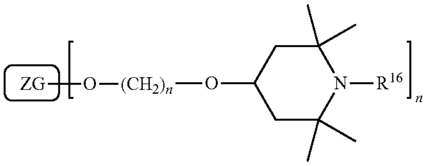

wherein ZG, $R^{16}$ and n are as defined above and n denotes an integer from 1 to 8. These compounds are highly suitable as stabilisers in LC mixtures and stabilise the VHR of the mixtures upon UV exposure.

In a particularly preferred embodiment, the one or more compounds of the Formula H may be selected from the group consisting of the compounds the following Formulae H-2-1 to H-2-6:

H-2-1

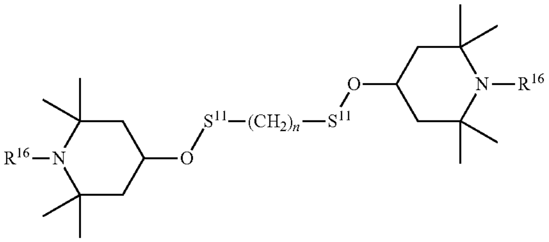

H-2-2

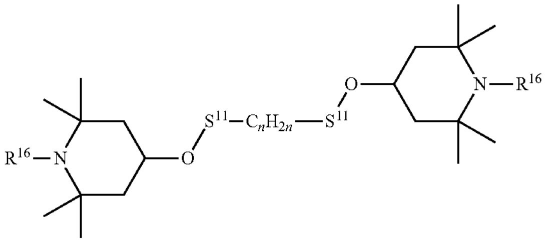

H-2-3

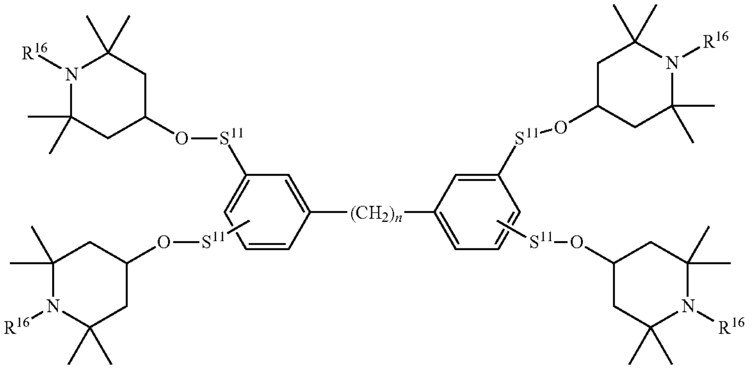

-continued
H-2-4
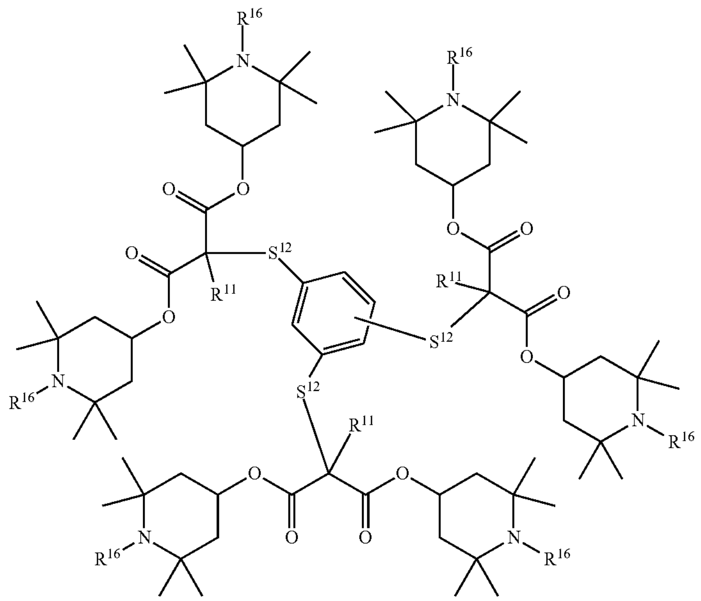
H-2-5
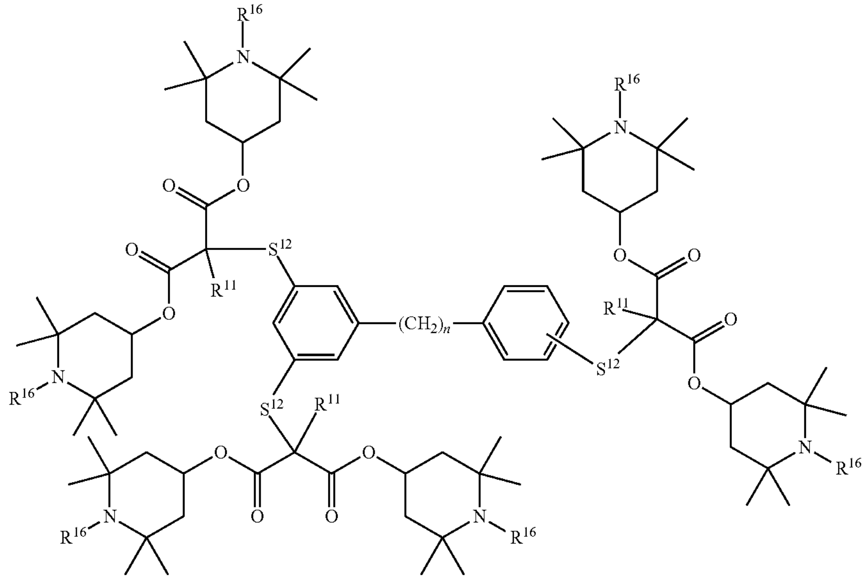
H-2-6
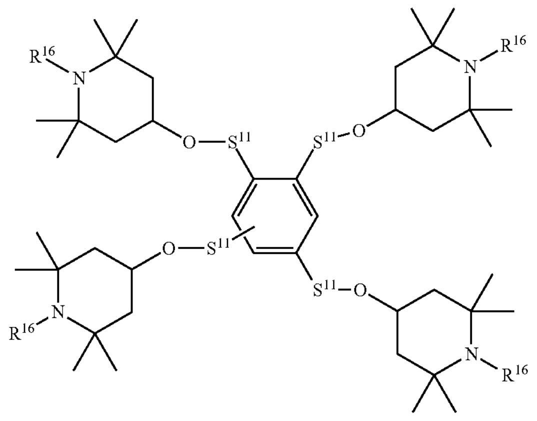

in which $R^{11}$ each, independently of one another, denotes an H atom, an alkyl group having 1 to 20 C atoms, in which one —$CH_2$— group or, if present, a plurality of —$CH_2$— groups may be replaced by —O— or —C(=O)—, but two adjacent —$CH_2$— groups cannot be replaced by —O—, and one or, if present, a plurality of —$CH_2$— groups may be replaced by —CH=CH— or —C≡C—, and in which one H atom or a plurality of H atoms may be replaced by F, $OR^{13}$, $N(R^{13})(R^{14})$ or $R^{15}$, $R^{16}$ denotes a H atom or $O^{\bullet}$, n denotes an integer from 0 to 12, and $S^{11}$ and $S^{12}$ each, independently of one another, denote an alkylene group having 1 to 20 C atoms, in which one —$CH_2$— group or, if present, a plurality of —$CH_2$— groups may be replaced by —O— or —C(=O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or denote a single bond.

In a preferred embodiment of the present invention, the LC media according to the invention comprise in each case one or more compounds of the Formula H selected from the following group of the compounds of the formulae:

H-3-1

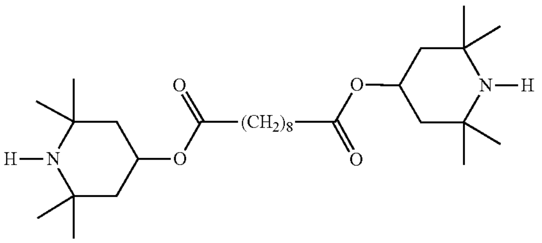

H-3-2

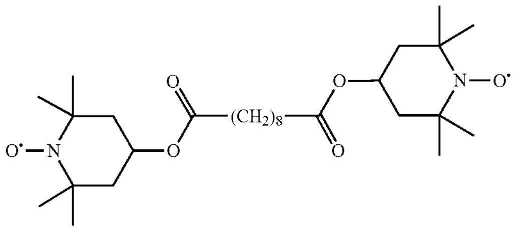

H-3-3

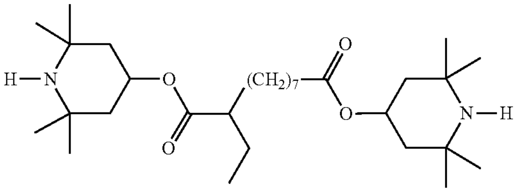

H-3-4

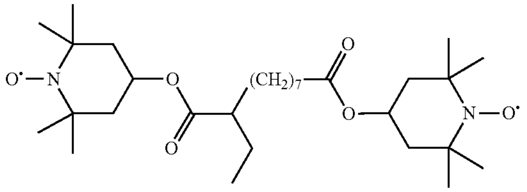

H-3-5

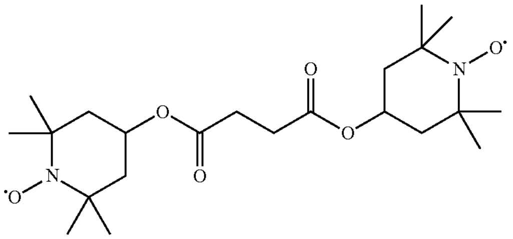

H-3-6

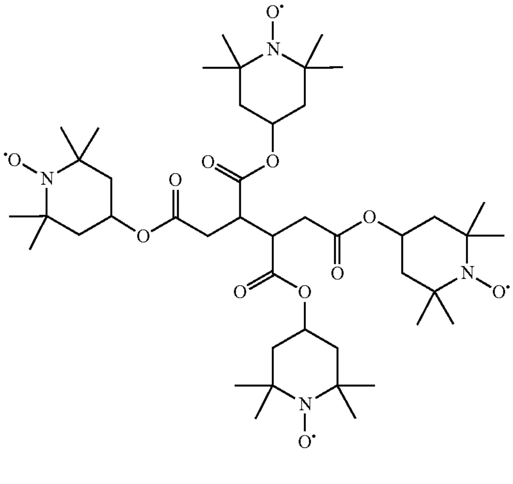

-continued
H-3-7
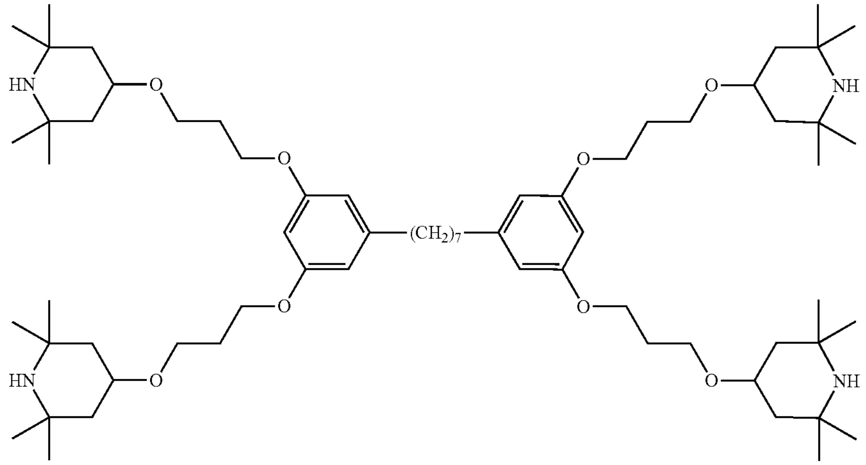
H-3-8
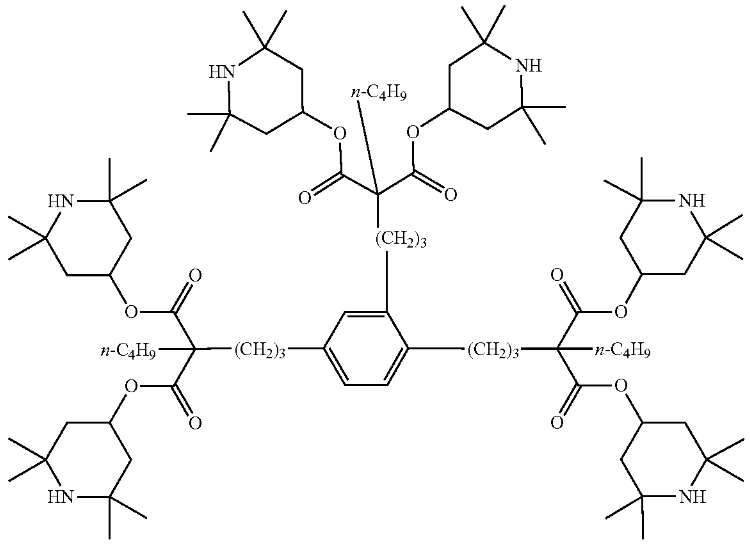
H-3-9
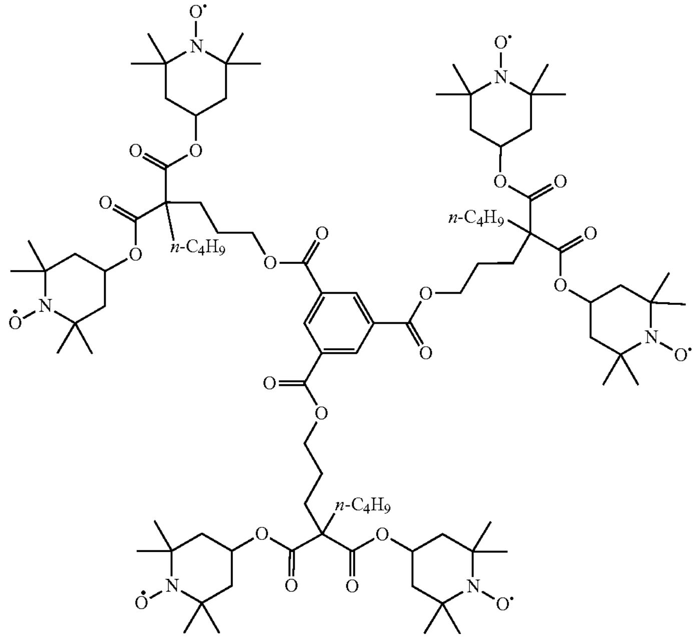

-continued
H-3-10
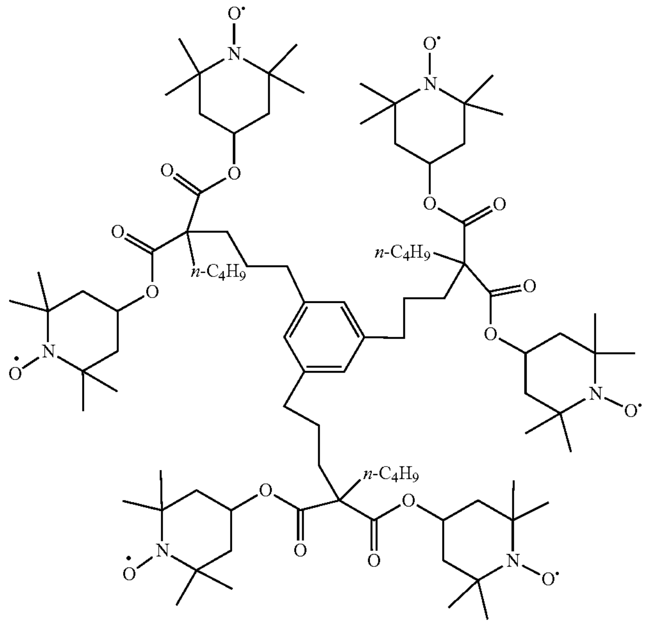
H-3-11
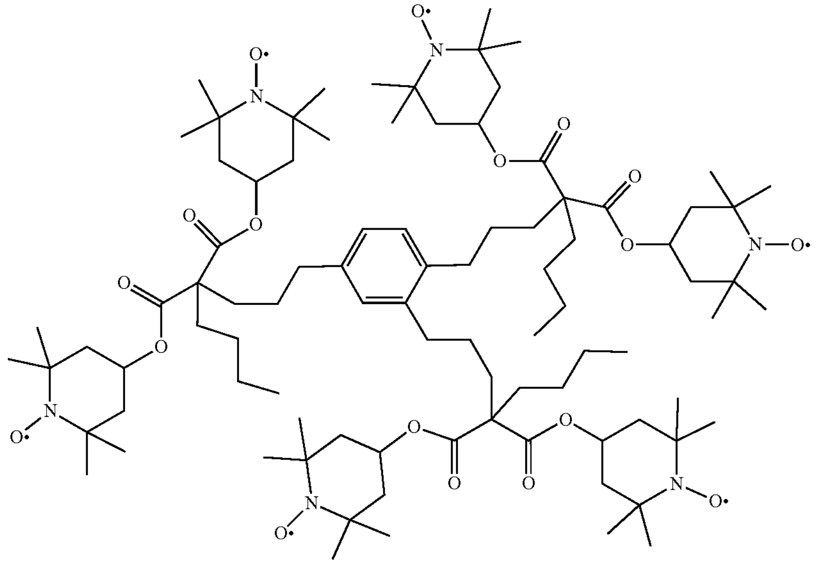

-continued
H-3-12
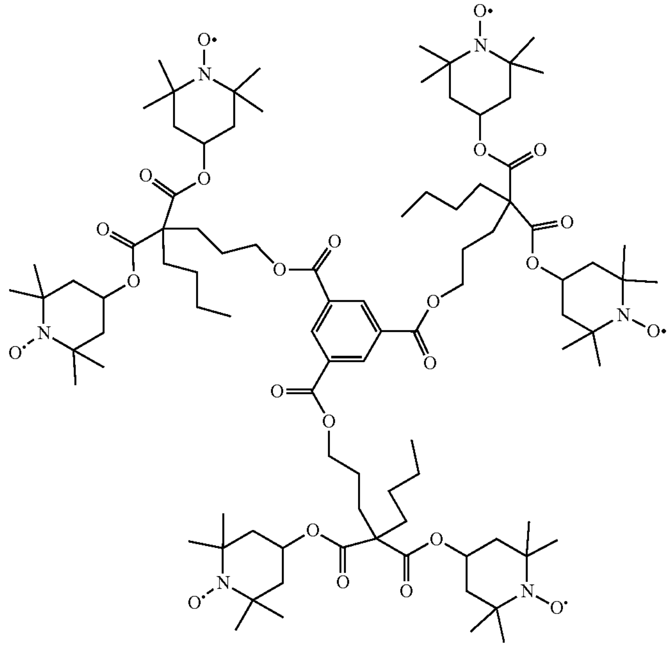
H-3-13
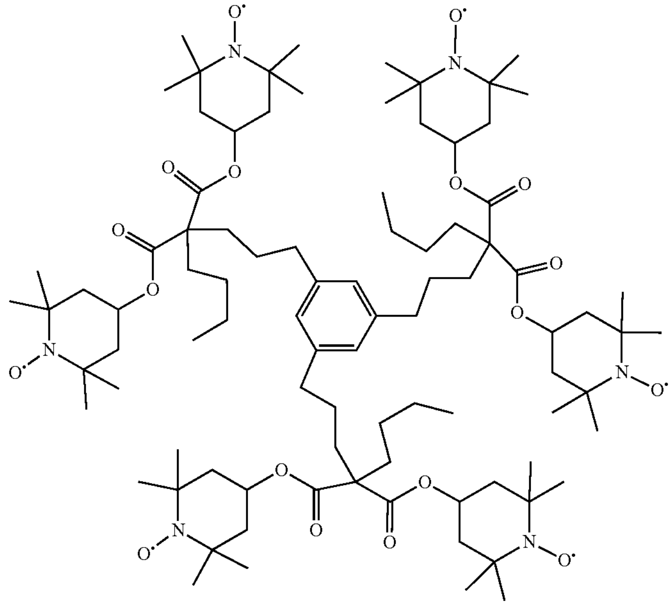

-continued
H-3-14
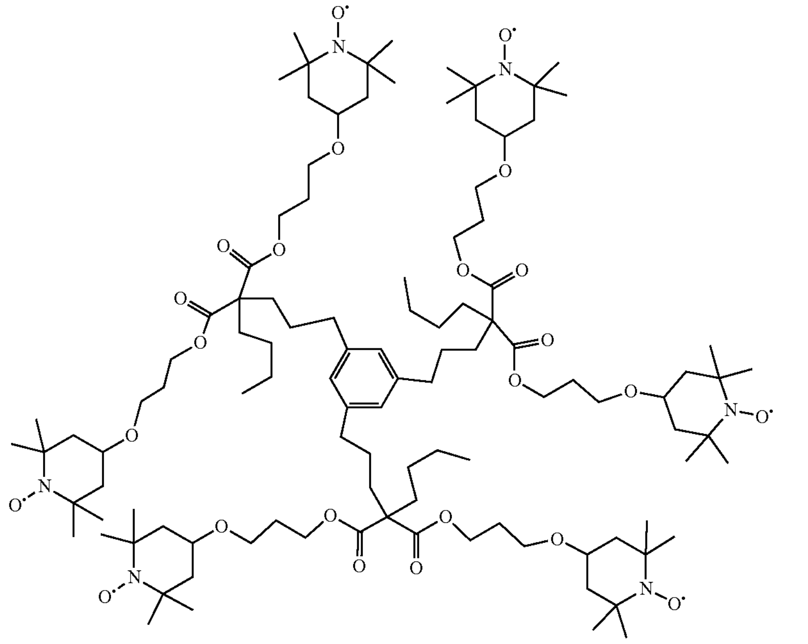
H-3-15
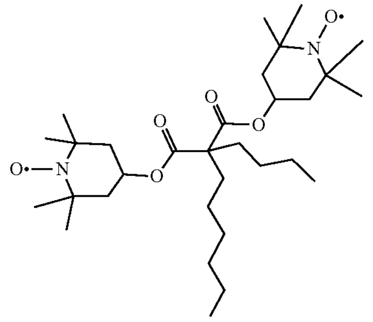
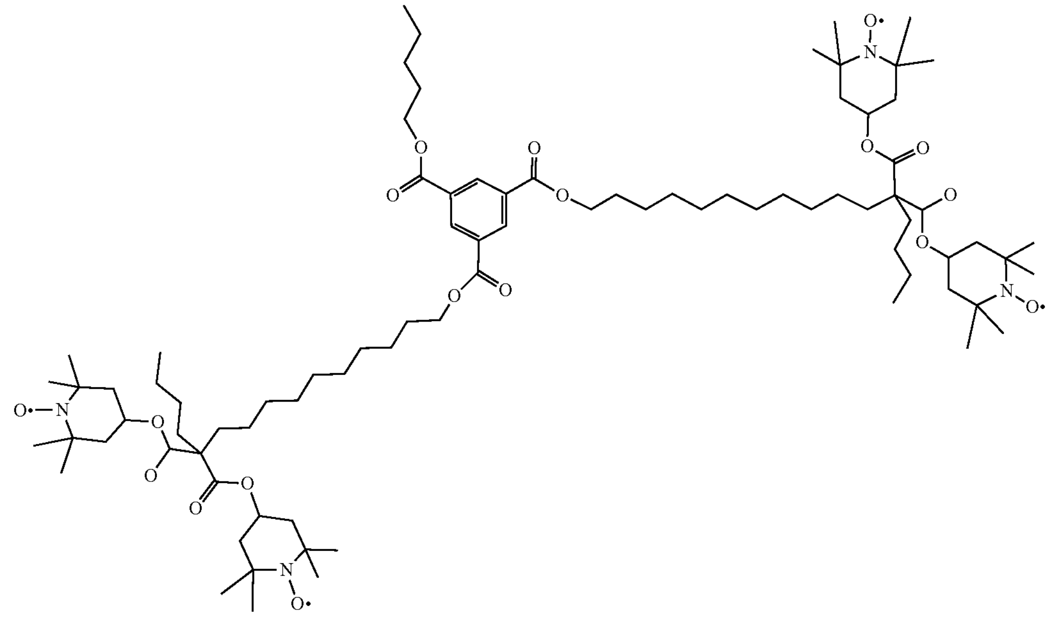

-continued
H-3-16
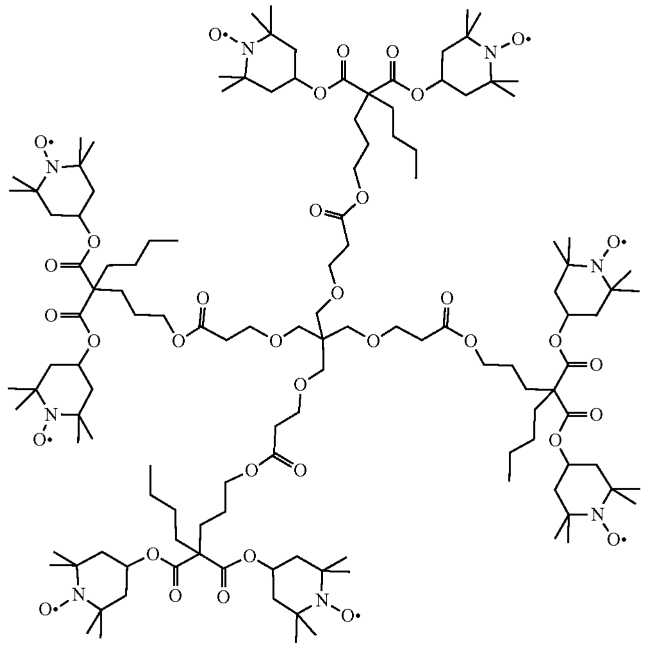
H-3-17
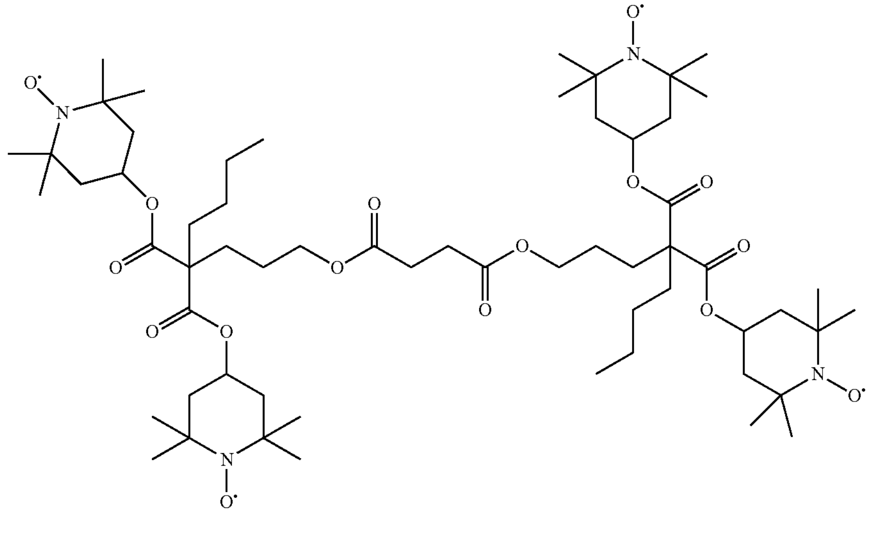

-continued
H-3-18
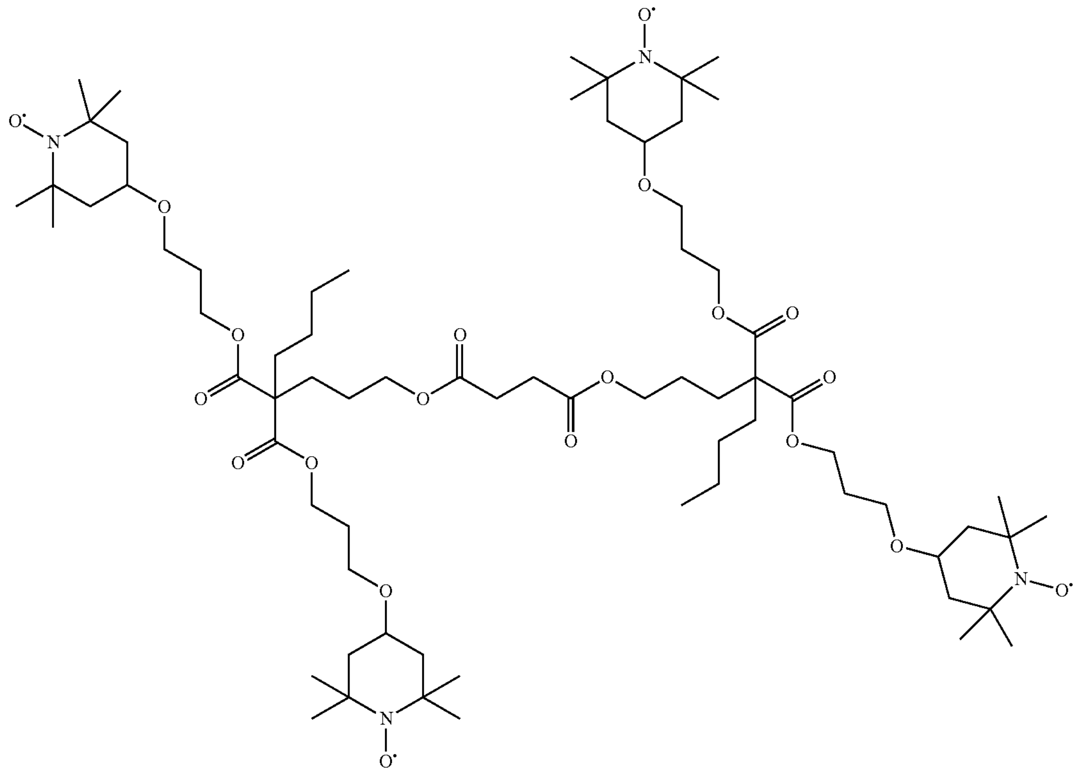
H-3-19
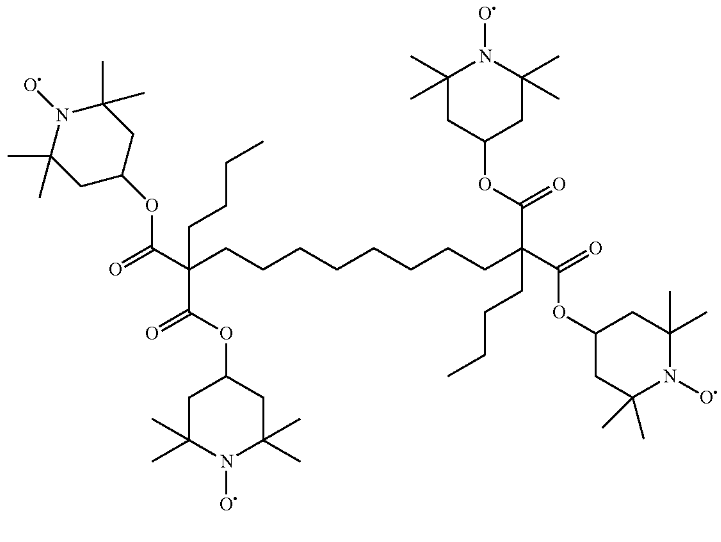

-continued
H-3-20
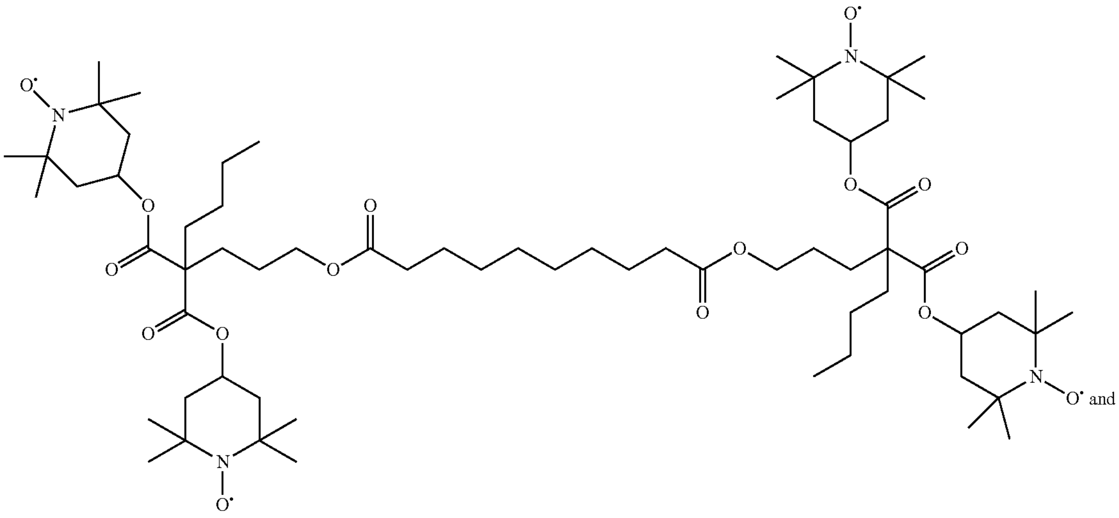
and
H-3-21
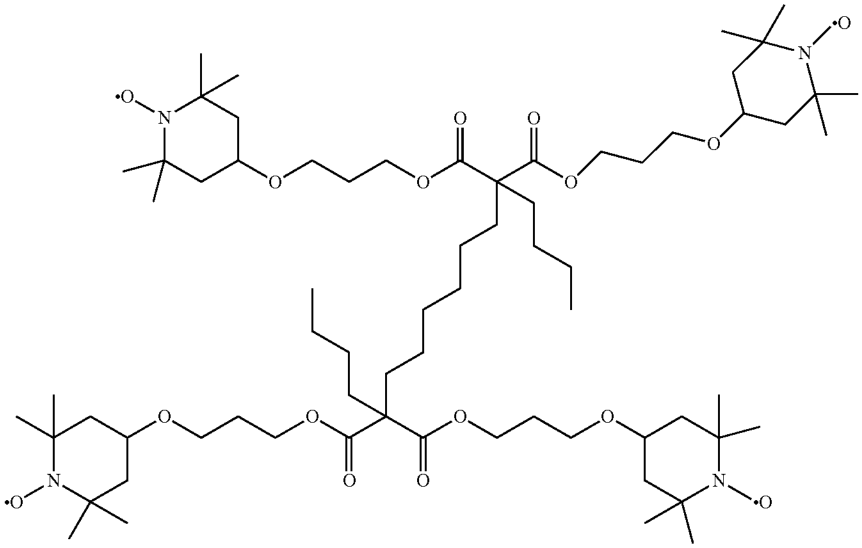
H-3-22
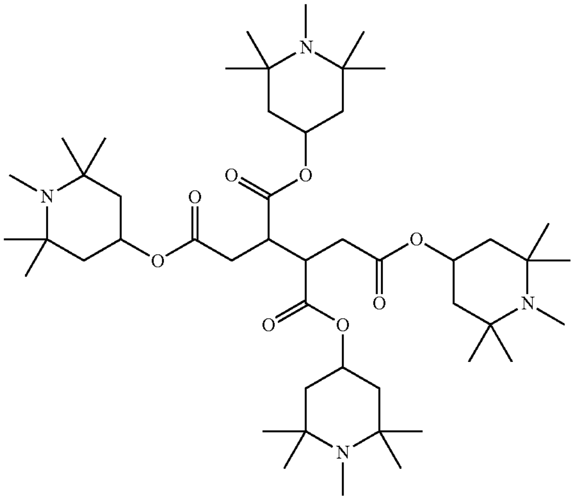

-continued

H-3-23

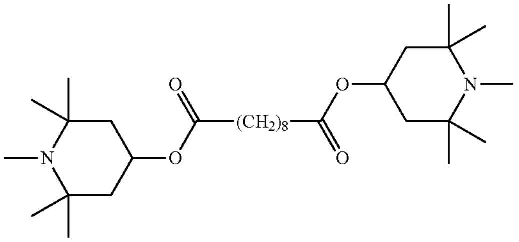

The preferred content of the one or more compounds of Formula H in the LC medium depends inter alia on the inherent chemical stability of the LC medium as well as on the nature of the compound of Formula H. Compounds of Formula H in which $R^{16}$ denotes O•, which are known as NO radical type HALS are preferably used in proportion ranging from 50 ppm to 1000 ppm, based on the weight of the LC medium. Compounds of Formula H in which $R^{16}$ denotes an H atom, which are known as NH radical type HALS are advantageously used in proportion ranging from 50 ppm to 2000 ppm, based on the weight of the LC medium.

Further Components

In one preferred embodiment, the LC medium may additionally comprise one or more compounds selected from the following Formulae II and III:

II

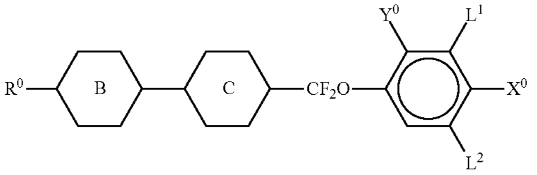

III

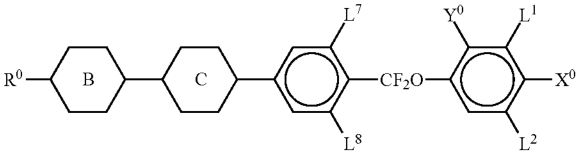

wherein the individual substituents, independently of each other and on each occurrence identically or differently, have the following meanings:

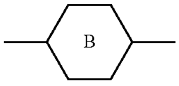

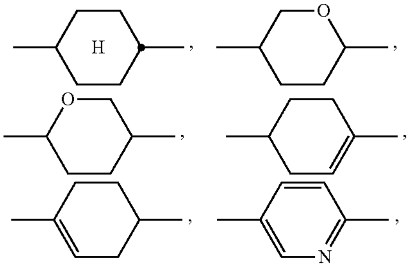

-continued

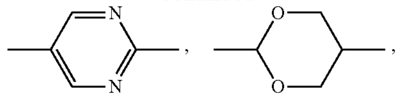

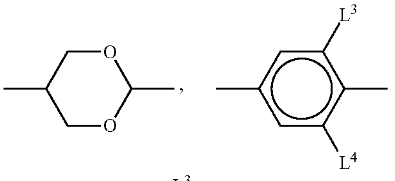

or

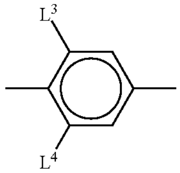

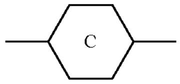

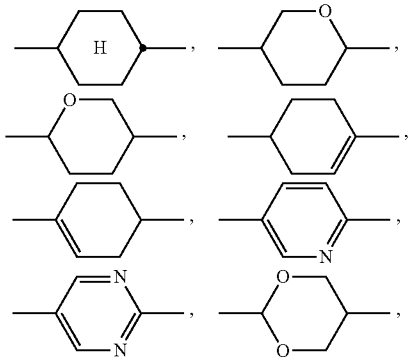

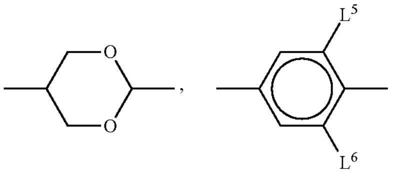

or

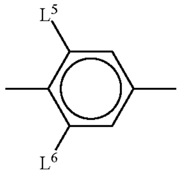

$R^0$ one of the meanings given for $R^0$ in Formula I, $X^0$ independently of one another F, Cl, an alkyl group, an alkenyl group, an alkoxy group or an alkenyloxy group having up to 6 C atoms, in which one or more H atoms has been substituted by a halogen atom, $L^{1-8}$ independently of one another H, F or Cl, and $Y^0$ H or $CH_3$.

Preferred compounds of the Formula II and Ill are those wherein $Y^0$ is H.

Further preferred compounds of the Formula II and Ill are those wherein $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F.

In a preferred embodiment, the LC medium comprises one or more compounds of the Formula II selected from the following subformulae:

II-1

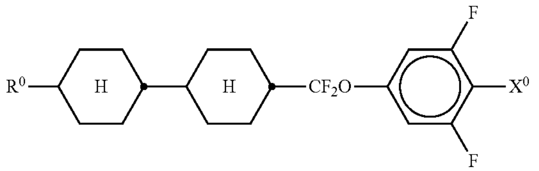

II-2

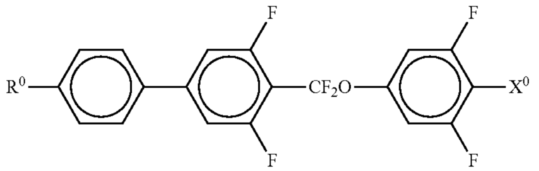

II-3

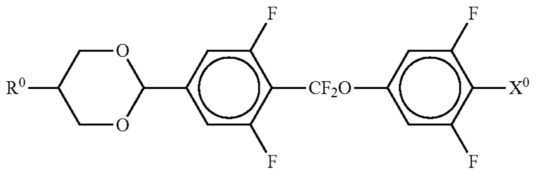

II-4

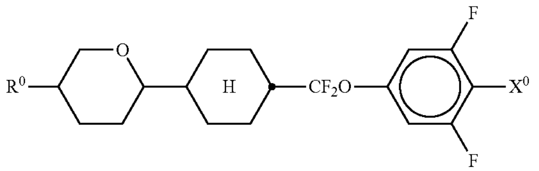

II-5

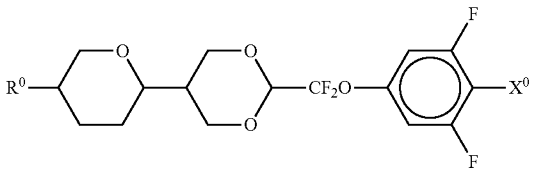

II-6

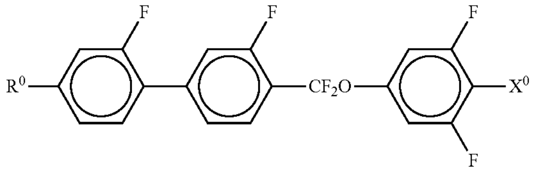

-continued

II-7

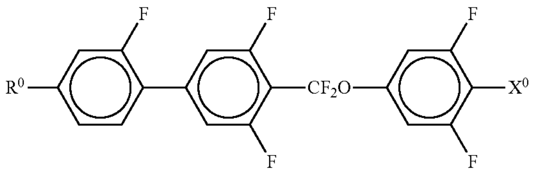

in which $R^0$ and $X^0$ have the meanings given in the Formula II.

Preferred compounds are those of the Formula II-1, ||-2 and 11-3, very preferred those of the Formula II-1 and 11-2.

In the compounds of the Formulae II-1 to 11-7 $R^0$ preferably denotes $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F.

In one embodiment, the LC medium contains one or more compounds of the Formula II or their subformulae as described above and below, wherein $Y^0$ is $CH_3$. Very preferably, the LC medium according to this preferred embodiment comprises one or more compounds of the Formula II selected from the following subformulae:

IIA-1

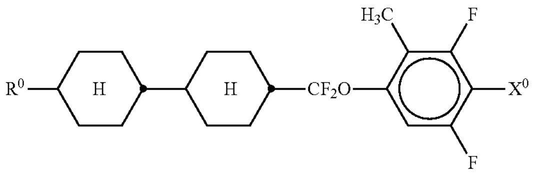

IIA-2

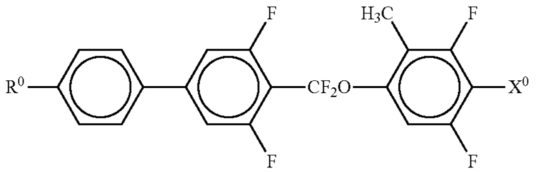

IIA-3

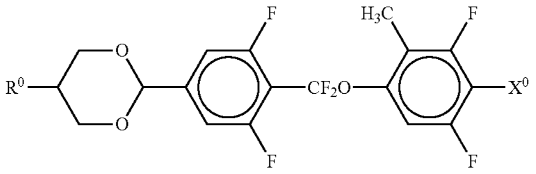

IIA-4

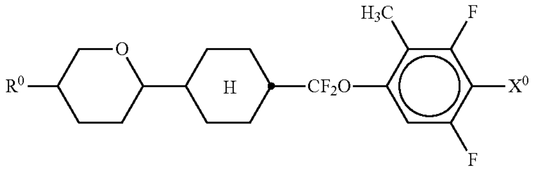

-continued

IIA-5

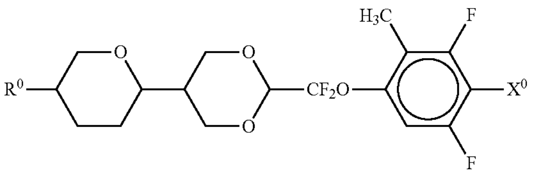

IIA-6

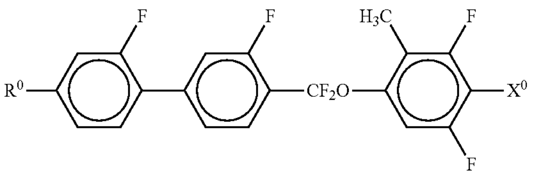

IIA-7

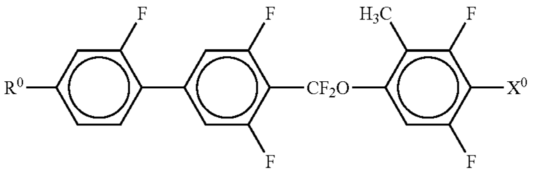

in which $R^0$ and $X^0$ have the meanings given in the Formula II.

Preferred compounds are those of the Formula IIA-1, IIA-2 and IIA-3, very preferred are those of Formula IIA-1 and IIA-2.

In the compounds of the Formulae IIA-1 to IIA-7 $R^0$ preferably denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F.

The proportion of the compounds of the Formula II in the LC medium is typically from 0 to 20%, very preferably from 1 to 15%, most preferably from 2 to 10% by weight.

In a further preferred embodiment, the LC medium comprises one or more compounds of the Formula III selected from the following subformulae:

III-1

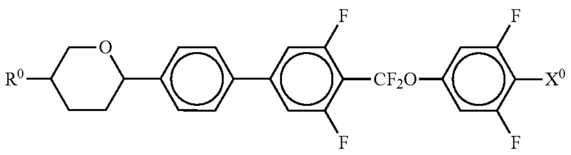

III-2

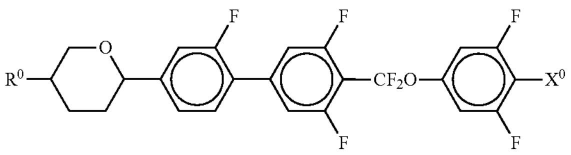

III-3

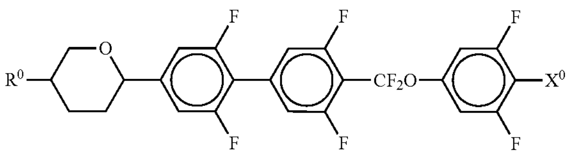

-continued

III-4

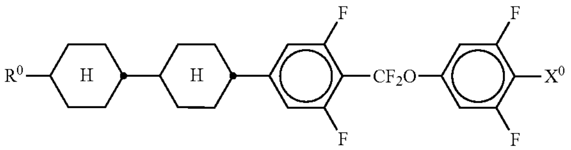

III-5

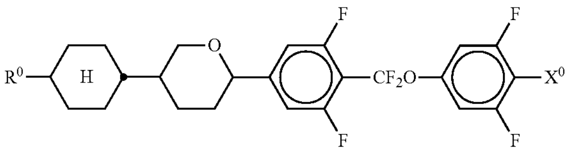

III-6

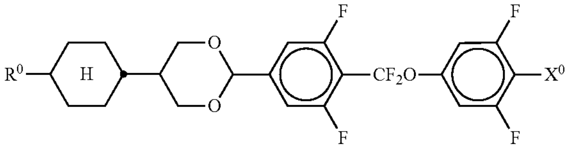

III-7

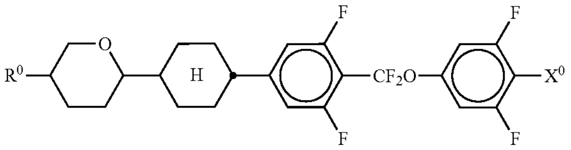

III-8

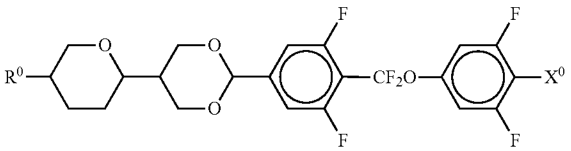

III-9

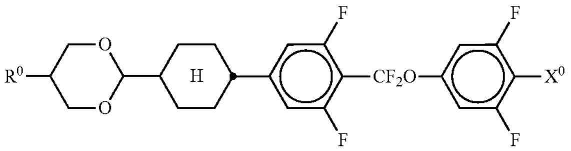

III-10

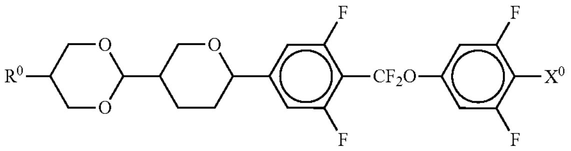

III-11

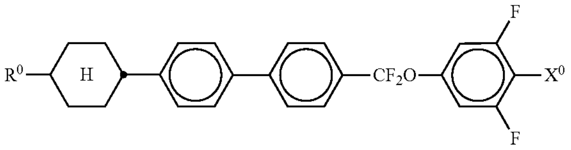

III-12

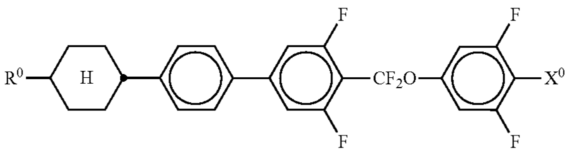

-continued

III-13

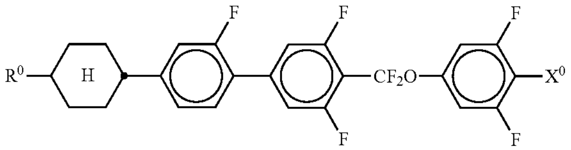

III-14

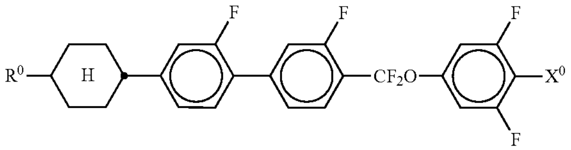

III-15

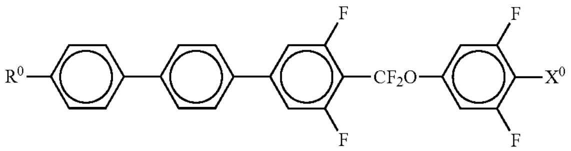

III-16

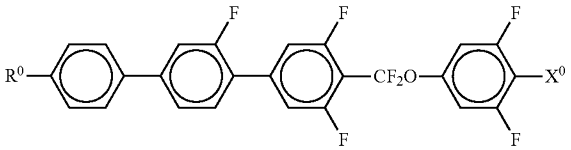

III-17

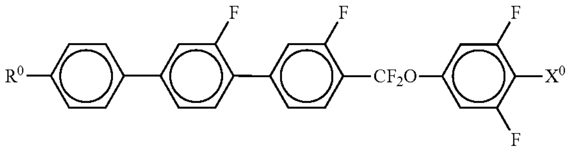

III-18

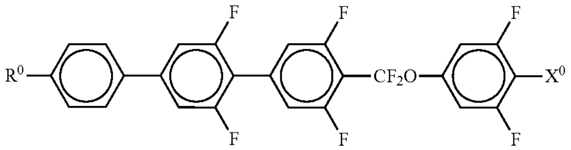

III-19

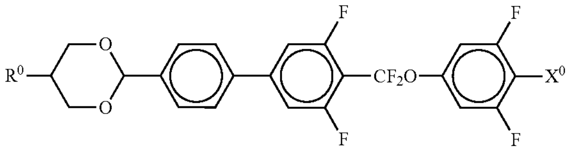

III-20

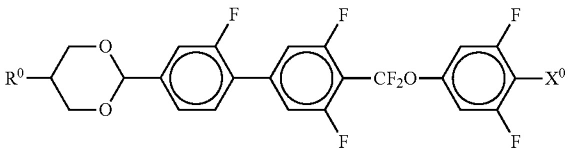

III-21

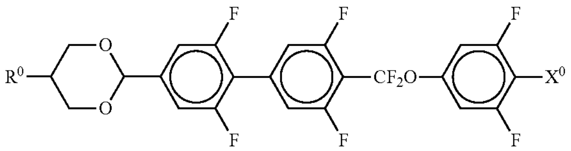

-continued

III-22

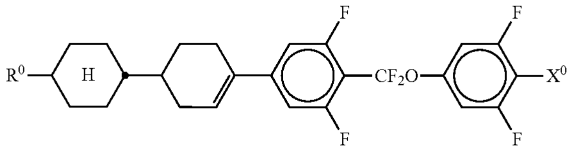

in which $R^0$ and $X^0$ have the meanings given in the Formula II.

Particularly preferred compounds are those of the Formulae Ill-1, Ill-4, Ill-6, Ill-16, Ill-19 and Ill-20.

In the compounds of the Formulae Ill-1 to Ill-22 $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F, and $Y^0$ preferably denotes H.

The LC medium may contain one or more compounds of the Formula III or their subformulae as described above and below wherein $Y^0$ is $CH_3$. Very preferably, the LC medium according to this preferred embodiment comprises one or more compounds of the Formula III selected from the following subformulae:

IIIA-1

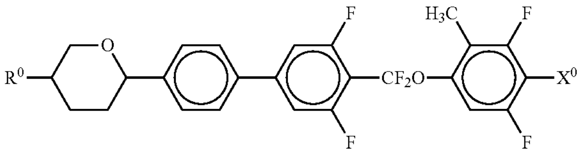

IIIA-2

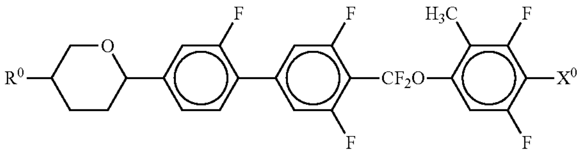

IIIA-3

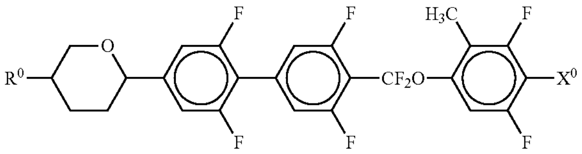

IIIA-4

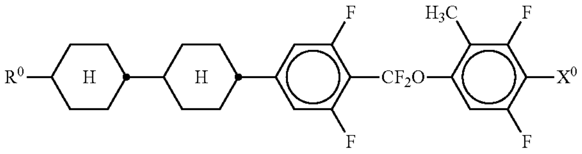

IIIA-5

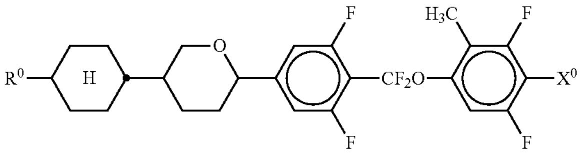

-continued

IIIA-6

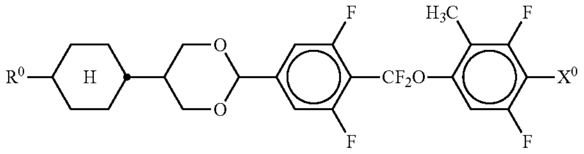

IIIA-7

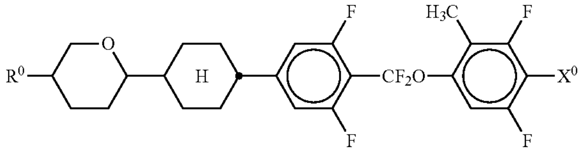

IIIA-8

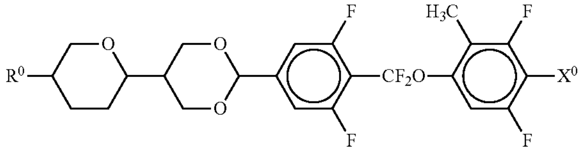

IIIA-9

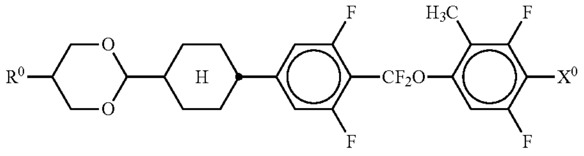

IIIA-10

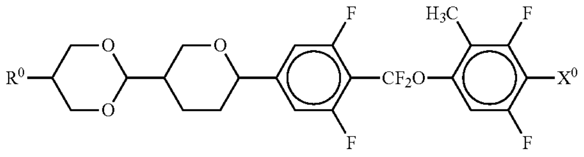

IIIA-11

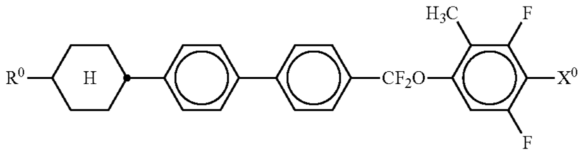

IIIA-12

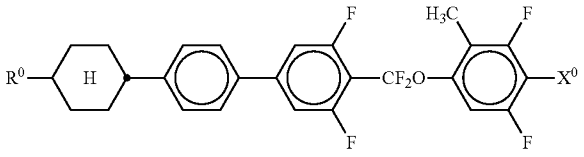

IIIA-13

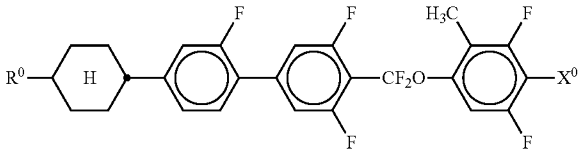

IIIA-14

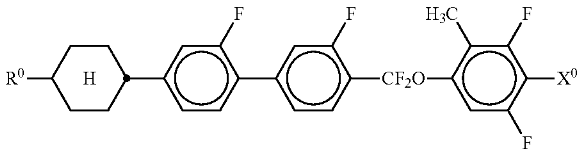

-continued

IIIA-15

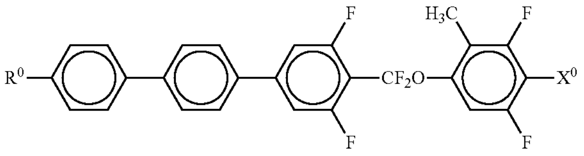

IIIA-16

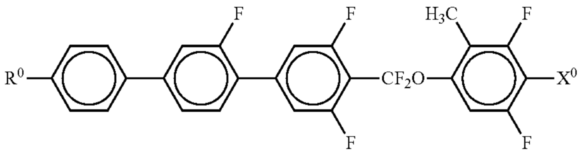

IIIA-17

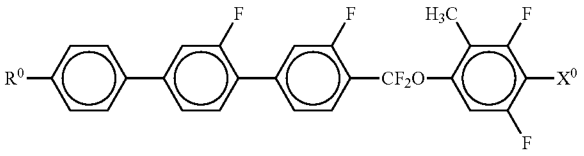

IIIA-18

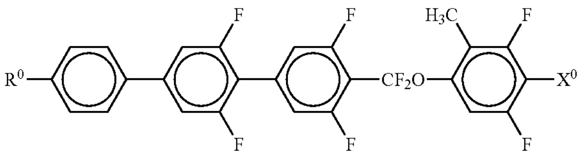

IIIA-19

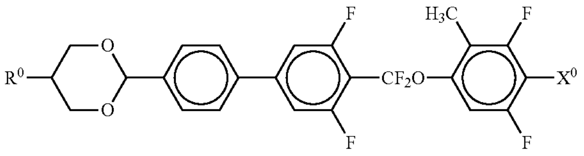

IIIA-20

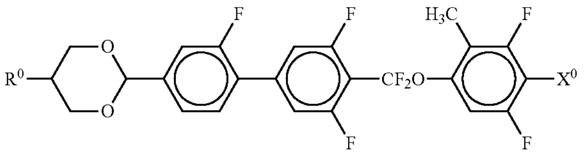

IIIA-21

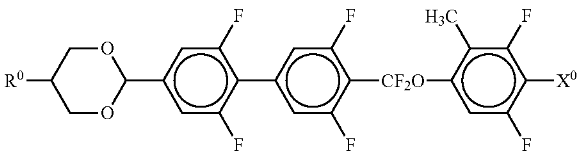

in which $R^0$ and $X^0$ have the meanings given in the Formula III.

Preferred compounds are those of the Formula IIIA-1, IIIA-4, IIIA-6, IIIA-16, IIIA-19 and IIIA-20.

In the compounds of the Formulae IIIA-1 to IIIA-21 $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F.

The proportion of the compounds of the Formula III in the LC medium is preferably from 5 to 60%, very preferably from 10 to 50%, most preferably from 20 to 40% by weight.

In a further preferred embodiment, the LC medium may additionally comprise one or more compounds selected from the following formulae:

IV

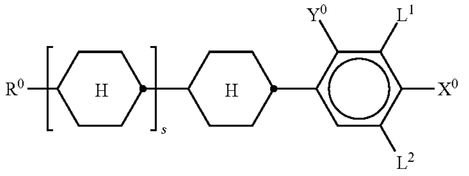

V

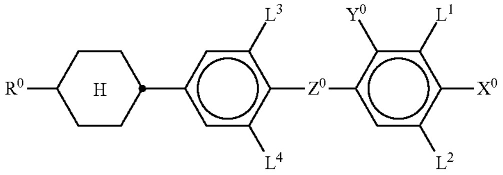

VI

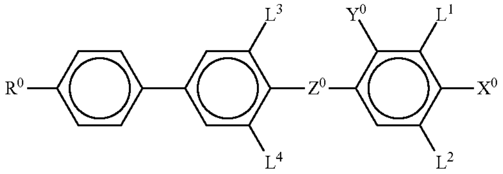

VII

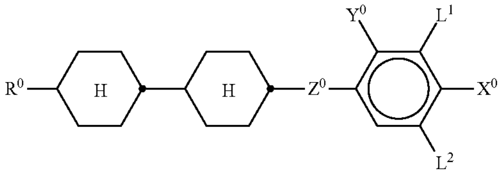

VIII

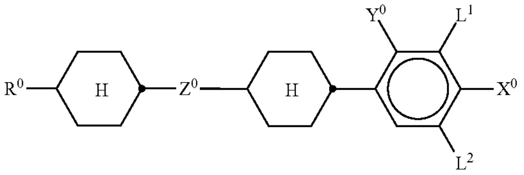

in which $R^0$, $X^0$, $L^{1-4}$ and $Y^0$ have the meanings indicated in the Formulae II and III, $Z^0$ denotes $-C_2H_4-$, $-(CH_2)_4-$, $-CH{=}CH-$, $-CF{=}CF-$, $-C_2F_4-$, $-CH_2CF_2-$, $-CF_2CH_2-$, $-CH_2O-$, $-OCH_2-$, $-COO-$, $-CF_2O-$, or $-OCF_2-$, in the Formulae V and VI also a single bond; and s denotes 0 or 1.

The compounds of the Formula IV are preferably selected from the following formulae:

IVa

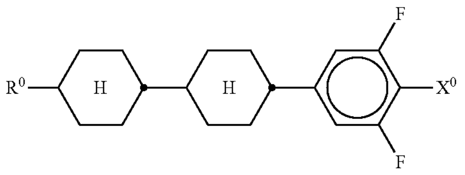

-continued

IVb

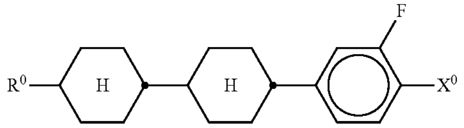

IVc

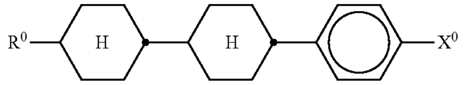

IVd

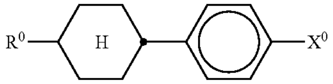

in which $R^0$ and $X^0$ have the meanings indicated in the Formulae II and III.

$R^0$ preferably denotes alkyl having 1 to 6 C atoms or cycloalkyl having 3 to 6 C atoms, very preferably ethyl, propyl, butyl or pentyl. $X^0$ preferably denotes F or $OCF_3$, furthermore $OCF{=}CF_2$, $OCHFCF_3$ or Cl.

The compounds of the Formula IVa are preferably represented by the following subformulae:

IVa-1

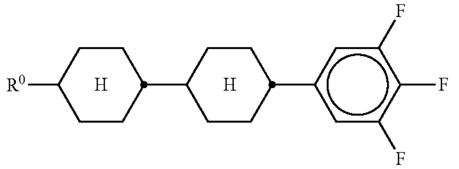

IVb-1

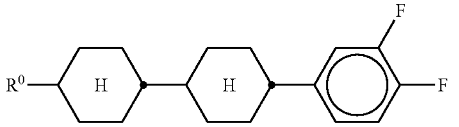

The compounds of the Formula IVb are preferably represented by the following formulae:

IVb-1

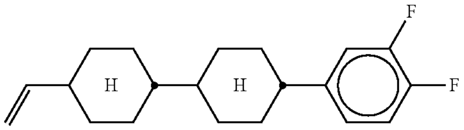

IVb-2

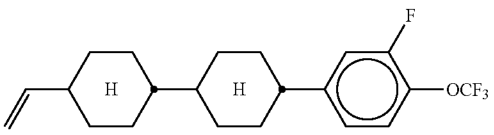

The compounds of the Formulae IVc are preferably represented by the following subformulae:

IVc-1

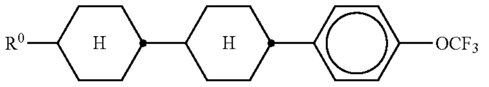

-continued

IVc-1a

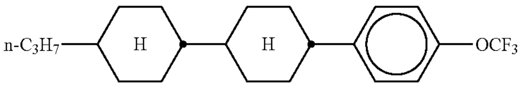

in which $R^0$ has the meanings indicated in the Formula II and is preferably alkyl having 1 to 6 C atoms or cycloalkyl having 3 to 6 C atoms, very preferably ethyl, n-propyl, n-butyl or n-pentyl.

The compound(s) of the Formula IVc, in particular of the Formula IVc-1, is (are) preferably employed in the LC media according to the invention in amounts of 1-20% by weight, particularly preferably 2-15% by weight.

The compounds of the Formula V are preferably selected from the following subformulae:

Va

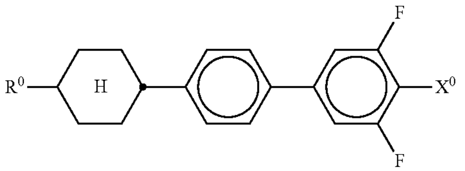

Vb

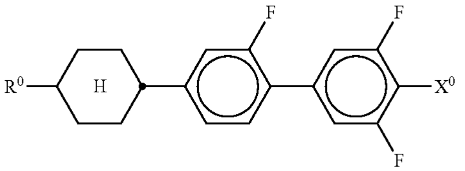

Vc

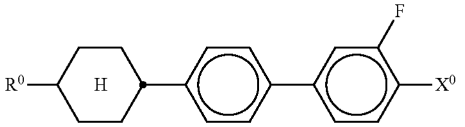

Vd

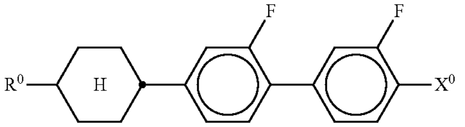

Ve

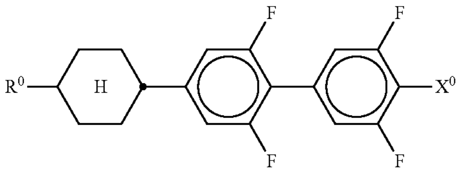

Vf

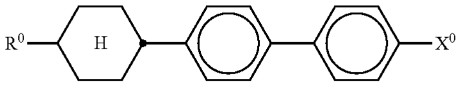

Vg

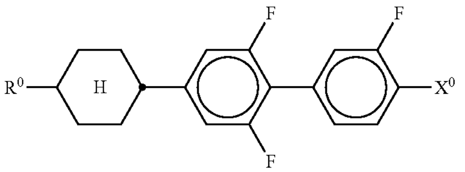

-continued

Vh

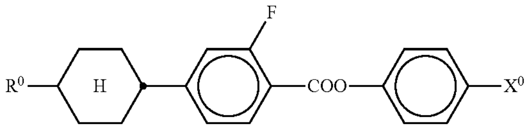

in which $R^0$ and $X^0$ have the meanings indicated in the Formula II.

$R^0$ preferably denotes alkyl having 1 to 6 C atoms or cycloalkyl having 3 to 6 C atoms, very preferably ethyl, propyl, butyl or pentyl. $X^0$ preferably denotes F and $OCF_3$, furthermore $OCHF_2$, $CF_3$, $OCF{=}CF_2$, $OCHFCF_3$ and $OCH{=}CF_2$.

The compounds of the Formula VI are preferably selected from the following subformulae:

VIa

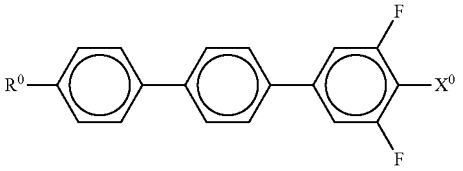

VIb

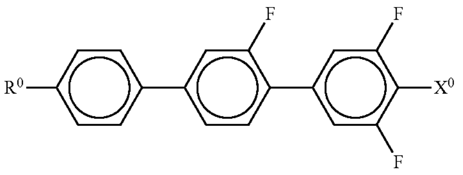

VIc

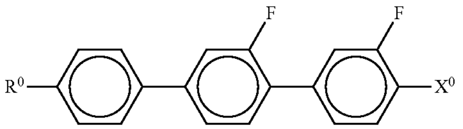

VId

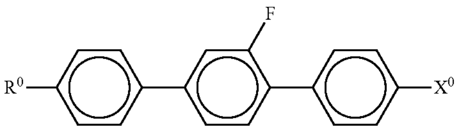

VIe

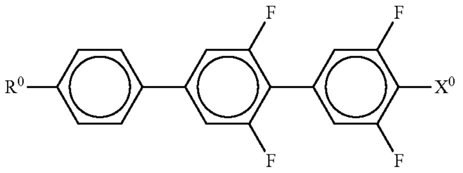

in which $R^0$ and $X^0$ have the meanings indicated in the Formula II.

$R^0$ preferably denotes alkyl having 1 to 6 C atoms or cycloalkyl having 3 to 6 C atoms, very preferably ethyl, n-propyl, n-butyl or n-pentyl. $X^0$ preferably denotes F, furthermore $OCF_3$, $CF_3$, $CF{=}CF_2$, $OCHF_2$, $OCHFCF_3$ and $OCH{=}CF_2$;

Preferred compounds of the Formulae Via to Vie are those selected from the following subformulae:

VIb-1

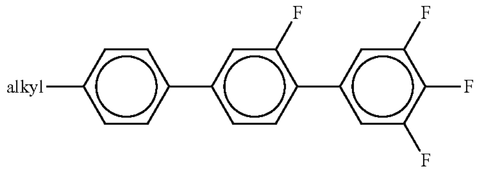

VIb-2

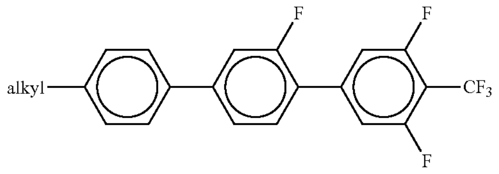

VIb-3

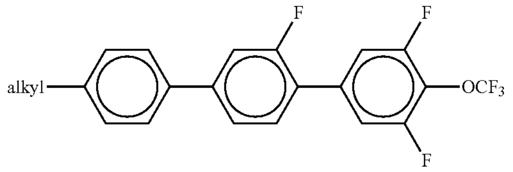

"alkyl" being an alkyl group with 1 to 6 C atoms.

The compounds of the Formula VII are preferably selected from the following subformulae:

VIIa

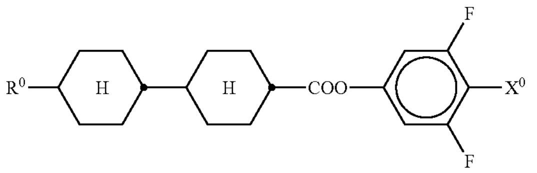

VIIb

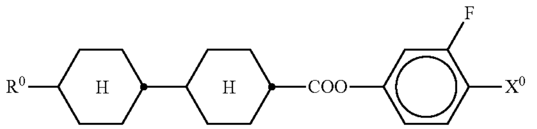

in which $R^0$ and $X^0$ have the meanings indicated in the Formula II.

$R^0$ preferably denotes alkyl having 1 to 6 C atoms or cycloalkyl having 3 to 6 C atoms, very preferably ethyl, propyl, butyl or pentyl. $X^0$ preferably denotes F, furthermore $OCF_3$, $OCHF_2$, $OCHFCF_3$ and $OCH{=}CF_2$.

In some embodiments, the LC medium additionally comprises one or more compounds selected from the following formulae:

XVIII

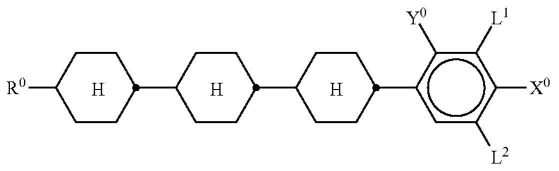

-continued

XIX

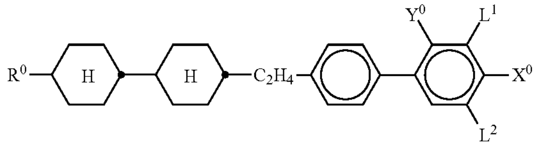

XX

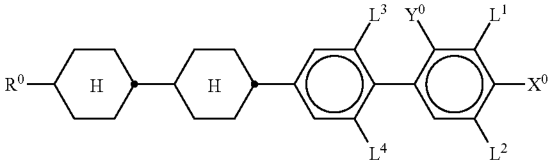

XXI

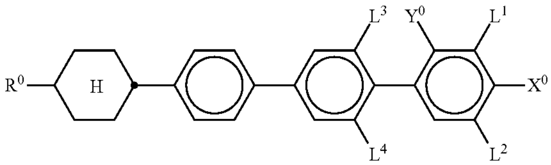

XXII

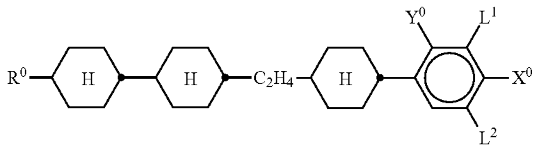

XXIII

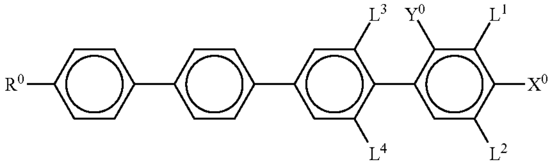

in which $R^0$ and $X^0$ each, independently of one another, have one of the meanings indicated in the Formula II, $L^{1-4}$ each, independently of one another, denote H or F, $Y^0$ denotes H or $CH_3$, preferably H, $X^0$ is preferably F, Cl, $CF_3$, $OCF_3$ or $OCHF_2$, $OCF{=}CF_2$, $OCHFCF_3$, $R^0$ preferably denotes alkyl, alkoxy, oxaalkyl, cycloalkyl, fluoroalkyl or alkenyl, each having up to 6 C atoms.

Very preferably, the LC medium according to the invention comprises one or more compounds of the Formula XXa:

XXa

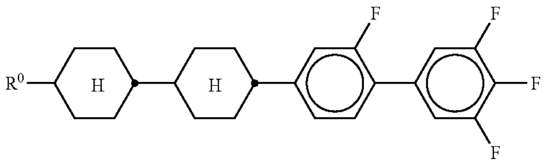

in which $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F. $R^0$ preferably denotes straight-chain alkyl, in particular ethyl, n-propyl, n-butyl or n-pentyl and very particularly preferably n-propyl.

The compound(s) of the Formula XX, in particular of the Formula XXa, is (are) preferably employed in the LC media according to the invention in amounts of 0-15% by weight, particularly preferably 1-10% by weight.

Very preferably, the LC medium according to the invention comprises one or more compounds of the Formula XXIa:

XXIa

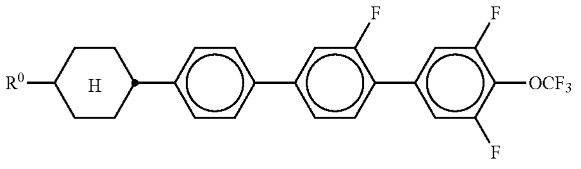

in which $R^0$ denotes alkyl having 1 to 6 C atoms or cycloalkyl having 3 to 6 C atoms, very preferably ethyl, propyl, butyl or pentyl. $R^0$ preferably denotes straight-chain alkyl, in particular ethyl, n-propyl, n-butyl or n-pentyl and very particularly preferably n-propyl.

The compound(s) of the Formula XXI, in particular of the Formula XXIa, is (are) preferably employed in the LC media according to the invention in amounts of 1-15% by weight, particularly preferably 2-10% by weight.

Further preferably, the LC medium according to the invention comprises one or more compounds of the Formula XXIIIa:

XXIIIa

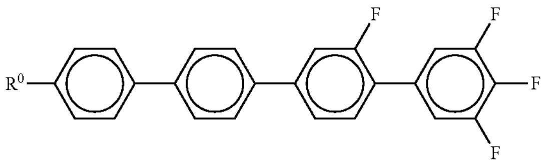

in which $R^0$ denotes alkyl having 1 to 6 C atoms or cycloalkyl having 3 to 6 C atoms. $R^0$ preferably denotes straight-chain alkyl, in particular ethyl, n-propyl, n-butyl or n-pentyl and very particularly preferably n-propyl or cycloalkyl, in particular cyclopentyl.

Preferred specific compounds of Formula XXIIIa include, in particular

XXIIIa-1

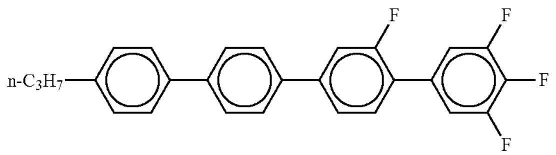

XXIIIa-2

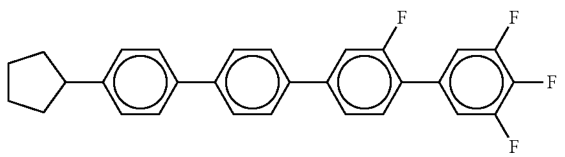

The compound(s) of the Formula XXIII, in particular of the Formula XXIIIa, is (are) preferably employed in the LC media according to the invention in amounts of 0.5-5% by weight, particularly preferably 0.5-2% by weight.

The LC medium may additionally comprise one or more compounds of the Formula XXIV:

XXIV

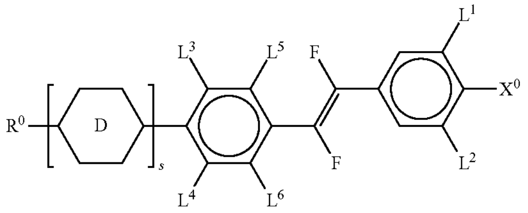

in which $R^0$, $X^0$ and $L^{1-6}$ have the meanings indicated in the Formula III, s denotes 0 or 1, and

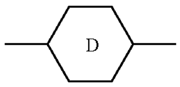 denotes 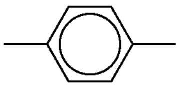 ,

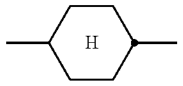 or 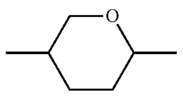 .

In the Formula XXIV, $X^0$ may also denote an alkyl group having 1 to 6 C atoms or an alkoxy group having 1 to 6 C atoms. The alkyl or alkoxy group is preferably straight-chain.

$R^0$ preferably denotes alkyl having 1 to 6 C atoms. $X^0$ preferably denotes F.

The compounds of the Formula XXIV are preferably selected from the following subformulae:

XXIVa

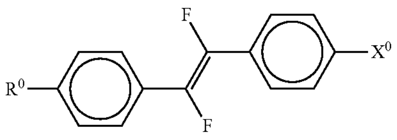

XXIVb

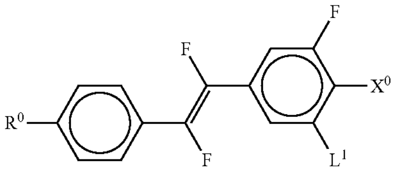

XXIVc

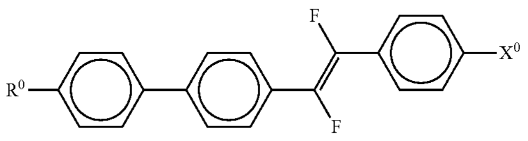

-continued

XXIVd

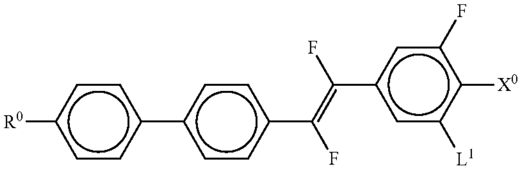

XXIVe

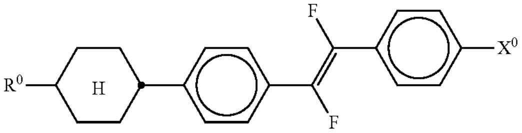

XXIVf

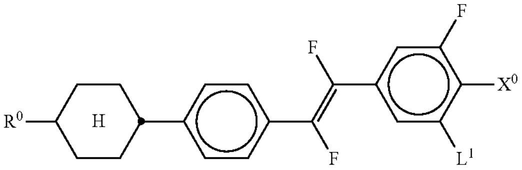

XXIVg

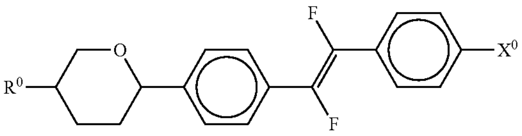

XXIVh

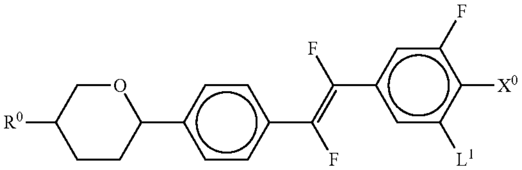

in which $R^0$, $X^0$ and $L^1$ have the meanings indicated in the Formula III. $R^0$ preferably denotes alkyl having 1 to 6 C atoms. $X^0$ preferably denotes F, and $L^1$ is preferably F;

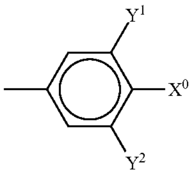

is preferably

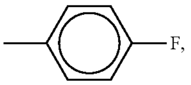
,
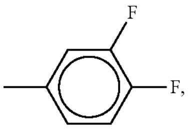
,

-continued

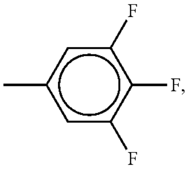
,
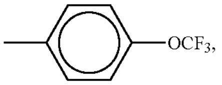
,
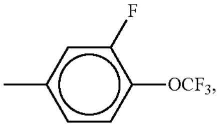
,
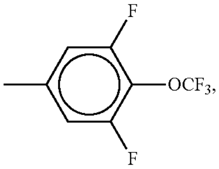
,
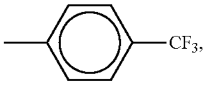
,
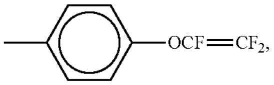
,
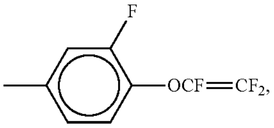
,
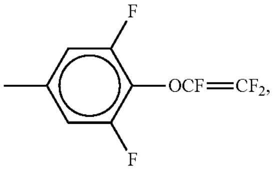
,
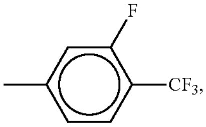
,
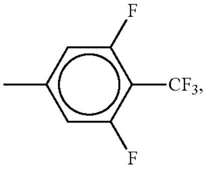
,
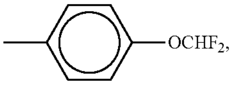
,
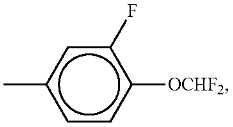
,
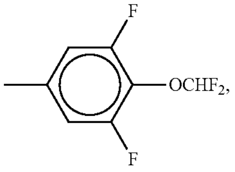
,
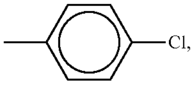
,
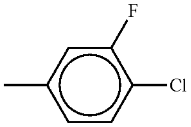
or
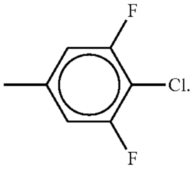
.

$R^0$ is straight-chain alkyl or alkenyl having 2 to 6 C atoms;

The LC medium may further comprise one or more compounds of the following formulae:

XXV

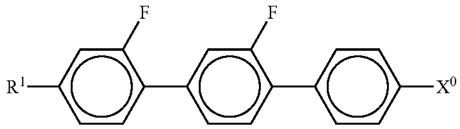

-continued

XXVI

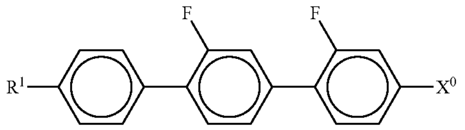

in which $R^1$ and $X^0$ have the meanings indicated in the Formula II for $R^0$ and $X^0$, respectively. $R^1$ preferably denotes alkyl having 1 to 6 C atoms or cycloalkyl having 3 to 6 C atoms, very preferably ethyl, propyl, butyl or pentyl. $X^0$ preferably denotes F, $CF_3$ or $OCF_3$, furthermore $OCF{=}CF_2$, $OCHFCF_3$ or Cl, very preferably F. In the Formula XXIV, $X^0$ very particularly preferably denotes Cl.

The LC medium may further optionally comprise one or more compounds of the following formulae:

XXVII

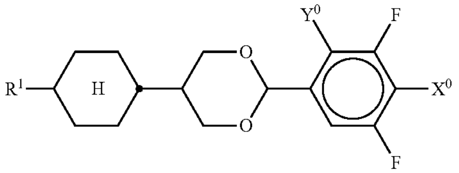

XXVIII

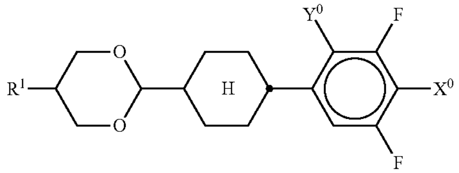

XXIX

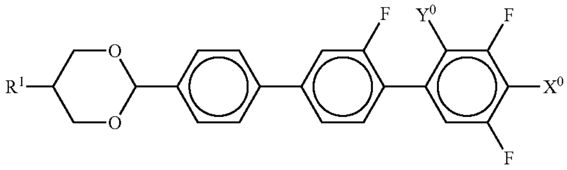

XXX

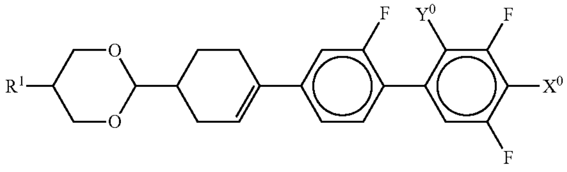

in which and $R^1$, $X^0$ and $Y^0$ have the meanings indicated in the Formula II for $R^0$, $X^0$ and $Y^0$, respectively. $R^1$ preferably denotes alkyl having 1 to 6 C atoms or cycloalkyl having 3 to 6 C atoms, very preferably ethyl, propyl, butyl or pentyl. $X^0$ preferably denotes F, $CF_3$ or $OCF_3$, furthermore $OCF{=}CF_2$, $OCHFCF_3$ or Cl, very preferably F, and $Y^0$ preferably denotes H. In some embodiments, the LC medium according to the invention preferably comprises one or more compounds of the Formula XXIX in which $X^0$ preferably denotes F.

The compounds of the Formula XXVIII are preferably selected from the subformulae XXVIIIa, wherein XXVIIIa-1 and XXVIIIa-2 are mostly preferred:

XXVIIIa

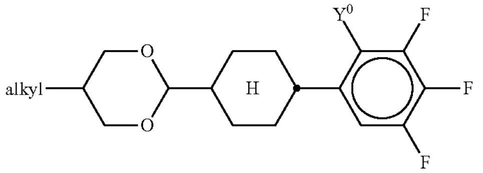

XXVIIIa-1

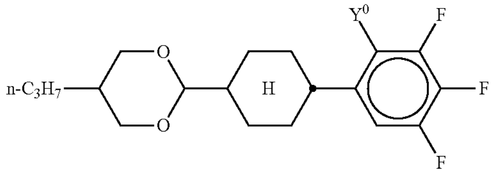

XXVIIIa-2

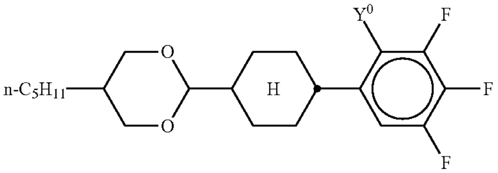

"alkyl" being an alkyl group with 1 to 6 C atoms.

The compound(s) of the Formulae XXVII-XXX is (are) preferably employed in the LC media according to the invention in amounts of 1-20% by weight, particularly preferably 1-15% by weight. Particularly preferred LC media comprise at least one compound of the Formula XXIX and/or the Formula XXX.

Very preferably, the LC medium according to the invention comprises one or more compounds of the Formulae XXIXa and/or XXXa:

XXIXa

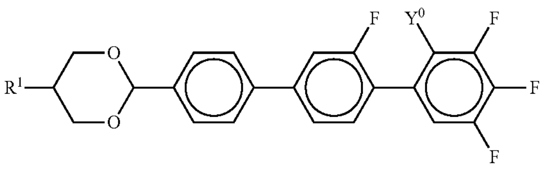

XXXa

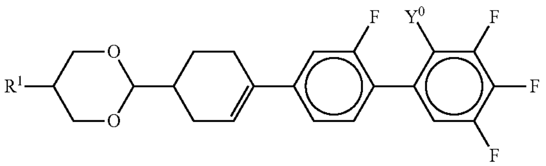

in which $R^1$ and $Y^0$ have the meanings indicated for $R^0$ and $Y^0$ in the Formula II, and preferably $R^1$ denotes alkyl having 1 to 6 C atoms or cycloalkyl having 3 to 6 C atoms, very preferably ethyl, propyl, butyl or pentyl.

The compound(s) of the Formulae XXIXa and/or XXXa is/are preferably employed in the LC media according to the invention in amounts of 1-15% by weight, particularly preferably 2-10% by weight.

The LC medium may further comprise one or more compounds of the following pyrimidine or pyridine compounds of the following formulae:

XXXI-1

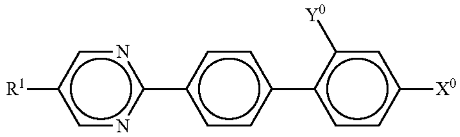

XXXI-2

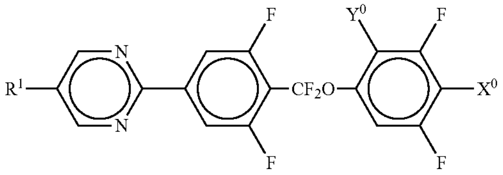

XXXI-3

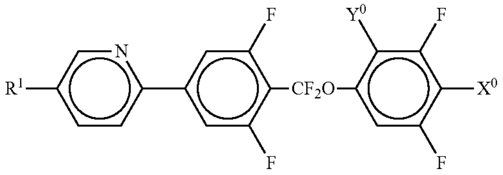

in which $R^1$, $X^0$ and $Y^0$ have the meanings indicated in the Formula II for $R^0$, $X^0$ and $Y^0$, respectively. $R^1$ preferably denotes alkyl having 1 to 6 C atoms or cycloalkyl having 3 to 6 C atoms, very preferably ethyl, propyl, butyl or pentyl. $X^0$ preferably denotes F, $CF_3$ or $OCF_3$, furthermore $OCF{=}CF_2$, $OCHFCF_3$ or Cl, very preferably F and $Y^0$ preferably denotes H. The medium according to the invention particularly may optionally comprise one or more compounds of the Formula XXXI-1, in which $X^0$ preferably denotes F. The compound(s) of the Formulae XXXI-1 to XXXI-3 may be employed in the LC media according to the invention in amounts of 1-20% by weight, particularly preferably 1-15% by weight.

Preferably, in addition to the compounds of the Formula I, an antioxidant and, optionally, a light stabilizer, the LC medium contains one or more compounds of the Formulae N1 and N2:

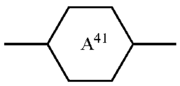

and

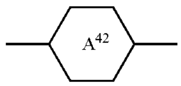

independently of one another and, if

occurs twice, also these independently of one another, denote

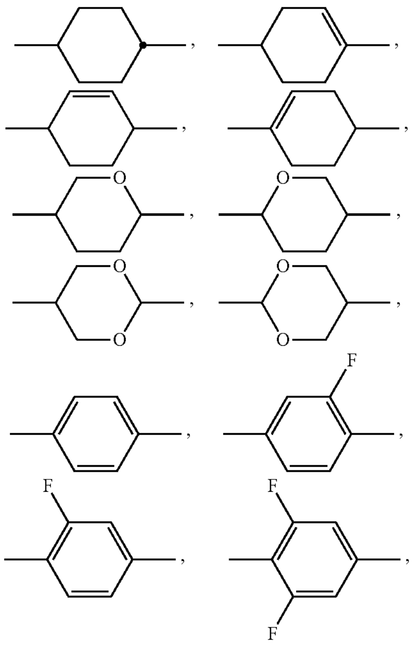

N1

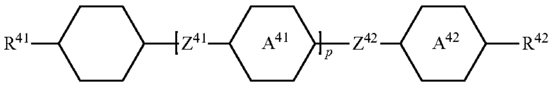

N2

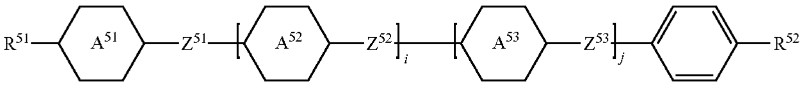

in which $R^{41}$ and $R^{42}$ independently of one another, have the meaning indicated above for $R^0$ under Formula I, preferably $R^{41}$ denotes alkyl and $R^{42}$ denotes alkyl or alkoxy or $R^{41}$ denotes alkenyl and $R^{42}$ denotes alkyl, wherein one $—CH_2—$ group may be replaced by cyclopropylene, 1,3-cyclobutylene, 1,3-cyclopentylene, 1,3-cyclopentenylene, preferably by cyclopropylene or 1,3-cyclopentylene, -continued

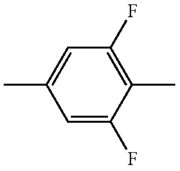

or

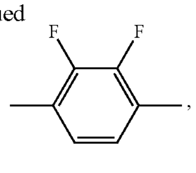

, preferably one or more of

and

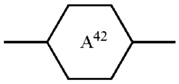

denotes or denote,

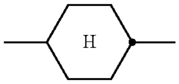

$Z^{41}$ and $Z^{42}$, independently of one another and, if $Z^{41}$ occurs twice, also these independently of one another, denote —$CH_2CH_2$—, —COO—, trans-CH═CH—, trans—CF═CF—, —$CH_2O$—, —$CF_2O$—, —C≡C— or a single bond, preferably one or more thereof denotes/denote a single bond, and p denotes 0, 1 or 2, preferably 0 or 1, and $R^{51}$ and $R^{52}$, independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy, wherein one —$CH_2$— group may be replaced by cyclopropylene, 1,3-cyclobutylene, 1,3-cyclopentylene, 1,3-cyclopentenylene, preferably by cyclopropylene or 1,3-cyclopentylene,

to

, if present, each, independently of one another, denote

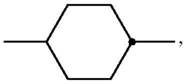

,

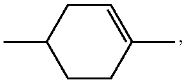

,

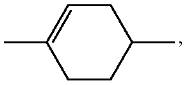

,

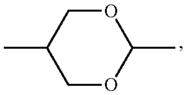

,

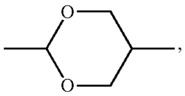

,

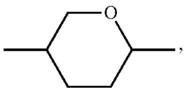

,

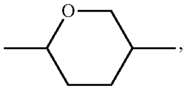

,

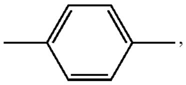

,

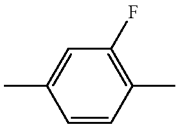

or

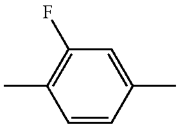

, preferably

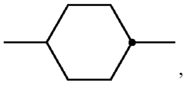

,

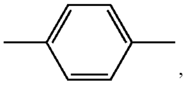

,

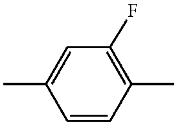

, or

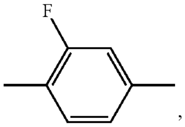

, preferably

denotes

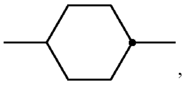

, and, if present,

preferably denotes,

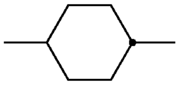

, $Z^{51}$ to $Z^{53}$ each, independently of one another, denote —$CH_2$—$CH_2$—, —$CH_2$—O—, —CH═CH—, —C≡C—, —COO— or a single bond, preferably —$CH_2$—$CH_2$—, —$CH_2$—O— or a single bond and particularly preferably a single bond, i and j each, independently of one another, denote 0 or 1, (i+j) preferably denotes 0, 1 or 2, more preferably 0 or 1 and, most preferably, 1, and wherein the one or more, preferably one, of the aromatic rings present may optionally be substituted by an alkyl group, preferably by methyl.

In some embodiments, the LC medium contains one or more compounds selected from the following formulae:

Z1

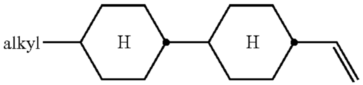

Z2

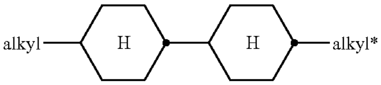

Z2'

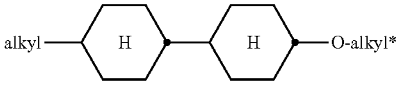

Z3

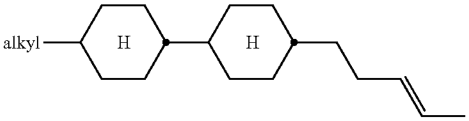

-continued

Z4

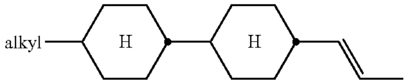

Z5

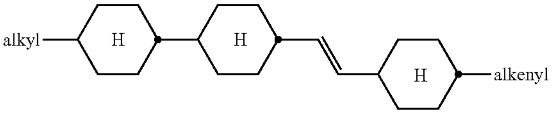

Z6

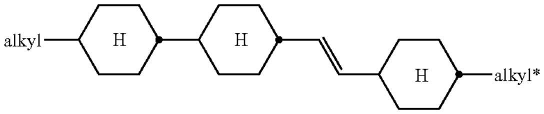

Z7

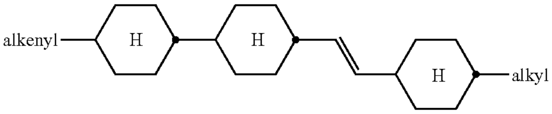

Z8

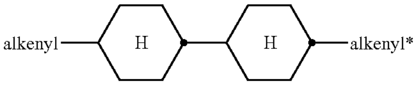

Z9

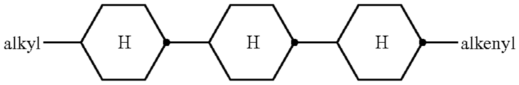

Z9'

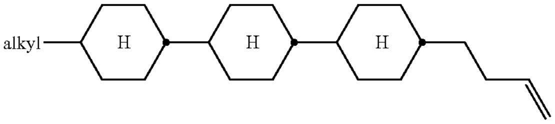

Z10

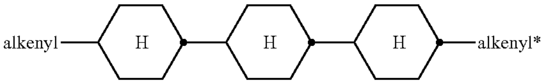

Z11

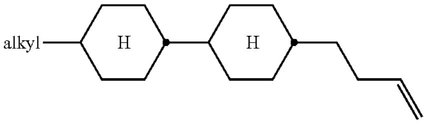

wherein

"alkyl" and "alkyl*" each, independently from one another, denote an alkyl group having 1 to 6 C atoms;

"alkenyl" and "alkenyl*" each, independently of one another, denote an alkenyl group having 2 to 6 C atoms.

Very preferred are compounds of the Formula $Z^1$ and $Z^2$.

Preferred compounds of the Formulae $Z^1$ to $Z^6$ are those selected from the following subformulae:

Z1-1

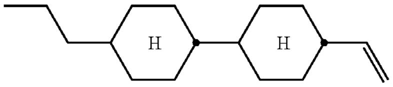

-continued

Z1-2

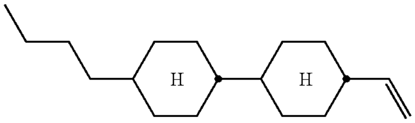

Z1-3

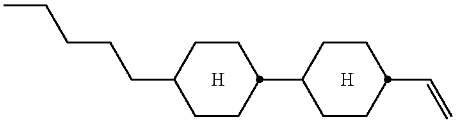

Z2-1

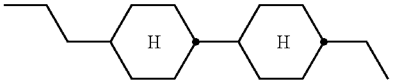

Z2-2

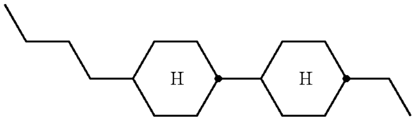

Z2-3

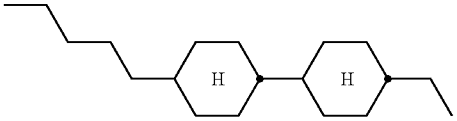

Z2-4

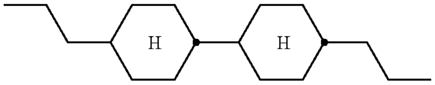

Z2-5

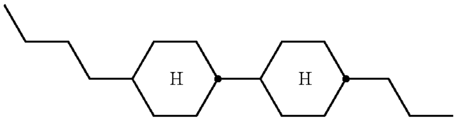

Z2-6

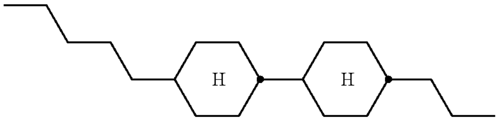

Z3-1

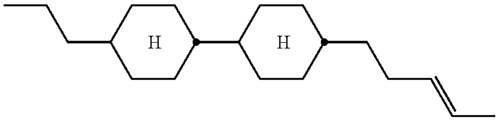

Z4-1

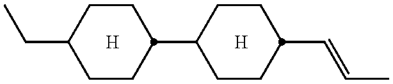

Z4-2

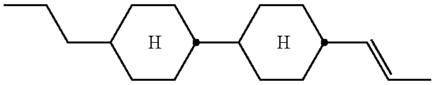

Z4-3

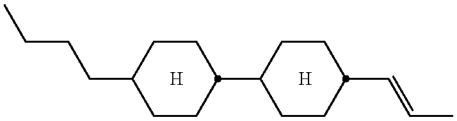

-continued

Z4-4

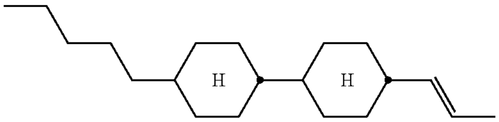

Z7-1

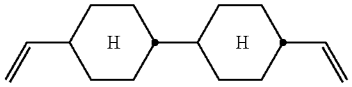

Z7-2

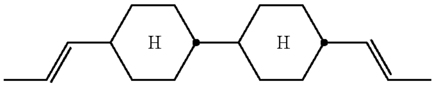

Z7-3

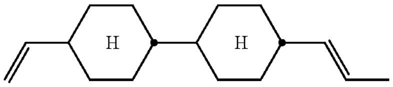

Z9-1

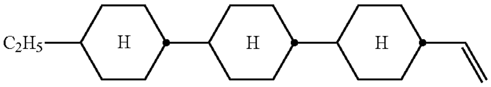

Z9-2

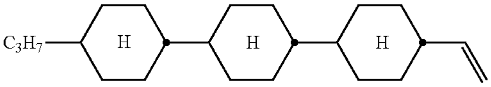

Z9-3

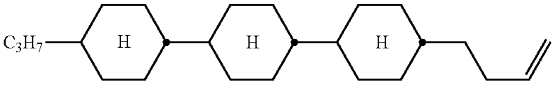

Z9-4

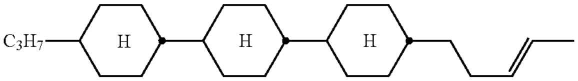

Z10-1

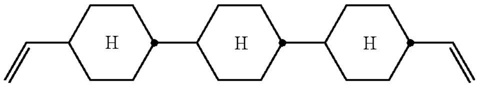

Z11-1

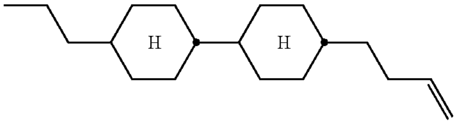

In another preferred embodiment, the LC medium contains one or more compounds of the Formula Z1 or its preferred subformulae and/or one or more compounds selected from the Formulae Z2, Z3, Z4 and Z5 or their preferred subformulae.

Preferably, the total proportion of compounds of the Formula Z1, Z2, Z3, Z4, Z5 and Z6 or their subformulae, such as CC-3-V in the medium is from 10 to 65%, very preferably from 20 to 60%, most preferably from 25 to 55% by weight. In yet a more preferred embodiment, the compound of the Formula Z1-1 is used in concentrations ranging from 10 wt.-% to 60 wt.-%, more preferably 25 wt.-% to 50 wt.-%, based on the total weight of the LC medium. In a further preferred embodiment, the LC medium comprises 50 wt.-% to 70 wt.-% of compounds represented by the Formulae Z1-1 and Z4-2 in total.

Preferably, the medium contains 1, 2 or 3 compounds selected from the Formulae Z1, Z2, Z3 and Z4 or their subformulae.

The LC medium may additionally comprise one or more compounds of the following general formulae:

XII

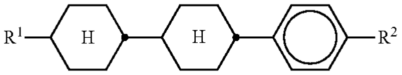

in which $R^1$ and $R^2$ each, independently from one another, denote $C_{1-6}$-alkyl, $C_{1-6}$-alkoxy or $C_{2-6}$-alkenyl.

The compounds of the Formula XII are preferably selected from the following subformulae:

XIIa

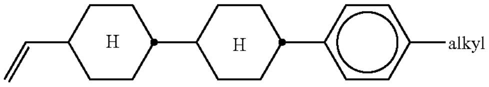

XIIb

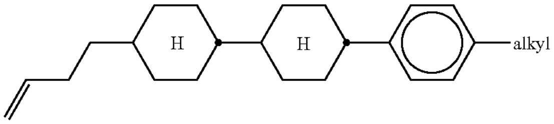

XIIc

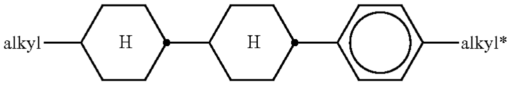

wherein “alkyl” and “alkyl*” each, independently from one another, denote methyl, ethyl, propyl, butyl, pentyl or hexyl.

Particular preference is given to the compounds of the Formulae XIIa and XIIc. In the Formula XIIb, “alkyl” preferably, independently of one another, denotes n-$C_3H_7$, n-$C_4H_9$ or n-$C_5H_{11}$, in particular n-$C_3H_7$. In the Formula XIIc, “alkyl” preferably denotes n-$C_3H_7$ and “alkyl” is preferably $CH_3$ or n-$C_3H_7$.

Particularly preferred compounds of the Formula XII are described by the following structures:

XIIa-1

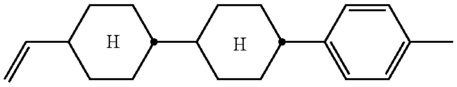

XIIa-2

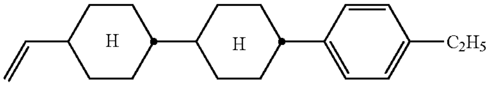

XIIc-1

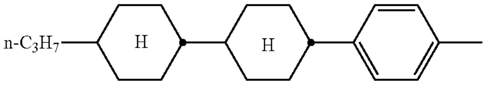

XIIc-3

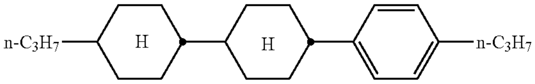

The LC medium may additionally comprise one or more compounds selected from the following formulae:

XIV

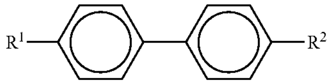

XV

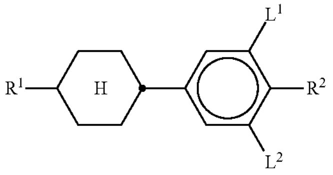

in which $L^1$ and $L^2$ have the meanings indicated in the Formula III, and $R^1$ and $R^2$ each, independently of one another, denote n-alkyl, cycloalkyl, alkoxy, oxaalkyl, fluoroalkyl or alkenyl, each having up to 6 C atoms, and preferably each, independently of one another, denote alkyl having 1 to 6 C atoms; in the compound of the Formula XIV, at least one of the substituents $R^1$ and $R^2$ preferably denotes alkenyl having 2 to 6 C atoms.

The LC medium may further optionally comprise one or more compounds of the Formula XIV in which at least one of the substituents $R^1$ and $R^2$ denotes alkenyl having 2 to 6 C atoms, preferably those selected from the following subformulae:

XIVa

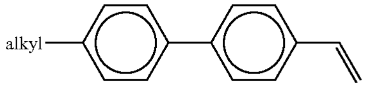

XIVb

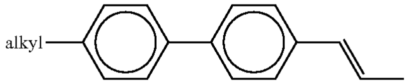

XIVc

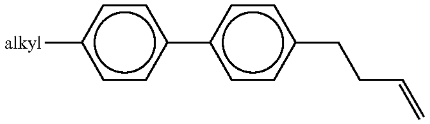

XIVd

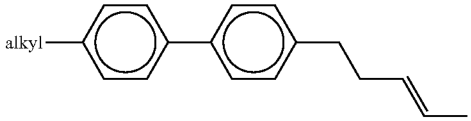

XIVe

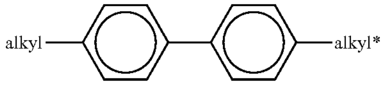

in which "alkyl" and "alkyl*" have the meaning indicated above, and each, independently of one another, preferably denote methyl, ethyl or propyl.

The compounds of the Formulae XIV are preferably selected from the following subformulae:

XIVc-1

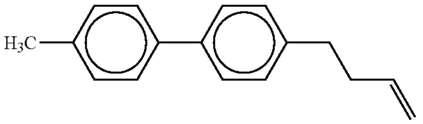

-continued

XIVd-1

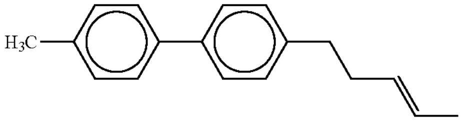

XIVd-2

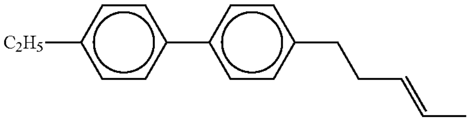

XIVe-1

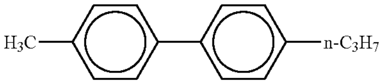

XIVe-2

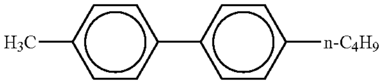

XIVe-3

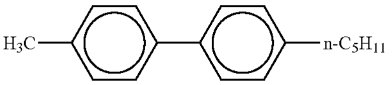

Very preferred are compounds of the Formulae XIVd-1, XIVe-1, XIVe-2 and XIVe-3.

The LC medium may further optionally comprise one or more compounds of the Formula XV in which at least one of the substituents $R^1$ and $R^2$ denotes alkyl or alkoxy having 2 to 6 C atoms, preferably those selected from the following subformulae:

XVa

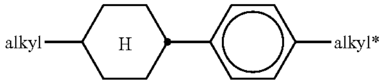

XVb

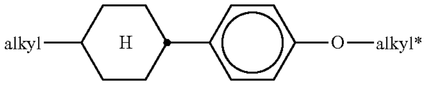

in which "alkyl" and "alkyl*" has the meaning indicated above, and each, independently of one another, preferably denote methyl, ethyl or propyl.

In yet a further embodiment, the LC medium comprises one or more compounds of the Formula XVI:

XVI

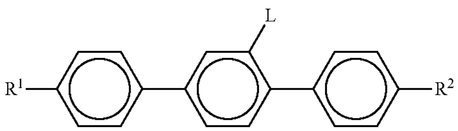

in which $R^1$ and $R^2$ have the meanings indicated for $R^0$ in the Formula II, and preferably each, independently of one another, denote alkyl having 1 to 6 C atoms. L denotes H or F.

Particularly preferred compounds of the Formula XVI are those of the subformulae:

XVIa

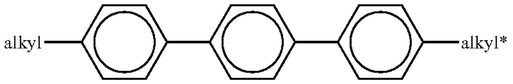

XVIb

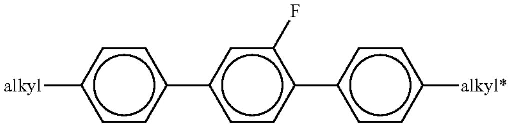

XVIc

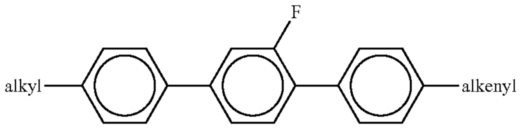

XVId

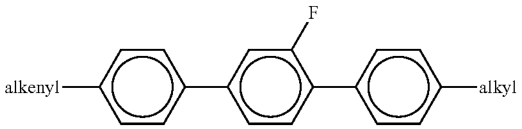

XVIe

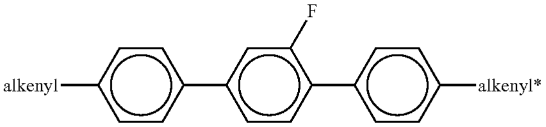

XVIf

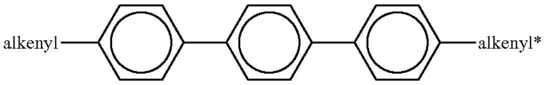

in which

“alkyl” and “alkyl” each, independently of one another, denote a straight-chain alkyl group having 1 to 6 C atoms, in particular ethyl, propyl or pentyl, and “alkenyl” and “alkenyl*” each, independently of one another, denote a straight-chain alkenyl group having 2 to 6 C atoms, in particular $CH_2$═$CHC_2H_4$, $CH_3CH$═$CHC_2H_4$, $CH_2$═CH and $CH_3CH$═CH.

Particular preference is given to the compounds of the Formulae XVIb and XVIc. Very particular preference is given to the compounds of the following subformulae:

XVIb-1

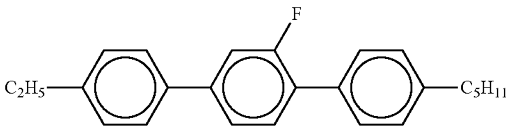

XVIb-2

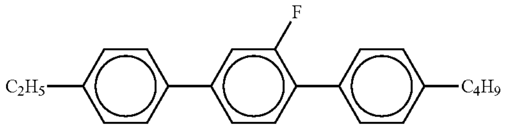

-continued

XVIb-3

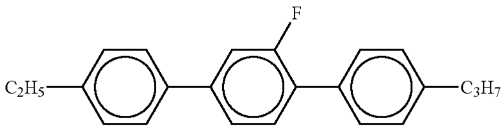

XVIc-1

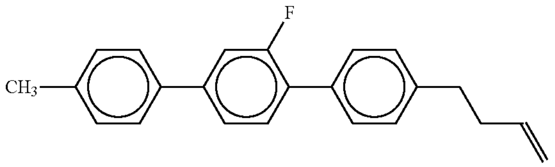

XVIc-2

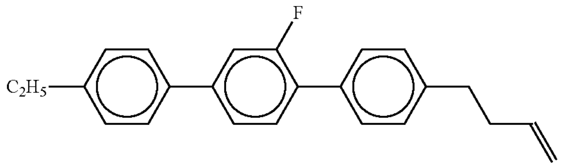

XVIc-3

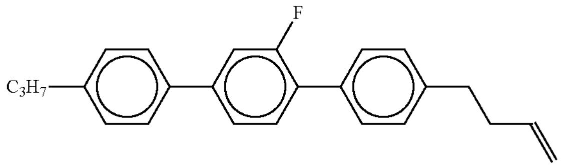

In yet a further embodiment, the LC medium comprises one or more compounds of the Formula XIII:

XIII

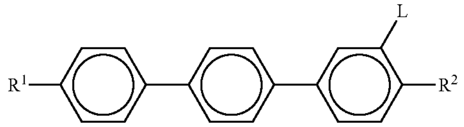

in which $R^1$ and $R^2$ have the meanings indicated for $R^0$ in the Formula II, and preferably each, independently of one another, denote alkyl having 1 to 6 C atoms. L denotes H, F or Cl.

Particularly preferred compounds of the Formula XIII are those of the subformulae:

XIIIa

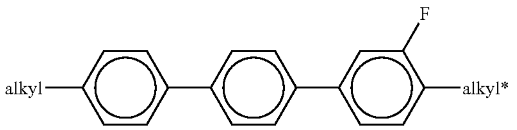

XIIIb

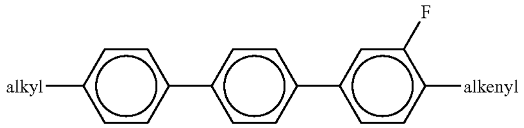

-continued

XIIIc

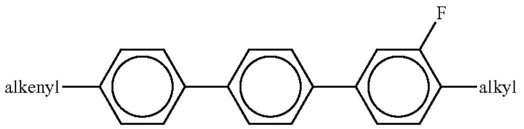

XIIId

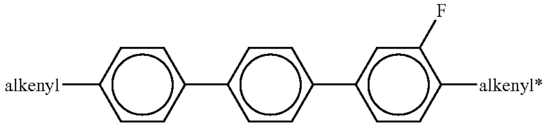

in which

"alkyl" and "alkyl*" each, independently of one another, denote a straight-chain alkyl group having 1 to 6 C atoms, in particular ethyl, propyl or pentyl, and "alkenyl" and "alkenyl*" each, independently of one another, denote a straight-chain alkenyl group having 2 to 6 C atoms, in particular $CH_2{=}CHC_2H_4$, $CH_3CH{=}CHC_2H_4$, $CH_2{=}CH$ and $CH_3CH{=}CH$.

Particular preference is given to the compounds of the Formulae XIIIa and XIIIb. Very particular preference is given to the compounds of the following subformulae:

XIIIa-1

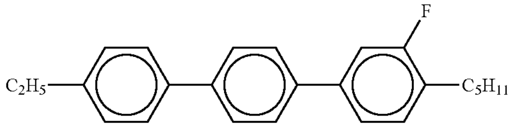

XIIIa-2

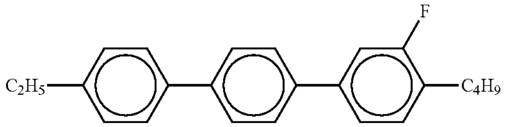

XIIIa-3

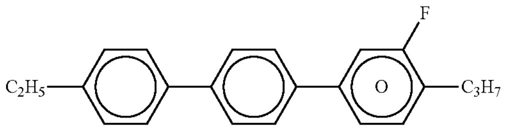

XIIIb-1

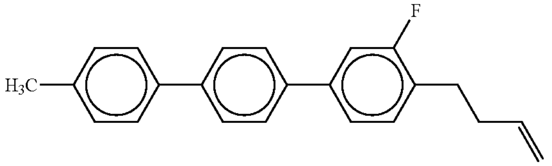

XIIIb-2

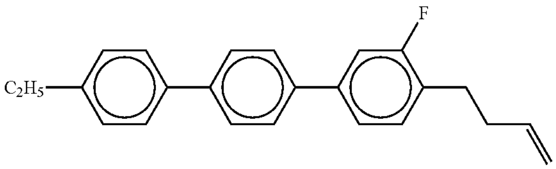

-continued

XIIIb-3

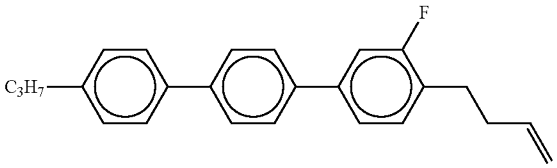

In yet a further embodiment, the LC medium comprises one or more compounds of the Formula XIII:

XIII

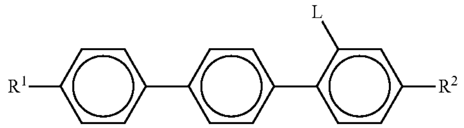

in which $R^1$ and $R^2$ have the meanings indicated for $R^0$ in the Formula II, and preferably each, independently of one another, denote alkyl having 1 to 6 C atoms. L denotes H, F or Cl.

Particularly preferred compounds of the Formula XIII are those of the subformulae:

XIIIa

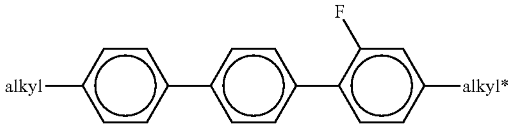

XIIIb

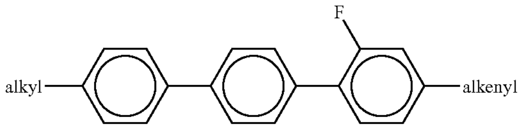

XIIIc

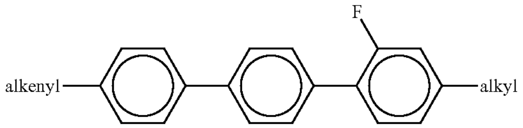

XIIId

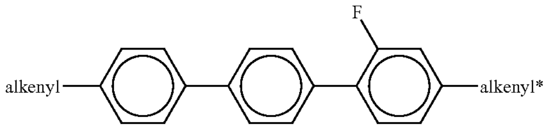

in which

"alkyl" and "alkyl*" each, independently of one another, denote a straight-chain alkyl group having 1 to 6 C atoms, in particular ethyl, propyl or pentyl, and "alkenyl" and "alkenyl*" each, independently of one another, denote a straight-chain alkenyl group having 2 to 6 C atoms, in particular $CH_2{=}CHC_2H_4$, $CH_3CH{=}CHC_2H_4$, $CH_2{=}CH$ and $CH_3CH{=}CH$.

Particular preference is given to the compounds of the Formulae XIIIa and XIIIb. Very particular preference is given to the compounds of the following subformulae:

XIIIa-1

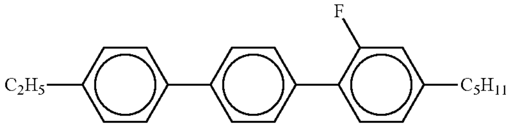

XIIIa-2

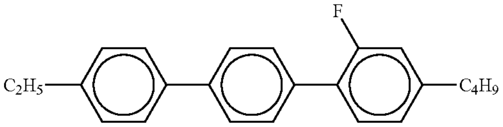

XIIIa-3

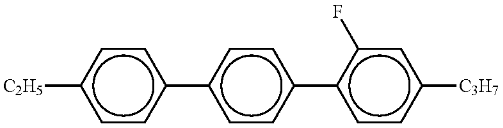

XIIIb-1

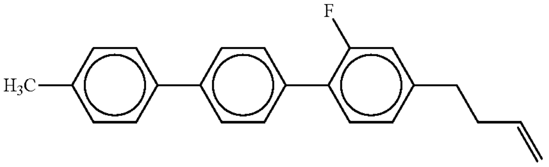

XIIIb-2

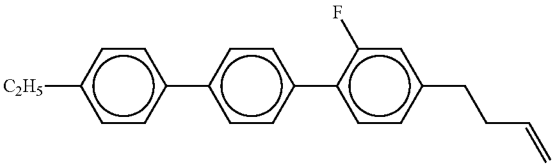

XIIIb-3

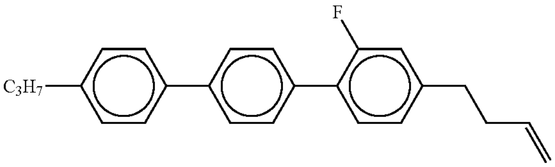

The LC medium may optionally comprise one or more compounds of the following formulae:

XVIIa

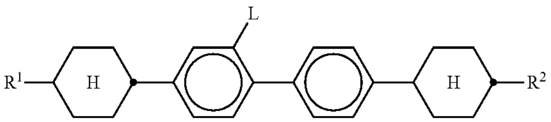

XVIIb

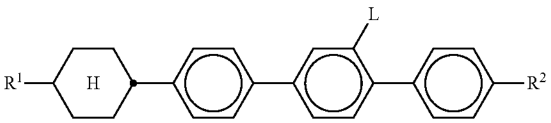

-continued

XVIIc

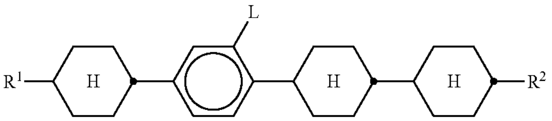

in which $R^1$ and $R^2$ have the meanings indicated for $R^0$ in the Formula II, respectively, and preferably each, independently of one another, denote alkyl having 1 to 6 C atoms. L denotes H or F.

Very preferred are compounds of the Formula XVIIa, wherein L is H or F. Very preferred are compounds of the Formula XVIIb, wherein L is F.

The LC medium may additionally comprise one or more compounds of the following formula:

XXXII

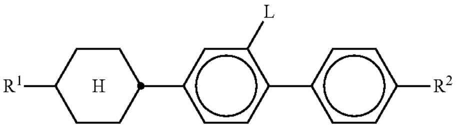

in which L, $R^1$ and $R^2$ have the meanings indicated in the Formula I for $L^1$ and $R^0$, respectively. $R^1$ and $R^2$ preferably denote alkyl, alkoxy, oxaalkyl, fluoroalkyl or alkenyl, each having up to 6 C atoms.

Particularly preferred compounds of the Formula XXXII are those of the subformulae:

XXXIIa

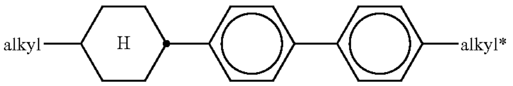

XXXIIb

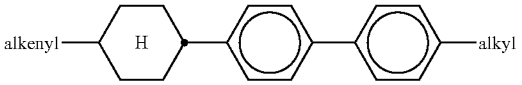

XXXIIc

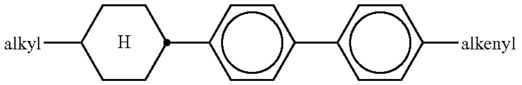

in which

"alkyl" and "alkyl" each, independently of one another, denote a straight-chain alkyl group having 1 to 6 C atoms, in particular ethyl, propyl or pentyl, and "alkenyl" denotes a straight-chain alkenyl group having 2 to 6 C atoms, in particular $CH_2{=}CHC_2H_4$, $CH_3CH{=}CHC_2H_4$, $CH_2{=}CH$ and $CH_3CH{=}CH$.

Very particular preference is given to the compounds of the following subformulae:

XXXIIa-1

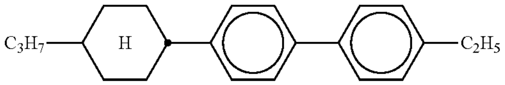

-continued

XXXIIa-2

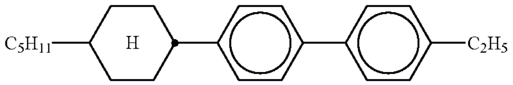

XXXIIb-1

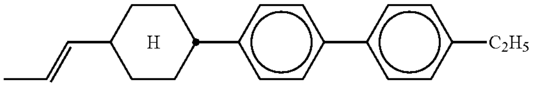

XXXIIb-2

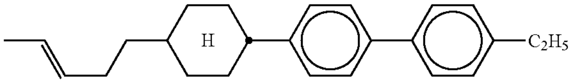

XXXIIb-3

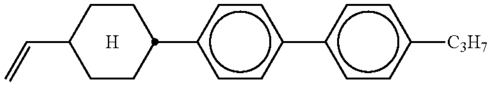

XXXIIc-1

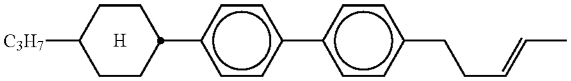

In some further embodiments, the LC medium comprises one or more compounds of the following formulae:

XXXV

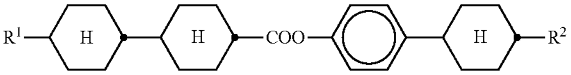

in which $R^1$ and $R^2$ each, independently from one another, have the meanings indicated in the Formula I for $R^0$ and preferably each, independently of one another, denote alkyl having 1 to 6 C atoms.

Very particular preference is given to the compounds of the following subformulae:

XXXV-1

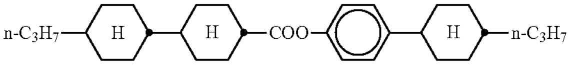

XXXV-2

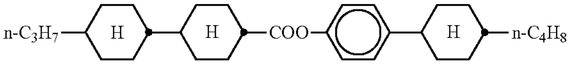

XXXV-3

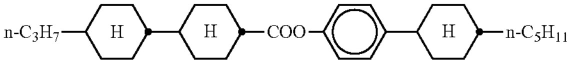

Advantageously, the LC medium of the present invention may comprise one or more compounds of the Formula LP1

LP1

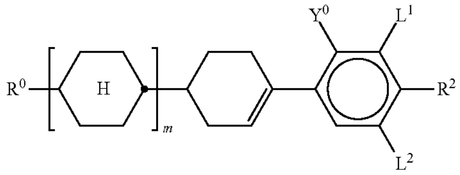

and/or one or more compounds of the Formula LP2

LP2

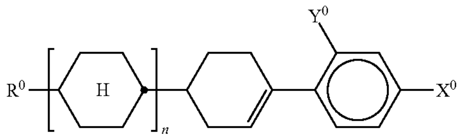

in which the individual substituents have the following meanings:

$R^0$ has one of the meanings given in for $R^0$ in the Formula I;

$R^2$ denote an alkyl or an alkoxy group having 1 to 12 C atoms or an alkenyl or an alkenyloxy group having 2 or 12 C atoms in which one or more non-adjacent $CH_2$ groups are optionally substituted by —C≡C—, —$CF_2$O—, —O$CF_2$—, —CH═CH—,

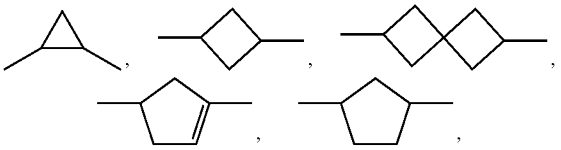

—O—, —CO—O— or —O—CO— in such a way that O atoms are not linked directly to one another, and in which one or more H atoms may be substituted by a cycloalkyl or a cycloalkoxy group having 3 to 12 C atoms;

$X^0$ has one of the meanings given in for $X^0$ in the Formula I;

$Y^0$ denote H or $CH_3$; and m and n denote 0 or 1.

The one or more compounds of the Formulae LP1 and LP2 may be preferably described by the following Formulae:

LP1-1

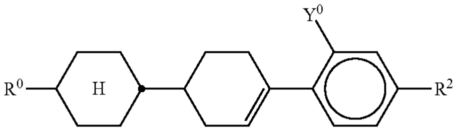

LP1-2

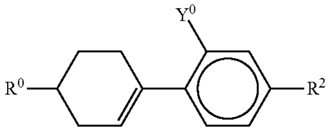

-continued

LP2-1

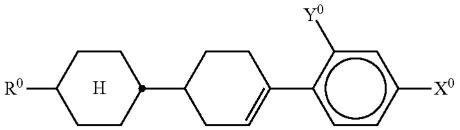

LP2-2

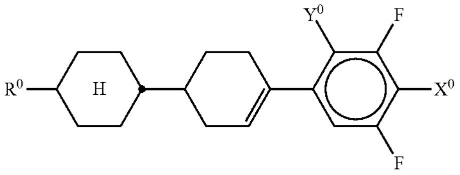

LP2-3

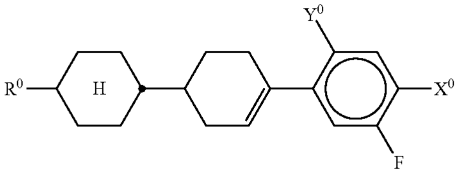

in which $R^0$ is an alkyl or an alkoxy group having 1 to 6 C atoms or an alkenyl group having 2 to 6 C atoms in which one or more $CH_2$ groups are optionally substituted by —C≡C—, —$CF_2O$—, —$OCF_2$—, —CH═CH—,

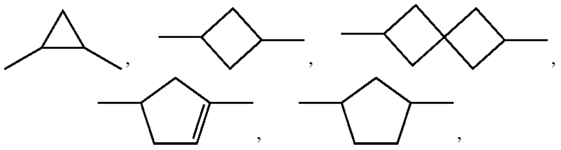

—O—

—CO—O— or —O—CO— in such a way that O atoms are not linked directly to one another, and in which one or more H atoms may be substituted by a halogen atom;

$R^2$ is an alkyl group having 1 to 6 C atoms, in which one or more $CH_2$ groups are optionally substituted by —C≡C—, —$CF_2O$—, —$OCF_2$—, —CH═CH—,

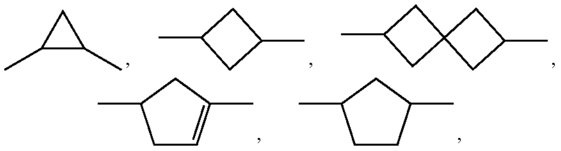

—O—

—CO—O— or —O—CO— in such a way that O atoms are not linked directly to one another, and in which one or more H atoms may be substituted by a halogen atom;

$X^0$ a F atom or an alkyl or an alkoxy group having 1 to 3 C atoms or an alkenyl or an alkenyloxy group having 2 or 3 C atoms in which one or more H atoms are replaced by a F atom; and $Y^0$ H or $CH_3$.

The compounds of the general Formulae LP1 and LP2 can also be represented by one of the following structures:

LP1a

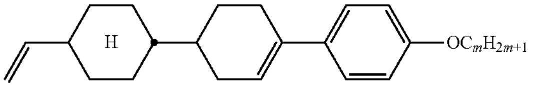

LP1b

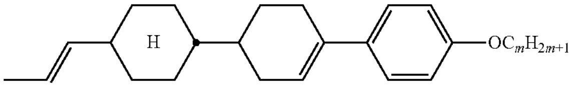

LP1c

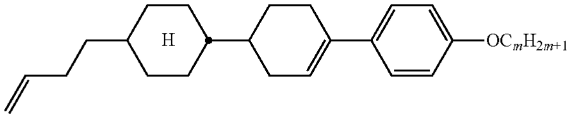

LP1d

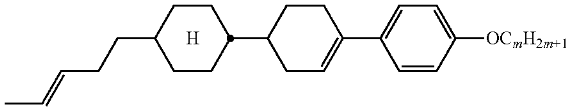

LP1e

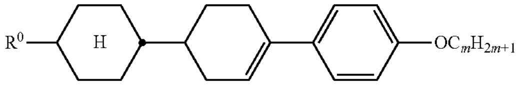

LP1f

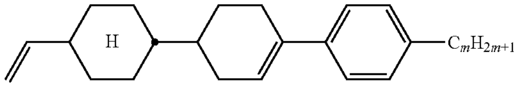

LP1g

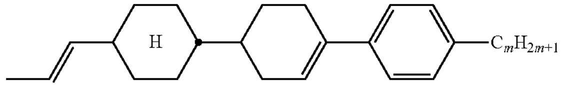

LP1h

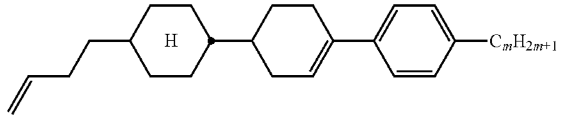

LP1i

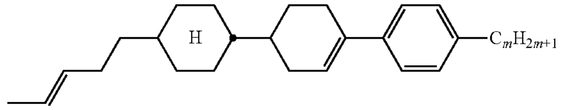

LP1j

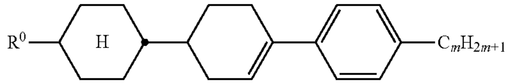

LP2a

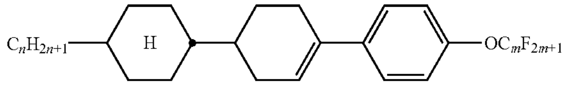

LP2b

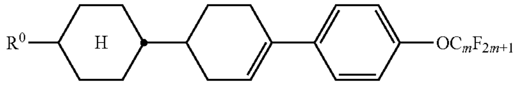

-continued

LP2c

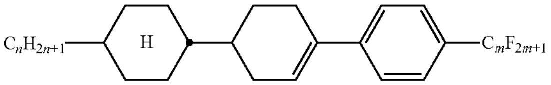

LP2d

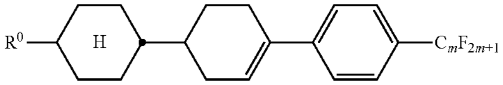

LP2e

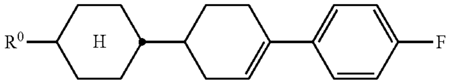

LP2f

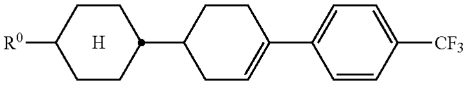

in which $R^0$ is an alkyl or an alkoxy group having 1 to 12 C atoms in which one or more $CH_2$ groups are optionally substituted by —C≡C—, —$CF_2$O—, —O$CF_2$—,

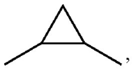, 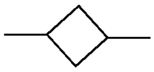, 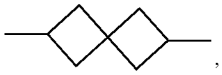, 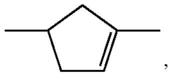, 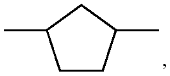,

—O—

—CO—O— or —O—CO— in such a way that O atoms are not linked directly to one another, and in which one or more H atoms may be substituted by a halogen atom, preferably an alkyl group having 1 to 4 C atoms, alkenyl or an alkenyloxy group having 2 to 6 C atoms or a cycloalkyl or a cycloalkyloxy group having 3 to 6 C atoms, wherein vinyl, allyl or cyclopentyl are particularly preferable;

n denotes 1, 2, 3, 4 or 5; and m denotes 1, 2, 3 or 4.

Particularly preferred compounds of the Formula LP1 are those selected from the group consisting of the following subformulae:

LP1-1a

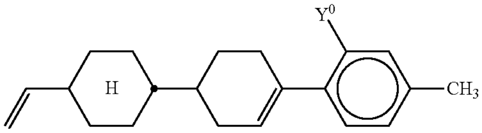

LP1-1b

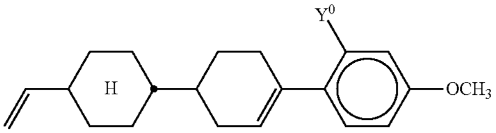

LP1-1c

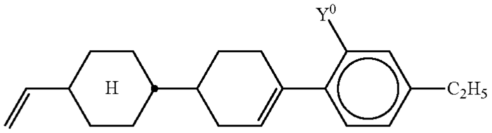

-continued

LP1-1d

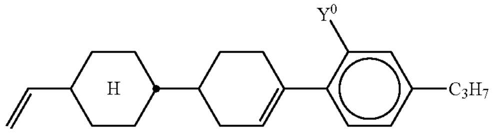

LP1-1e

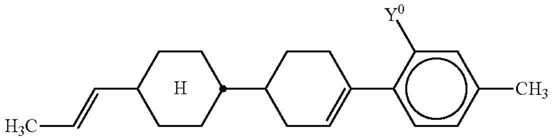

LP1-1f

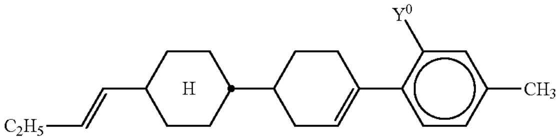

LP1-1g

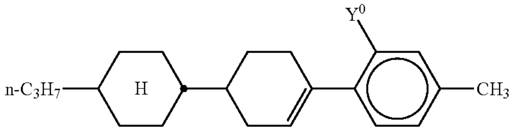

LP1-1h

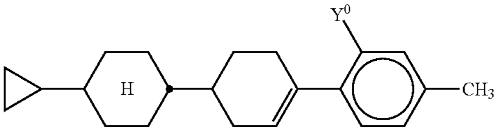

LP1-1i

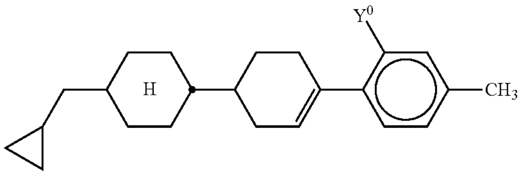

LP1-1j

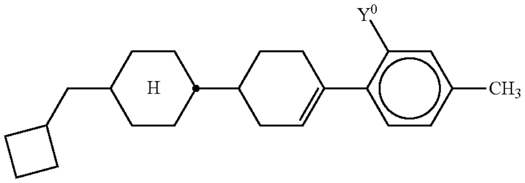

LP1-1k

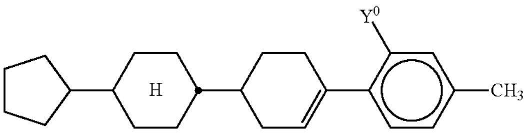

-continued

LP1-1l

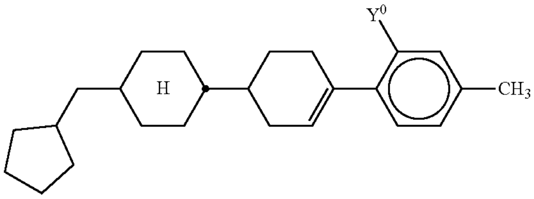

wherein $Y^0$ is H or $CH_3$, preferably H.

Particularly preferred compounds of the Formula LP2 are those selected from the group consisting of the following subformulae:

LP2-1a

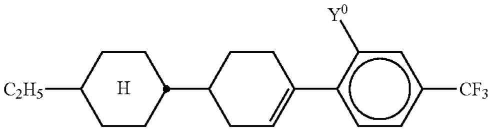

LP2-1b

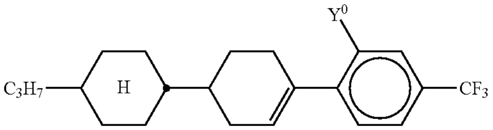

LP2-1c

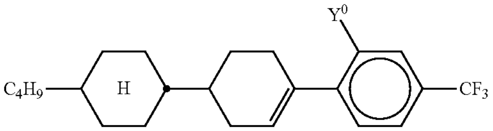

LP2-1d

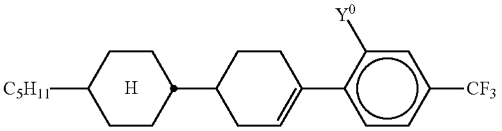

LP2-1e

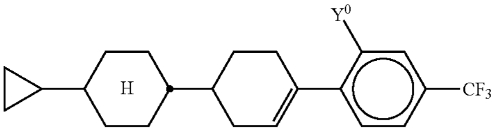

LP2-1f

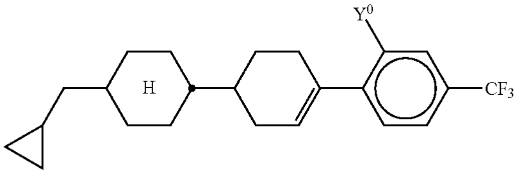

LP2-1g

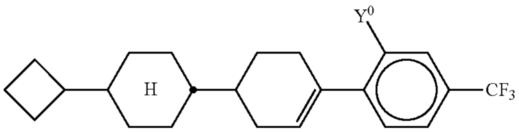

-continued

LP2-1h

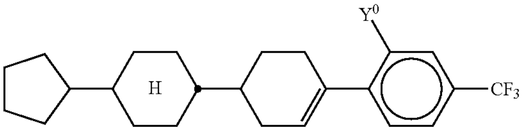

LP2-1i

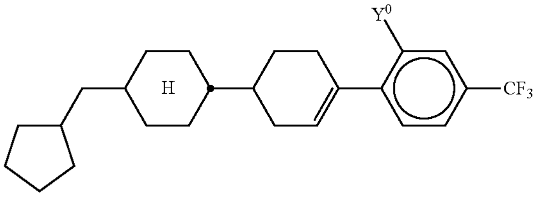

LP2-2a

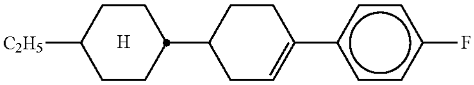

LP2-2b

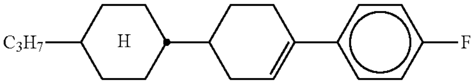

LP2-3a

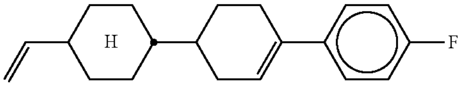

LP2-3b

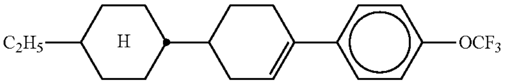

LP2-3c

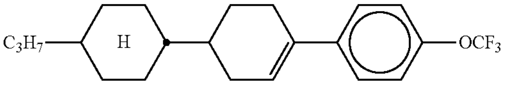

wherein $Y^0$ is H or $CH_3$, preferably H.

Very preferred are compounds of the Formulae LP2-1a, LP2-1b, LP2-1c, LP2-1d, and LP2-1 i, LP2-2b, LP2-3a, LP2-3c mostly preferred is the compound Formula LP2-1 b.

Preferably, the LC medium comprises one or more compounds of the Formula LP1 and one or more compounds of the Formula LP2.

The total proportion of the compounds of the Formula LP1 or its subformulae in the LC medium is preferably from 2 to 35%, very preferably from 3 to 25%, mostly preferred from 4 to 15% by weight. The total proportion of the compounds of the Formula LP2 or its subformulae in the LC medium is preferably from 2 to 35%, very preferably from 3 to 25%, mostly preferred from 4 to 15% by weight.

Preferably, the LC medium contains 1, 2 or 3 compounds of the Formula LP1 or their subformulae. In a particularly preferred embodiment, the LC medium comprises at least one compound of the Formula LP1.

In addition to the compounds of the Formula I, an antioxidant and, optionally, a light stabilizer, the LC medium may optionally contain one or more compounds selected from the Formulae Y and B:

Y

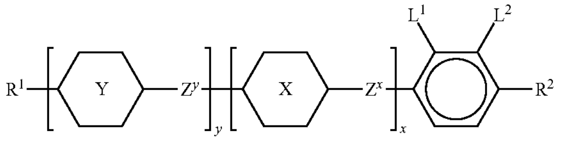

B

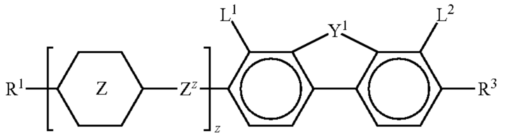

in which the individual substituents, on each occurrence identically or differently, and each, independently of one another, have the following meanings:

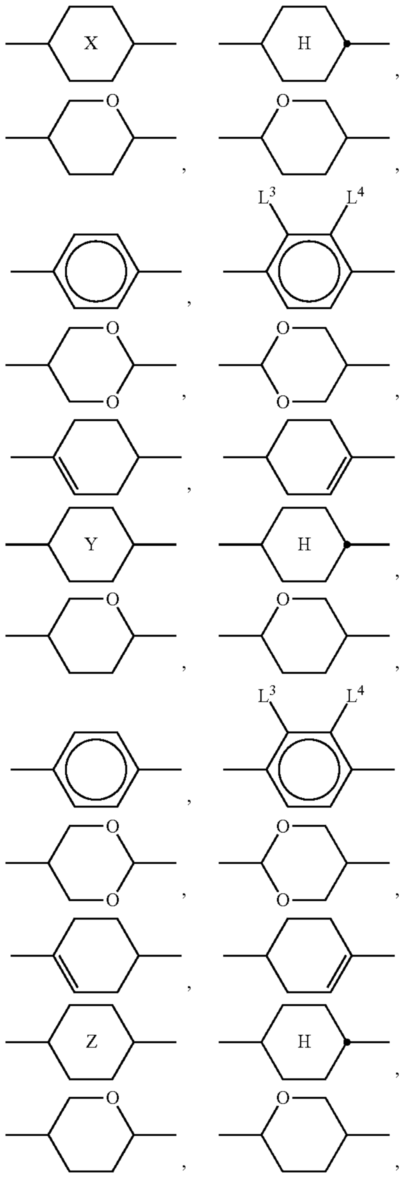

-continued

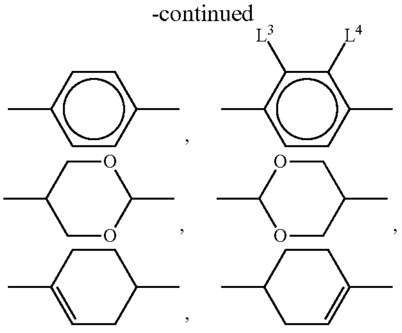

wherein $R^1$, $R^2$ each, independently from one another, have one of the meanings given for $R^0$ in the Formula I, $R^3$ one of the meanings given for $R^1$, $Z^x$, $Z^y$ —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$—, or a single bond, preferably a single bond, $Z^z$ —$CH_2O$—, —O—, —$C_2H_4$—, —$OCH_2$—, or a single bond, $Y^1$ —$CH_2$—, —O— or —S—, $L^{1-4}$ H, F or Cl, preferably H or F, very preferably F, x, y 0, 1 or 2, with x+y≤3, z 0 or 1, wherein in the Formula B the dibenzofuran or dibenzothiophene group may also be further substituted by a methyl or methoxy group, and wherein the compounds of the Formula Y contain at least one substituent $L^{1-4}$ that is F or Cl, preferably F.

The LC medium according to this first preferred embodiment may contain one or more compounds of the Formula I, one or more antioxidants, one or more light stabilizers, one or more compounds selected from the Formulae Z1, Z2 and Z3, and one or more compounds selected from the Formulae Y and B.

The LC media according to this first preferred embodiment are especially suitable for use in LC displays of the HB-FFS or PS-HB-FFS mode.

In the compounds of the Formula Y and its subformulae, $R^1$ and $R^2$ preferably denote straight-chain alkyl or alkoxy having 1 to 6 C atoms, furthermore alkenyl having 2 to 6 C atoms, in particular vinyl, 1E-propenyl, 1E-butenyl, 3-butenyl, 1E-pentenyl, 3E-pentenyl or 4-pentenyl.

In the compounds of the Formula Y and its subformulae, preferably both substituents $L^1$ and $L^2$ denote F. In another preferred embodiment of the present invention, in the compounds of the Formula Y and its subformulae one of the substituents $L^1$ and $L^2$ denotes F and the other denotes Cl.

In a preferred embodiment of the present invention, the LC medium contains one or more compounds of the Formula Y selected from the following subformulae:

Y1

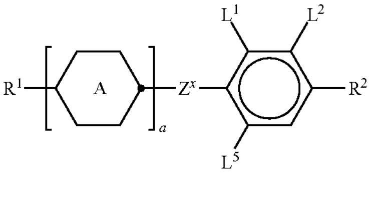

-continued

Y2

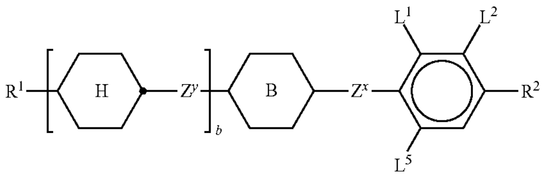

wherein $R^1$, $R^2$, $Z^x$ and $Z^y$ have the meanings given in the Formula Y, a denotes 1 or 2, b denotes 0 or 1, $L^1$, $L^2$ denote F or Cl, preferably F, and $L^5$ denotes a H atom or $CH_3$,

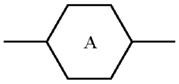

denotes

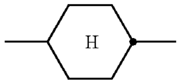

or

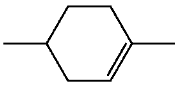

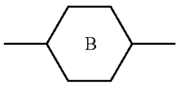

denotes

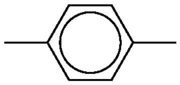

or

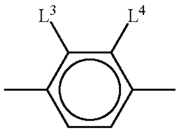

Preferably, in the compounds of the Formula $Y^1$ and $Y^2$ both $L^1$ and $L^2$ denote F or one of $L^1$ and $L^2$ denotes F and the other denotes $C_1$, or both $L^1$ and $L^2$ denote F or one of $L^1$ and $L^2$ denotes F and the other denotes Cl.

Preferably, the LC medium comprises one or more compounds of the Formula $Y^1$ selected from the group consisting of the following subformulae:

Y1-1

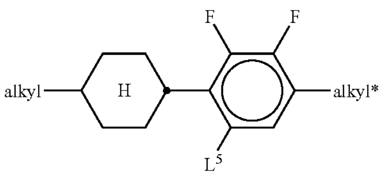

Y1-2

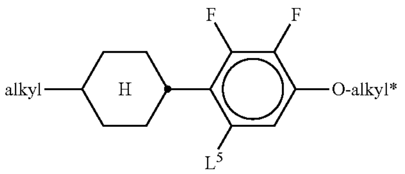

Y1-3

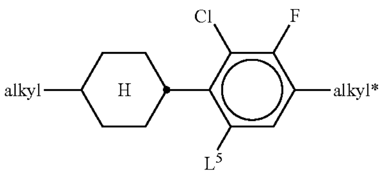

-continued

Y1-4

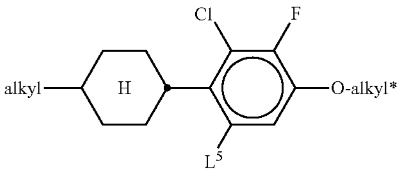

Y1-5

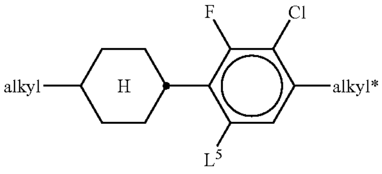

Y1-6

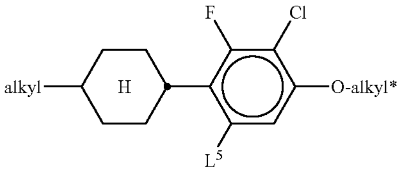

Y1-7

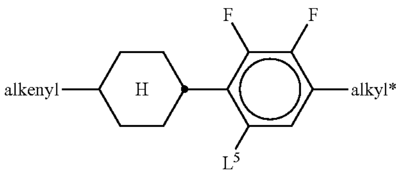

Y1-8

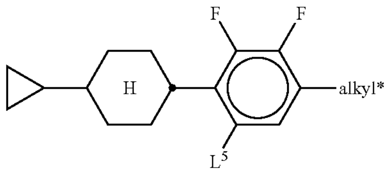

Y1-9

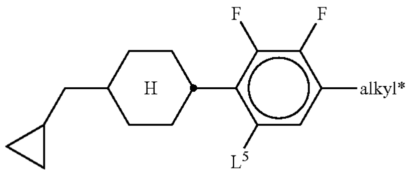

Y1-10

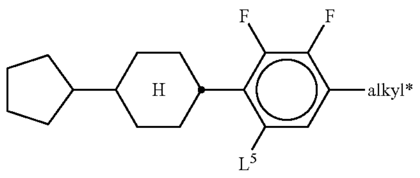

Y1-11

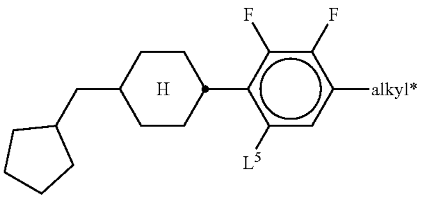

-continued
Y1-12
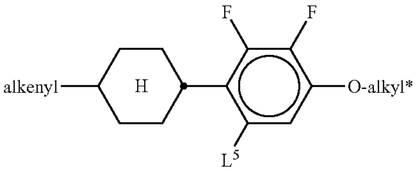
Y1-13
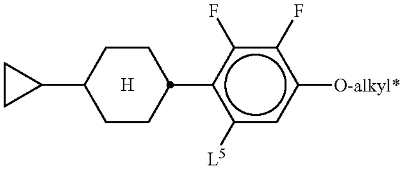
Y1-14
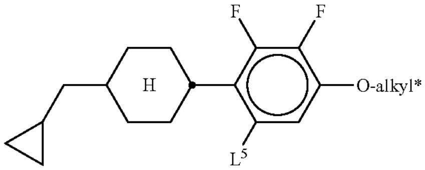
Y1-15
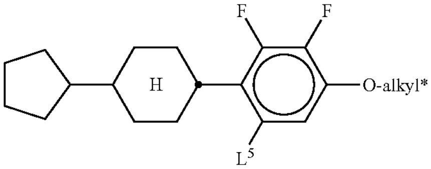
Y1-16
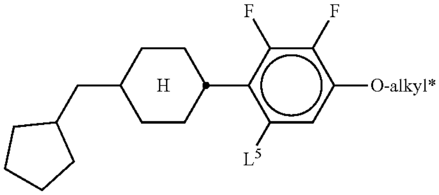
Y1-17
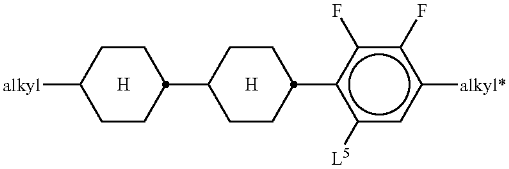
Y1-18
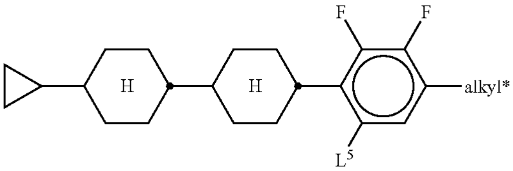
Y1-19
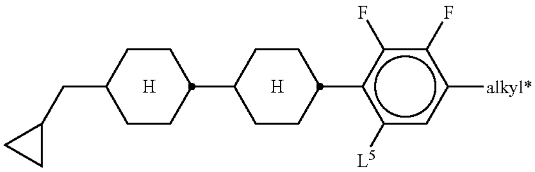
-continued
Y1-20
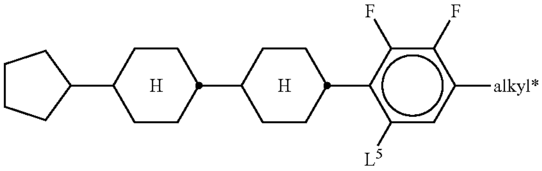
Y1-21
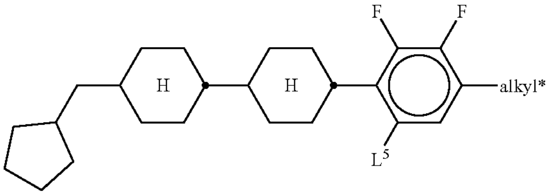
Y1-22
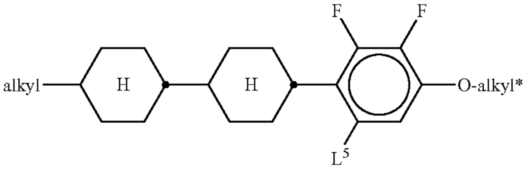
Y1-23
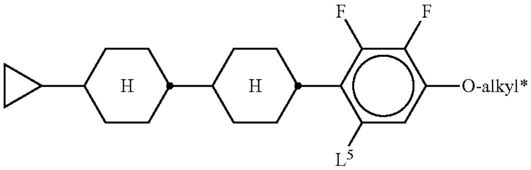
Y1-24
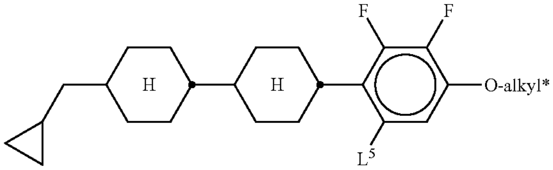
Y1-25
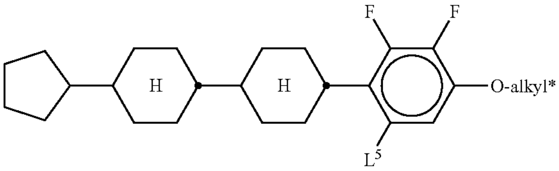
Y1-26
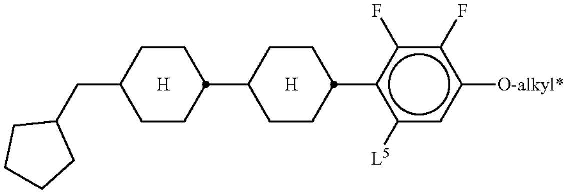
Y1-27
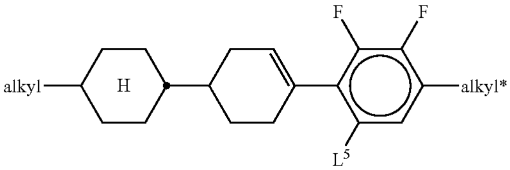

-continued
Y1-28
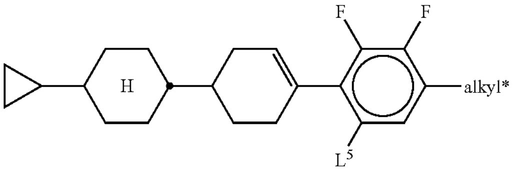
Y1-29
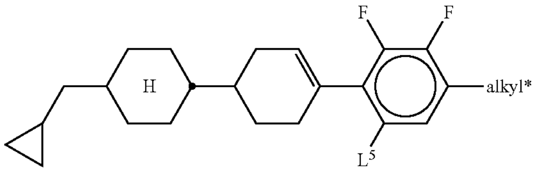
Y1-30
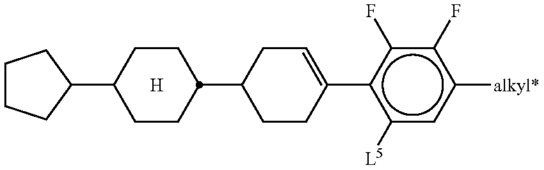
Y1-31
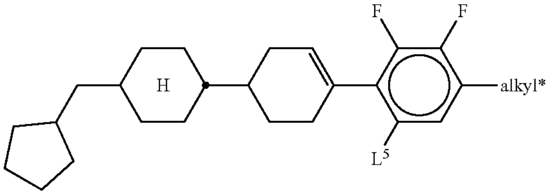
Y1-32
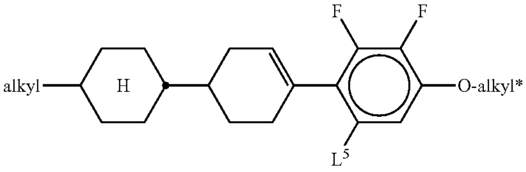
Y1-33
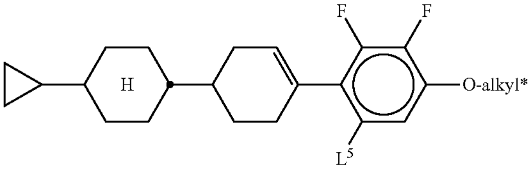
Y1-34
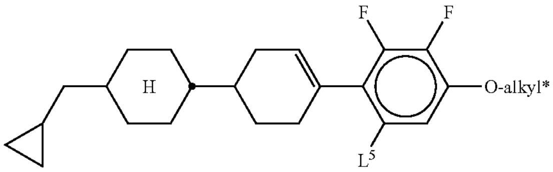
Y1-35
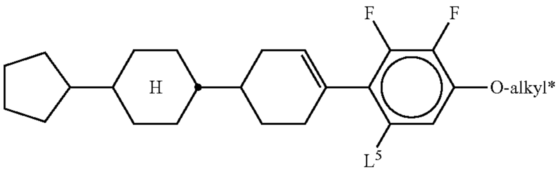
-continued
Y1-36
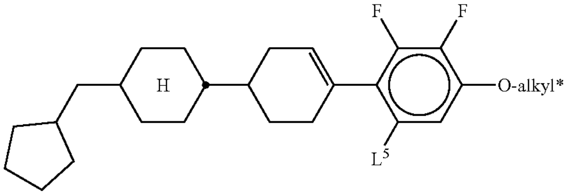
Y1-37
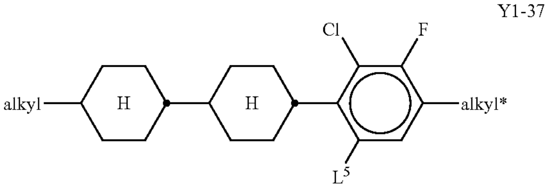
Y1-38
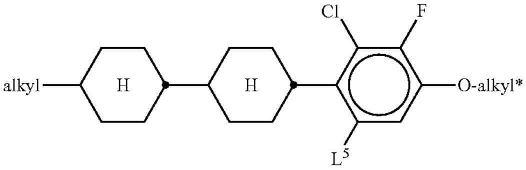
Y1-39
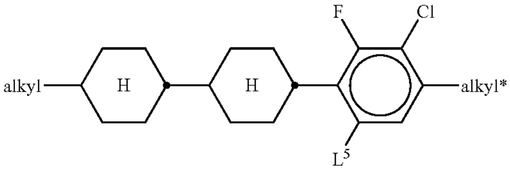
Y1-40
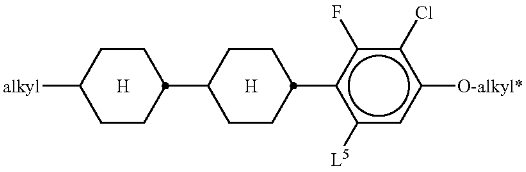
Y1-41
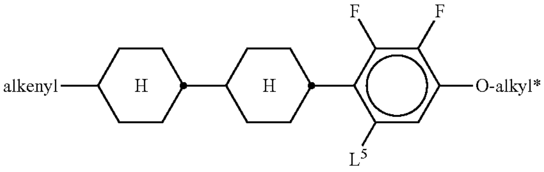
Y1-42
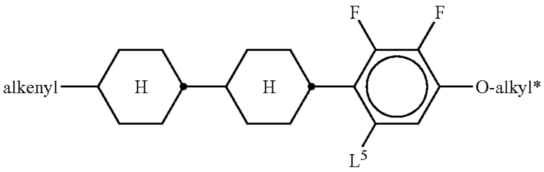
Y1-43
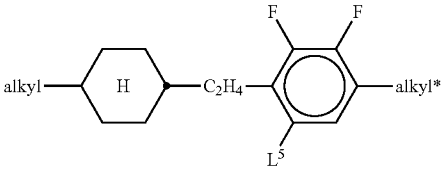

-continued
Y1-44
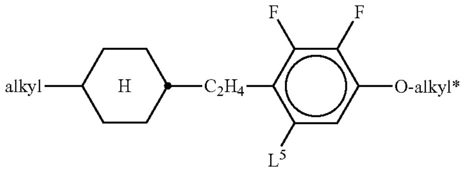
Y1-45
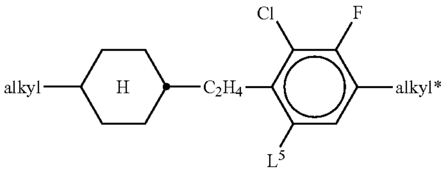
Y1-46
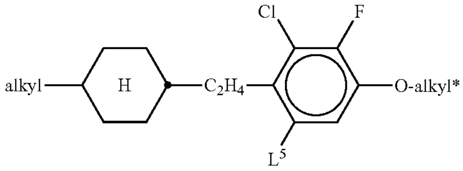
Y1-47
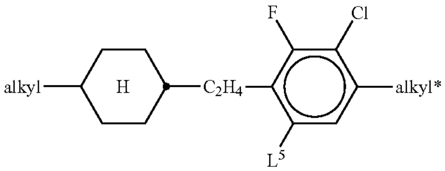
Y1-48
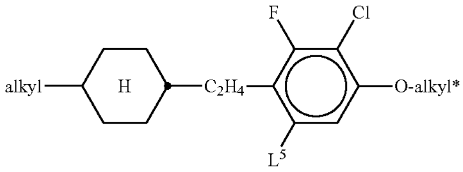
Y1-49
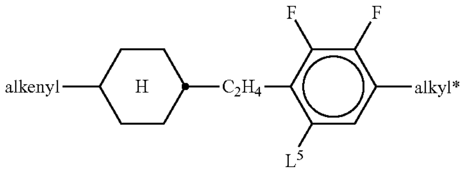
Y1-50
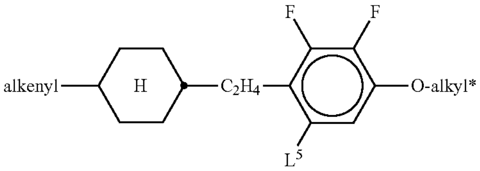
Y1-51
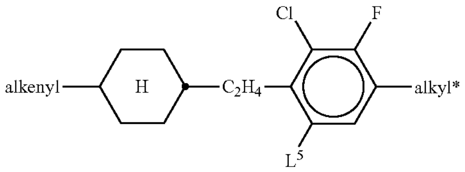
Y1-52
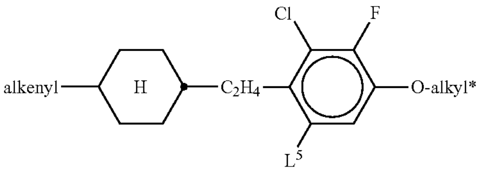
-continued
Y1-53
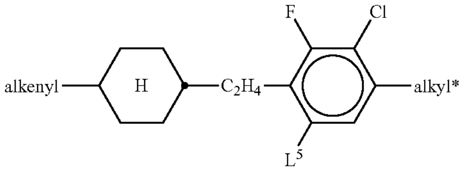
Y1-54
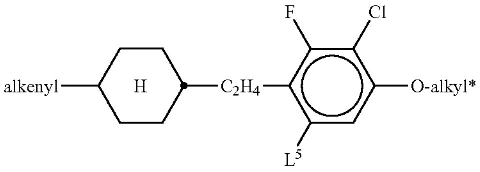
Y1-55
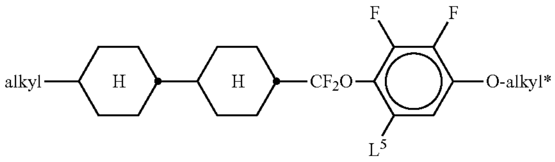
Y1-56
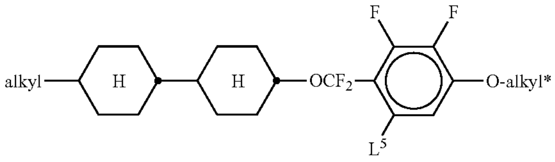
Y1-57
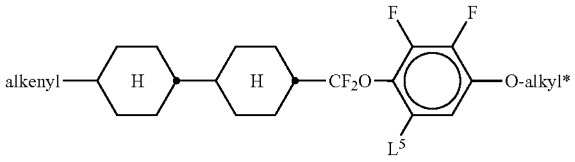
Y1-58
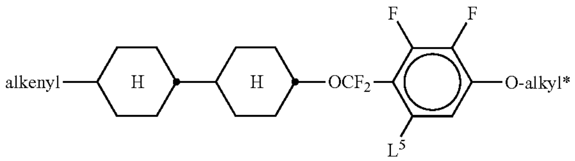
Y1-59
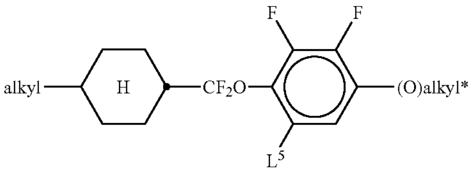
Y1-60
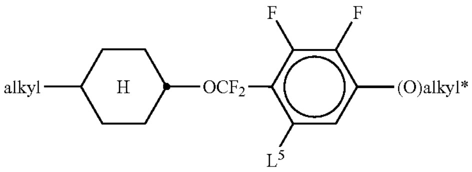

-continued
Y1-61
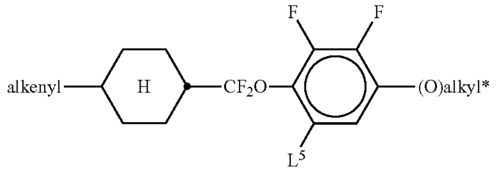
Y1-62
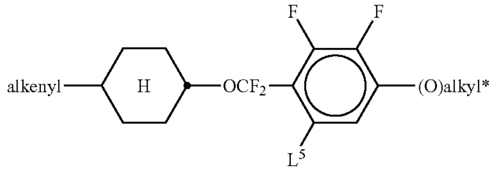
Y1-63
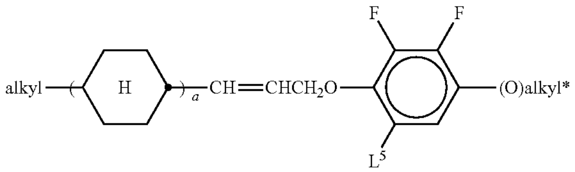
Y1-64
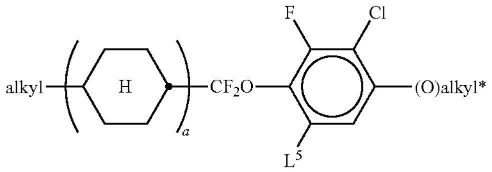
Y1-65
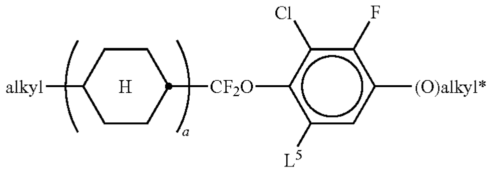
Y1-66
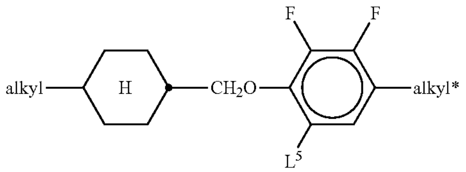
Y1-67
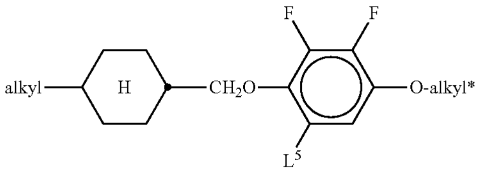
Y1-68
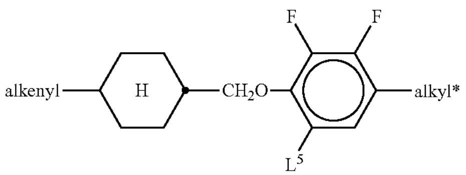
Y1-69
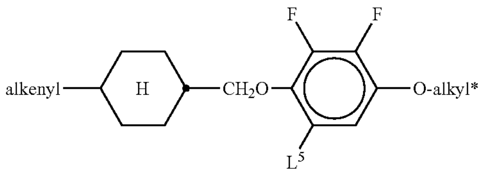
-continued
Y1-70
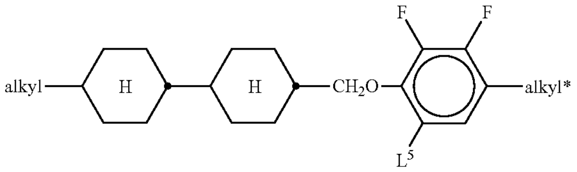
Y1-71
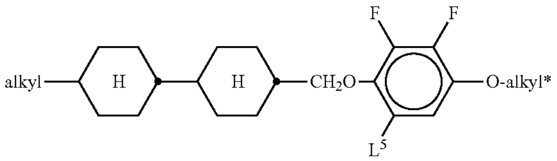
Y1-72
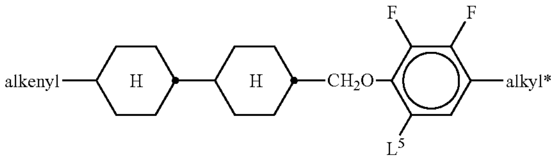
Y1-73
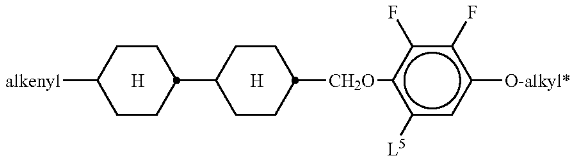
Y1-74
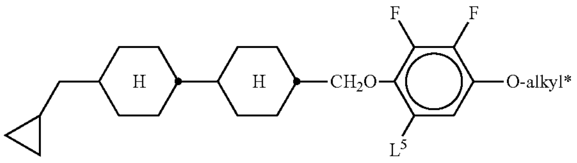
Y1-75
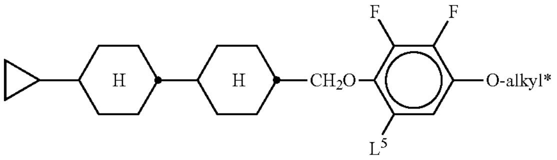
Y1-76
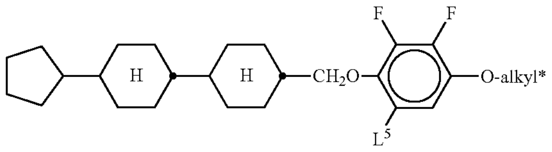
Y1-77
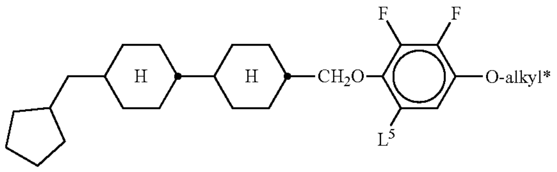

-continued

Y1-78

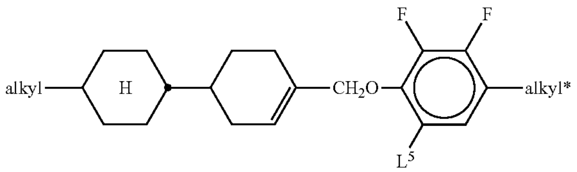

Y1-79

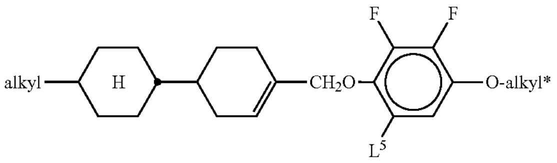

Y1-80

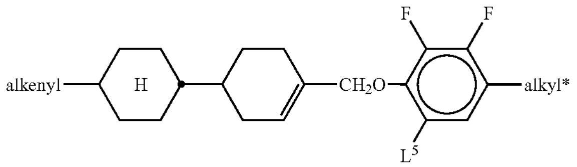

Y1-81

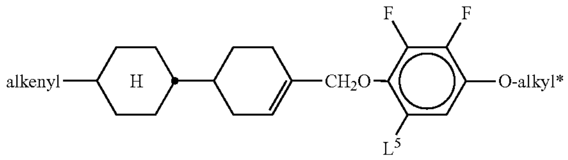

Y1-82

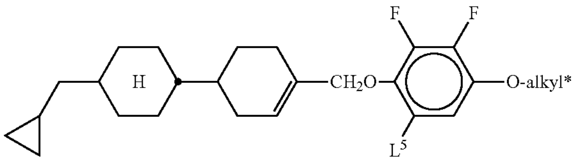

Y1-83

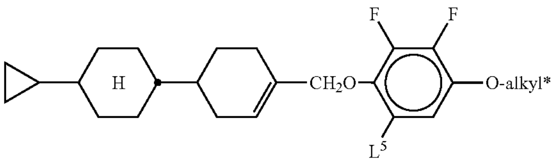

Y1-84

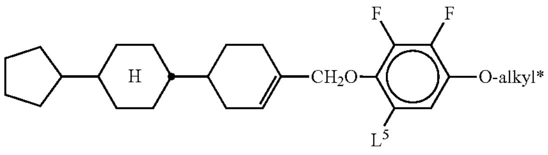

Y1-85

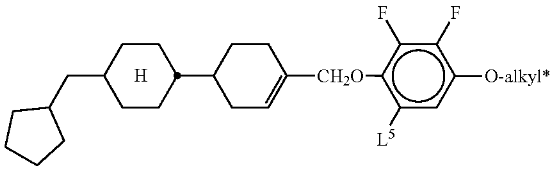

in which a denotes 1 or 2,

“alkyl” and “alkyl” each, independently of one another, denote a straight-chain alkyl group having 1 to 6 C atoms, “alkenyl” denotes a straight-chain alkenyl group having 2 to 6 C atoms, and $L^5$ denotes a H atom or $CH_3$.

“alkenyl” preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very preferably, the LC medium contains one or more compounds of the Formula Y1 selected from the Formulae Y1-1, Y1-2, Y1-7, Y1-12, Y1-17, Y1-22, Y1-40, Y1-41, Y1-42, Y1-44, Y1-50 and Y1-68. $L^5$ preferably denotes a H atom.

Further preferably, the LC medium comprises one or more compounds of the Formula $Y^2$ selected from the group consisting of the following subformulae:

Y2-1

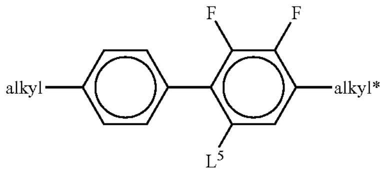

Y2-2

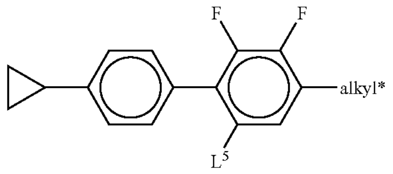

Y2-3

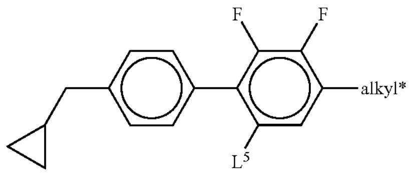

Y2-4

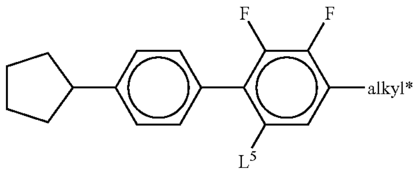

Y2-5

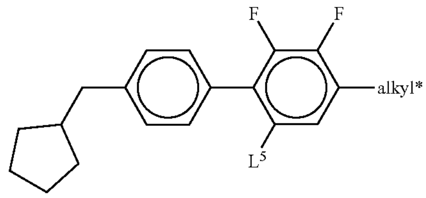

Y2-6

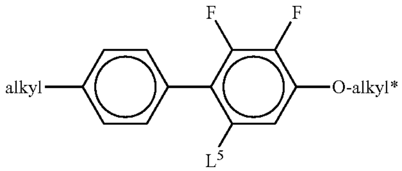

Y2-7
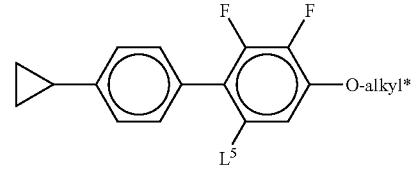
Y2-8
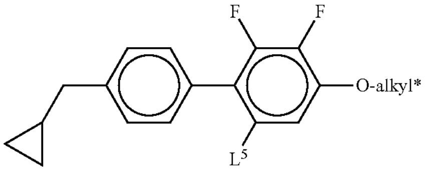
Y2-9
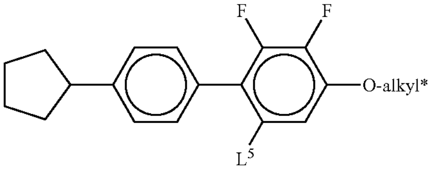
Y2-10
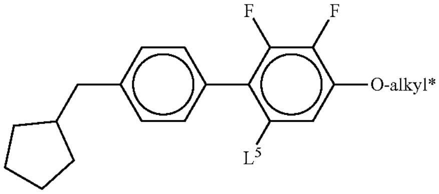
Y2-11
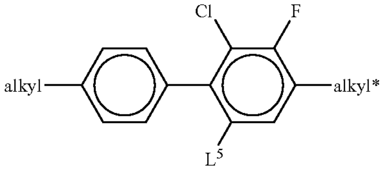
Y2-12
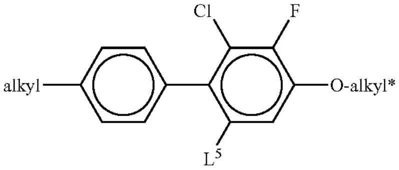
Y2-13
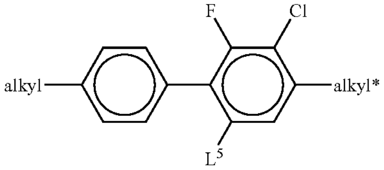
Y2-14
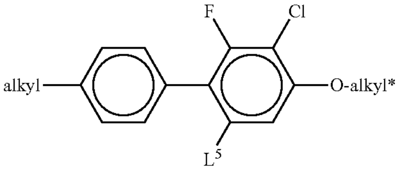
Y2-15
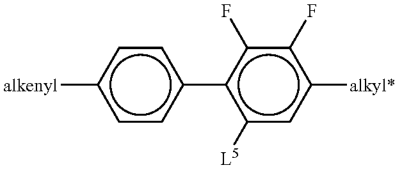
Y2-16
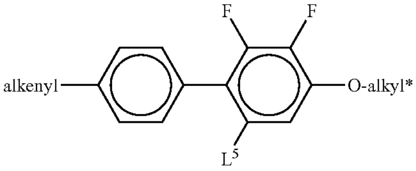
Y2-17
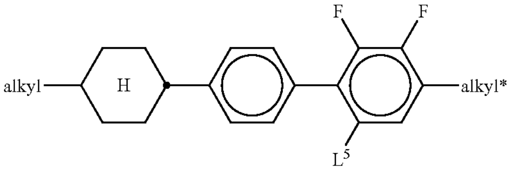
Y2-18
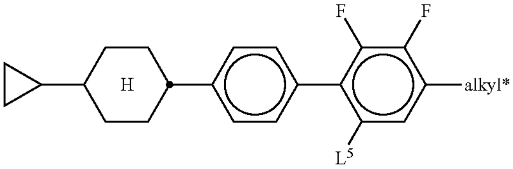
Y2-19
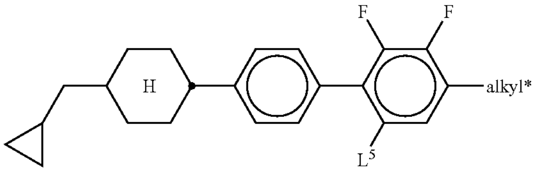
Y2-20
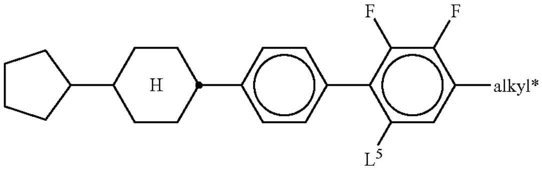
Y2-21
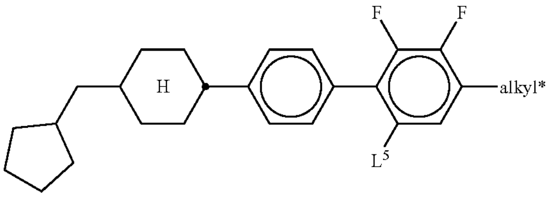
Y2-22
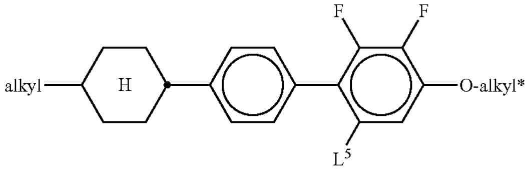

-continued
Y2-23
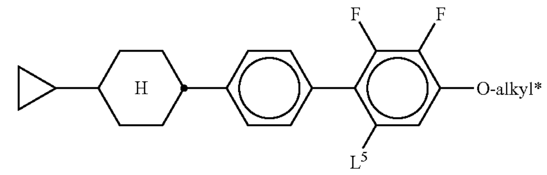
Y2-24
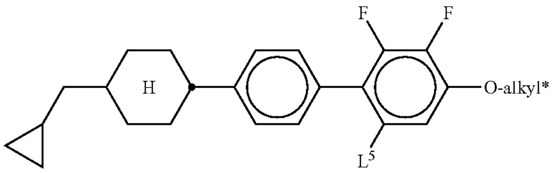
Y2-25
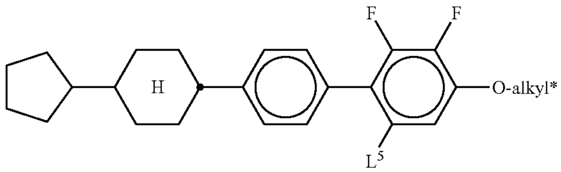
Y2-26
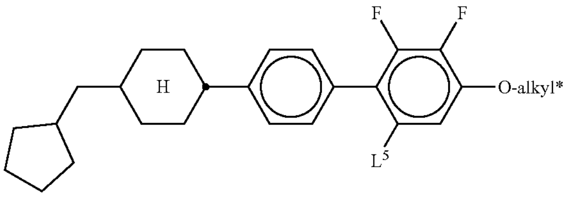
Y2-27
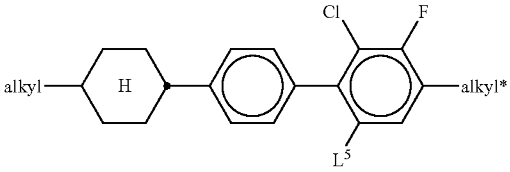
Y2-28
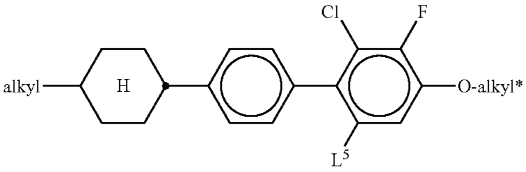
Y2-29
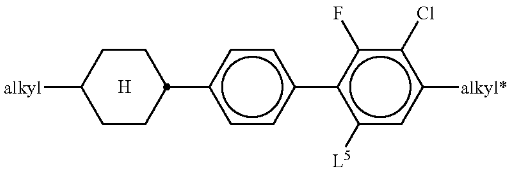
Y2-30
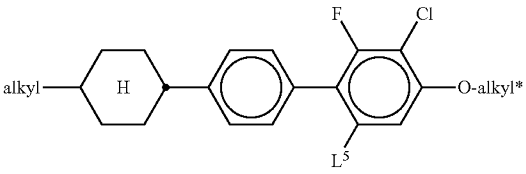
-continued
Y2-31
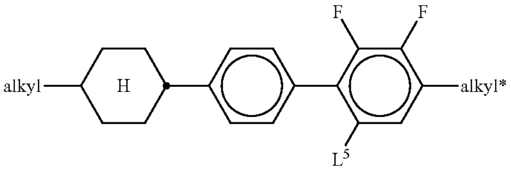
Y2-32
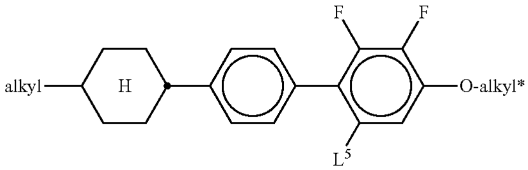
Y2-33
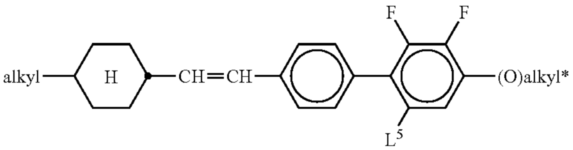
Y2-34
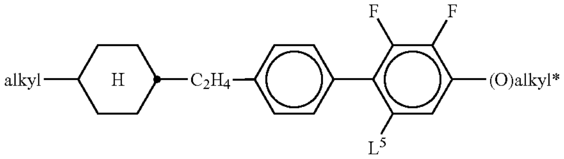
Y2-35
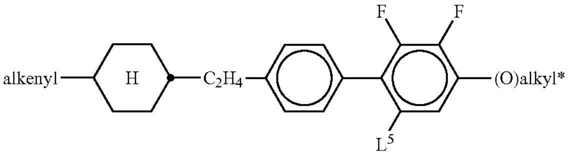
Y2-36
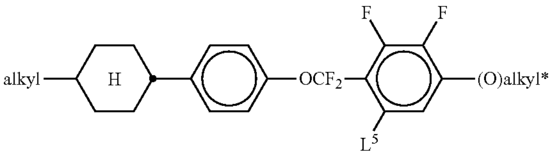
Y2-37
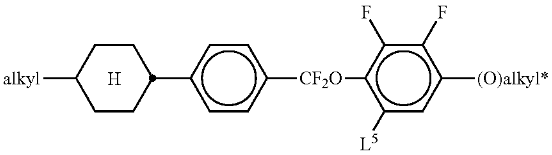
Y2-38
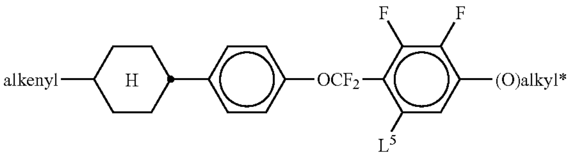

-continued

Y2-39

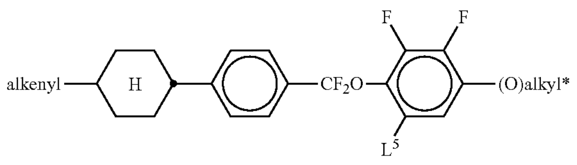

which

"alkyl" and "alkyl" each, independently of one another, denote a straight-chain alkyl group having 1 to 6 C atoms, and "alkenyl" denotes a straight-chain alkenyl group having 2 to 6 C atoms, (O) denotes an oxygen atom or a single bond, and $L^5$ denotes a H atom or $CH_3$, preferably a H atom.

"alkenyl" preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Very preferably, the LC medium contains one or more compounds of the Formula Y2 selected from Formulae Y2-2 and Y2-10.

The proportion of the compounds of the Formula Y1 or its subformulae in the LC medium is preferably from 0 to 10% by weight.

The proportion of the compounds of the Formula Y2 or its subformulae in the LC medium is preferably from 0 to 10% by weight.

The total proportion of the compounds of the Formula Y1 and Y2 or their subformulae in the medium is preferably from 1 to 20%, very preferably from 2 to 15% by weight.

Preferably, the LC medium contains 1, 2 or 3 compounds of the Formula Y1 and Y2 or their subformulae, very preferably selected from the Formulae Y1-2, Y1-22, Y1-66, Y1-70, Y2-6 and Y2-22.

In another preferred embodiment of the present invention, the LC medium contains one or more compounds of the Formula Y of the following subformula:

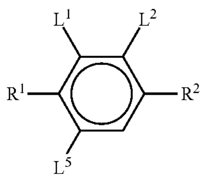

wherein $L^1$, $L^2$, $L^5$, $R^1$ and $R^2$ have one of the meanings given in the Formula I for $L^1$, $L^2$, $Y^0$ and $R^0$, respectively.

Preferred compounds of the Formula Y3 are selected from the group consisting of the following subformulae:

Y3-1

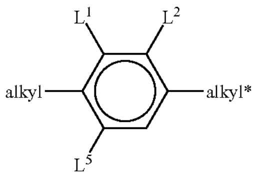

-continued

Y3-2

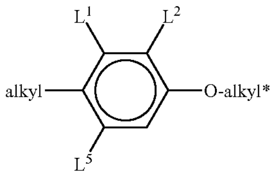

Y3-3

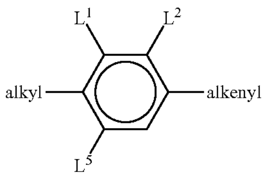

Y3-4

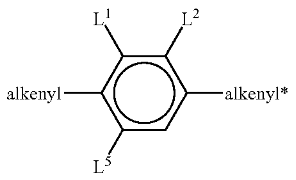

Y3-5

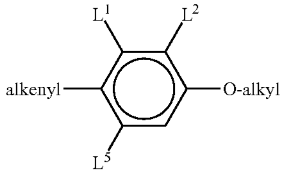

Y3-6

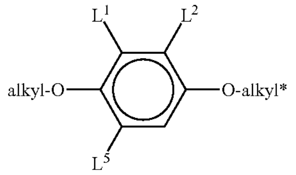

Y3-7

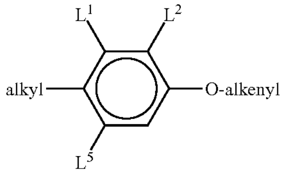

Y3-8

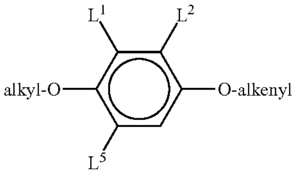

Y3-9

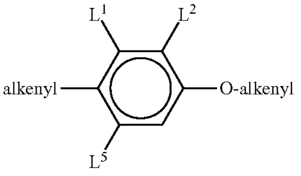

-continued

Y3-10

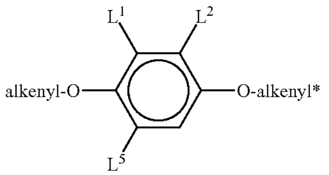

Y3-11

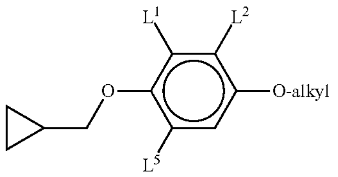

Y3-12

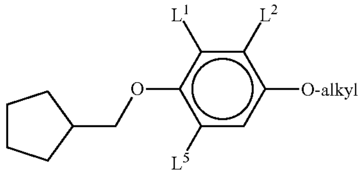

Y3-13

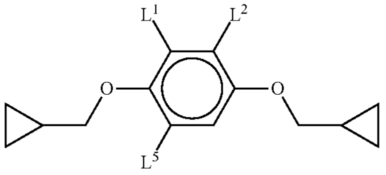

Y3-14

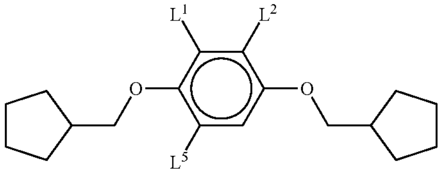

in which,

"alkyl" and "alkyl*" each, independently of one another, denote a straight-chain alkyl group having 1 to 6 C atoms;

"alkenyl" and "alkenyl*" each, independently of one another, denote a straight-chain alkenyl group having 2 to 6 C atoms; and (O) denotes an oxygen atom or a single bond.

"alkenyl" and "alkenyl*" preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred compounds of the Formula Y3 are selected from the group consisting of following subformulae:

Y3-6A

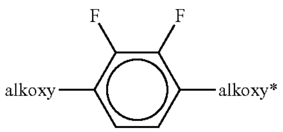

-continued

Y3-6B

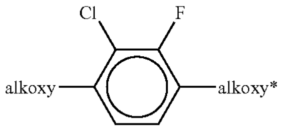

wherein "alkoxy" and "alkoxy*" each, independently of one another, preferably denote straight-chain alkoxy with 3, 4, or 5 C atoms.

Preferably, in the compounds of the Formula Y3 and its subformulae both $L^1$ and $L^2$ denote F. Further preferably in the compounds of the Formula Y3 one of the substituents $L^1$ and $L^2$ denotes F and the other denotes Cl.

The proportion of the compounds of the Formula Y3 or its subformulae in the LC medium is preferably from 0 to 10%, very preferably from 1 to 6% by weight.

Preferably, the LC medium contains 1, 2 or 3 compounds of the Formula Y3 or its subformulae, more preferably of the Formula Y3-6, very preferably of the Formula Y3-6A.

In yet another preferred embodiment of the present invention, the LC medium contains one or more compounds of the Formula Y of the subformula Y4:

Y4

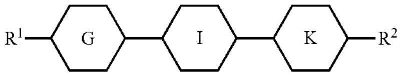

in which $R^1$ and $R^2$ each, independently of one another, have one of the meanings indicated above in the Formula Y, and

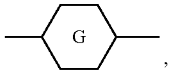
,
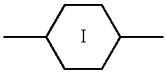
and
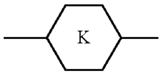

each, independently of one another, denote

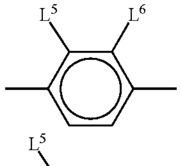
,
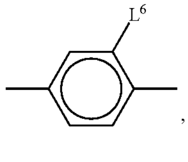
,
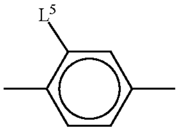
or
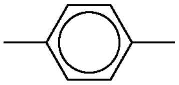

in which $L^5$ denotes F or Cl, preferably F, and $L^6$ denotes F, Cl, $OCF_3$, $CF_3$, $CH_3$, $CH_2F$ or $CHF_2$, preferably F, and preferably at least one of the rings G, I and K is different from unsubstituted benzene.

Mostly preferred compounds of the Formula Y4 are selected from the group consisting of the following subformulae:

Y4-1
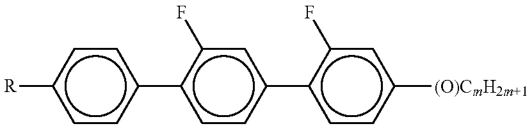
Y4-2
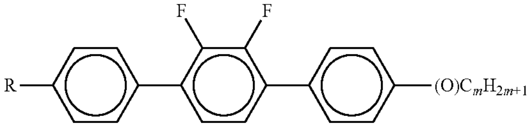
Y4-3
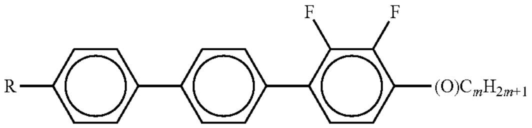
Y4-4
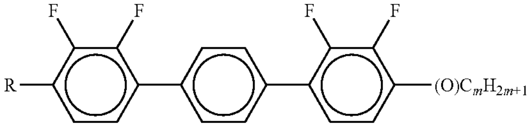
Y4-5
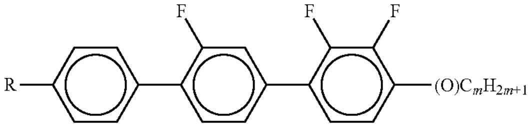
Y4-6
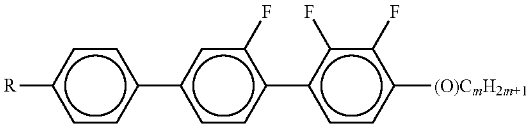
Y4-7
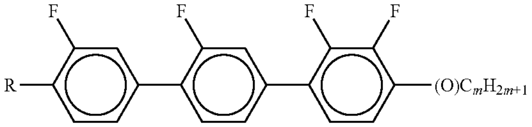
Y4-8
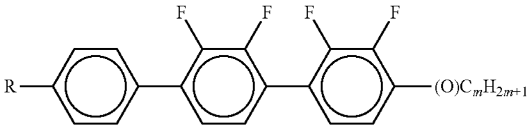
Y4-9
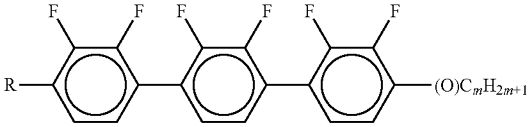
Y4-10
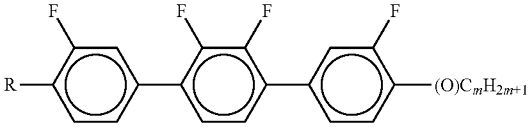
-continued
Y4-11
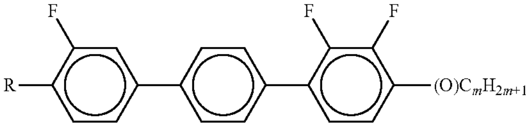
Y4-12
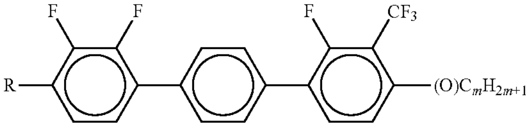
Y4-13
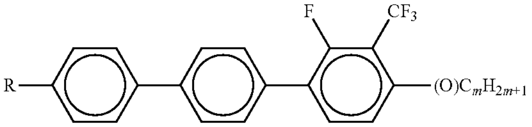
Y4-14
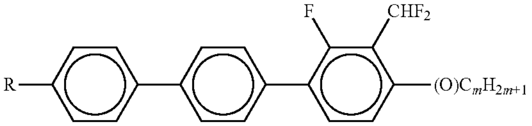
Y4-15
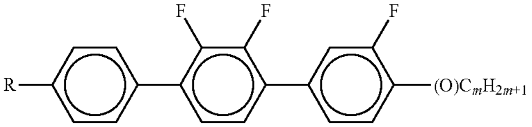
Y4-16
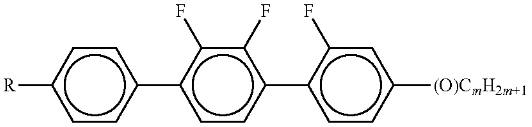
Y4-17
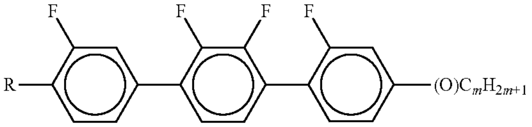
Y4-18
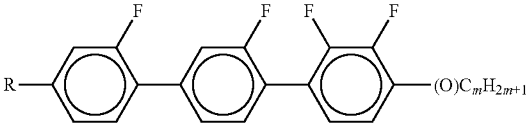
Y4-19
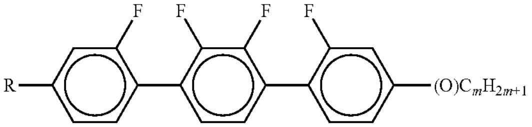
Y4-20
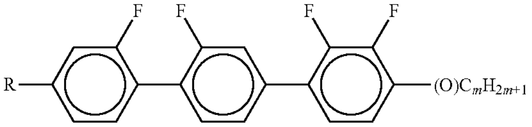

in which

R denotes a straight-chain alkyl or alkoxy group having 1-7 C atoms, (O) denotes an oxygen atom or a single bond, and m denotes an integer from 1 to 6.

R preferably denotes methyl, ethyl, propyl, butyl, pentyl, hexyl, methoxy, ethoxy, propoxy, butoxy or pentoxy.

The proportion of the compounds of the Formula Y4 or its subformulae in the medium is preferably from 0 to 10%, very preferably from 1 to 6% by weight.

Particularly preferred compounds are those of the subformulae

Y4-2a

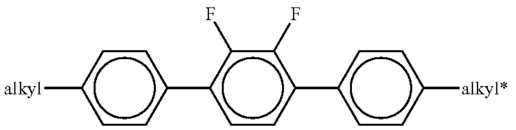

Y4-2b

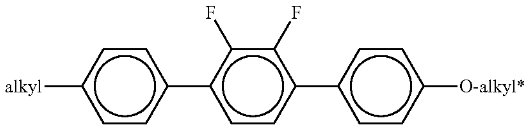

Y4-3a

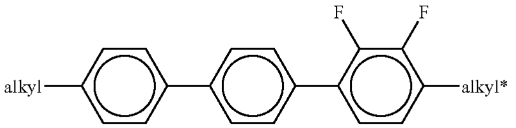

Y4-3b

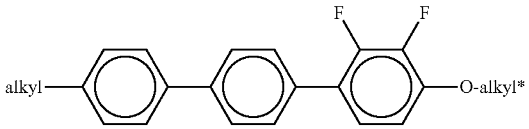

in which

"alkyl" and "alkyl" each, independently of one another, denote a straight-chain alkyl group having 1 to 6 C atoms, in particular ethyl, propyl or pentyl.

Use of the following compounds is particularly advantageous:

Y4-2a-1

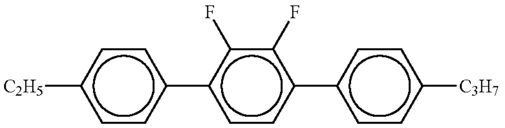

Y4-2a-2

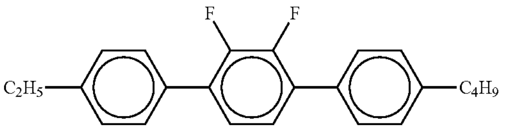

Y4-2a-3

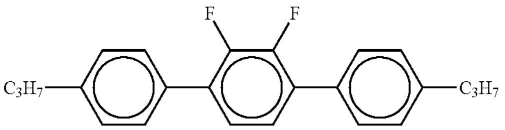

-continued

Y4-2a-4

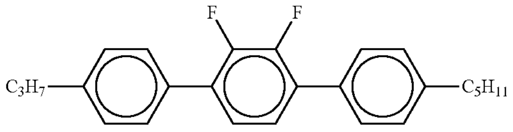

Y4-3a-1

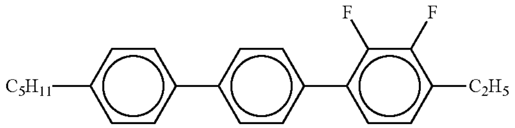

In another preferred embodiment of the present invention, the LC medium contains one or more compounds of the Formula Y selected from the group consisting of the following subformulae:

Y5

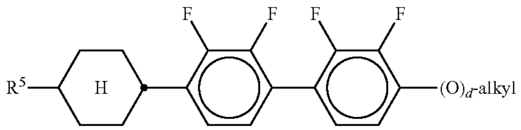

Y6

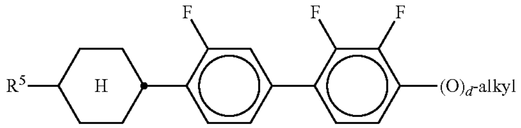

Y7

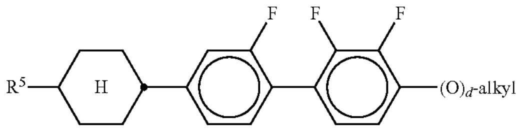

in which $R^5$ has one of the meanings indicated above in the Formula Y for $R^1$, "alkyl" denotes a straight-chain alkyl group having 1 to 6 C atoms, d denotes 0 or 1, and z and m each, independently of one another, denote an integer from 1 to 6.

$R^5$ in these compounds is particularly preferably $C_2$-6-alkyl or -alkoxy or $C_{2-6}$-alkenyl, d is preferably 1. The LC medium according to the invention preferably comprises one or more compounds of the above-mentioned formulae in amounts of ≥5% by weight.

Further preferred embodiments are indicated below:

The LC medium comprises one or more compounds of the Formula Y of the following subformula

LY

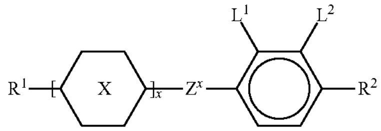

wherein $R^1$, $R^2$, $L^1$, $L^2$, X, x and $Z^x$ have the meanings given in the Formula Y, and wherein at least one of the rings X is cyclohexenylene.

Preferably, both substituents $L^1$ and $L^2$ denote F. Further preferably, one of the substituents $L^1$ and $L^2$ denotes F and the other denotes Cl.

The compounds of the Formula LY are preferably selected from the group consisting of the following subformulae:

LY1

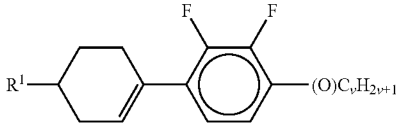

LY2

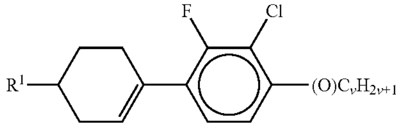

LY3

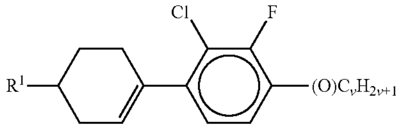

LY4

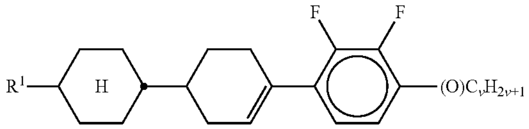

LY5

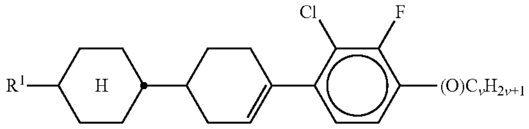

LY6

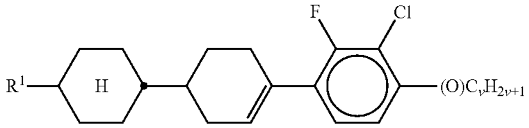

LY7

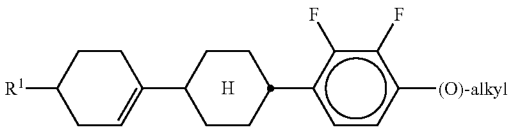

LY8

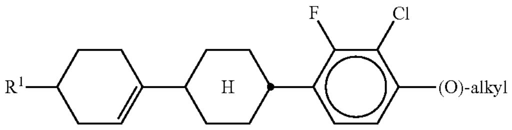

in which $R^1$ has the meaning indicated in the Formula Y above, (O) denotes an oxygen atom or a single bond, and v denotes an integer from 1 to 6.

$R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Very preferred are compounds of the Formula LY4.

Preferably, the medium contains 1, 2 or 3 compounds of the Formula LY, very preferably of the Formula LY4.

The proportion of the compounds of the Formula LY or its subformulae in the medium is preferably from 1 to 10% by weight.

The medium comprises one or more compounds of the Formula Y represented by the following subformula:

AY

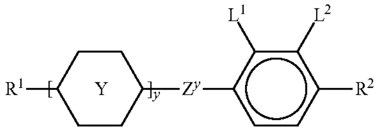

wherein $R^1$, $R^2$, $L^1$, $L^2$, Y, y and $Z^y$ have the meanings given in the Formula Y, and wherein at least one of the rings Y is tetrahydropyrane.

The compounds of the Formula AY are preferably selected from the group consisting of the following subformulae:

AY1

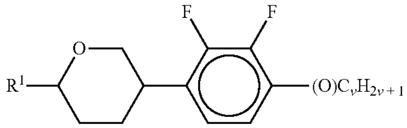

AY2

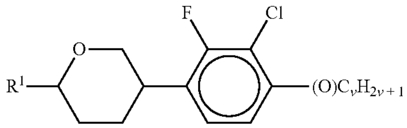

AY3

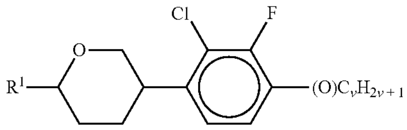

AY4

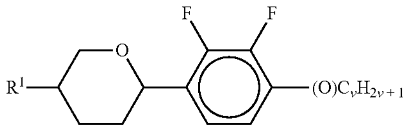

AY5

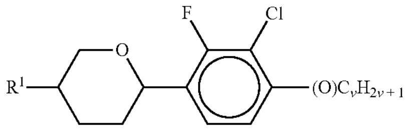

AY6

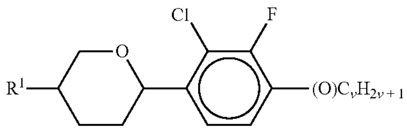

AY7

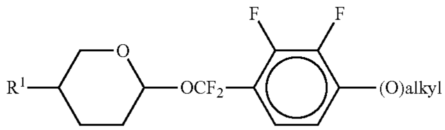

AY8

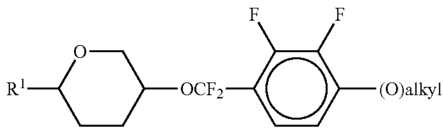

-continued

AY9

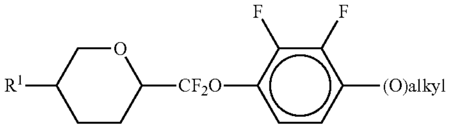

AY10

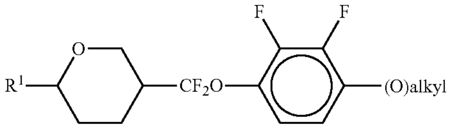

AY11

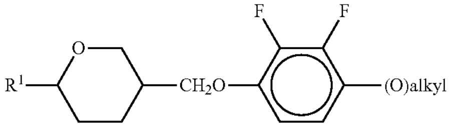

AY12

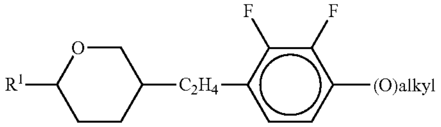

AY13

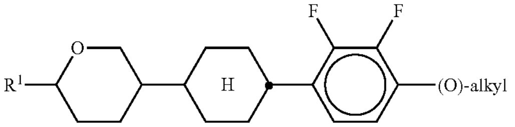

AY14

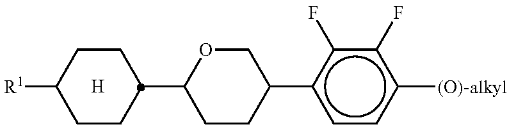

AY15

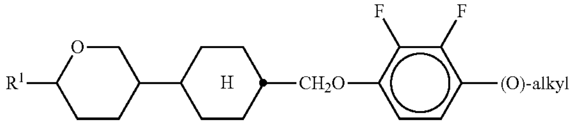

AY16

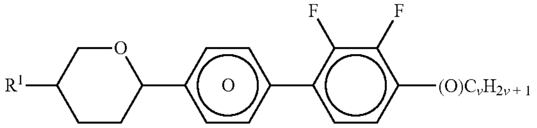

in which $R^1$ has the meaning indicated above,

"alkyl" denotes a straight-chain alkyl group having 1 to 6 C atoms, (O) denotes an oxygen atom or a single bond, and v denotes an integer from 1 to 6.

$R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

In the compounds of the Formula B and its subformulae, $R^1$ and $R^3$ preferably denote straight-chain alkyl or alkoxy having 1 to 6 C atoms, in particular methoxy, ethoxy, propoxy or butoxy, furthermore alkenyl having 2 to 6 C atoms, in particular vinyl, 1E-propenyl, 1E-butenyl, 3-butenyl, 1E-pentenyl, 3E-pentenyl or 4-pentenyl.

In a preferred embodiment of the present invention, the medium contains one or more compounds of the Formula B selected from the following subformulae:

B1

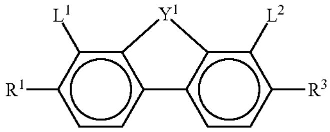

B2

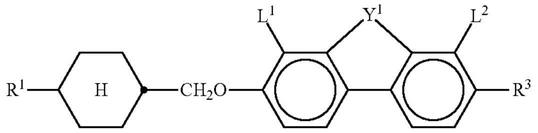

B3

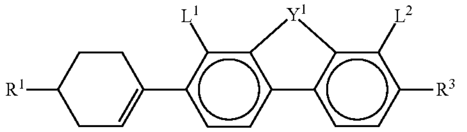

wherein Y1, $L^1$, $L^2$, $R^1$ and $R^3$ have the meanings given in the Formula B.

Preferred compounds of the Formula B1 are selected from the following subformulae:

B1-1

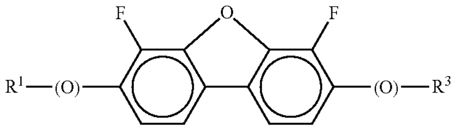

B1-2

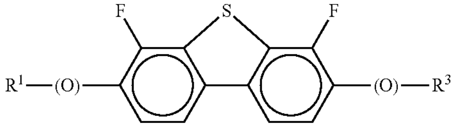

wherein $R^1$ and $R^3$ independently denote a straight-chain alkyl group having 1 to 6 C atoms, in which one or more $CH_2$ groups are optionally substituted by —C≡C—, —$CF_2$O—, —$OCF_2$—, —CH═CH—,

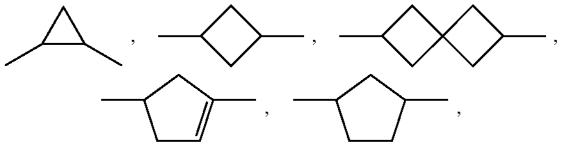

—O—, —CO—O— or —O—CO— in such a way that O atoms are not linked directly to one another, and in which one or more H atoms may be replaced by a halogen atom.

Very preferred are compounds of the Formula B1-1 and B1-2 wherein both groups (O) denote an oxygen atom and $R^1$ and $R^3$ independently denote an alkyl group being methyl, ethyl, propyl, butyl, pentyl or hexyl, which are preferably straight-chained. Very preferably one "alkyl" is ethyl and the other "alkyl" is n-pentyl.

Particularly preferred are compounds of the Formula B1-2.

Preferably, the compounds of the Formula B1-1 are selected from the group of compounds of the Formulae B1-1-1 to B1-1-11, preferably of the Formula B1-1-6:

B1-1-1

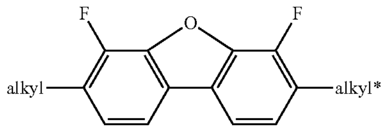

B1-1-2

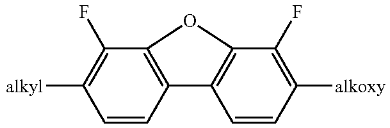

B1-1-3

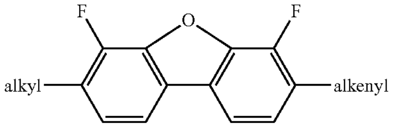

B1-1-4

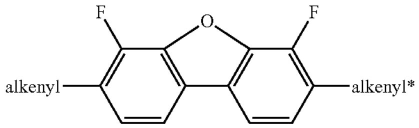

B1-1-5

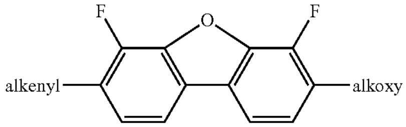

B1-1-6

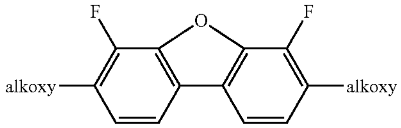

B1-1-7

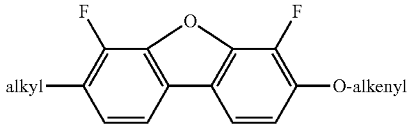

B1-1-8

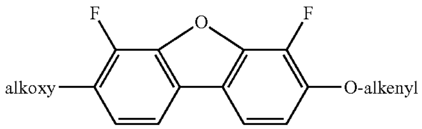

B1-1-9

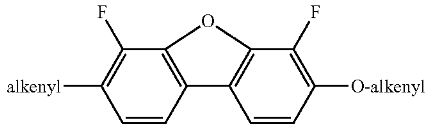

B1-1-10

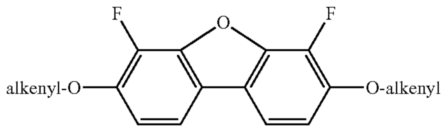

in which

"alkyl" and "alkyl" each, independently of one another, denote a straight-chain alkyl group having 1 to 6 C atoms, "alkenyl" and "alkenyl*" each, independently of one another, denote a straight-chain alkenyl group having 2 to 6 C atoms, "alkoxy" and "alkoxy*" each, independently of one another, denote a straight-chain alkoxy group having 1 to 6 C atoms.

Preferably, the compounds of the Formula B1-2 are selected from the group of compounds of Formulae B1-2-1 to B1-2-10, preferably of Formula B1-2-6:

B1-2-1

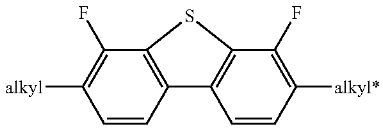

B1-2-2

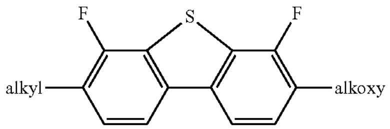

B1-2-3

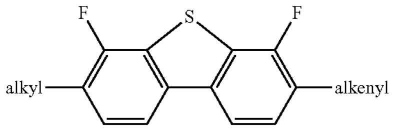

B1-2-4

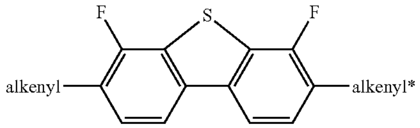

B1-2-5

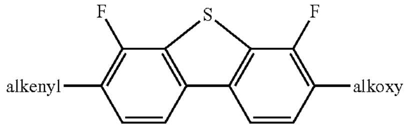

B1-2-6

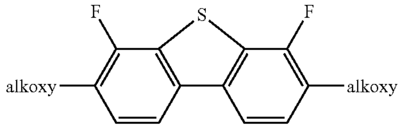

B1-2-7

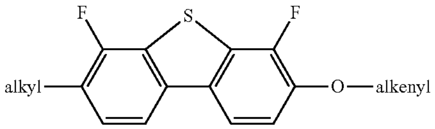

B1-2-8

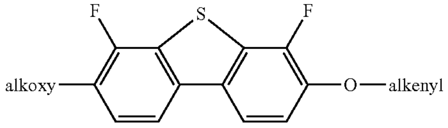

B1-2-9

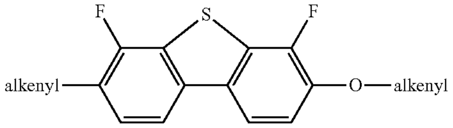

-continued

B1-2-10

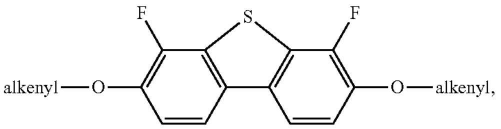

in which

"alkyl" and "alkyl" each, independently of one another, denote a straight-chain alkyl group having 1 to 6 C atoms, "alkenyl" and "alkenyl*" each, independently of one another, denote a straight-chain alkenyl group having 2 to 6 C atoms, "alkoxy" and "alkoxy*" each, independently of one another, denote a straight-chain alkoxy group having 1 to 6 C atoms.

Optionally, the LC medium comprises one or more compounds of the Formula B1-1A and/or B1-2A:

B1-1A

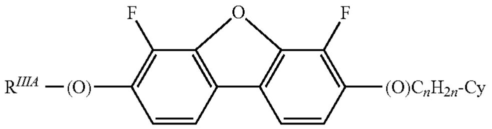

B1-2A

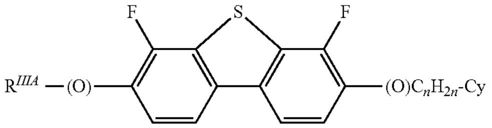

in which (O) denotes O or a single bond, $R^{IIIA}$ denotes alkyl or alkenyl having up to 7 C atoms or a group Cy-$C_mH_{2m+1}$—, m and n are, identically or differently, 0, 1, 2, 3, 4, 5 or 6, preferably 1, 2 or 3, very preferably 1, Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of the Formulae B1-1A and/or B1-2A are contained in the medium either alternatively or in addition to the compounds of the Formulae B1-1 and B1-2, preferably additionally.

Preferred compounds of the Formulae B1-1A and/or B1-2A are also the following:

B1-1A-1

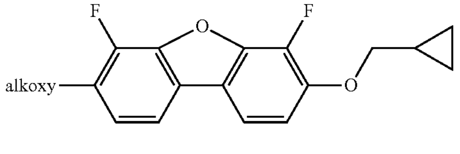

-continued

B1-1A-2

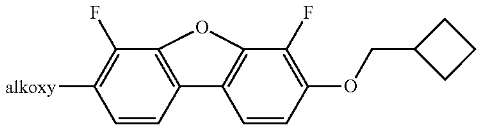

B1-1A-3

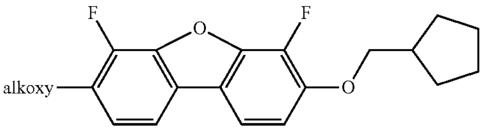

B1-2A-1

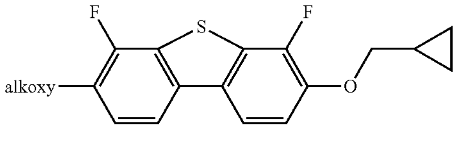

B1-2A-2

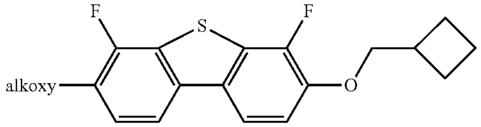

B1-2A-3

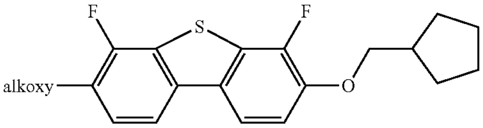

in which alkoxy denotes a straight-chain alkoxy group having 1 to 6 C atoms or alternatively —$(CH_2)_nF$ in which n is 2, 3, 4, or 5, preferably $C_2H_4F$.

The proportion of the compounds of the Formula B1 or its subformulae in the LC medium is preferably from 1 to 20%, very preferably from 1 to 15% by weight.

Preferably, the LC medium contains 1, 2 or 3 compounds of the Formula B1 or its subformulae.

In a preferred embodiment of the present invention, the LC medium may comprise one or more compounds of the Formula B2-2

B2-2-1

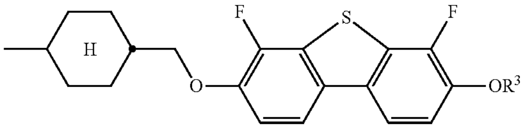

in which $R^1$, $R^3$ identically or differently, denote H, an alkyl or alkoxy group having 1 to 6 C atoms, in which one or more $CH_2$ groups in these groups are optionally replaced, independently of one another, by —C≡C—, —$CF_2O$—, —$OCF_2$—, —CH═CH—,

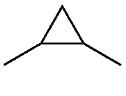, 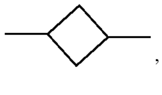, 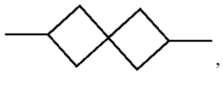,

-continued

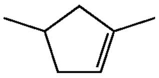
,
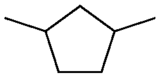
,

—O—, —CO—O— or —O—CO— in such a way that atoms are not linked directly to one another, and in which, in addition, one or more H atoms may be replaced by halogen.

The compounds of the Formula B2-2 are preferably selected from the group of compounds of the Formulae B2-2-1 to B2-2-10:

B2-2-1

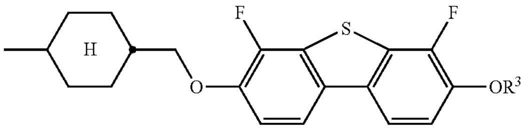

B2-2-2

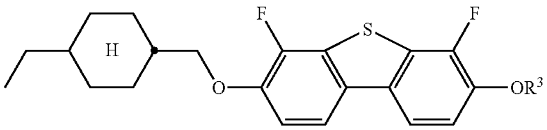

B2-2-3

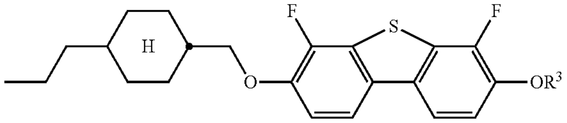

B2-2-4

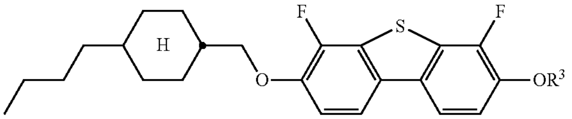

B2-2-5

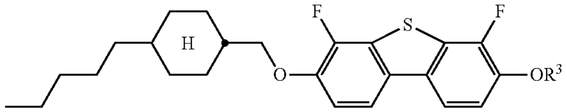

B2-2-6

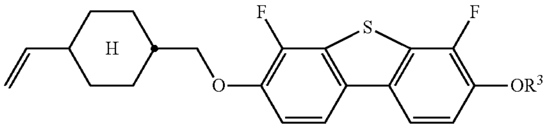

B2-2-7

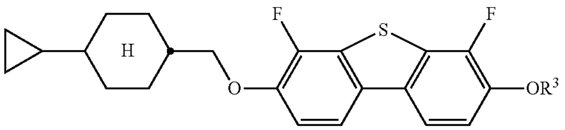

B2-2-8

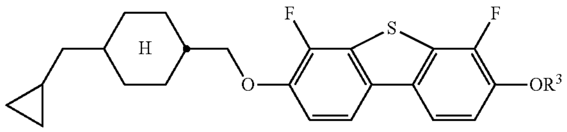

-continued

B2-2-9

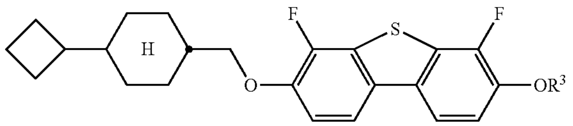

B2-2-10

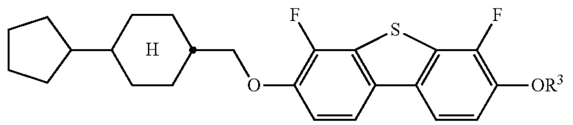

in which $R^3$ denotes alkyl having 1 to 6 C-atoms, preferably ethyl, n-propyl or n-butyl, or alternatively cyclopropylmethyl, cyclobutylmethyl or cyclopentylmethyl or alternatively $—(CH_2)_nF$ in which n is 2, 3, 4, or 5, preferably $C_2H_4F$.

Particularly preferred compounds of the Formula B2 are selected from the following subformulae:

B2-2-11

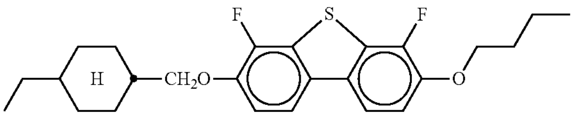

B2-2-12

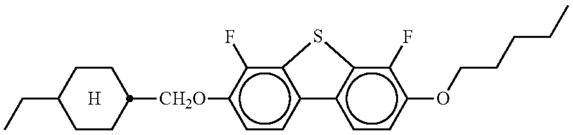

B2-2-13

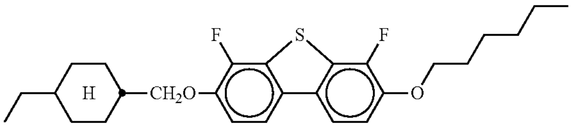

The proportion of the compounds of the Formula B2 or its subformulae in the LC medium is preferably from 1 to 20%, very preferably from 1 to 15% by weight.

Preferably, the LC medium contains 1, 2 or 3 compounds of the Formula B2 or its subformulae.

Preferred compounds of the Formula B3 are selected from the following subformulae:

B3-1

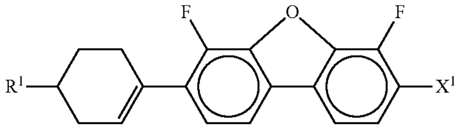

B3-2

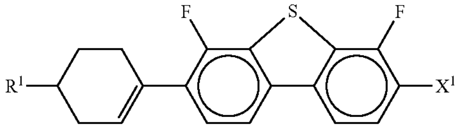

wherein $R^1$ has one of the meanings given in the Formula B3 and preferably denotes straight-chain alkyl having 1 to 6 C atoms, very preferably methyl, ethyl, propyl, butyl, pentyl or hexyl, more preferably ethyl or propyl, most preferably propyl, and $X^1$ has one of the meanings given in the Formula B3 and preferably denotes $CF_3$ or $OCF_3$.

Preferred compounds of the Formula B3 are selected from the following subformulae:

B3-1-1

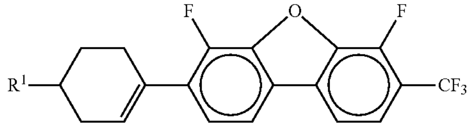

B3-1-2

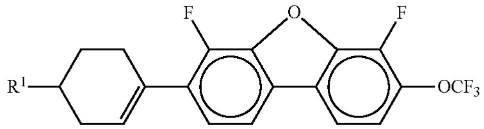

B3-2-1

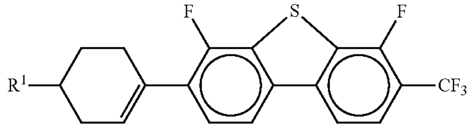

B3-2-2

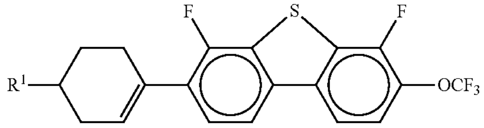

wherein $R^1$ has one of the meanings given in the Formula B3 and preferably denotes straight-chain alkyl having 1 to 6 C atoms, very preferably methyl, ethyl, propyl, butyl, pentyl or hexyl, more preferably ethyl or propyl, most preferably propyl.

Most preferred are compounds of the Formulae B3-1-1 and B3-2-2.

In a preferred embodiment, the LC medium contains one or more compounds of the Formula B or its subformulae B1, B2, B3, B1-1, B1-2, B2-1, B2-2, B2-3, B3-1, B3-2, B3-1-1, B3-1-2, B3-2-1 and B3-2-2 wherein the dibenzofuran or dibenzothiophene group is substituted by a methyl or methoxy group, preferably by a methyl group, preferably in p-position to the substituent F, very preferably in p-position to the substituent F (i.e. in m-position to the terminal group $R^2$ or $X^1$).

The proportion of the compounds of the Formula B3 or its subformulae in the LC medium is preferably from 1 to 20%, very preferably from 1 to 10% by weight.

Preferably, the LC medium contains 1, 2 or 3 compounds of the Formula B3 or its subformulae.

Preferably, the total proportion of compounds of the Formula Y and B or their subformulae in the LC medium is from 2 to 25%, very preferably from 3 to 20% by weight.

Further preferred LC media are selected from the following preferred embodiments, including any combination thereof:

- a compound of the Formula I in combination with a compound of the Formula ST, H and Z1 to Z7
- a compound of the Formula I in combination with a compound of the Formula ST, Z1 to Z7 and II and/or III
- a compound of the Formula I in combination with a compound of the Formula ST, LP1, IV to VIII and a compound of the Formula Z1 and Z4
- a compound of the Formula I in combination with a compound of the Formula LP1 and/or LP2
- a compound of the Formula I in combination with a compound of the Formula XXX and/or XXIX
- a compound of the Formula I in combination with a compound of the Formula IVb-1
- a compound of the Formula I in combination with a compound of the Formula IVc-1
- a compound of the Formula I in combination with a compound of the Formula XXXV
- a compound of the Formula I in combination with a compound of the Formula XIVc-1
- a compound of the Formula I in combination with a compound of the Formula XIIa-1
- a compound of the Formula I in combination with a compound of the Formula XVIc
- a compound of the Formula I in combination with a compound of the Formula VIb
- a compound of the Formula I in combination with a compound of the Formula XXVIIIa The LC medium comprises one or more compounds of the Formula I or its subformulae, ST and, optionally, H, II and/or III and one or more compounds selected from the group consisting of the Formulae Z1, Z2, Z3, Z4, Z5, V, VI, VII, VIII, XIV, XV, XVI, XVIIa, XVIIb, XVIIc, XVIII, XIX, XX, XXI, XXIII, XXIV, XXV, XXVI, XXVII, XXVIII, XXIX, XXX, XXX-1, XXX-2, XXX-3, XXXII, XXXIII and S and their subformulae.

The LC medium comprises one or more compounds of the Formulae I or its subformulae and ST and/or H, II and/or III and one or more compounds selected from the group consisting of the Formulae Z1, Z2, Z3, Z4, Z5, IV, VI, XII, XIV, XVI, XVIIa, XVIIb, XVIIc, XX, LP1-1, XXIII, XXIX and S and their subformulae.

The LC medium comprises one or more compounds selected from the group consisting of the Formula II-1, 11-2 and 11-3, very preferably from the Formula II-1 and 11-2. The individual concentration of each of these compounds is preferably from 2 to 15% by weight. The total concentration of these compounds is preferably from 5 to 25% by weight.

The LC medium comprises one or more compounds selected from the group consisting of the Formula III-1, 111-4, 111-6, 111-16, 111-19 and 111-20, very preferably from the group consisting of the Formula III-1, 111-6, 111-16 and 111-20. The individual concentration of each of these compounds is preferably from 2 to 15% by weight. The total concentration of these compounds is preferably from 5 to 30% by weight.

The LC medium comprises one or more compounds of the Formula IV, preferably selected from the Formula Va or IVc, very preferably from the Formula IVa-1 or IVc-1, most preferably of the Formula IVc-1. The individual concentration of each of these compounds is preferably from 2 to 15% by weight. The total concentration of these compounds is preferably from 5 to 20% by weight.

The LC medium comprises one or more compounds of the Formula VI, preferably selected from the Formula VIb. The individual concentration of each of these compounds is preferably from 1 to 20% by weight. The total concentration of these compounds is preferably from 5 to 20% by weight.

The LC medium comprises one or more compounds of the Formula Z1, preferably selected from the Formula Z1-1. The total concentration of these compounds is preferably from 1 to 60% by weight, more preferably 5 to 50% by weight.

The LC medium comprises one or more compounds of the Formula Z2, preferably selected from the Formulae Z2-1 and Z2-2. The total concentration of these compounds is preferably from 2 to 35%, very preferably from 3 to 25% by weight.

The LC medium comprises from 5 to 20% by weight of compounds of the Formula Z3, preferably of the Formula Z3-1.

The LC medium comprises from 5 to 20% by weight of compounds of the Formula Z4, preferably of the Formula Z4-1.

The LC medium comprises from 10 to 65%, very preferably from 20 to 60% by weight of compounds of Formula Z5.

The LC medium comprises one or more compounds of the Formula LP1-1, preferably of the Formula LP1-1a, very preferably of the Formula LP1-1a. The concentration of these compounds is preferably from 2 to 15% by weight.

The LC medium comprises one or more compounds of the Formula XII, preferably of the Formula XIIa or XIIb, very preferably of the Formula XIIa, most preferably of the Formula XIIa-1. The concentration of these compounds is preferably from 2 to 15% by weight.

The LC medium comprises from 1 to 15% by weight of compounds of the Formula XIIb.

The LC medium comprises one or more compounds of the Formula XIV, preferably of the Formula XIVd, very preferably of the Formula XIVd-1. The concentration of these compounds is preferably from 2 to 10% by weight.

The LC medium comprises one or more compounds of the Formula XVIb, preferably of the Formula XVIb-1, XVIb-2 and/or XVIb-3. The concentration of these compounds is preferably from 2 to 15% by weight.

The LC medium comprises one or more compounds of the Formula XVIc, preferably of the Formula XVIc-1, XVIc-2 and/or XVIc-3. The concentration of these compounds is preferably from 2 to 20% by weight.

The LC medium comprises one or more compounds selected from the group consisting of the Formulae XVIIa, XVIIb and XVIIc, very preferably of the Formula XVIIa wherein L is H and of the Formula XVIIb wherein L is F. The total concentration of these compounds is preferably from 0.5 to 5% by weight.

The LC medium comprises one or more compounds of the Formula XX, preferably of the Formula XXa. The concentration of these compounds is preferably from 2 to 10% by weight.

The LC medium comprises one or more compounds of the Formula XXI, preferably of the Formula XXIa. The concentration of these compounds is preferably from 2 to 10% by weight.

The LC medium comprises one or more compounds of the Formula XXIII, preferably of the Formula XXIIIa. The concentration of these compounds is preferably from 0.5 to 5% by weight.

The LC medium comprises one or more compounds of the Formula XXIX, preferably of the Formula XXIXa. The concentration of these compounds is preferably from 2 to 10% by weight.

The LC medium comprises one or more compounds of the Formula XXX. The concentration of these compounds is preferably from 2 to 10% by weight.

The LC medium comprises one or more compounds of the Formula XII. The concentration of these compounds is preferably from 2 to 10% by weight.

The LC medium comprises one or more compounds of the Formula I, ST, H, II and/or III, one or more compounds selected from the group consisting of the Formulae Z1, Z2 and Z3 or their subformulae, one or more compounds selected from the group consisting of the Formula XIV, one or more compounds selected from the group consisting of the Formulae IV, VI, XX, XXIII and XXIX or their subformulae, and one or more compounds selected from the group consisting of the Formulae XVI, XVIIa, XVIIb, XVIIc or their subformulae.

The LC medium comprises one or more compounds of Formula I, ST, II and/or III, one or more compounds selected from the group consisting of the Formulae Z1, Z2, Z3, Z4 and Z5 or their subformulae, one or more compounds selected from the group consisting of the Formula XIVd or their subformulae, one or more compounds selected from the group consisting of the Formulae IVc, VIb, XXa, XXIIIa and XXIXa or their subformulae, and one or more compounds selected from the group consisting of the Formulae LP1-1b, XVIb, XVIc, XVIIa, XVIIb, XVIIc or their subformulae.

The LC medium comprises one or more compounds of the Formula I, ST, II and/or III, one or more compounds selected from the group consisting of the Formulae Z1, Z2 and Z3 or their subformulae, one or more compounds of the Formula Y, preferably selected from the group consisting of the Formulae Y1 and Y2, one or more compounds selected from the group consisting of the Formula XIV, one or more compounds selected from the group consisting of the Formulae II, III, IV, VI, XX, XXIII and XXIX or their subformulae, and one or more compounds selected from the group consisting of the Formulae XVI, XVIIa, XVIIb, XVIIc or their subformulae.

The LC medium comprises one or more compounds of the Formula I one or more compounds selected from the group consisting of the Formulae Z1, Z2, Z3, Z4 and Z5 or their subformulae, one or more compounds of Formula B, preferably selected from the group consisting of the Formulae B1, B2 and B3, one or more compounds of the Formula XIVd or their subformulae, one or more compounds selected from the group consisting of the Formulae II, III, IVc, VIb, XXa, XXIIIa and XXIXa or their subformulae, and one or more compounds selected from the group consisting of the Formulae LP1-1 b, XVIb, XVIc, XVIIa, XVIIb, XVIIc or their subformulae.

Besides the compounds of the Formula I, the LC medium comprises further compounds selected from the group of the compounds of the Formula Z1, Z2, Z3, IV, LP1-1, XIV, XVI, XVIIa, XVIIb, XVIIc, XXI, XXIII, XXIX, XXX and XXIV or their subformulae.

Besides the compounds of the Formula I, the LC medium comprises further compounds selected from the group of the compounds of the Formulae Z1, Z2, Z3, IV, XIV, XVI, XVIIa, XVIIb, XVIIc, XXI, XXIII, XXIX, XXX and XXIV or their subformulae.

The proportion of compounds of the Formula I or its subformulae in the LC medium is from 1 to 30%, very preferably from 2 to 25%, most preferably from 2 to 20% by weight.

The proportion of compounds of the Formulae Z1, Z2, Z3, Z4 and Z5 or their subformulae in the LC medium as a whole is from 10 to 65%, very preferably from 20 to 60% by weight.

The proportion of compounds of the Formula Y or its subformulae in the LC medium as a whole is from 0 to 15%, very preferably from 2 to 10% by weight.

The proportion of compounds of the Formula B or its subformulae in the LC medium as a whole is from 0 to 15%, very preferably from 2 to 10% by weight.

The proportion of compounds of the Formulae II, III, IV-VIII, XVIII-XXIII and XXVII-XXX in the LC medium as a whole is 30 to 60% by weight.

The proportion of compounds of the Formulae XIV and XV in the LC medium as a whole is 40 to 70% by weight.

The proportion of compounds of the Formulae XIV, XVIIa-c and XXXII in the LC medium as a whole is 0.5 to 15% by weight.

The term "alkyl" or "alkyl" in this application encompasses straight-chain and branched alkyl groups having 1 to 6 carbon atoms, in particular the straight-chain groups methyl, ethyl, propyl, butyl, pentyl and hexyl. Groups having 2 to 5 carbon atoms are generally preferred.

The term "alkenyl" or "alkenyl*" encompasses straight-chain and branched alkenyl groups having 2 to 6 carbon atoms, in particular the straight-chain groups. Preferred alkenyl groups are $C_{2-7}$-1E-alkenyl, $C_4$-$C_6$-3E-alkenyl, in particular $C_2$-$C_6$-1E-alkenyl. Examples of particularly preferred alkenyl groups are vinyl, E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2$=CH, $CH_3CH$=CH.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain groups of the Formula $C_nH_{2n+1}$—O—$(CH_2)_m$, in which n and m each, independently of one another, denote 1 to 6. m may also denote 0. Preferably, n=1 and m=1 to 6 or m=0 and n=1 to 3. Further preferably the alkoxy or oxaalkyl group can also contain one or more further O atoms such that oxygen atoms are not directly linked to one another.

Through a suitable choice of the meanings of $R^0$ and $X^0$ in Formulae II and III, the addressing times, the threshold voltage, the steepness of the transmission characteristic lines, etc., can be modified in the desired manner. For example, 1E-alkenyl groups, 3E-alkenyl groups, 2E-alkenyloxy groups and the like generally result in shorter addressing times, improved nematic tendencies and a higher ratio between the elastic constants $K_3$ (bend) and $K_1$ (splay) compared with alkyl and alkoxy groups. 4-Alkenyl groups, 3-alkenyl groups and the like generally give lower threshold voltages and lower values of $K_3/K_1$ compared with alkyl and alkoxy groups. The LC media according to the invention are distinguished, in particular, by high Δε values and thus have significantly faster response times than the LC media from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the LC media according to the invention is not crucial. The LC media can therefore comprise one or more further components for the purposes of optimisation of various properties.

However, the observed effect on the desired improvement in the properties of the medium is generally greater, the higher the total concentration of compounds of the above-mentioned formulae.

In a particularly preferred embodiment, the LC media according to the invention comprise compounds of the Formulae IV to VIII (preferably IV and V) in which $X^0$ denotes F, $OCF_3$, $OCHF_2$, OCH=$CF_2$, OCF=$CF_2$ or $OCF_2$—$CF_2$H. A favourable synergistic action with the compounds of the Formula I, an antioxidant and, if present, a light stabilizer results in particularly advantageous properties. In particular, LC media comprising compounds of the Formula I, an antioxidant, a light stabilizer, II and/or III are distinguished by their low threshold voltage.

The individual compounds of the above-mentioned formulae and the subformulae thereof which can be used in the LC media according to the invention are either known or can be prepared analogously to the known compounds.

The invention also relates to a process for the preparation of a LC medium as described above and below, by mixing one or more compounds of the Formula I, an antioxidant, a light stabilizer and one or more compounds selected from the group consisting of the Formulae II, III, Z1, Z2, Z3, Z4, IV, VI, XIV, XVI, XVIIa, XVIIb, XVIIc, XX, XXIII, XXIX.

The LC medium of the present invention may optionally comprise one or more polymerisable compounds. The polymerisable compounds are preferably selected from the Formula M $$R^a—B^1—(Z^b—B^2)_m—R^b \qquad M$$

in which the individual substituents, on each occurrence identically or differently, and each, independently of one another, have the following meaning:

NCSOCNR$^a$ and $R^b$ P, P-Sp-, H, F, Cl, Br, I, —CN, —$NO_2$, —NCO, -, -, —SCN, $SF_5$ or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, NCSOCN—N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, C, Br, I, CN, P or P-Sp-, where, if $B^1$ and/or $B^2$ contain a saturated C atom, $R^a$ and/or $R^b$ may also denote a group which is spiro-linked to this saturated C atom, wherein at least one of the substituents $R^a$ and $R^b$ denotes or contains a group P or P-Sp-, P a polymerisable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF═CF—, —C≡C—, —CH═CH—COO—, —OCO—CH═CH—, $CR^0R^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L P, P-Sp-, OH, $CH_2OH$, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, C, P or P-Sp-, P and Sp have the meanings indicated in the Formula M above, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, C, P or P-Sp-, an optionally substituted aryl or aryloxy group having 6 to 40 C atoms, or an optionally substituted heteroaryl or heteroaryloxy group having 2 to 40 C atoms.

Further preferably, the LC media according to the present invention comprise one or more polymerisable compounds selected from Table H below.

Preferably, the proportion of polymerisable compounds in the LC medium, preferably selected from the Formula M and Table H, is from 0.01 to 5%, very preferably from 0.05 to 1%, most preferably from 0.1 to 0.5%.

It was observed that the addition of one or more polymerisable compounds to the LC medium, like those selected from the Formula M and Table H, leads to advantageous properties like fast response times. Such a LC medium is especially suitable for use in PSA displays where it shows low image sticking, a quick and complete polymerisation, the quick generation of a low pretilt angle which is stable after UV exposure, a high reliability, high VHR value after UV exposure, and a high birefringence. By appropriate selection of the polymerisable compounds it is possible to increase the absorption of the LC medium at longer UV wavelengths, so that it is possible to use such longer UV wavelengths for polymerisation, which is advantageous for the display manufacturing process.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from the group consisting of $CH_2$═$CW^1$—CO—O—, $CH_2$═$CW^1$—CO—,

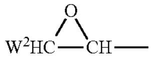,
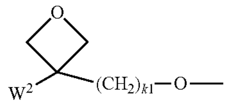,

-continued

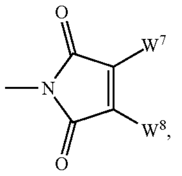
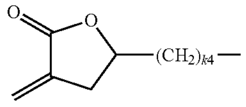, $CH_2$═$CW^2$—(O)$_{k3}$—, $CW^1$═CH—CO—(O)$_{k3}$—, $CW^1$═CH—CO—NH—, $CH_2$═$CW^1$—CO—NH—, $CH_3$—CH═CH—O—, ($CH_2$═CH)$_2$CH—OCO—, ($CH_2$═CH—$CH_2$)$_2$CH—OCO—, ($CH_2$═CH)$_2$CH—O—, ($CH_2$═CH—$CH_2$)$_2$N—, ($CH_2$═CH—$CH_2$)$_2$N—CO—, HO—$CW^2W^3$—, HS—$CW^2W^3$—, $HW^2N$—, HO—$CW^2W^3$—NH—, $CH_2$═$CW^1$—CO—NH—, $CH_2$═CH—(COO)$_{k1}$-Phe-(O)$_{k2}$—, $CH_2$═CH—(CO)$_{k1}$-Phe-(O)$_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, $C_1$ or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more substituents L as defined for the Formula M above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$═$CW^1$—CO—O—, $CH_2$═$CW^1$—CO—,

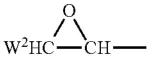,
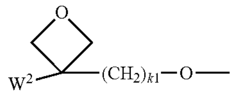,

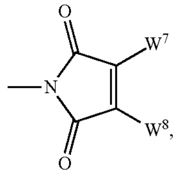
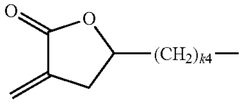, $CH_2$═$CW^2$—O—, CH═$CW^2$—, $CW^1$═CH—CO—(O)$_{k3}$—, $CW^1$═CH—CO—NH—, $CH_2$═$CW^1$—CO—NH—, ($CH_2$═CH)$_2$CH—OCO—, ($CH_2$═CH—$CH_2$)$_2$CH—OCO—, ($CH_2$═CH)$_2$CH—O—, ($CH_2$═CH—$CH_2$)$_2$N—, ($CH_2$═CH—$CH_2$)$_2$N—CO—, $CH_2$═$CW^1$—CO—NH—, $CH_2$═CH—(COO)$_{k1}$-Phe-(O)$_{k2}$—, $CH_2$═CH—(CO)$_{k1}$-Phe-(O)$_{k2}$—, Phe-CH═CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, C or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2$═$CW^1$—CO—O—, in particular $CH_2$=CH—CO—O—, $CH_2$=C($CH_3$)—CO—O— and $CH_2$=CF—CO—O—, furthermore $CH_2$=CH—O—, ($CH_2$=CH)$_2$CH—O—CO—, ($CH_2$=CH)$_2$CH—O—,

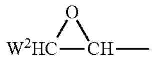

and

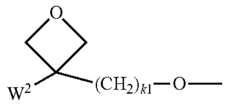

.

Further preferred polymerisable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the Formula Sp"-X", so that the respective substituent P-Sp-conforms to the Formula P-Sp"-X"—, wherein Sp" denotes alkylene having 1 to 20, preferably 1 to 12, C atoms, which is optionally mono- or polysubstituted by F, C, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH=CH— or —C=C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"-X"— are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —($SiR^0R^{00}$—O)$_{p1}$—, in which p1 is an integer from 1 to 12, q1 is an integer from 1 to 3, and $R^0$ and $R^{00}$ have the meanings indicated in the Formula M above.

Particularly preferred groups Sp and -Sp"-X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The combination of compounds of the preferred embodiments mentioned above with the polymerised compounds described above causes low threshold voltages, low rotational viscosities and very good low-temperature stabilities in the LC media according to the invention at the same time as constantly high clearing points and high VHR values.

The use of LC media containing polymerisable compounds allows the rapid establishment of a particularly low pretilt angle in PSA displays. In particular, the LC media exhibit significantly shortened response times, in particular also the grey-shade response times, in PSA displays compared with the media from the prior art.

Preference is generally given to LC media which have a nematic LC phase, and preferably have no chiral liquid crystal phase.

The invention also relates to the use of a LC medium according to the present invention as described above and below for electro-optical purposes, in particular for the use is in shutter glasses, for 3D applications, in TN, PS-TN, STN, TN-TFT, OCB, IPS, PS-IPS, FFS, HB-FFS, XB-FFS, PS-FFS, positive VA and positive PS-VA displays, and to electro-optical displays, in particular of the aforementioned types, containing a LC medium according to the present invention as described above and below, in particular a TN, PS-TN, STN, TN-TFT, OCB, IPS, PS-IPS, FFS, HB-FFS, XB-FFS, PS-FFS, positive VA (vertically aligned) or positive PS-VA display.

The invention also relates to electro-optical displays, such as, for example, STN or matrix LC (MLC) displays, having two plane-parallel outer plates, which, together with a frame, form a cell, integrated non-linear elements for switching individual pixels on the outer plates, and a nematic LC medium having positive dielectric anisotropy and high specific resistance located in the cell, wherein the nematic LC medium is a LC medium according to the present invention as described above and below.

The LC media according to the invention enable a significant broadening of the available parameter latitude. The achievable combinations of clearing point, rotational viscosity, thermal- and UV stability and high optical anisotropy are far superior to previous materials from the prior art.

In particular, the combination of compounds of the Formula I with at least one antioxidant, at least one light stabilizer and, optionally, with compounds selected from the Formulae II-XXXII or their subformulae, leads to LC media which show a reduced short-term image sticking and reduced long-term image sticking as well as low rotational viscosity resulting in fast response times. This enables fast energy saving LC displays, especially of the FFS, HB-FFS, XB-FFS and IPS mode.

The LC media according to the invention are suitable for mobile applications and TFT applications, such as, for example, mobile telephones and PDAs. Furthermore, the LC media according to the invention are particularly suitably for use in FFS, HB-FFS, XB-FFS and IPS displays based on dielectrically positive liquid crystals.

The LC media according to the present invention, while retaining the nematic phase down to −20° C. and preferably down to −30° C., particularly preferably down to −40° C., and the clearing point ≥75° C., preferably 80° C., at the same time allow rotational viscosities $\gamma_1$ of ≤120 mPa·s, particularly preferably ≤100 mPa·s, to be achieved, enabling excellent MLC displays having fast response times to be achieved. The rotational viscosities are determined at 20° C.

The dielectric anisotropy Δε of the LC media according to the invention at 20° C. and 1 kHz is preferably ≥+1.5, very preferably from +3 to +18, most preferred from +5 to +15.

The birefringence Δn of the LC media according to the invention at 20° C. is preferably from 0.08 to 0.2, very preferably from 0.09 to 0.15.

The rotational viscosity $\gamma_1$ of the LC media according to the invention is preferably ≤120 mPa·s, more preferably ≤110 mPa·s, very preferably 90 mPa·s.

The ratio $\gamma_1/K_1$ (wherein $\gamma_1$ is the rotational viscosity and $K_1$ is the elastic constant for splay deformation) of the LC media according to the invention is preferably 7 mPa·s/pN, very preferably 6 mPa·s/pN, most preferably ≤5.5 mPa·s/pN.

The average elasticity constant ratio $K_{av}$ of the LC media according to the invention is preferably at least 14.0 pN, very preferably at least 15.0 pN, most preferably at least 16.0 pN. $K_{av}$ can be calculated according to the following formula: $K_{av}=(K_1+K_2+K_3)/3\approx(K_1+½*K_1+K_3)/3$.

The nematic phase range of the LC media according to the invention preferably has a width of at least 90° C., more preferably of at least 100° C., in particular at least 110° C. This range preferably extends at least from −25° C. to +90° C.

It goes without saying that, through a suitable choice of the components of the LC media according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain LC media having a higher Δε and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the LC media according to the invention at the first minimum than in the case of LC media comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (VHR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that LC media according to the invention exhibit a significantly smaller decrease in the VHR on UV exposure than analogous LC media comprising cyanophenylcyclohexanes of the Formula

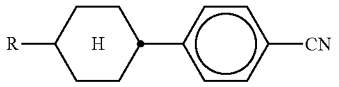

or esters of the Formula.

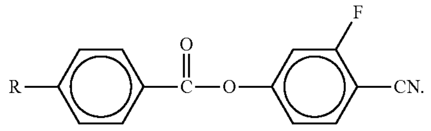

The light stability and UV stability of the LC media according to the invention are considerably better, i.e. they exhibit a significantly smaller decrease in the HR on exposure to light, heat or UV.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the LC parameters of the LC layer.

The LC media which can be used in accordance with the invention are prepared in a manner conventional per se, for example by mixing compounds of Formula I with one or more compounds of the Formulae II-XXXII or with further LC compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The LC media may also comprise further additives known to the person skilled in the art and described in the literature, such as, for example, polymerisation initiators, inhibitors, surface-active substances, microparticles, free-radical scavengers, nanoparticles, etc. For example, 0 to 15% of pleochroic dyes or chiral dopants or initiators like Irgacure®651 or Irgacure®907 can be added. Suitable stabilisers and dopants are mentioned below in Tables F and G. In a preferred embodiment, the LC medium comprises one or more stabilisers selected from Table G. Preferably, the proportion of antioxidants and light stabilisers, like those of the Formula ST and H, as described above or listed in Table G, in the LC medium is from 10 to 2000 ppm, very preferably from 30 to 1000 ppm.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

For the present invention and in the following examples, the structures of the LC compounds are indicated by means of acronyms, with the transformation into chemical formulae taking place in accordance with Tables A to C below. All substituents $C_mH_{2m+1}$, $C_nH_{2n+1}$, and $C_lH_{2l+1}$ or $C_mH_{2m-1}$, $C_nH_{2n-1}$ and $C_lH_{2l-}1$ are straight-chain alkyl groups or alkylene groups, in each case having n, m and I C atoms respectively. Preferably, n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | | | |
|---|---|---|---|
| C | 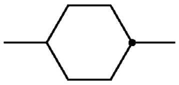 | | |
| D | 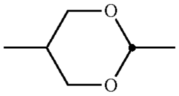 | DI | 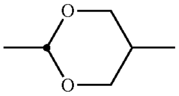 |
| A | 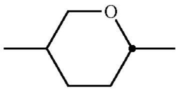 | AI | 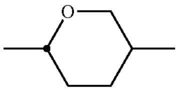 |
| P |  | | |
| G | 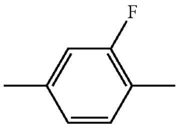 | GI | 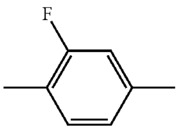 |
| U | 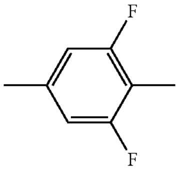 | UI | 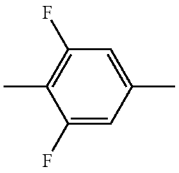 |
| Y | 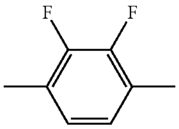 | U(1) | 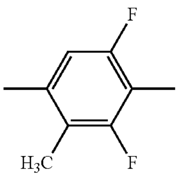 |
| P(F, Cl)Y | 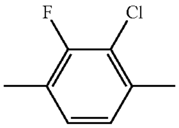 | P(Cl, F)Y | 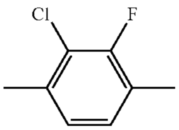 |
| np | 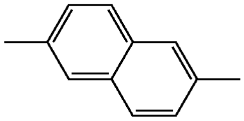 | | |

TABLE A-continued
| Ring elements | | | |
|---|---|---|---|
| n3f | 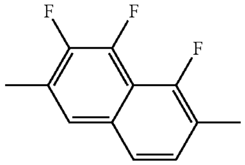 | nN3fl | 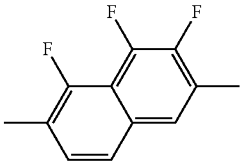 |
| th | 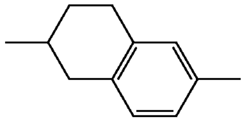 | thl | 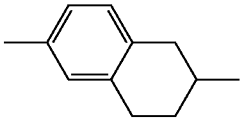 |
| tH2f | 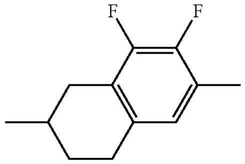 | tH2fl | 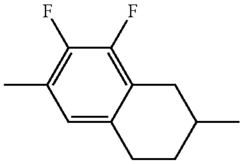 |
| o2f | 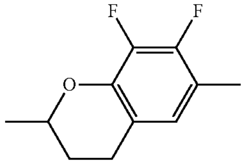 | o2fl | 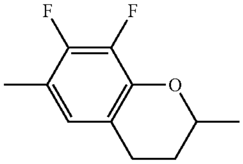 |
| dh | 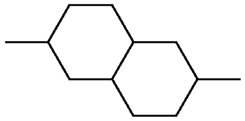 | | |
| B | 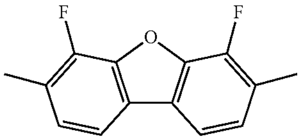 | B(S) | 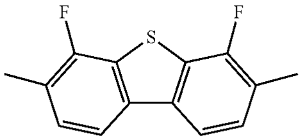 |
| O | 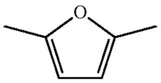 | S | 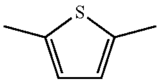 |
| K | 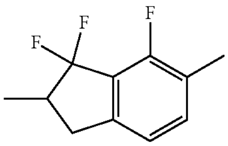 | Kl | 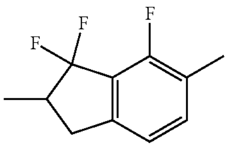 |
| L | 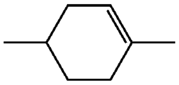 | Ll | 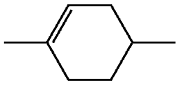 |

TABLE A-continued

| Ring elements | | | |
|---|---|---|---|
| F | 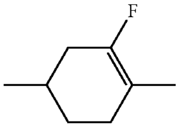 | Fl | 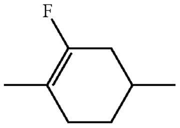 |
| Bh | 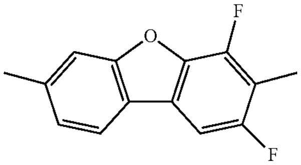 | Bh(S) | 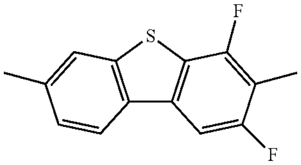 |
| Bf | 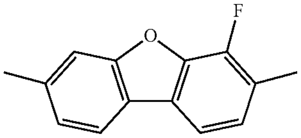 | Bf(S) | 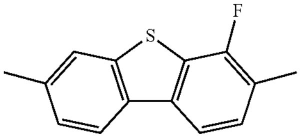 |
| Bfi | 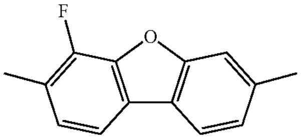 | Bfi(S) | 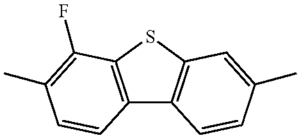 |

TABLE B

| Bridging units | | | |
|---|---|---|---|
| E | $—CH_2—CH_2—$ | | |
| V | —CH=CH— | | |
| T | —C≡C— | | |
| W | $—CF_2—CF_2—$ | | |
| B | —CF=CF— | | |
| Z | —CO—O— | ZI | —O—CO— |
| X | —CF=CH— | XI | —CH=CF— |
| O | $—CH_2—O—$ | OI | $—O—CH_2—$ |
| Q | $—CF_2—O—$ | QI | $—O—CF_2—$ |

TABLE C

End groups

| On the left individually or in combination | | On the right individually or in combination | |
|---|---|---|---|
| -n- | $C_nH_{2n+1}—$ | -n | $—C_nH_{2n+1}$ |
| -nO— | $C_nH_{2n+1}—O—$ | —On | $—O—C_nH_{2n+1}$ |
| —V— | $CH_2$=CH— | —V | $—CH=CH_2$ |
| -nV— | $C_nH_{2n+1}$—CH=CH— | -nV | $—C_nH_{2n}—CH=CH_2$ |
| —Vn- | $CH_2=CH—C_nH_{2n}—$ | —Vn | $—CH=CH—C_nH_{2n+1}$ |
| -nVm- | $C_nH_{2n+1}$—CH=CH—$C_mH_{2m}$— | -nVm | $—C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2—$ | —M | $—CFH_2$ |
| —D— | $CF_2H—$ | —D | $—CF_2H$ |
| —T— | $CF_3—$ | —T | $—CF_3$ |
| —MO— | $CFH_2O—$ | —OM | $—OCFH_2$ |
| —DO— | $CF_2HO—$ | —OD | $—OCF_2H$ |
| —TO— | $CF_3O—$ | —OT | $—OCF_3$ |
| —A— | H—C≡C— | —A | —C≡C—H |
| -nA— | $C_nH_{2n+1}$—C≡C— | —An | —C≡C—$C_nH_{2n+1}$ |
| —NA— | N≡C—C≡C— | —AN | —C≡C—C≡N |

TABLE C-continued

| | | | |
|---|---|---|---|
| -(cn)- | 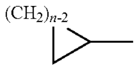 | -(cn) | 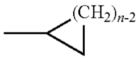 |
| -(cn)m- | 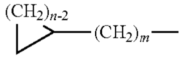 | -m(cn) | 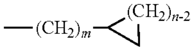 |

| On the left only in combination | | On the right only in combination | |
|---|---|---|---|
| - ... n ... - | $—C_nH_{2n}—$ | - ... n ... | $—C_nH_{2n}—$ |
| - ... M ... - | —CFH— | - ... M ... | —CFH— |
| - ... D ... - | $—CF_2—$ | - ... D ... | $—CF_2—$ |
| - ...V ... - | —CH=CH— | - ... V ... | —CH=CH— |
| - ... Z ... - | —CO—O— | - ... Z ... | —CO—O— |
| - ... Zl ... - | —O—CO— | - ... ZI ... | —O—CO— |
| - ... K ... - | —CO— | - ... K ... | —CO— |
| - ... W ... - | —CF=CF— | - ... W ... | —CF=CF— |

in which n and m are each integers, and the three dots " . . . " are placeholders for other abbreviations from this table.

The following abbreviations are used:

(n, m, k and l are, independently of one another, each an integer, preferably 1 to 12 preferably 1 to 6, k and l possibly may be also 0 and preferably are 0 to 4, more preferably 0 or 2 and most preferably 2, n preferably is 1, 2, 3, 4 or 5, in the combination "-nO—" it preferably is 1, 2, 3 or 4, preferably 2 or 4, m preferably is 1, 2, 3, 4 or 5, in the combination "-Om" it preferably is 1, 2, 3 or 4, more preferably 2 or 4. The combination "—IVm" preferably is "2V1".)

Preferred components of the LC medium are shown in Tables D and E.

TABLE D
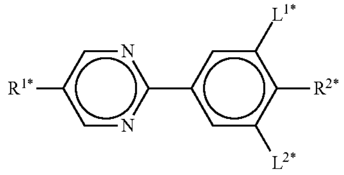
PYP
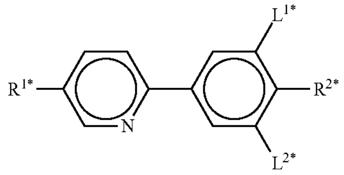
PYRP
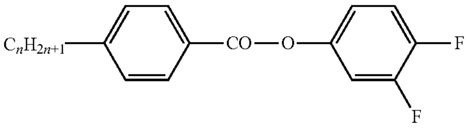
MEnF•F
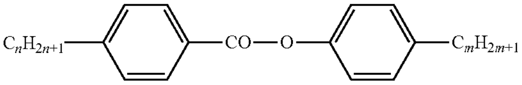
MEnm
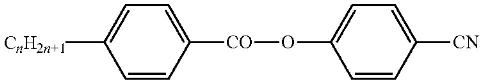
MEnN
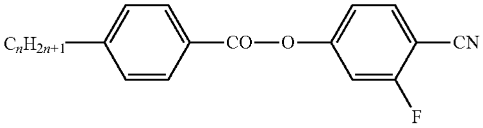
MEnN•F
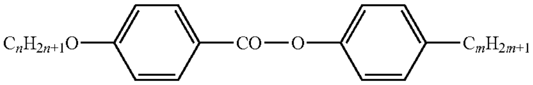
MEnO•m
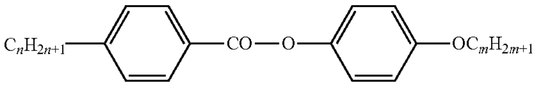
MEn•Om
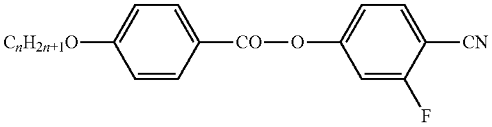
MEnON•F TABLE D-continued
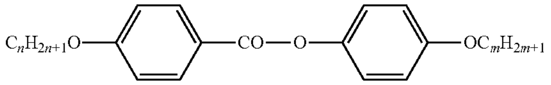
MEnOOm
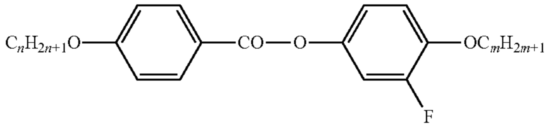
MEnOOm•F
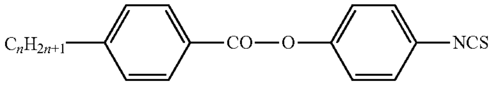
MEnS
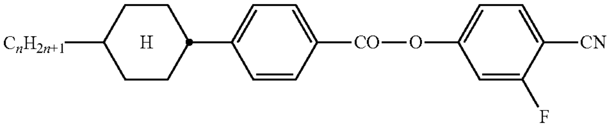
HP-nN•F
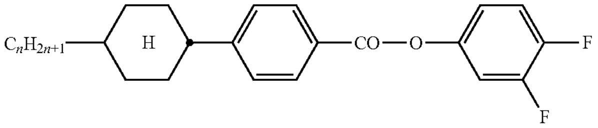
HP-nF•F
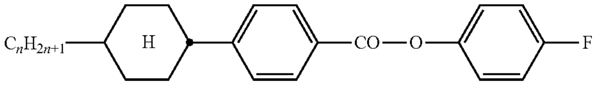
HP-nF
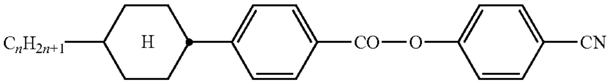
HP-nN
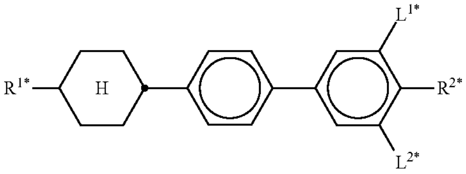
BCH
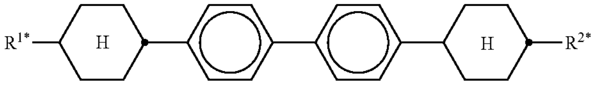
CBC
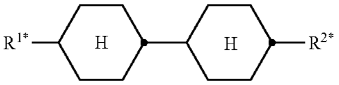
CCH TABLE D-continued
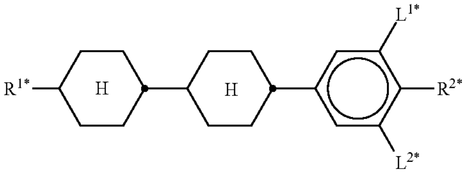
CCP
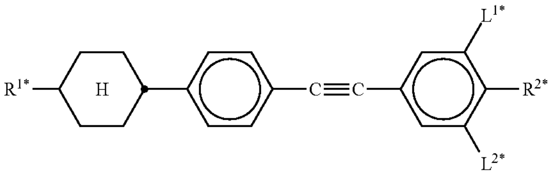
CPTP
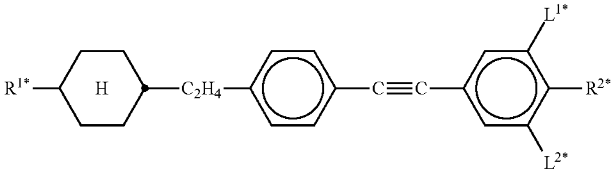
CEPTP
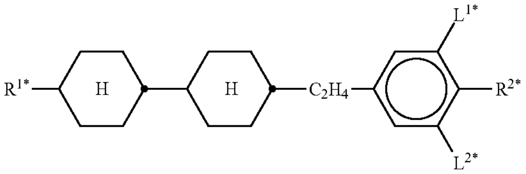
ECCP
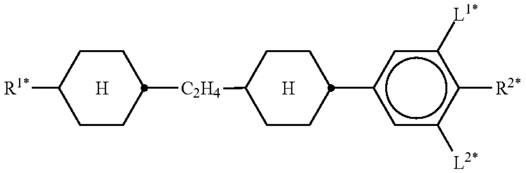
CECP
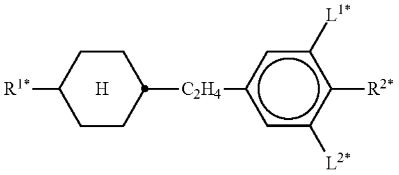
EPCH
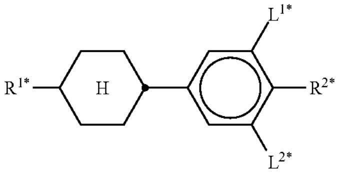
PCH TABLE D-continued
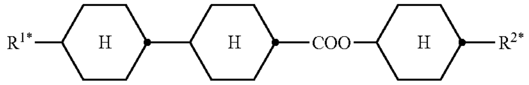
CH
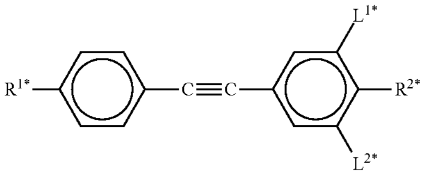
PTP
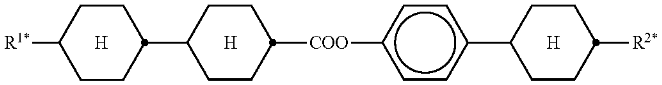
CCPC
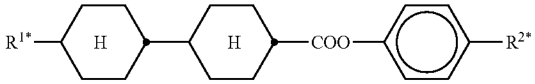
CP
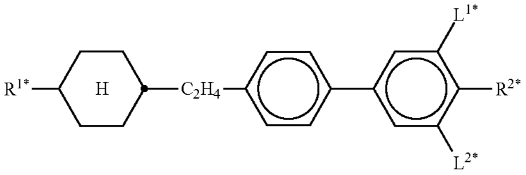
BECH
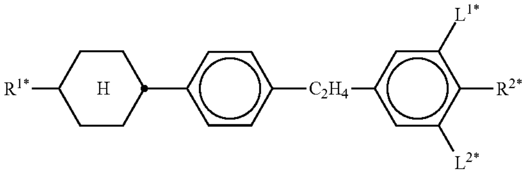
EBCH
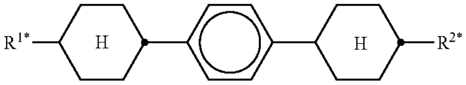
CPC
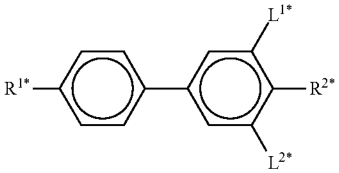
B
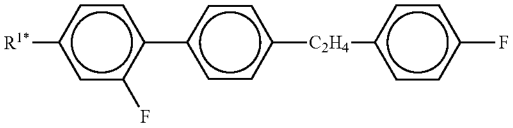
FET-nF TABLE D-continued
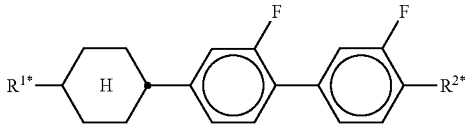
CGG
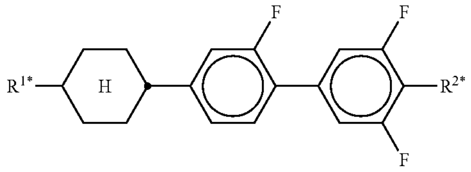
CGU
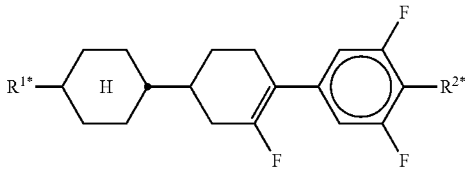
CFU
TABLE E
In the following formulae, n and m each, independently of one another, denote 0, 1, 2, 3, 4, 5, 6, 7, 8, 9, 10, 11 or 12, in particular 2, 3, 5, furthermore 0, 4, 6.
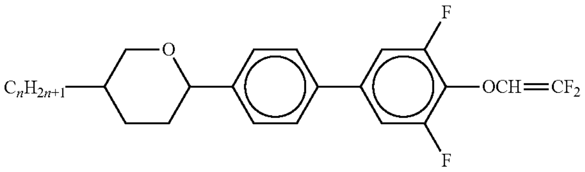
APU-n-OXF
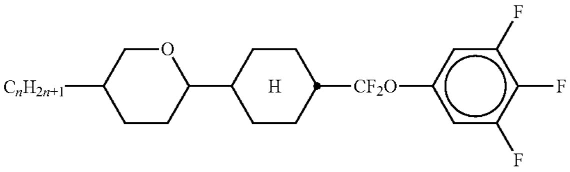
ACQU-n-F
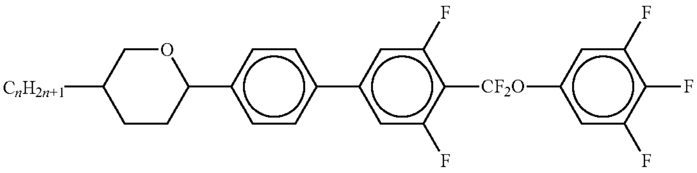
APUQU-n-F
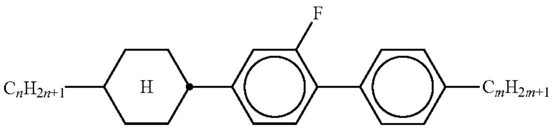
BCH-n•Fm TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
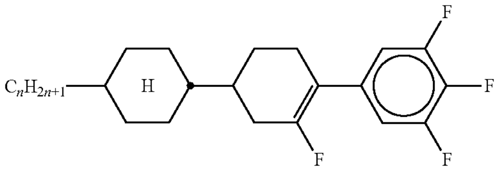
CFU-n-F
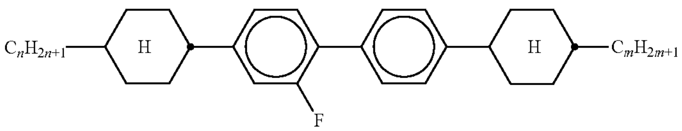
CBC-nmF
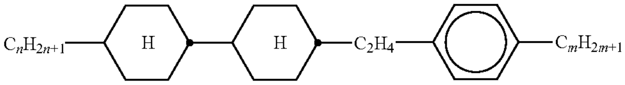
ECCP-nm
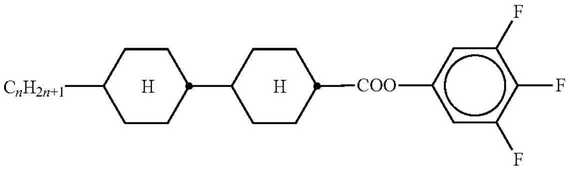
CCZU-n-F
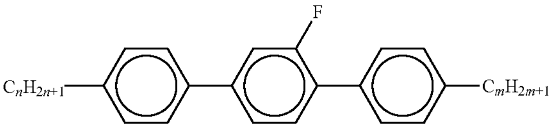
PGP-n-m
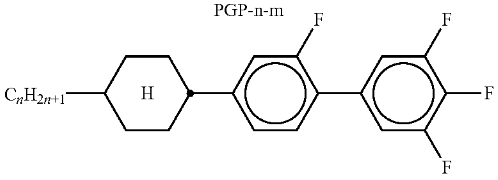
CGU-n-F
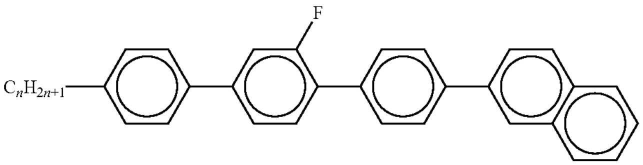
PGP-n-NA
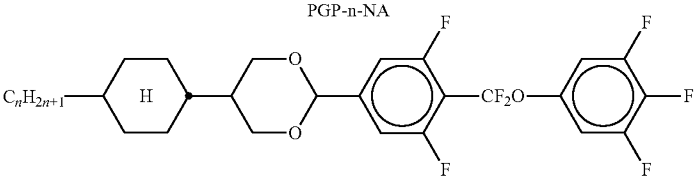
CDUQU-n-F TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
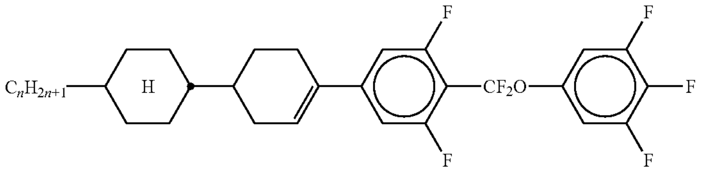
CLUQU-n-F
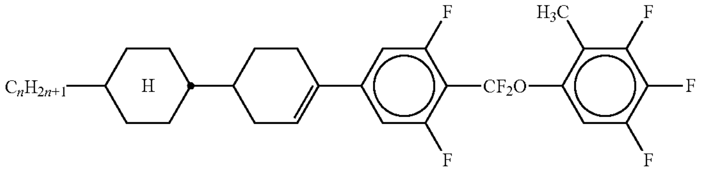
CLUQU(1)-n-F
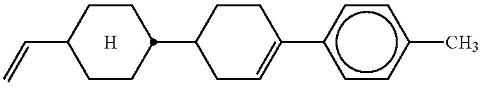
CLP-V-n
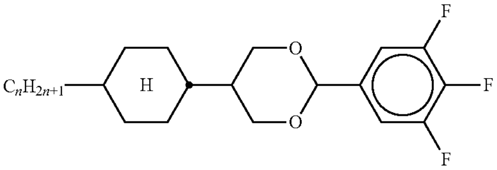
CDU-n-F
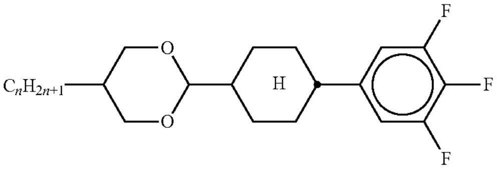
DCU-n-F
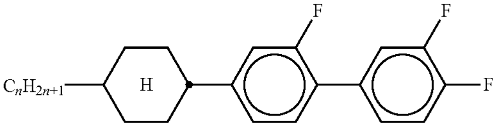
CGG-n-F
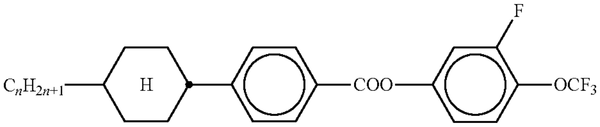
CPZG-n-OT
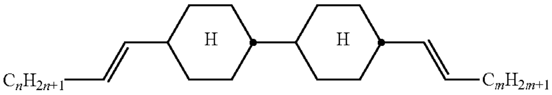
CC-nV-Vm TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
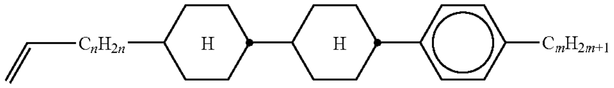
CCP-Vn-m
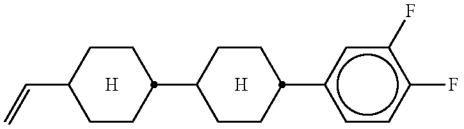
CCG-V-F
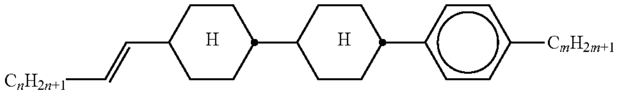
CCP-nV-m
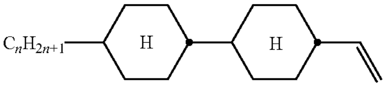
CC-n-V
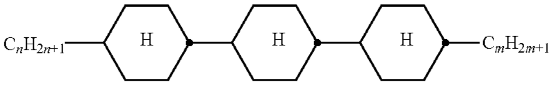
CCC-n-m
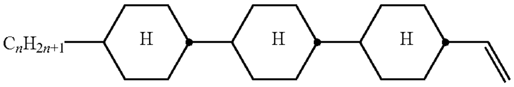
CCC-n-V
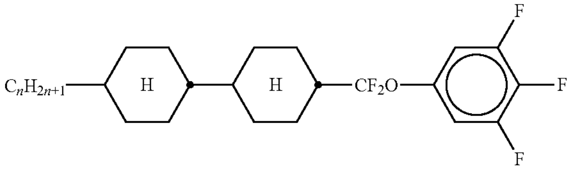
CCQU-n-F
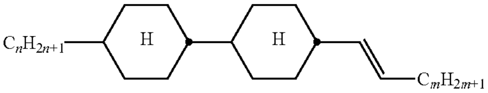
CC-n-Vm
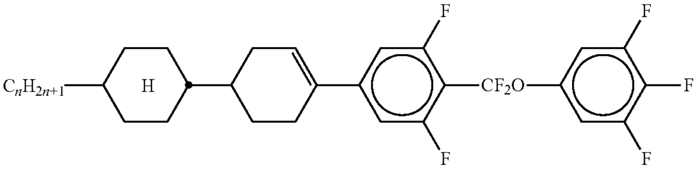
CLUQU-n-F TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
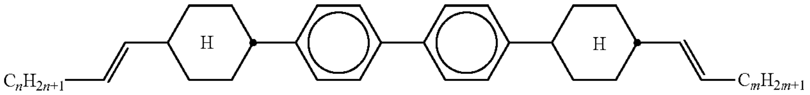
CPPC-nV-Vm
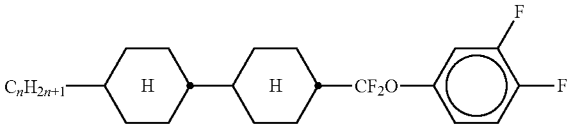
CCQG-n-F
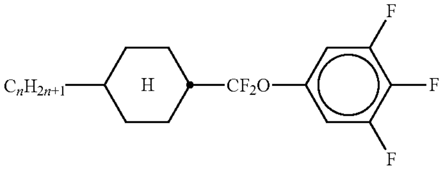
CQU-n-F
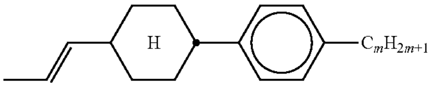
CP-1V-m
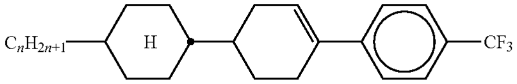
CLP-n-T
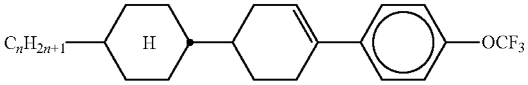
CLP-n-OT
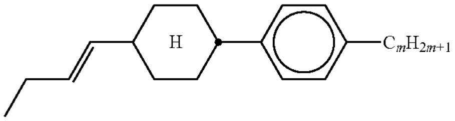
CP-2V-m
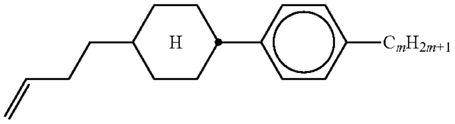
CP-V2-m
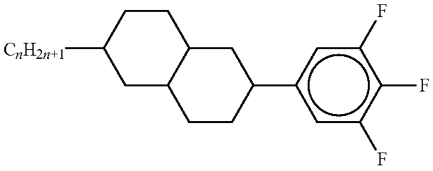
Dec-U-n-F TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
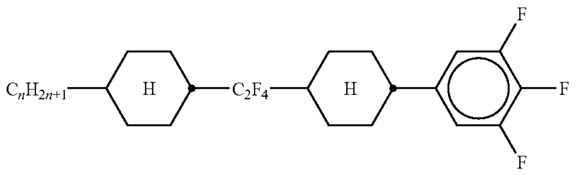
CWCU-n-F
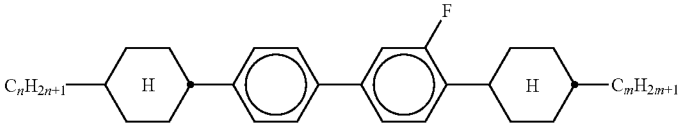
CPGP-n-m
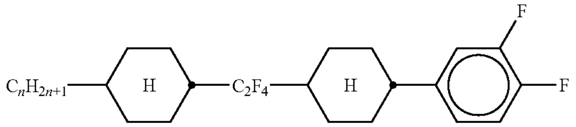
CWCG-n-F
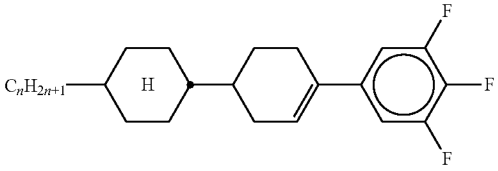
CLU-n-F
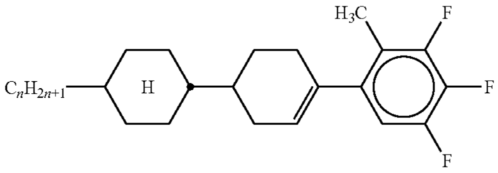
CLU-n-F(1)
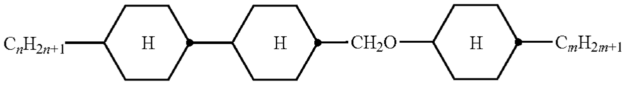
CCOC-n-m
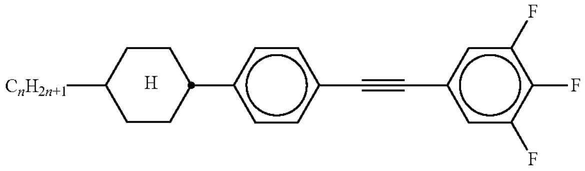
CPTU-n-F
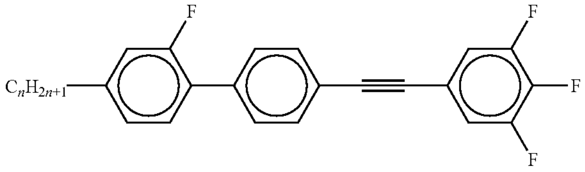

TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
| --- |
GPTU-n-F
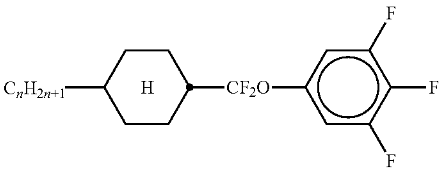
PQU-n-F
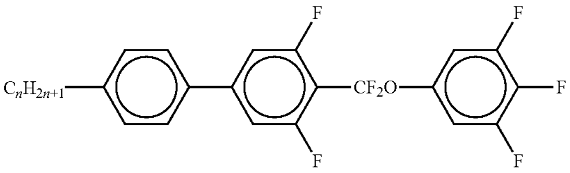
PUQU-n-F
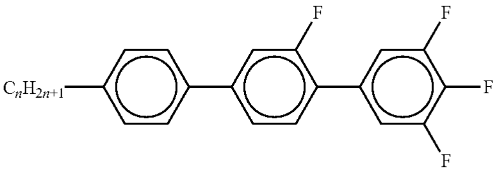
PGU-n-F
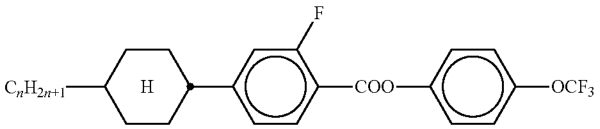
CGZP-n-OT
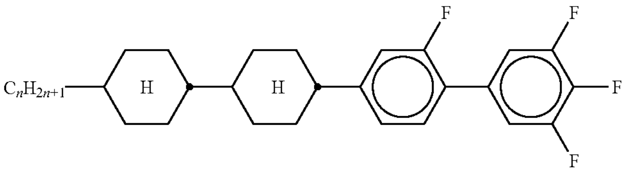
CCGU-n-F
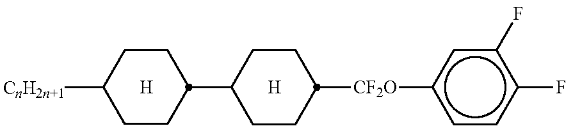
CCQG-n-F
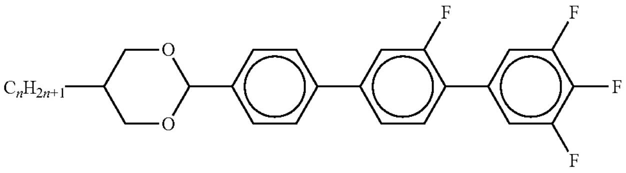
DPGU-n-F TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
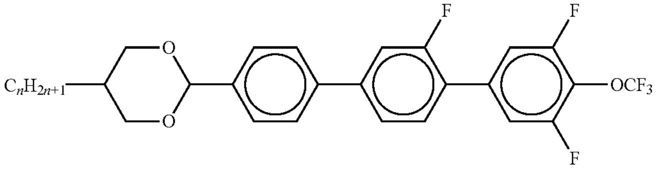
DPGU-n-OT
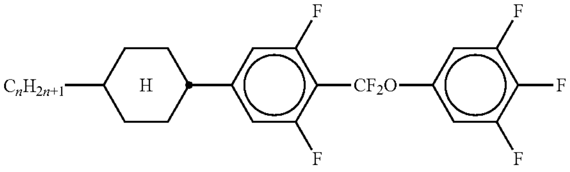
CUQU-n-F
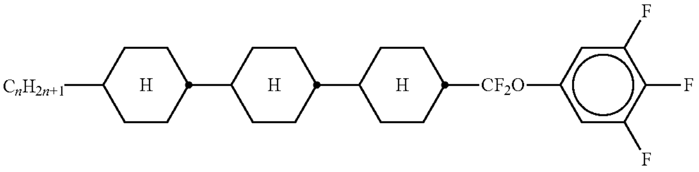
CCCQU-n-F
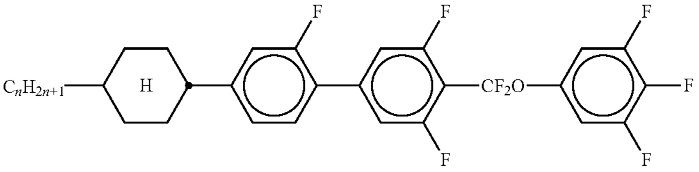
CGUQU-n-F
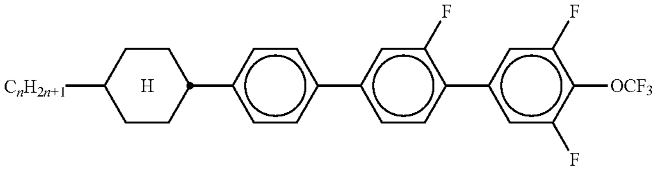
CPGU-n-OT
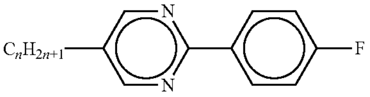
PYP-nF
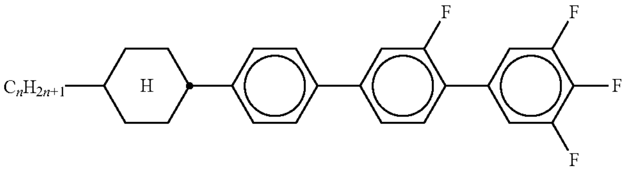
CPGU-n-F TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
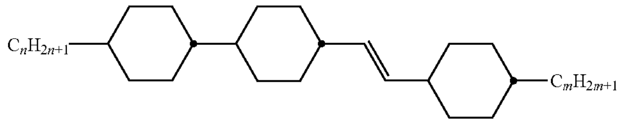
CCVC-n-m
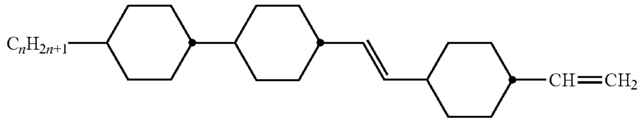
CCVC-n-V
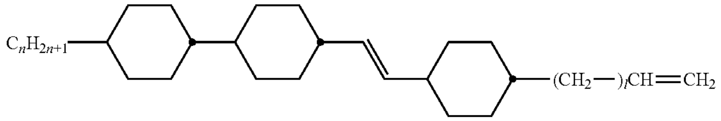
CCVC-n-IV
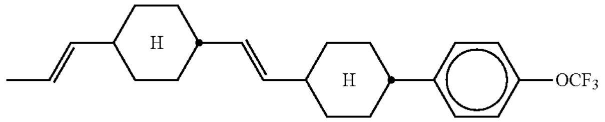
CVCP-1V-OT
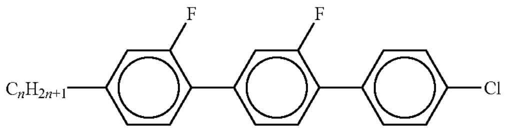
GGP-n-Cl
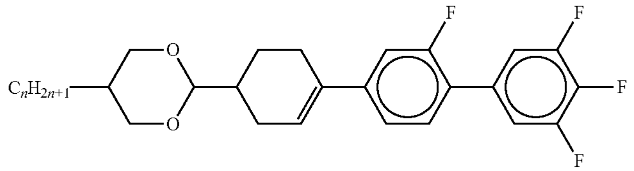
DLGU-n-F
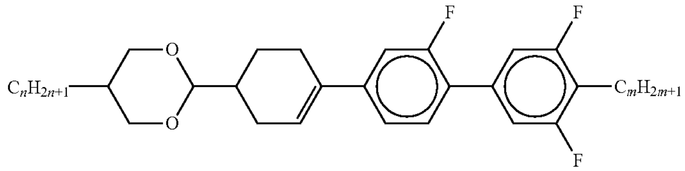
DLGU-n-m
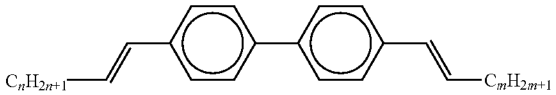
PP-nV-Vm
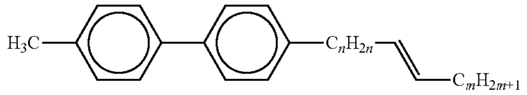

TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
|---|
| PP-1-nVm |
| 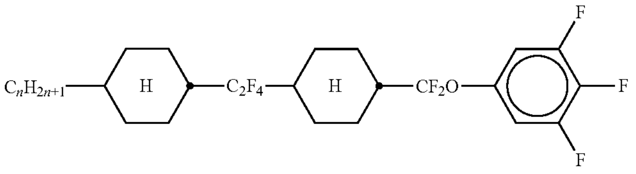 |
| CWCQU-n-F |
| 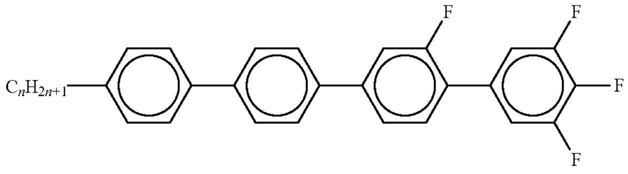 |
| PPGU-n-F |
| 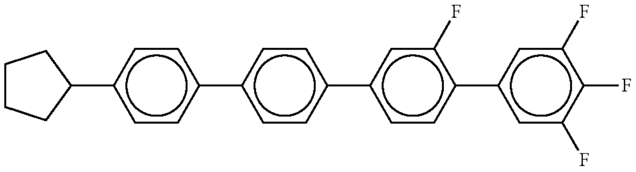 |
| PPGU-(c5)-F |
| 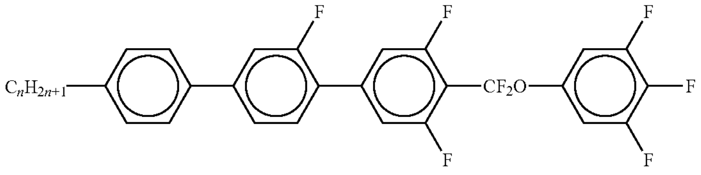 |
| PGUQU-n-F |
| 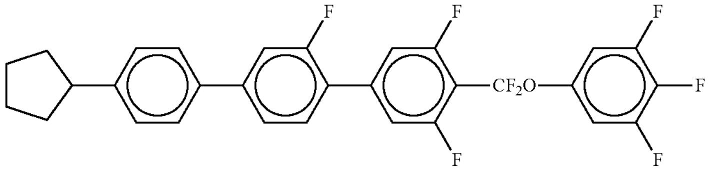 |
| PGUQU-(c5)-F |
| 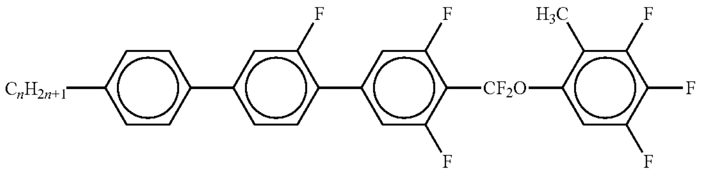 |
| PGUQU(1)-n-F |
| 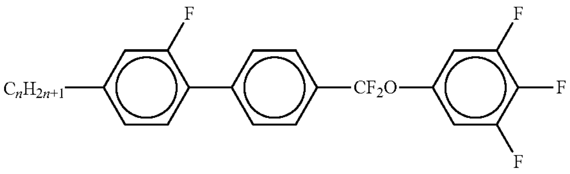 |

TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
|---|
| GPQU-n-F |
| 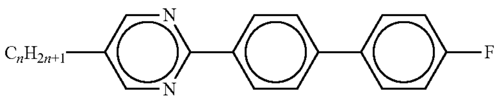 |
| MPP-n-F |
| 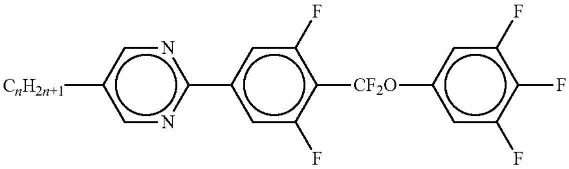 |
| MUQU-n-F |
| 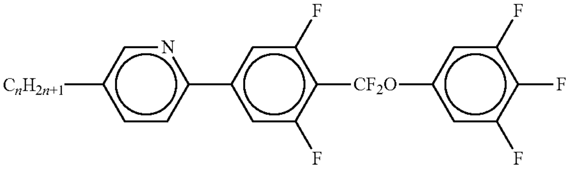 |
| NUQU-n-F |
| 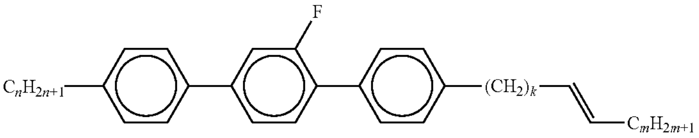 |
| PGP-n-kVm |
| 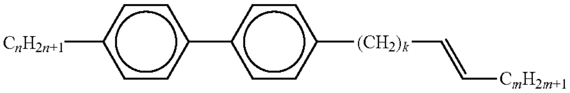 |
| PP-n-kVm |
| 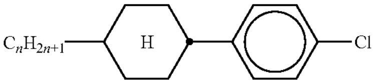 |
| PCH-nCl |
| 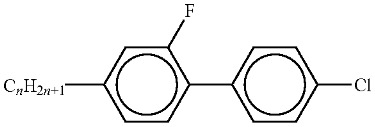 |
| GP-n-Cl |
| 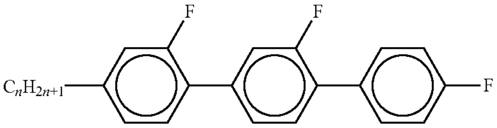 |
| GGP-n-F |

TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
|---|
| 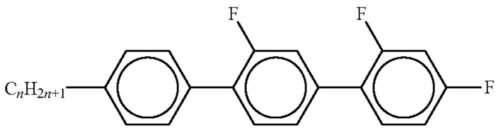 PGIGI-n-F |
| 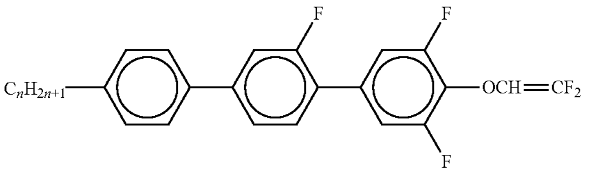 PGU-n-OXF |
| 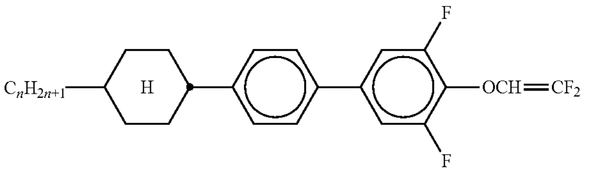 CPU-n-OXF |
| 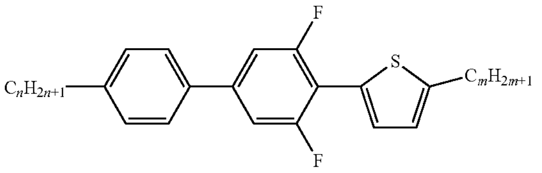 PUS-n-m |
| 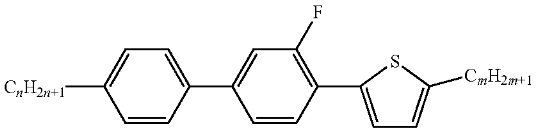 PGS-n-m |
| 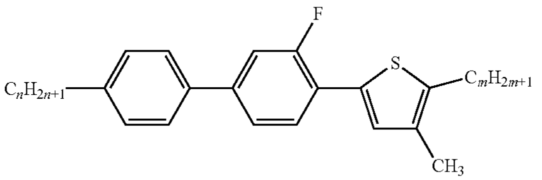 PGS(1)-n-m |
| 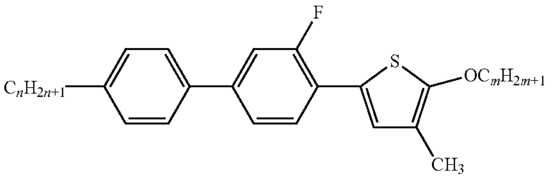 PGS(1)-n-Om |

TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
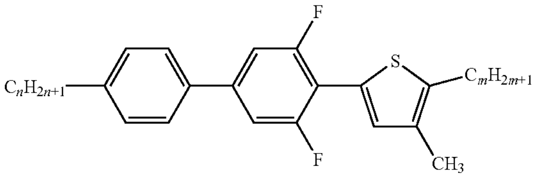
PUS(1)-n-m
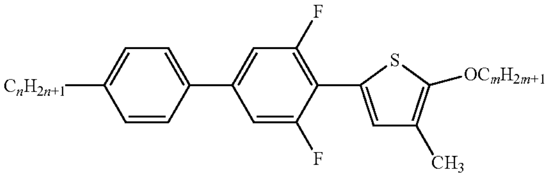
PUS(1)-n-Om
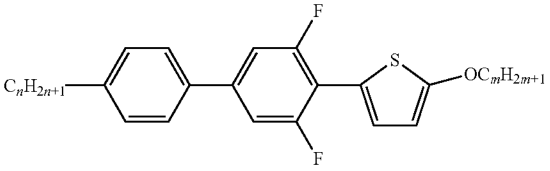
PUS-n-Om
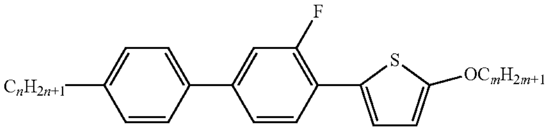
PGS-n-Om
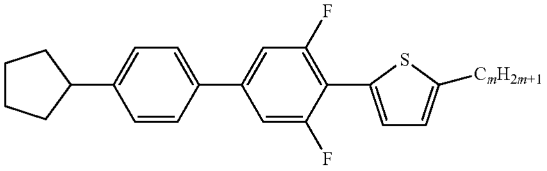
PUS-(c5)-m
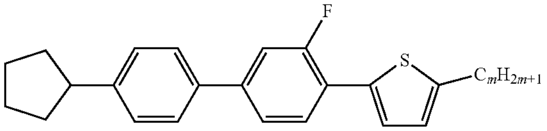
PGS-(c5)-m
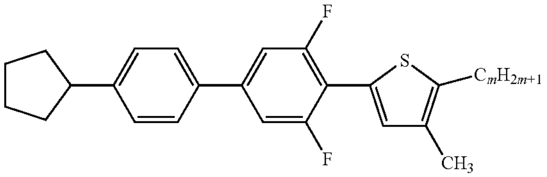
PUS(1)-(c5)-m TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
| --- |
| 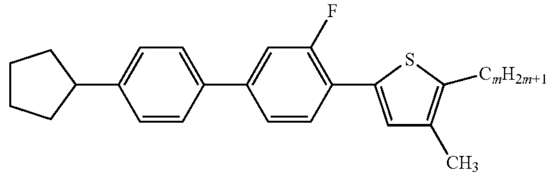 PGS(1)-(c5)-m |
| 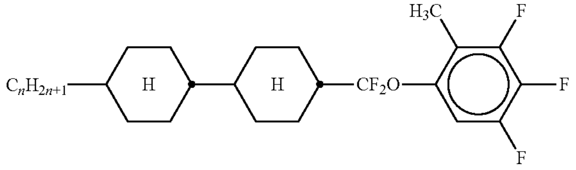 CCQU-n-F(1) |
| 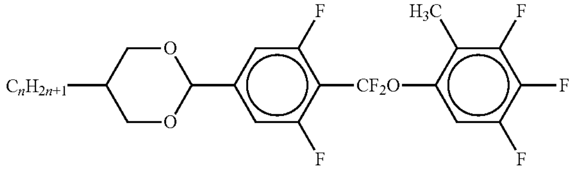 DUQU-n-F(1) |
| 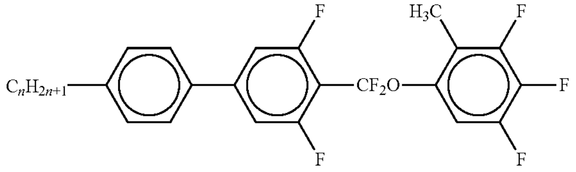 PUQU-n-F(1) |
| 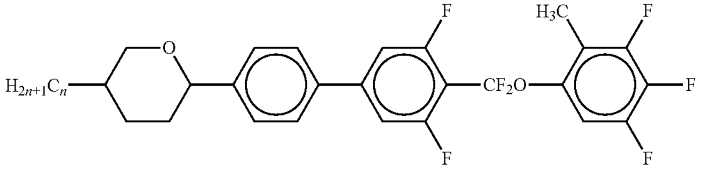 APUQU-n-F(1) |
| 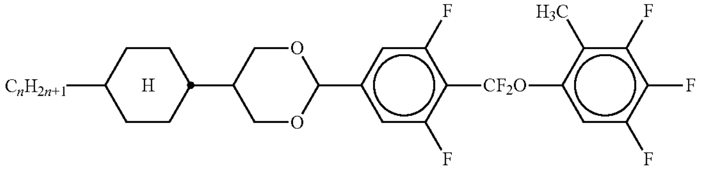 CDUQU-n-F(1) |
| 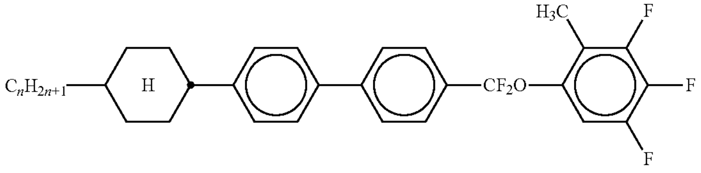 CPPQU-n-F(1) |

TABLE E-continued

In the following formulae, n and m each, independently of one another, denote 0, 1, 2, 3, 4, 5, 6, 7, 8, 9, 10, 11 or 12, in particular 2, 3, 5, furthermore 0, 4, 6.

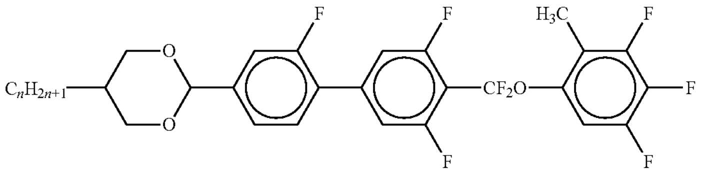

DGUQU-n-F(1)

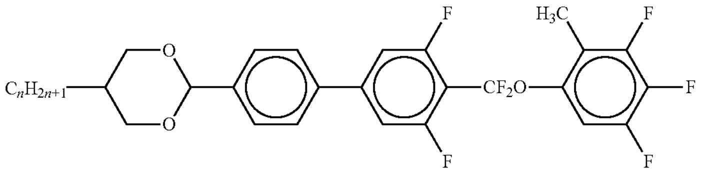

DPUQU-n-F(1)

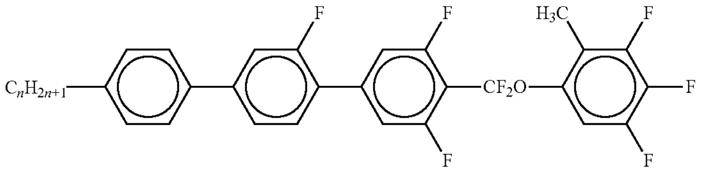

PGUQU-n-F(1)

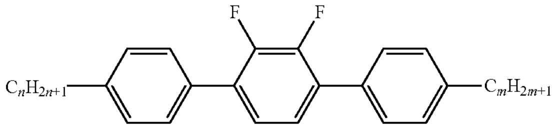

PYP-n-m

Particular preference is given to LC media which, besides the compounds of the Formulae I, an antioxidant and a light stabilizer comprise at least one, two, three, four or more compounds from Table E.

TABLE F

Table F indicates possible dopants which are generally added to the LC media according to the invention. The LC media preferably comprise 0-10% by weight, in particular 0.01-5% by weight and particularly preferably 0.01-3% by weight of dopants.

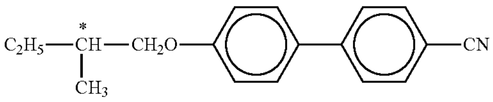

C 15

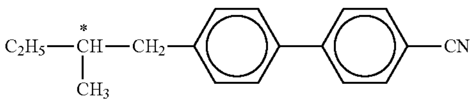

CB 15

TABLE F-continued
| Table F indicates possible dopants which are generally added to the LC media according to the invention. The LC media preferably comprise 0-10% by weight, in particular 0.01-5% by weight and particularly preferably 0.01-3% by weight of dopants. |
| --- |
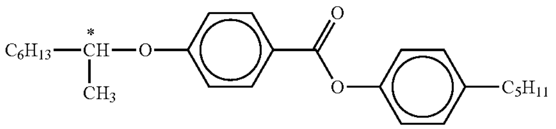
CM 21
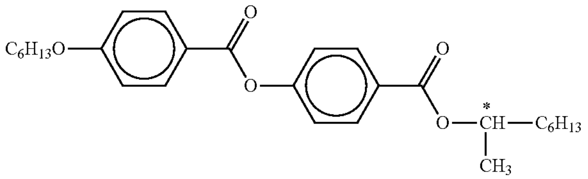
R/S-811
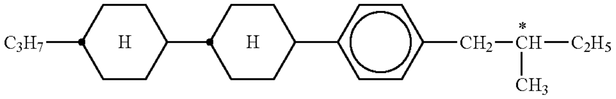
CM 44
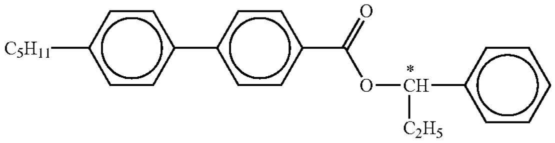
CM 45
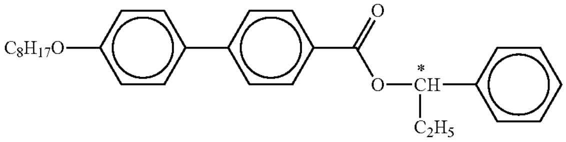
CM 47
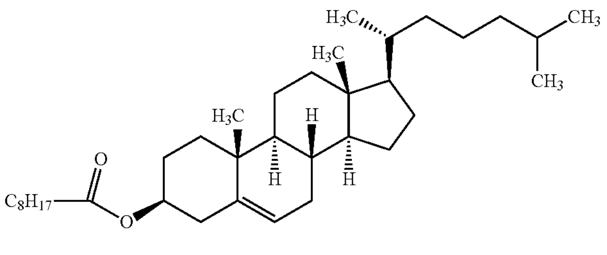
CN
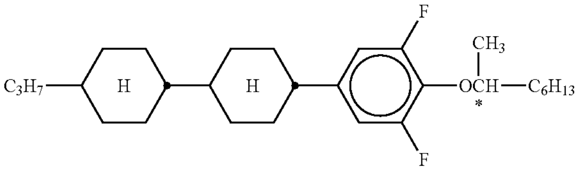
R/S-2011

TABLE F-continued

Table F indicates possible dopants which are generally added to the LC media according to the invention. The LC media preferably comprise 0-10% by weight, in particular 0.01-5% by weight and particularly preferably 0.01-3% by weight of dopants.

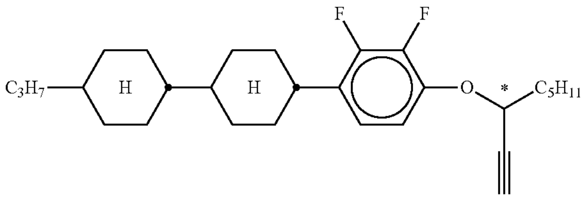

R/S-3011

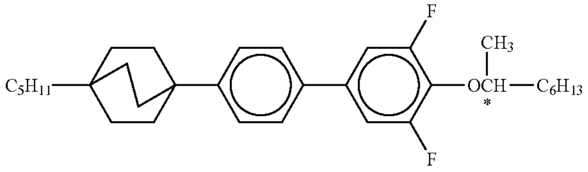

R/S-4011

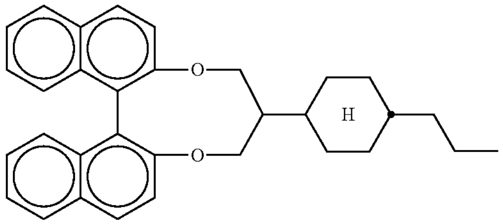

R/S-5011

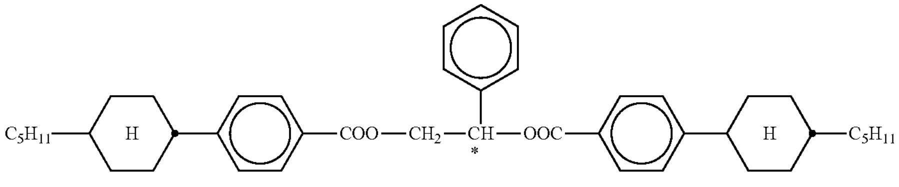

R/S-1011

TABLE G

Antioxidants and light stabilizers, which can additionally be added, for example, to the LC media according to the invention in amounts of 0 to 10% by weight, are mentioned below.

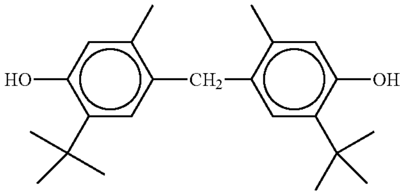

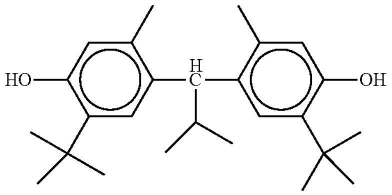

TABLE G-continued
| Antioxidants and light stabilizers, which can additionally be added, for example, to the LC media according to the invention in amounts of 0 to 10% by weight, are mentioned below. |
| --- |
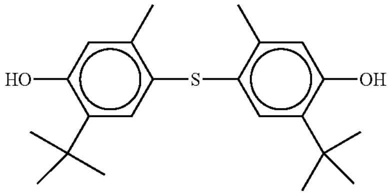
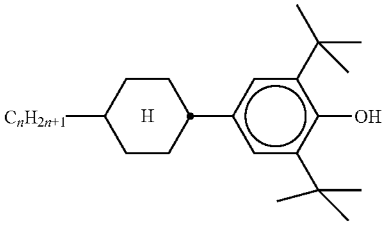
$_n$ = 1, 2, 3, 4, 5, 6 or 7
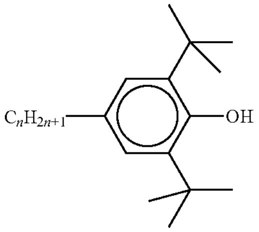
$_n$ = 1, 2, 3, 4, 5, 6 or 7
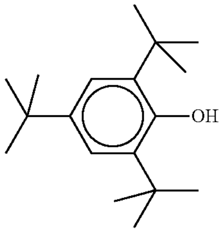
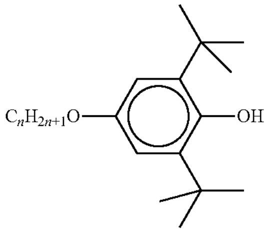
$_n$ = 1, 2, 3, 4, 5, 6 or 7
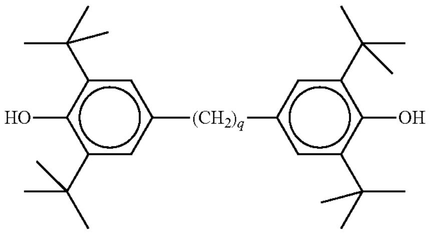

TABLE G-continued
Antioxidants and light stabilizers, which can additionally be added, for example, to the LC media according to the invention in amounts of 0 to 10% by weight, are mentioned below.
$q$ = 1, 2, 3, 4, 5, 6 or 7
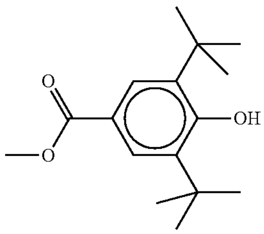
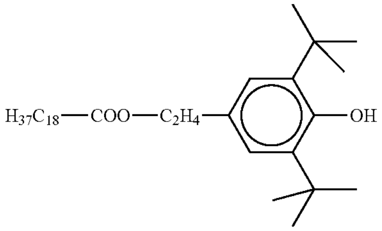
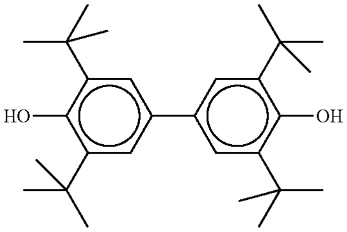
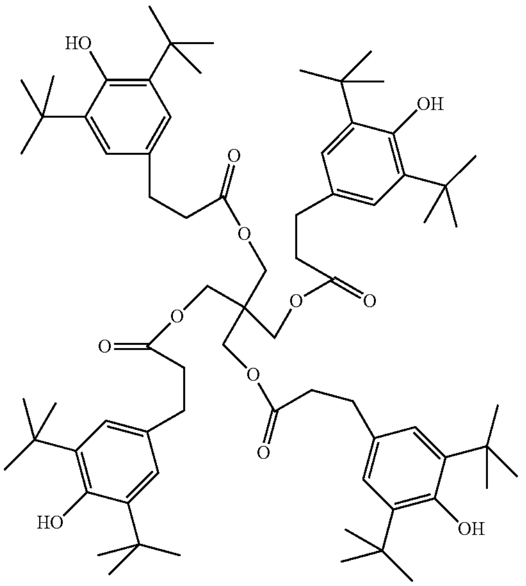 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
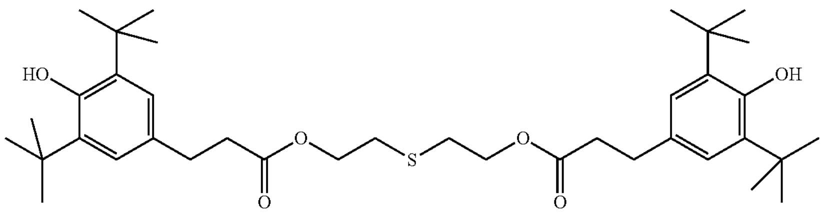 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE G-continued
| Antioxidants and light stabilizers, which can additionally be added, for example, to the LC media according to the invention in amounts of 0 to 10% by weight, are mentioned below. |
| --- |
| 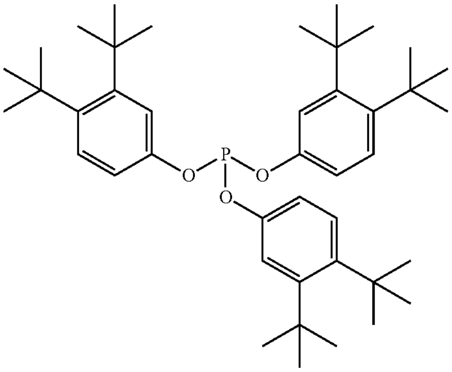 [SMILES: CC(C)(C)c1ccc(OP(Oc2ccc(C(C)(C)C)c(C(C)(C)C)c2)Oc2ccc(C(C)(C)C)c(C(C)(C)C)c2)cc1C(C)(C)C] |
| 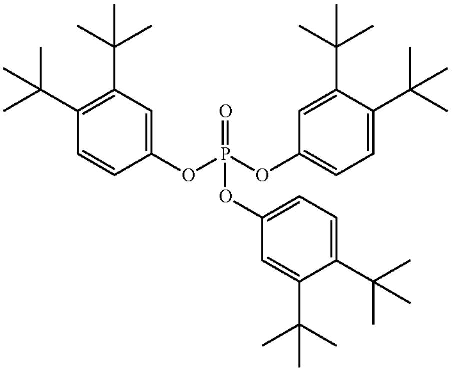 [SMILES: CC(C)(C)c1ccc(OP(=O)(Oc2ccc(C(C)(C)C)c(C(C)(C)C)c2)Oc2ccc(C(C)(C)C)c(C(C)(C)C)c2)cc1C(C)(C)C] |
| 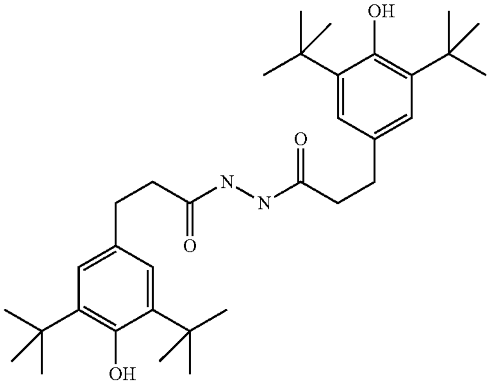 [SMILES: CC(C)(C)c1cc(CCC(=O)NNC(=O)CCc2cc(C(C)(C)C)c(O)c(C(C)(C)C)c2)cc(C(C)(C)C)c1O] |
| 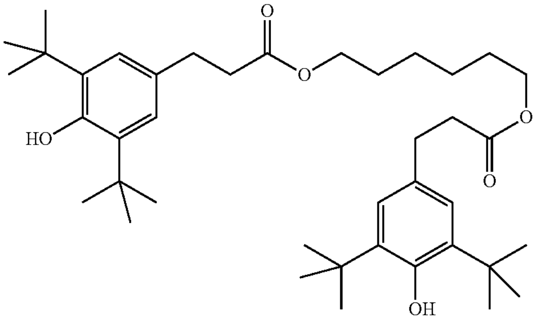 [SMILES: CC(C)(C)c1cc(CCC(=O)OCCCCCCOC(=O)CCc2cc(C(C)(C)C)c(O)c(C(C)(C)C)c2)cc(C(C)(C)C)c1O] |

TABLE G-continued
| |
|---|
| Antioxidants and light stabilizers, which can additionally be added, for example, to the LC media according to the invention in amounts of 0 to 10% by weight, are mentioned below. |
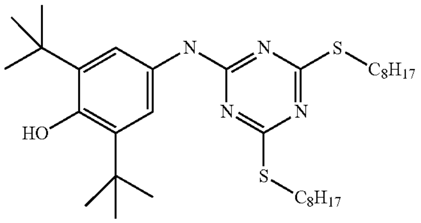
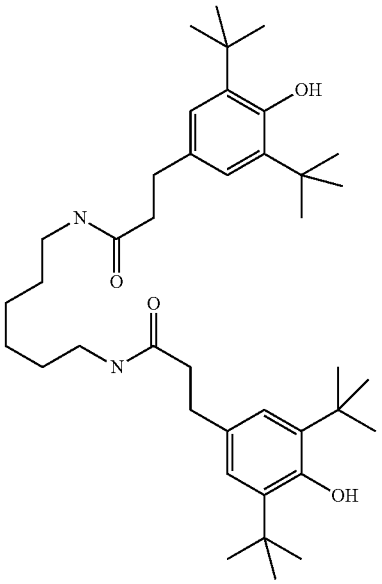 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
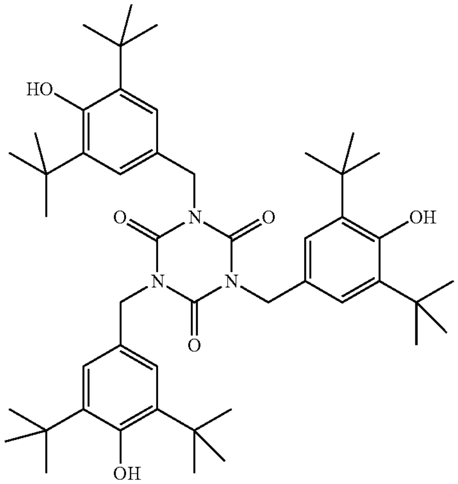 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE G-continued
| Antioxidants and light stabilizers, which can additionally be added, for example, to the LC media according to the invention in amounts of 0 to 10% by weight, are mentioned below. |
| --- |
| 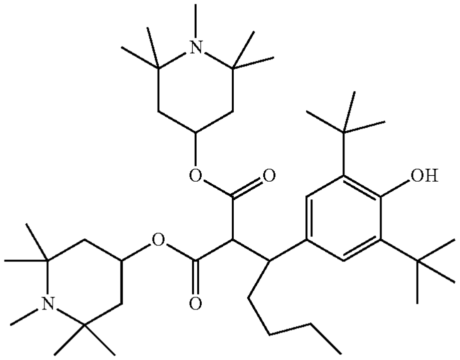 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1] |
| 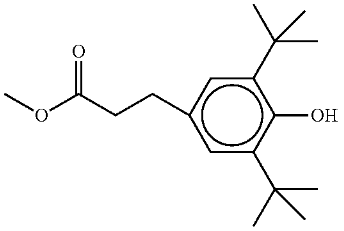 |
| 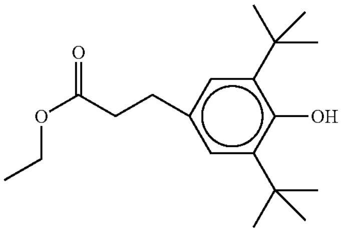 |
| 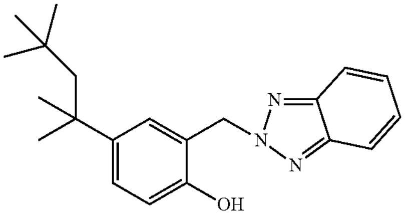 [SMILES: CC(C)(C)CC(C)(C)c1ccc(O)c(Cn2nc3ccccc3n2)c1] |
| 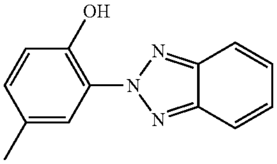 [SMILES: Cc1ccc(O)c(-n2nc3ccccc3n2)c1] |
| 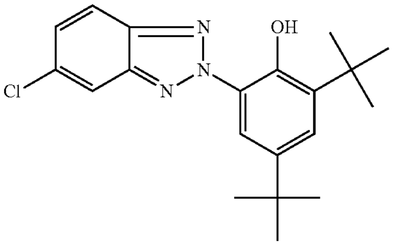 [SMILES: CC(C)(C)c1cc(-n2nc3ccc(Cl)cc3n2)c(O)c(C(C)(C)C)c1] |

TABLE G-continued
| Antioxidants and light stabilizers, which can additionally be added, for example, to the LC media according to the invention in amounts of 0 to 10% by weight, are mentioned below. |
| --- |
| 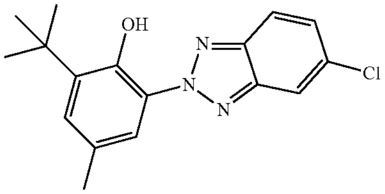 [SMILES: Cc1cc(-n2nc3ccc(Cl)cc3n2)c(O)c(C(C)(C)C)c1] |
| 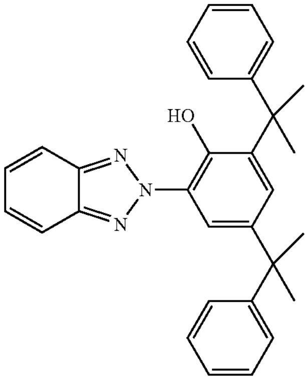 [SMILES: CC(C)(c1ccccc1)c1cc(-n2nc3ccccc3n2)c(O)c(C(C)(C)c2ccccc2)c1] |
| 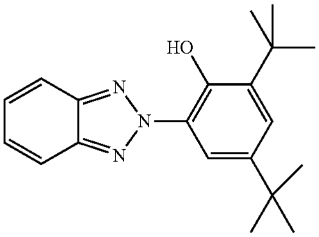 [SMILES: CC(C)(C)c1cc(-n2nc3ccccc3n2)c(O)c(C(C)(C)C)c1] |
| 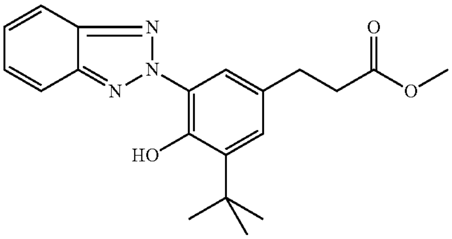 [SMILES: COC(=O)CCc1cc(-n2nc3ccccc3n2)c(O)c(C(C)(C)C)c1] |
| 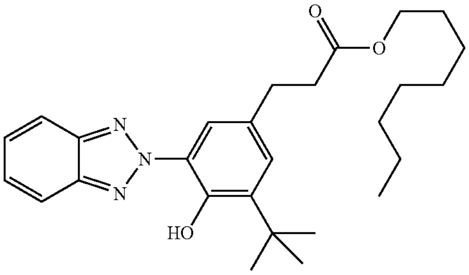 [SMILES: CCCCCCCCOC(=O)CCc1cc(-n2nc3ccccc3n2)c(O)c(C(C)(C)C)c1] |

TABLE G-continued
Antioxidants and light stabilizers, which can additionally be added, for example, to the LC media according to the invention in amounts of 0 to 10% by weight, are mentioned below.
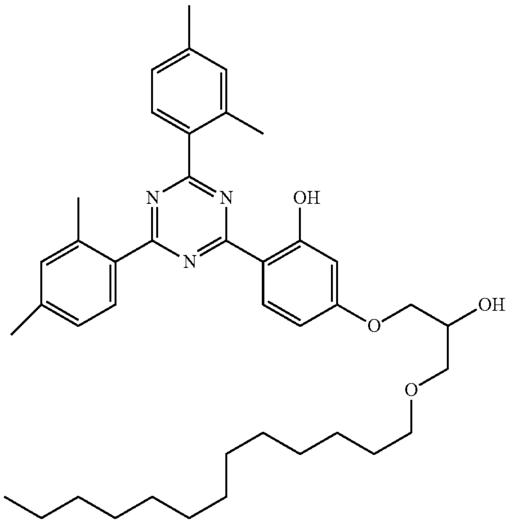 [SMILES: CCCCCCCCCCCCCOCC(O)COc1ccc(-c2nc(-c3ccc(C)cc3C)nc(-c3ccc(C)cc3C)n2)c(O)c1]
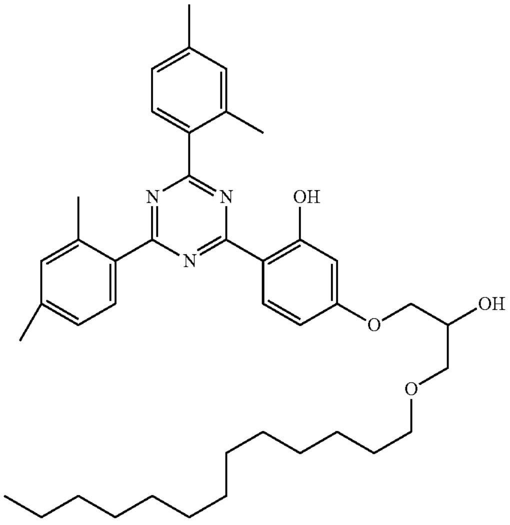 [SMILES: CCCCCCCCCCCCCOCC(O)COc1ccc(-c2nc(-c3ccc(C)cc3C)nc(-c3ccc(C)cc3C)n2)c(O)c1]
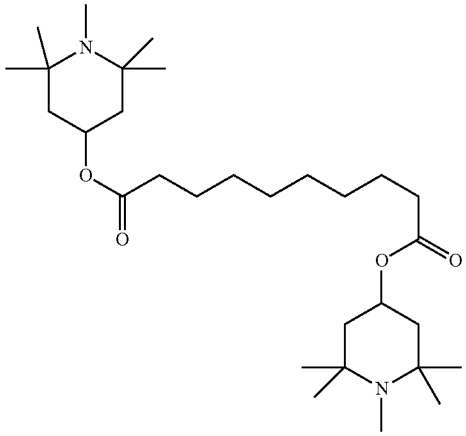

TABLE G-continued
| Antioxidants and light stabilizers, which can additionally be added, for example, to the LC media according to the invention in amounts of 0 to 10% by weight, are mentioned below. |
|---|
| 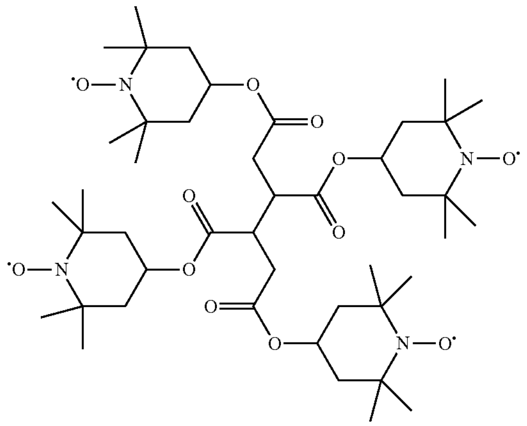 |
| 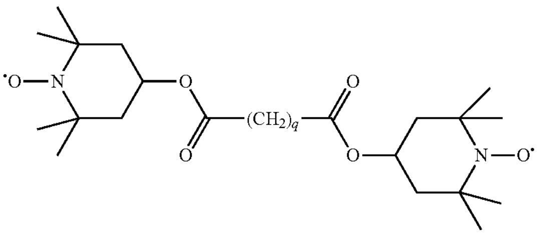 |
| q = 1, 2, 3, 4, 5, 6, 7, 8, 9 or 10 |
TABLE H
| Table H shows illustrative reactive mesogenic compounds (RMs) which can be used in the LC media in accordance with the present invention. | |
|---|---|
| 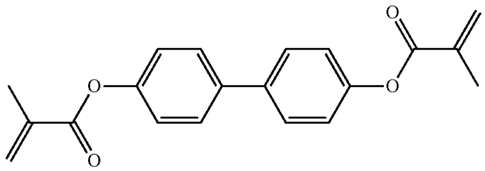 [SMILES: C=C(C)C(=O)Oc1ccc(-c2ccc(OC(=O)C(=C)C)cc2)cc1] | RM-1 |
| 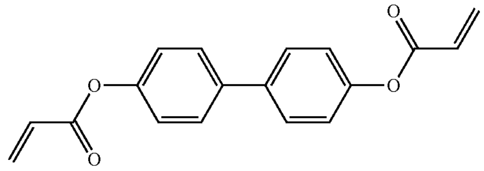 [SMILES: C=CC(=O)Oc1ccc(-c2ccc(OC(=O)C=C)cc2)cc1] | RM-2 |
| 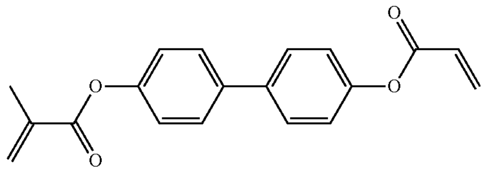 [SMILES: C=CC(=O)Oc1ccc(-c2ccc(OC(=O)C(=C)C)cc2)cc1] | RM-3 |

TABLE H-continued
| Table H shows illustrative reactive mesogenic compounds (RMs) which can be used in the LC media in accordance with the present invention. |
| --- |
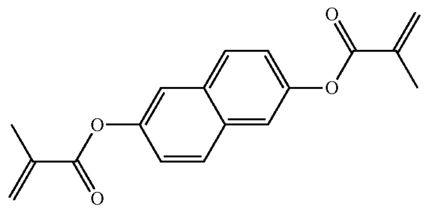 [SMILES: C=C(C)C(=O)Oc1ccc2cc(OC(=O)C(=C)C)ccc2c1]
RM-4
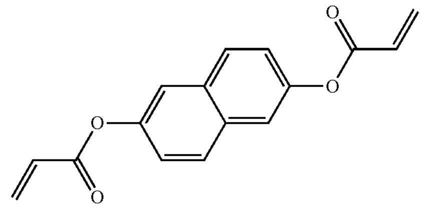 [SMILES: C=CC(=O)Oc1ccc2cc(OC(=O)C=C)ccc2c1]
RM-5
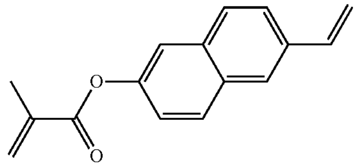 [SMILES: C=Cc1ccc2cc(OC(=O)C(=C)C)ccc2c1]
RM-6
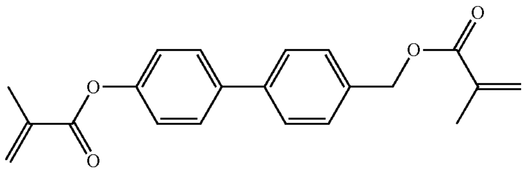 [SMILES: C=C(C)C(=O)OCc1ccc(-c2ccc(OC(=O)C(=C)C)cc2)cc1]
RM-7
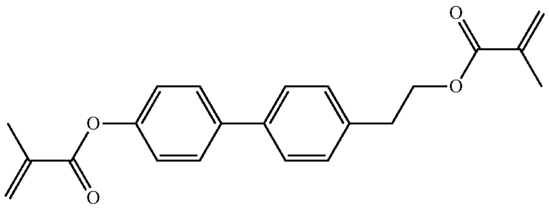 [SMILES: C=C(C)C(=O)OCCc1ccc(-c2ccc(OC(=O)C(=C)C)cc2)cc1]
RM-8
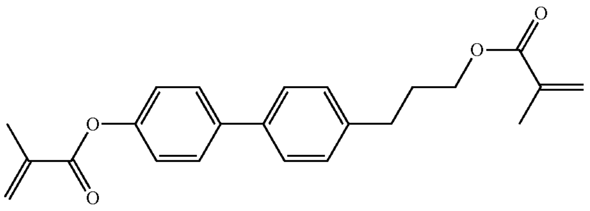 [SMILES: C=C(C)C(=O)OCCCc1ccc(-c2ccc(OC(=O)C(=C)C)cc2)cc1]
RM-9
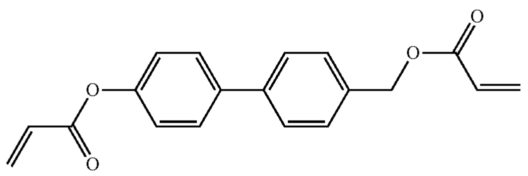 [SMILES: C=CC(=O)OCc1ccc(-c2ccc(OC(=O)C=C)cc2)cc1]
RM-10

TABLE H-continued
Table H shows illustrative reactive mesogenic compounds (RMs) which can be used in the LC media in accordance with the present invention.
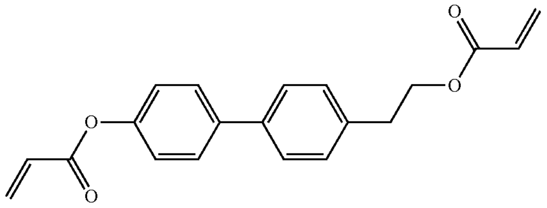 [SMILES: C=CC(=O)OCCc1ccc(-c2ccc(OC(=O)C=C)cc2)cc1]
RM-11
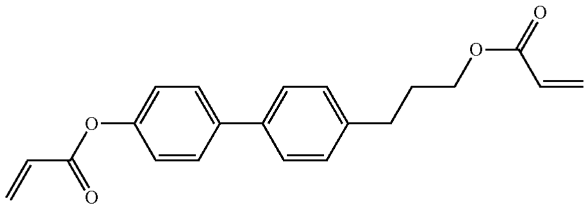 [SMILES: C=CC(=O)OCCCc1ccc(-c2ccc(OC(=O)C=C)cc2)cc1]
RM-12
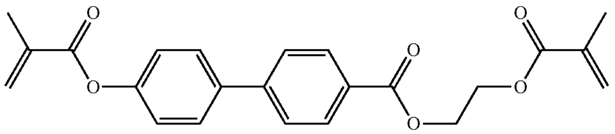 [SMILES: C=C(C)C(=O)OCCOC(=O)c1ccc(-c2ccc(OC(=O)C(=C)C)cc2)cc1]
RM-13
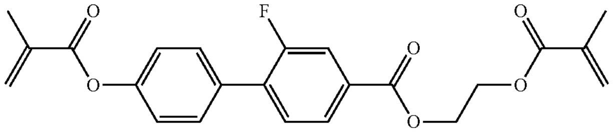 [SMILES: C=C(C)C(=O)OCCOC(=O)c1ccc(-c2ccc(OC(=O)C(=C)C)cc2)c(F)c1]
RM-14
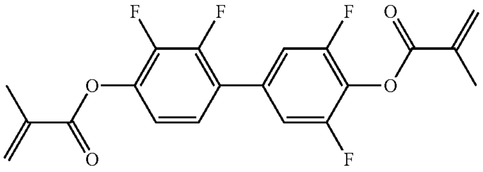 [SMILES: C=C(C)C(=O)Oc1ccc(-c2cc(F)c(OC(=O)C(=C)C)c(F)c2)c(F)c1F]
RM-15
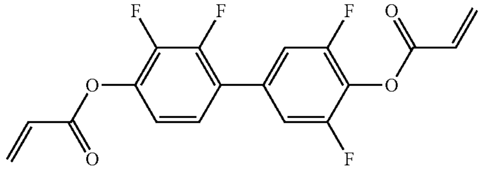 [SMILES: C=CC(=O)Oc1ccc(-c2cc(F)c(OC(=O)C=C)c(F)c2)c(F)c1F]
RM-16
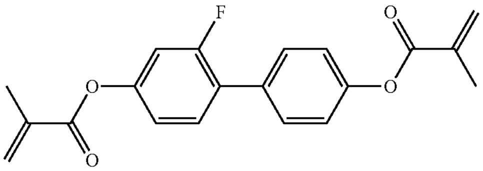 [SMILES: C=C(C)C(=O)Oc1ccc(-c2ccc(OC(=O)C(=C)C)cc2F)cc1]
RM-17
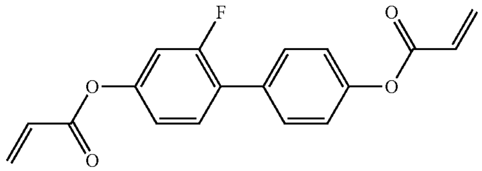 [SMILES: C=CC(=O)Oc1ccc(-c2ccc(OC(=O)C=C)cc2F)cc1]
RM-18

TABLE H-continued
Table H shows illustrative reactive mesogenic compounds (RMs) which can be used in the LC media in accordance with the present invention.
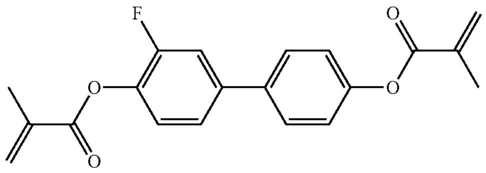
RM-19
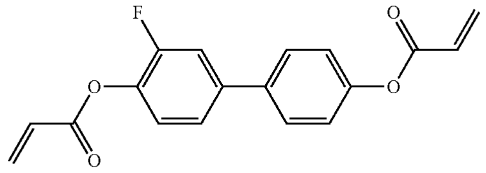
RM-20
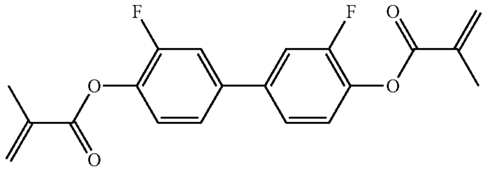
RM-21
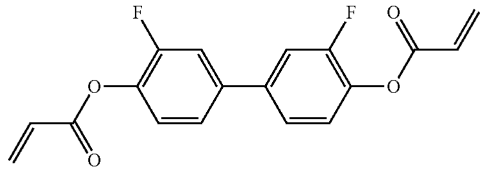
RM-22
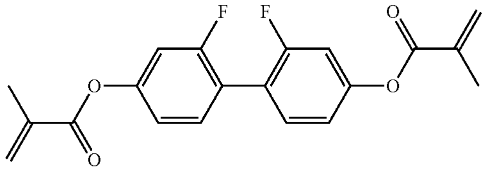 [SMILES: C=C(C)C(=O)Oc1ccc(-c2ccc(OC(=O)C(=C)C)cc2F)c(F)c1]
RM-23
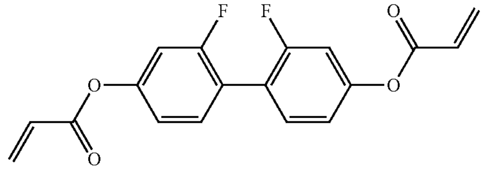
RM-24
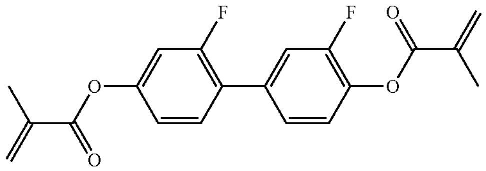 [SMILES: C=C(C)C(=O)Oc1ccc(-c2ccc(OC(=O)C(=C)C)c(F)c2)c(F)c1]
RM-25
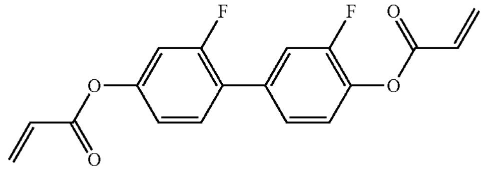
RM-26

TABLE H-continued
| Table H shows illustrative reactive mesogenic compounds (RMs) which can be used in the LC media in accordance with the present invention. | |
|---|---|
| 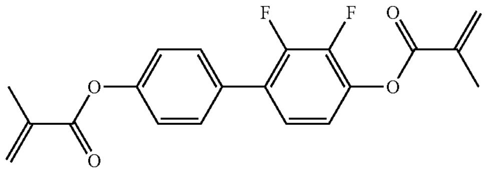 [SMILES: C=C(C)C(=O)Oc1ccc(-c2ccc(OC(=O)C(=C)C)c(F)c2F)cc1] | RM-27 |
| 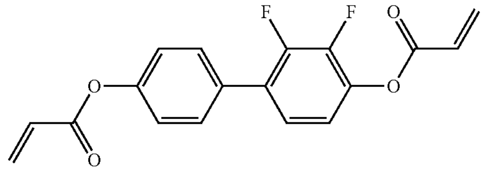 | RM-28 |
| 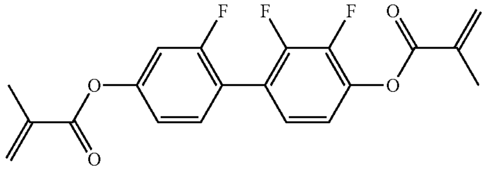 [SMILES: C=C(C)C(=O)Oc1ccc(-c2ccc(OC(=O)C(=C)C)c(F)c2F)c(F)c1] | RM-29 |
| 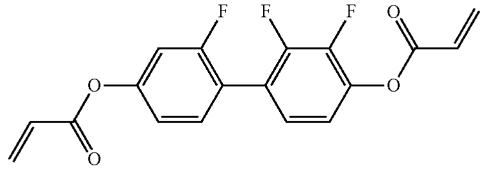 [SMILES: C=CC(=O)Oc1ccc(-c2ccc(OC(=O)C=C)c(F)c2F)c(F)c1] | RM-30 |
| 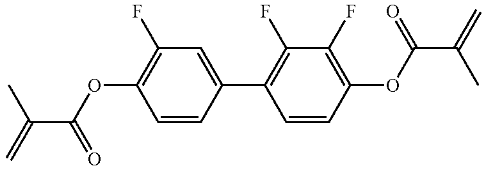 [SMILES: C=C(C)C(=O)Oc1ccc(-c2ccc(OC(=O)C(=C)C)c(F)c2F)cc1F] | RM-31 |
| 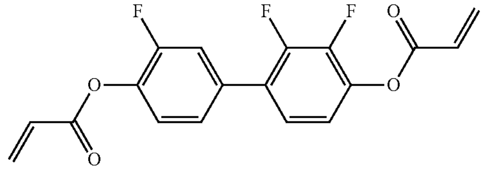 [SMILES: C=CC(=O)Oc1ccc(-c2ccc(OC(=O)C=C)c(F)c2F)cc1F] | RM-32 |
| 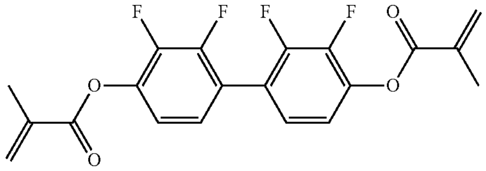 [SMILES: C=C(C)C(=O)Oc1ccc(-c2ccc(OC(=O)C(=C)C)c(F)c2F)c(F)c1F] | RM-33 |
| 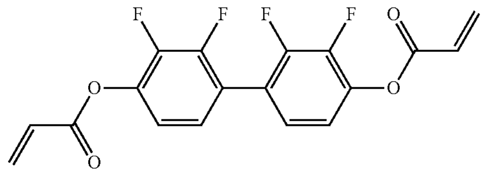 [SMILES: C=CC(=O)Oc1ccc(-c2ccc(OC(=O)C=C)c(F)c2F)c(F)c1F] | RM-34 |

TABLE H-continued
Table H shows illustrative reactive mesogenic compounds (RMs) which can be used in the LC media in accordance with the present invention.
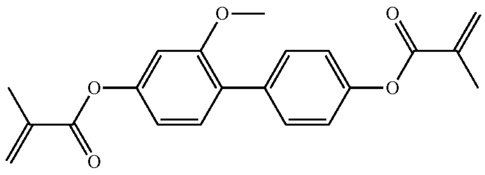
RM-35
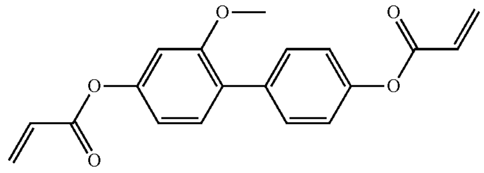 [SMILES: C=CC(=O)Oc1ccc(-c2ccc(OC(=O)C=C)cc2OC)cc1]
RM-36
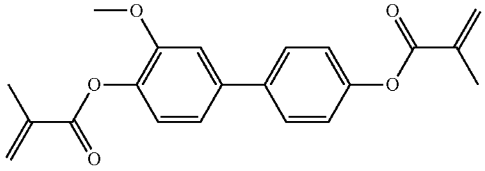
RM-37
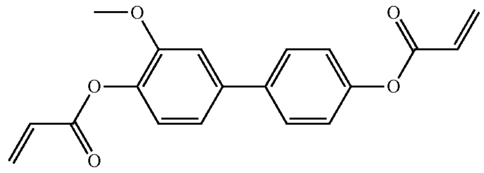 [SMILES: C=CC(=O)Oc1ccc(-c2ccc(OC(=O)C=C)c(OC)c2)cc1]
RM-38
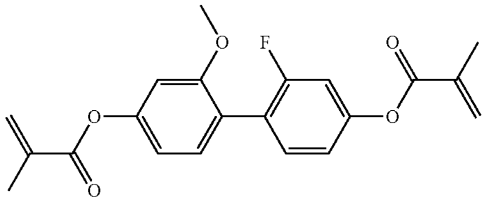 [SMILES: C=C(C)C(=O)Oc1ccc(-c2ccc(OC(=O)C(=C)C)cc2OC)c(F)c1]
RM-39
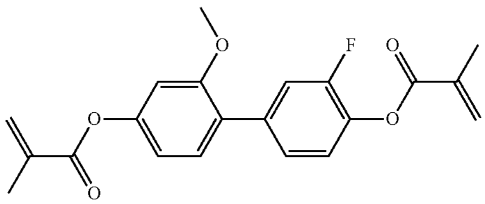 [SMILES: C=C(C)C(=O)Oc1ccc(-c2ccc(OC(=O)C(=C)C)c(F)c2)c(OC)c1]
RM-40
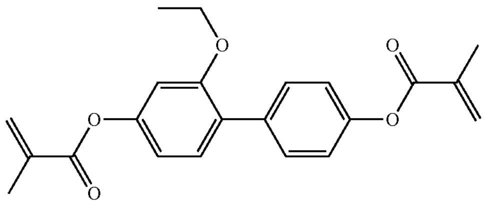 [SMILES: C=C(C)C(=O)Oc1ccc(-c2ccc(OC(=O)C(=C)C)cc2OCC)cc1]
RM-41
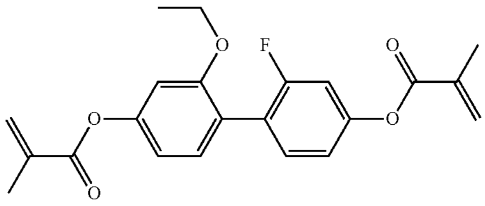
RM-42

TABLE H-continued
| Table H shows illustrative reactive mesogenic compounds (RMs) which can be used in the LC media in accordance with the present invention. |
| --- |
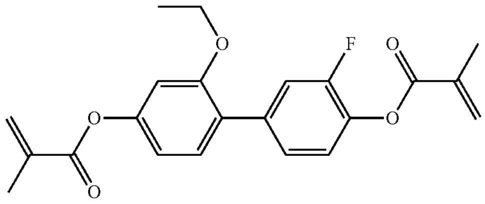 [SMILES: C=C(C)C(=O)Oc1ccc(-c2ccc(OC(=O)C(=C)C)c(F)c2)c(OCC)c1]
RM-43
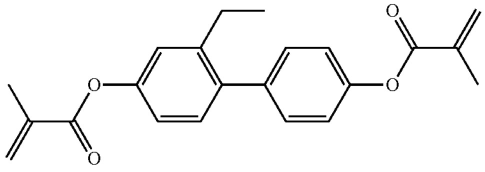 [SMILES: C=C(C)C(=O)Oc1ccc(-c2ccc(OC(=O)C(=C)C)cc2C)cc1]
RM-44
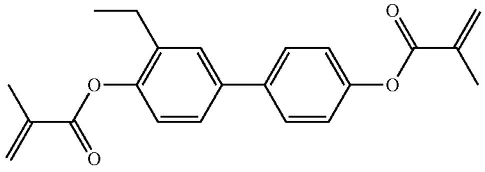
RM-45
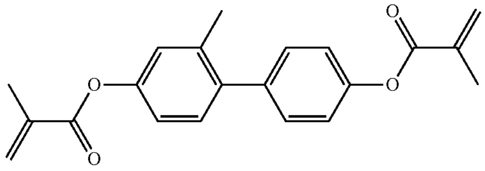
RM-46
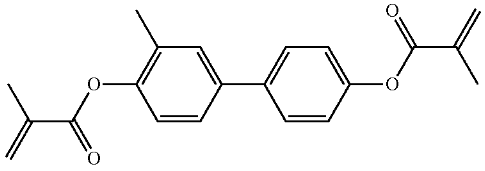 [SMILES: C=C(C)C(=O)Oc1ccc(-c2ccc(OC(=O)C(=C)C)c(C)c2)cc1]
RM-47
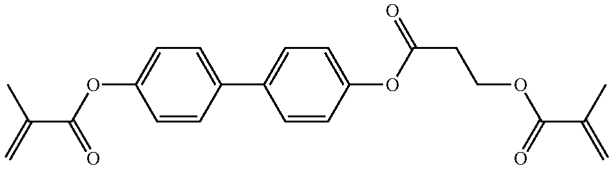 [SMILES: C=C(C)C(=O)OCCC(=O)Oc1ccc(-c2ccc(OC(=O)C(=C)C)cc2)cc1F]
RM-48
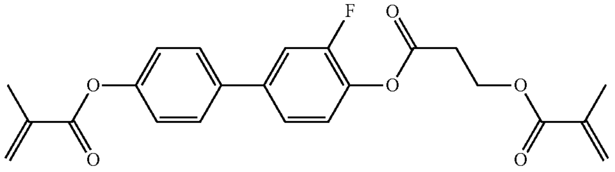
RM-49
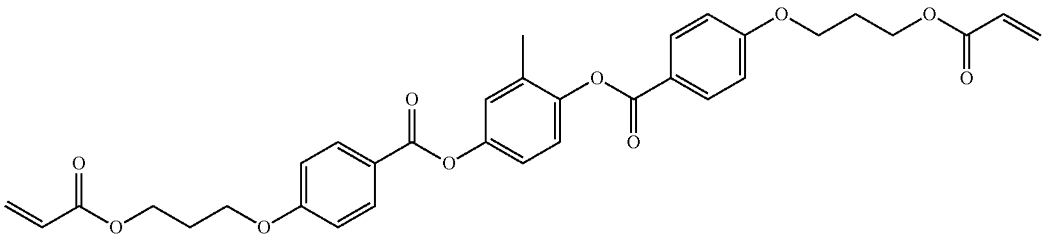 [SMILES: C=CC(=O)OCCCOc1ccc(C(=O)Oc2ccc(OC(=O)c3ccc(OCCCOC(=O)C=C)cc3)c(C)c2)cc1]
RM-50

TABLE H-continued
| Table H shows illustrative reactive mesogenic compounds (RMs) which can be used in the LC media in accordance with the present invention. |
|---|
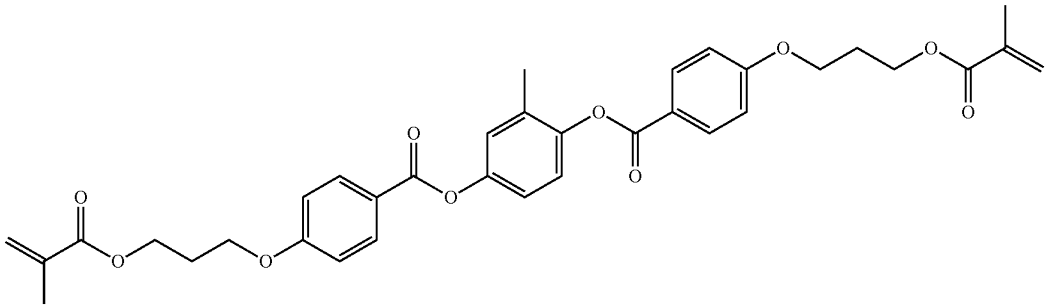 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
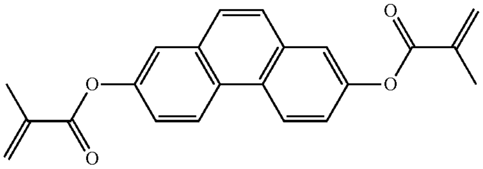 [SMILES: C=C(C)C(=O)Oc1ccc2c(ccc3cc(OC(=O)C(=C)C)ccc32)c1]
RM-52
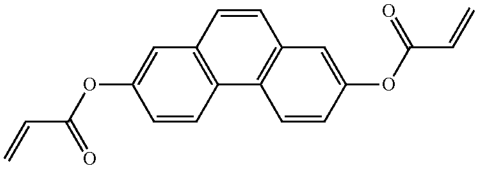 [SMILES: C=CC(=O)Oc1ccc2c(ccc3cc(OC(=O)C=C)ccc32)c1]
RM-53
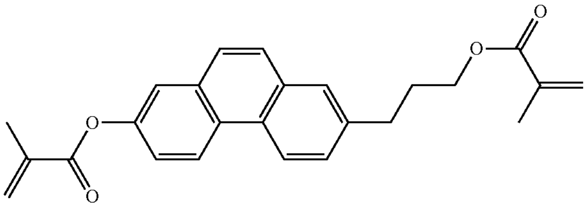 [SMILES: C=C(C)C(=O)OCCCc1ccc2c(ccc3cc(OC(=O)C(=C)C)ccc32)c1]
RM-54
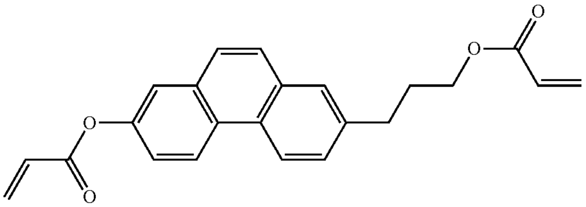 [SMILES: C=CC(=O)OCCCc1ccc2c(ccc3cc(OC(=O)C=C)ccc32)c1]
RM-55
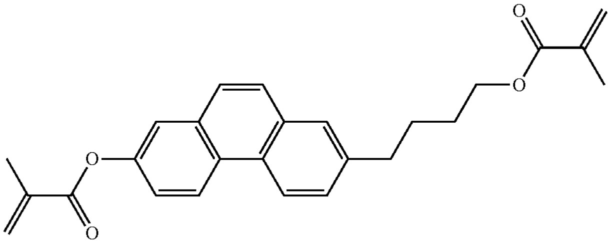 [SMILES: C=C(C)C(=O)OCCCCc1ccc2c(ccc3cc(OC(=O)C(=C)C)ccc32)c1]
RM-56

TABLE H-continued
Table H shows illustrative reactive mesogenic compounds (RMs) which can be used in the LC media in accordance with the present invention.
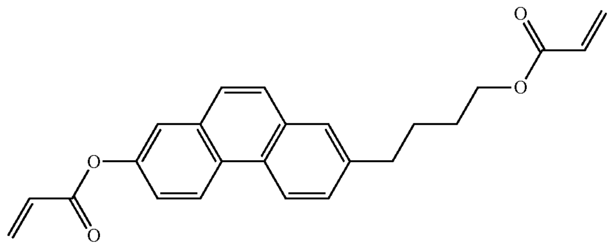 [SMILES: C=CC(=O)OCCCCc1ccc2c(ccc3cc(OC(=O)C=C)ccc32)c1]
RM-57
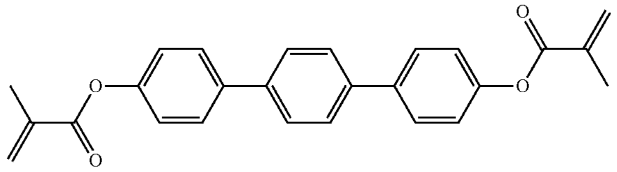 [SMILES: C=C(C)C(=O)Oc1ccc(-c2ccc(-c3ccc(OC(=O)C(=C)C)cc3)cc2)cc1]
RM-58
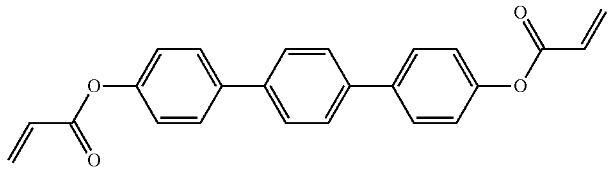 [SMILES: C=CC(=O)Oc1ccc(-c2ccc(-c3ccc(OC(=O)C=C)cc3)cc2)cc1]
RM-59
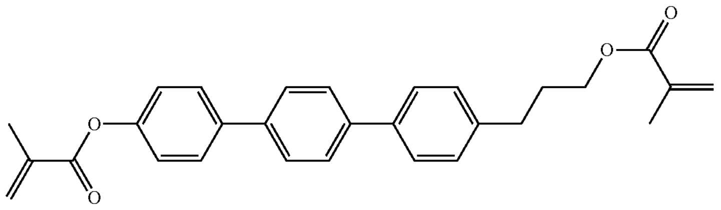 [SMILES: C=C(C)C(=O)OCCCc1ccc(-c2ccc(-c3ccc(OC(=O)C(=C)C)cc3)cc2)cc1]
RM-60
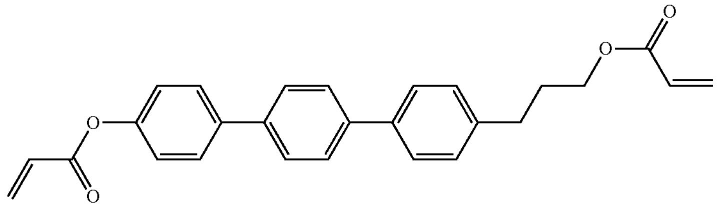 [SMILES: C=CC(=O)OCCCc1ccc(-c2ccc(-c3ccc(OC(=O)C=C)cc3)cc2)cc1]
RM-61
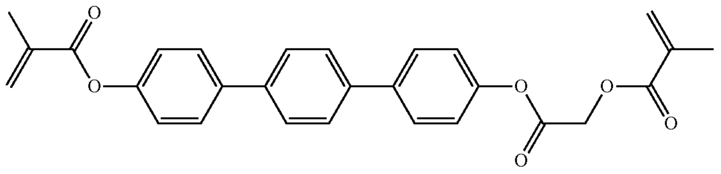 [SMILES: C=C(C)C(=O)OCC(=O)Oc1ccc(-c2ccc(-c3ccc(OC(=O)C(=C)C)cc3)cc2)cc1]
RM-62
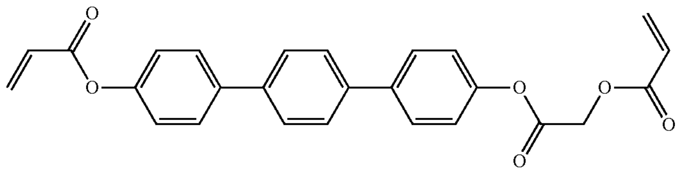 [SMILES: C=CC(=O)OCC(=O)Oc1ccc(-c2ccc(-c3ccc(OC(=O)C=C)cc3)cc2)cc1]
RM-63

TABLE H-continued
| Table H shows illustrative reactive mesogenic compounds (RMs) which can be used in the LC media in accordance with the present invention. |
|---|
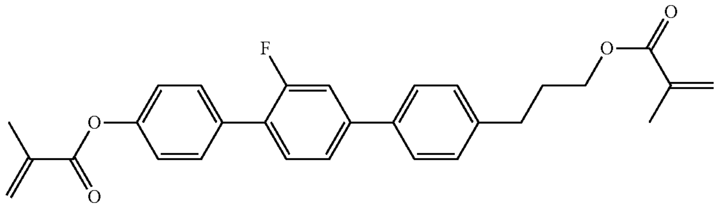
RM-64
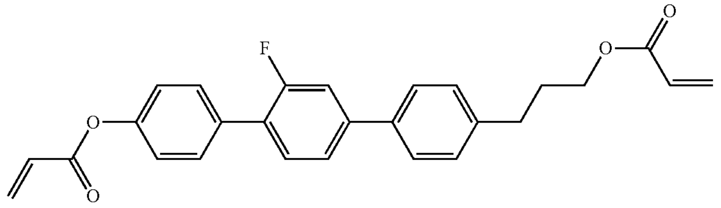
RM-65
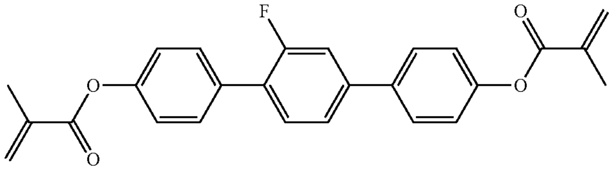 [SMILES: C=C(C)C(=O)Oc1ccc(-c2ccc(-c3ccc(OC(=O)C(=C)C)cc3)c(F)c2)cc1]
RM-66
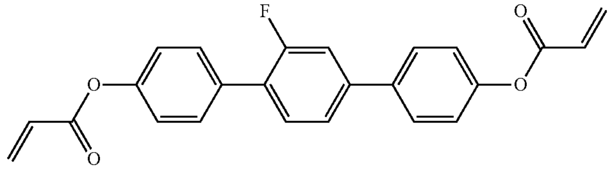 [SMILES: C=CC(=O)Oc1ccc(-c2ccc(-c3ccc(OC(=O)C=C)cc3)c(F)c2)cc1]
RM-67
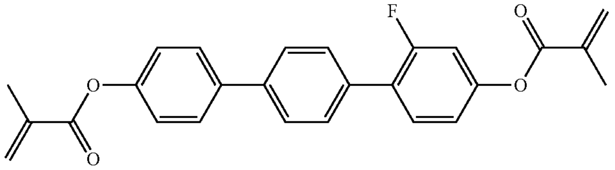
RM-68
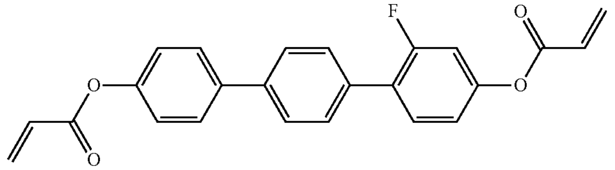 [SMILES: C=CC(=O)Oc1ccc(-c2ccc(-c3ccc(OC(=O)C=C)cc3F)cc2)cc1]
RM-69
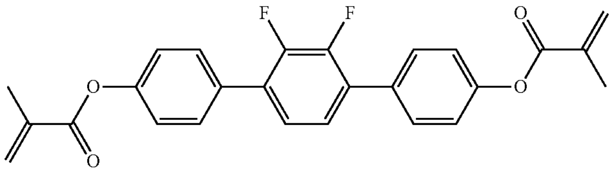
RM-70
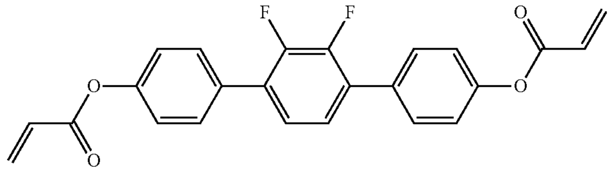
RM-71

TABLE H-continued
| Table H shows illustrative reactive mesogenic compounds (RMs) which can be used in the LC media in accordance with the present invention. |
|---|
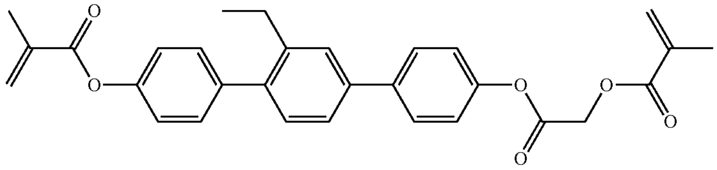 [SMILES: C=C(C)C(=O)OCC(=O)Oc1ccc(-c2ccc(-c3ccc(OC(=O)C(=C)C)cc3)c(CC)c2)cc1]
RM-72
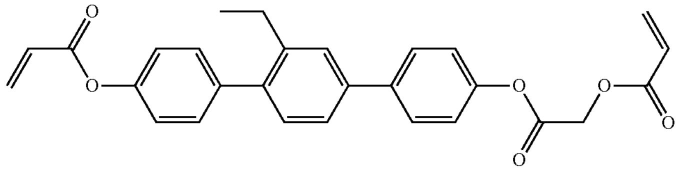 [SMILES: C=CC(=O)OCC(=O)Oc1ccc(-c2ccc(-c3ccc(OC(=O)C=C)cc3)c(CC)c2)cc1]
RM-73
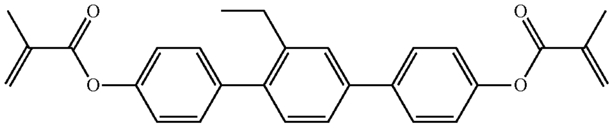 [SMILES: C=C(C)C(=O)Oc1ccc(-c2ccc(-c3ccc(OC(=O)C(=C)C)cc3)c(CC)c2)cc1]
RM-74
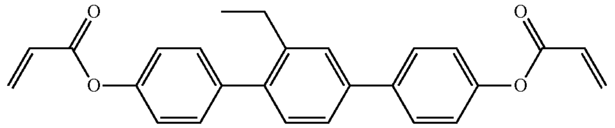
RM-75
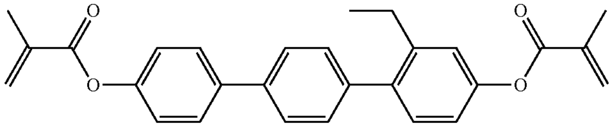 [SMILES: C=C(C)C(=O)Oc1ccc(-c2ccc(-c3ccc(OC(=O)C(=C)C)cc3CC)cc2)cc1]
RM-76
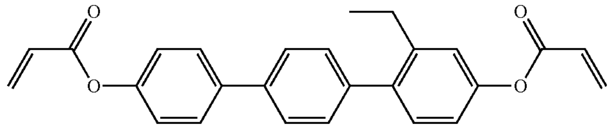
RM-77
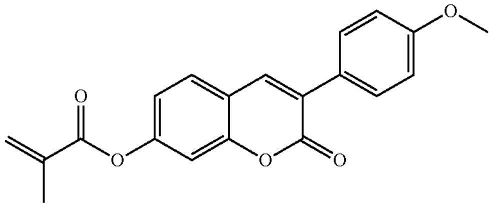 [SMILES: C=C(C)C(=O)Oc1ccc2cc(-c3ccc(OC)cc3)c(=O)oc2c1]
RM-78
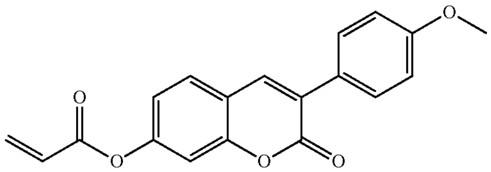 [SMILES: C=CC(=O)Oc1ccc2cc(-c3ccc(OC)cc3)c(=O)oc2c1]
RM-79
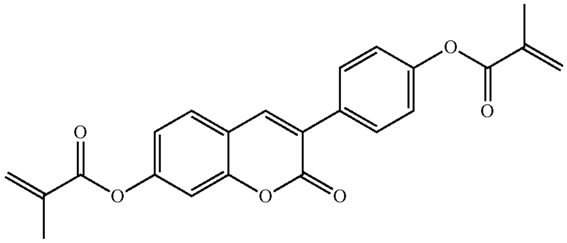 [SMILES: C=C(C)C(=O)Oc1ccc(-c2cc3ccc(OC(=O)C(=C)C)cc3oc2=O)cc1]
RM-80

TABLE H-continued
Table H shows illustrative reactive mesogenic compounds (RMs) which can be used in the LC media in accordance with the present invention.
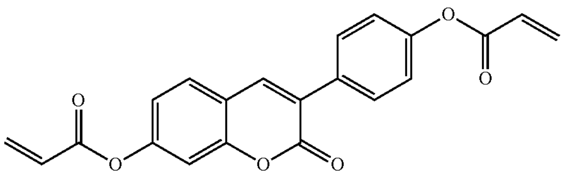 [SMILES: C=CC(=O)Oc1ccc(-c2cc3ccc(OC(=O)C=C)cc3oc2=O)cc1]
RM-81
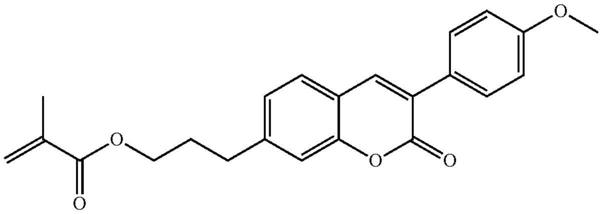 [SMILES: C=C(C)C(=O)OCCCc1ccc2cc(-c3ccc(OC)cc3)c(=O)oc2c1]
RM-82
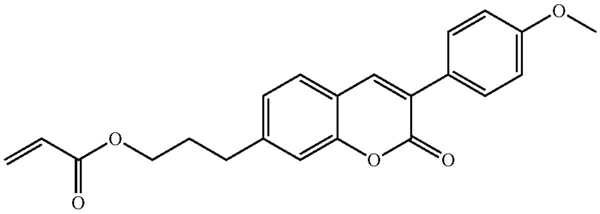 [SMILES: C=CC(=O)OCCCc1ccc2cc(-c3ccc(OC)cc3)c(=O)oc2c1]
RM-83
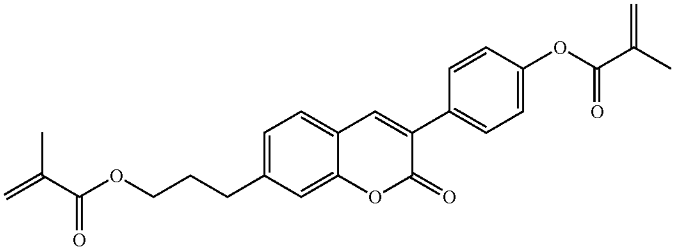 [SMILES: C=C(C)C(=O)OCCCc1ccc2cc(-c3ccc(OC(=O)C(=C)C)cc3)c(=O)oc2c1]
RM-84
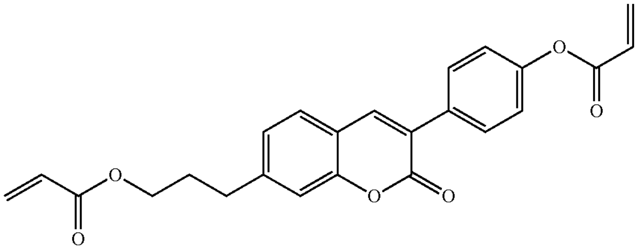 [SMILES: C=CC(=O)OCCCc1ccc2cc(-c3ccc(OC(=O)C=C)cc3)c(=O)oc2c1]
RM-85
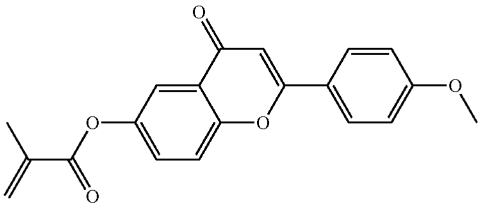 [SMILES: C=C(C)C(=O)Oc1ccc2oc(-c3ccc(OC)cc3)cc(=O)c2c1]
RM-86

TABLE H-continued
| Table H shows illustrative reactive mesogenic compounds (RMs) which can be used in the LC media in accordance with the present invention. |
| --- |
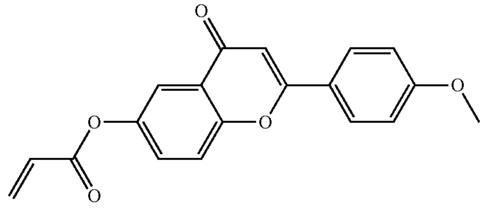 [SMILES: C=CC(=O)Oc1ccc2oc(-c3ccc(OC)cc3)cc(=O)c2c1]
RM-87
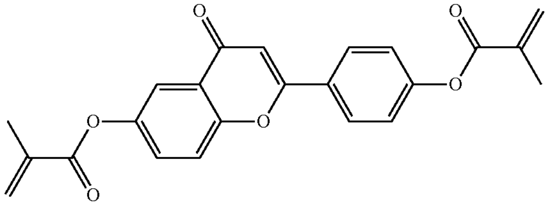 [SMILES: C=C(C)C(=O)Oc1ccc(-c2cc(=O)c3cc(OC(=O)C(=C)C)ccc3o2)cc1]
RM-88
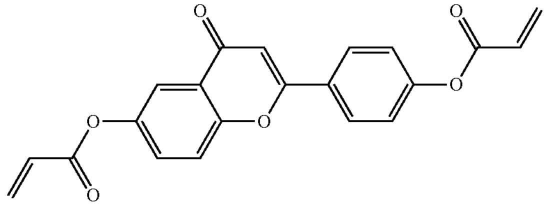 [SMILES: C=CC(=O)Oc1ccc(-c2cc(=O)c3cc(OC(=O)C=C)ccc3o2)cc1]
RM-89
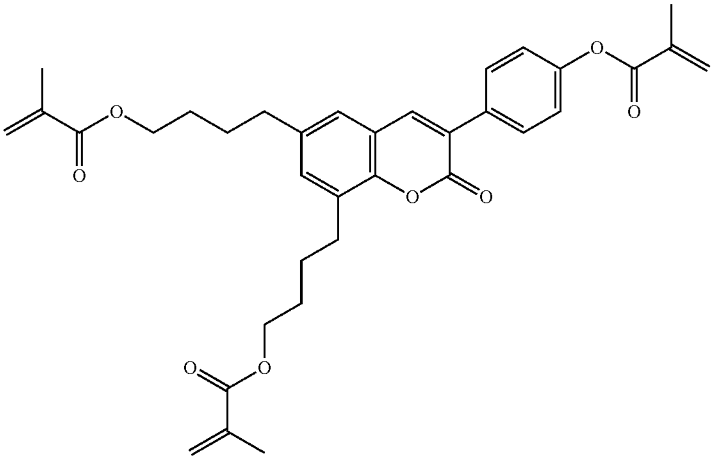 [SMILES: C=C(C)C(=O)OCCCCc1cc(CCCCOC(=O)C(=C)C)c2oc(=O)c(-c3ccc(OC(=O)C(=C)C)cc3)cc2c1]
RM-90
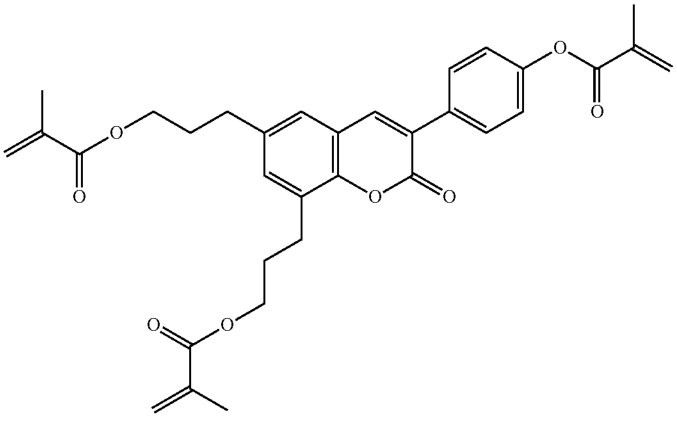 [SMILES: C=C(C)C(=O)OCCCc1cc(CCCOC(=O)C(=C)C)c2oc(=O)c(-c3ccc(OC(=O)C(=C)C)cc3)cc2c1]
RM-91

TABLE H-continued
| Table H shows illustrative reactive mesogenic compounds (RMs) which can be used in the LC media in accordance with the present invention. |
|---|
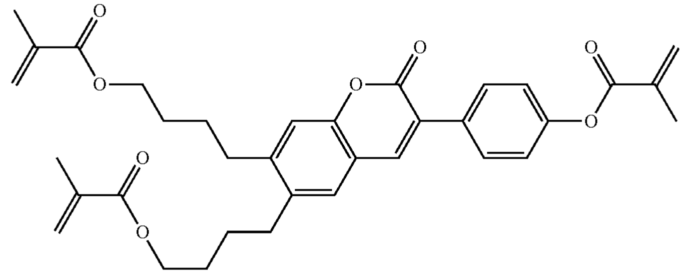 [SMILES: C=C(C)C(=O)OCCCCc1cc2cc(-c3ccc(OC(=O)C(=C)C)cc3)c(=O)oc2cc1CCCCOC(=O)C(=C)C]
RM-92
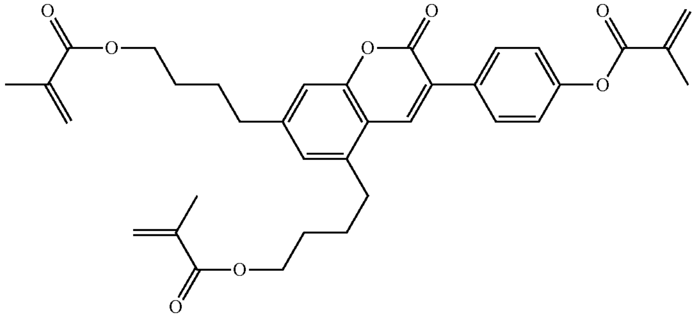 [SMILES: C=C(C)C(=O)OCCCCc1cc(CCCCOC(=O)C(=C)C)c2cc(-c3ccc(OC(=O)C(=C)C)cc3)c(=O)oc2c1]
RM-93
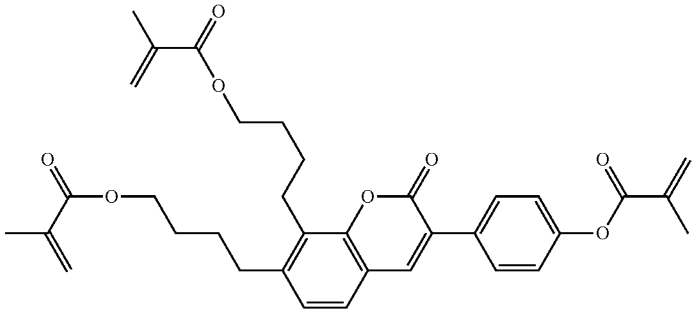 [SMILES: C=C(C)C(=O)OCCCCc1ccc2cc(-c3ccc(OC(=O)C(=C)C)cc3)c(=O)oc2c1CCCCOC(=O)C(=C)C]
RM-94
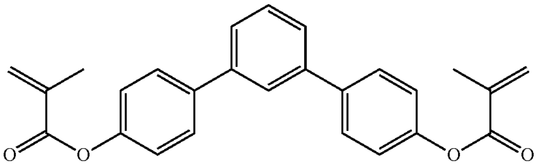 [SMILES: C=C(C)C(=O)Oc1ccc(-c2cccc(-c3ccc(OC(=O)C(=C)C)cc3)c2)cc1]
RM-95
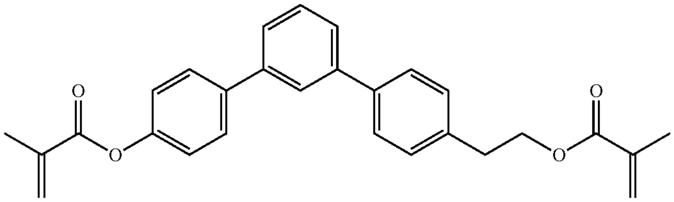 [SMILES: C=C(C)C(=O)OCCc1ccc(-c2cccc(-c3ccc(OC(=O)C(=C)C)cc3)c2)cc1]
RM-96
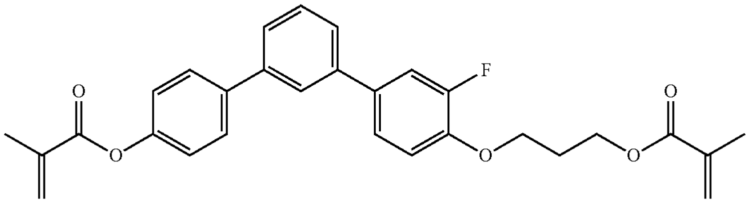 [SMILES: C=C(C)C(=O)OCCCOc1ccc(-c2cccc(-c3ccc(OC(=O)C(=C)C)cc3)c2)cc1F]
RM-97

TABLE H-continued
Table H shows illustrative reactive mesogenic compounds (RMs) which can be used in the LC media in accordance with the present invention.
RM-98
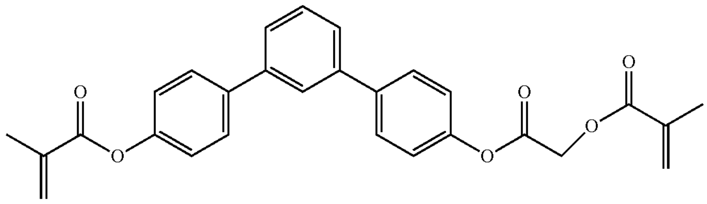 [SMILES: C=C(C)C(=O)OCC(=O)Oc1ccc(-c2cccc(-c3ccc(OC(=O)C(=C)C)cc3)c2)cc1]
RM-99
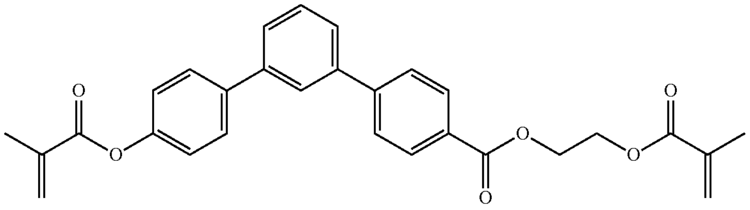 [SMILES: C=C(C)C(=O)OCCOC(=O)c1ccc(-c2cccc(-c3ccc(OC(=O)C(=C)C)cc3)c2)cc1]
RM-100
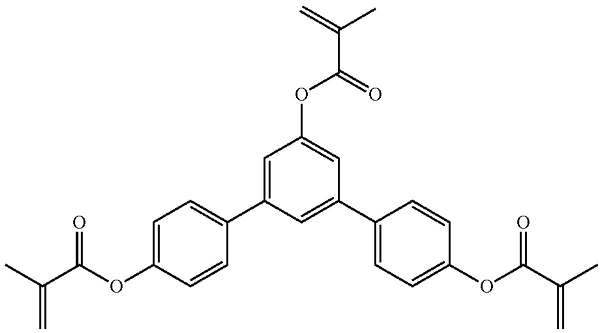 [SMILES: C=C(C)C(=O)Oc1ccc(-c2cc(OC(=O)C(=C)C)cc(-c3ccc(OC(=O)C(=C)C)cc3)c2)cc1]
RM-101
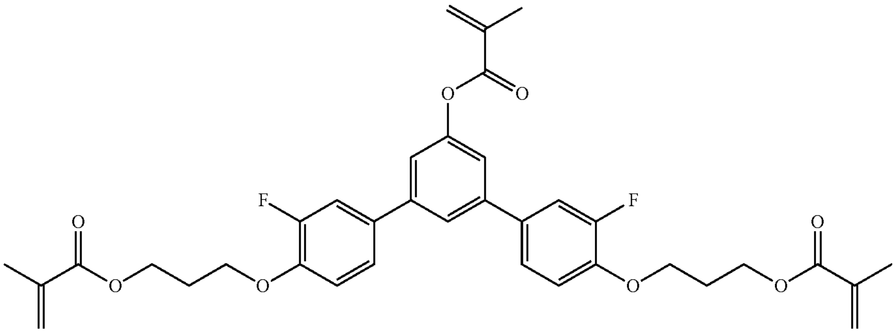 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-102
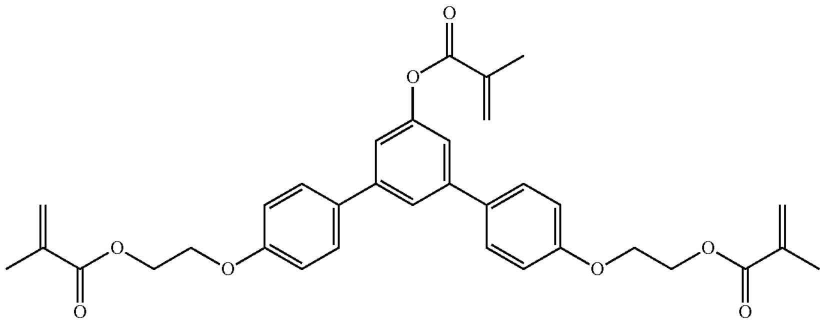 [SMILES: C=C(C)C(=O)OCCOc1ccc(-c2cc(OC(=O)C(=C)C)cc(-c3ccc(OCCOC(=O)C(=C)C)cc3)c2)cc1]

TABLE H-continued
Table H shows illustrative reactive mesogenic compounds (RMs) which can be used in the LC media in accordance with the present invention.
RM-103
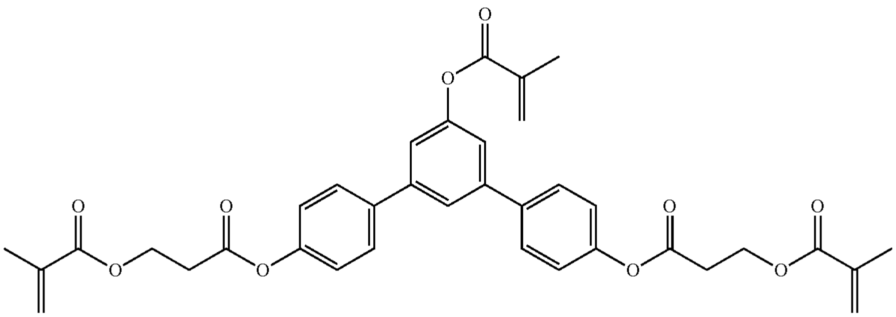 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-104
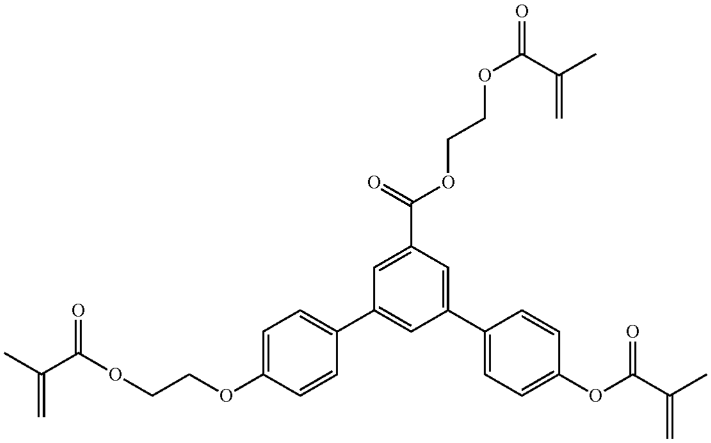 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
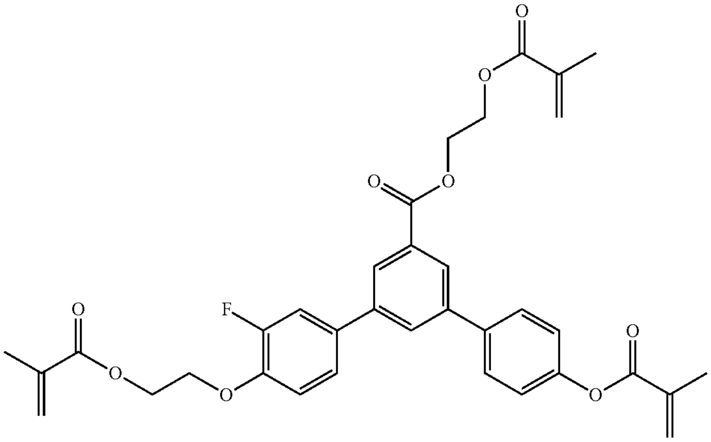 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-106
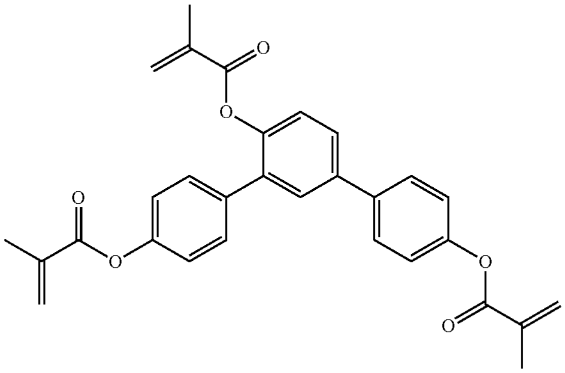 [SMILES: C=C(C)C(=O)Oc1ccc(-c2ccc(OC(=O)C(=C)C)c(-c3ccc(OC(=O)C(=C)C)cc3)c2)cc1]

TABLE H-continued
Table H shows illustrative reactive mesogenic compounds (RMs) which can be used in the LC media in accordance with the present invention.
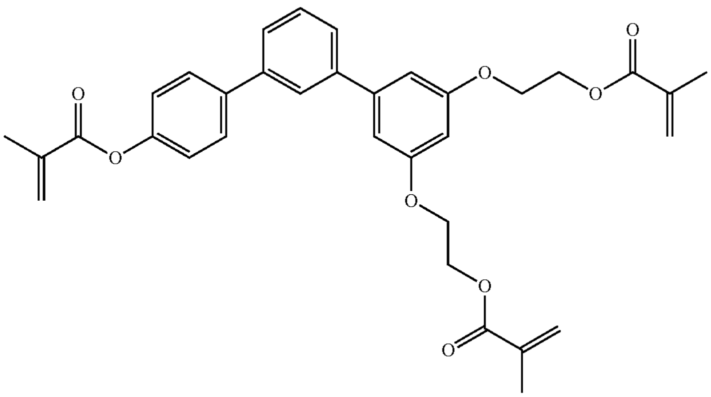 [SMILES: C=C(C)C(=O)OCCOc1cc(OCCOC(=O)C(=C)C)cc(-c2cccc(-c3ccc(OC(=O)C(=C)C)cc3)c2)c1]
RM-107
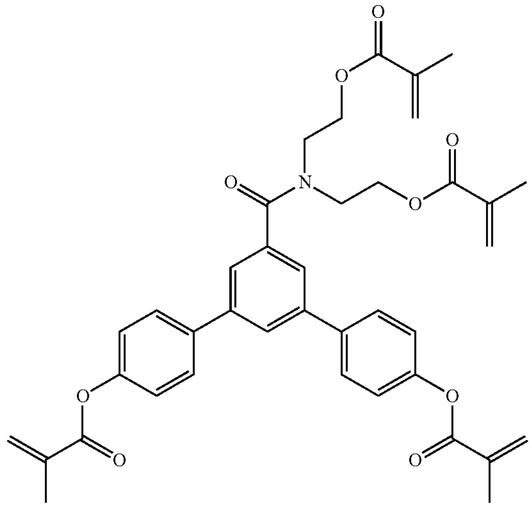 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-108
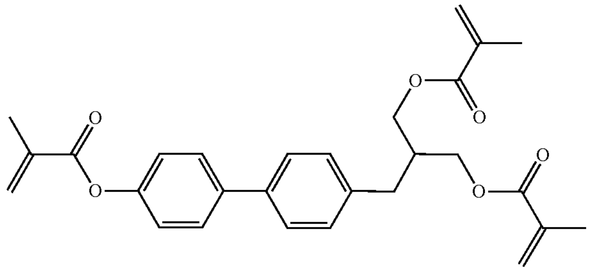 [SMILES: C=C(C)C(=O)OCC(COC(=O)C(=C)C)Cc1ccc(-c2ccc(OC(=O)C(=C)C)cc2)cc1]
RM-109
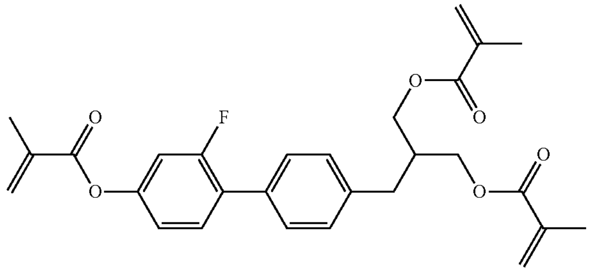 [SMILES: C=C(C)C(=O)OCC(COC(=O)C(=C)C)Cc1ccc(-c2ccc(OC(=O)C(=C)C)cc2F)cc1]
RM-110

TABLE H-continued
| Table H shows illustrative reactive mesogenic compounds (RMs) which can be used in the LC media in accordance with the present invention. |
|---|
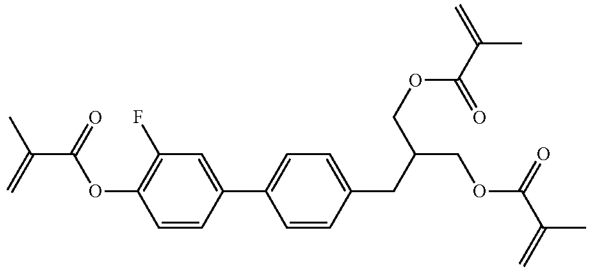 [SMILES: C=C(C)C(=O)OCC(COC(=O)C(=C)C)Cc1ccc(-c2ccc(OC(=O)C(=C)C)c(F)c2)cc1]
RM-111
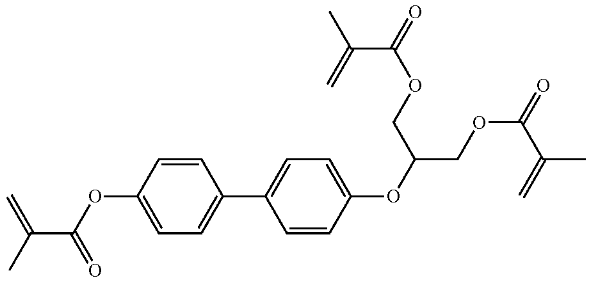 [SMILES: C=C(C)C(=O)OCC(COC(=O)C(=C)C)Oc1ccc(-c2ccc(OC(=O)C(=C)C)cc2)cc1]
RM-112
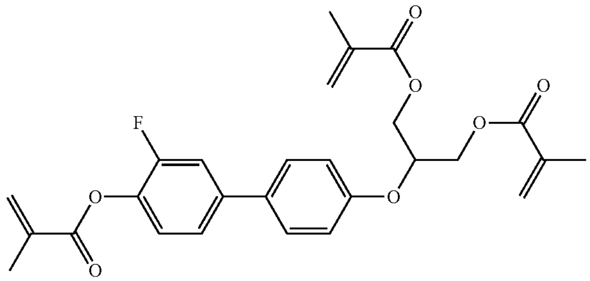 [SMILES: C=C(C)C(=O)OCC(COC(=O)C(=C)C)Oc1ccc(-c2ccc(OC(=O)C(=C)C)c(F)c2)cc1]
RM-113
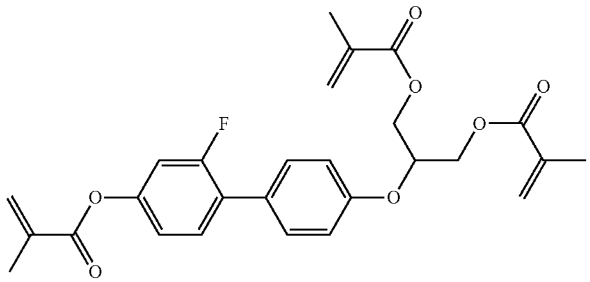 [SMILES: C=C(C)C(=O)OCC(COC(=O)C(=C)C)Oc1ccc(-c2ccc(OC(=O)C(=C)C)cc2F)cc1]
RM-114
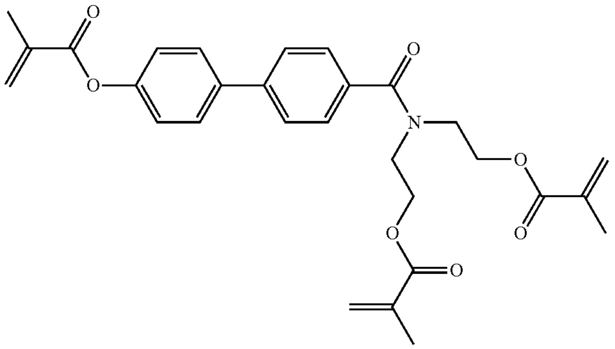 [SMILES: C=C(C)C(=O)OCCN(CCOC(=O)C(=C)C)C(=O)c1ccc(-c2ccc(OC(=O)C(=C)C)cc2)cc1]
RM-115

TABLE H-continued
Table H shows illustrative reactive mesogenic compounds (RMs) which can be used in the LC media in accordance with the present invention.
RM-116
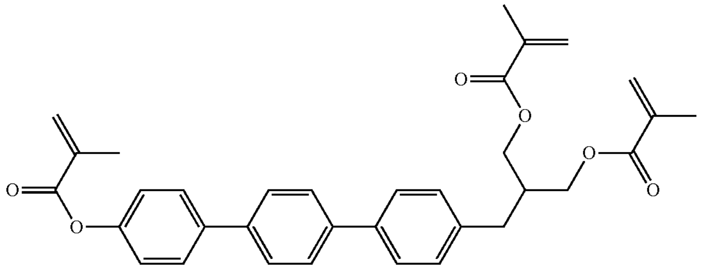 [SMILES: C=C(C)C(=O)OCC(COC(=O)C(=C)C)Cc1ccc(-c2ccc(-c3ccc(OC(=O)C(=C)C)cc3)cc2)cc1]
RM-117
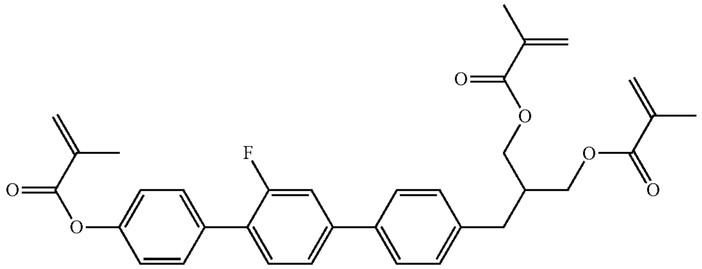 [SMILES: C=C(C)C(=O)OCC(COC(=O)C(=C)C)Cc1ccc(-c2ccc(-c3ccc(OC(=O)C(=C)C)cc3)c(F)c2)cc1]
RM-118
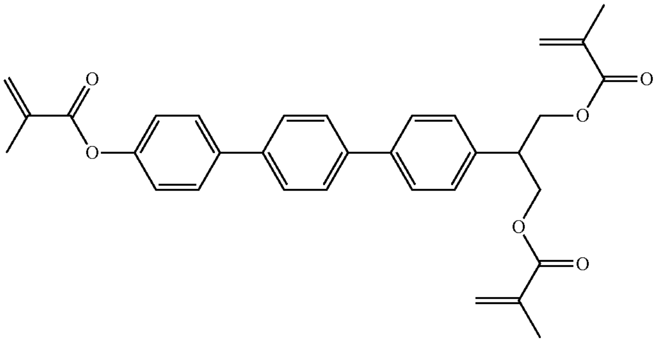 [SMILES: C=C(C)C(=O)OCC(COC(=O)C(=C)C)c1ccc(-c2ccc(-c3ccc(OC(=O)C(=C)C)cc3)cc2)cc1]
RM-119
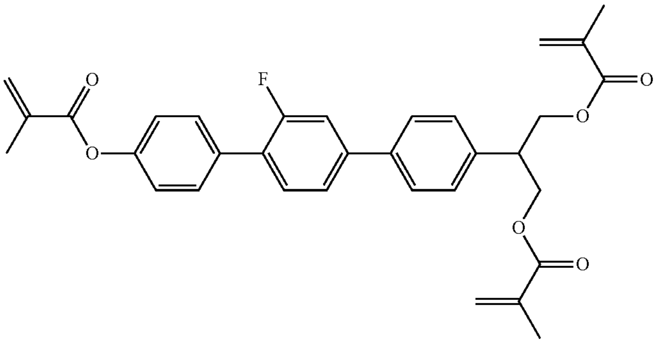 [SMILES: C=C(C)C(=O)OCC(COC(=O)C(=C)C)c1ccc(-c2ccc(-c3ccc(OC(=O)C(=C)C)cc3)c(F)c2)cc1]
RM-120
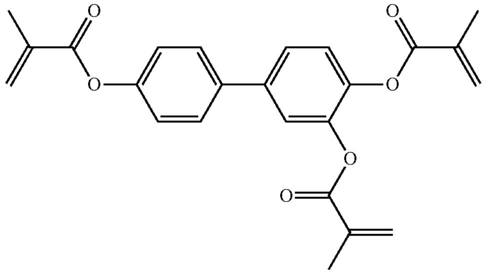 [SMILES: C=C(C)C(=O)Oc1ccc(-c2ccc(OC(=O)C(=C)C)c(OC(=O)C(=C)C)c2)cc1]

TABLE H-continued
| Table H shows illustrative reactive mesogenic compounds (RMs) which can be used in the LC media in accordance with the present invention. |
|---|
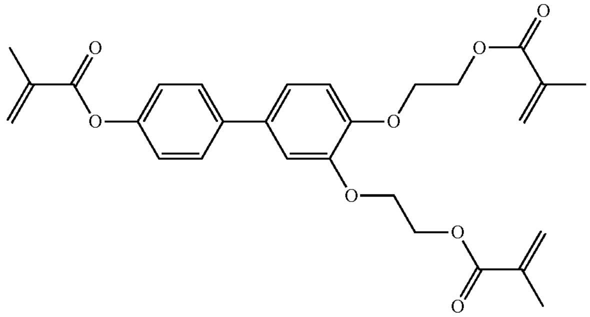 [SMILES: C=C(C)C(=O)OCCOc1ccc(-c2ccc(OC(=O)C(=C)C)cc2)cc1OCCOC(=O)C(=C)C]
RM-121
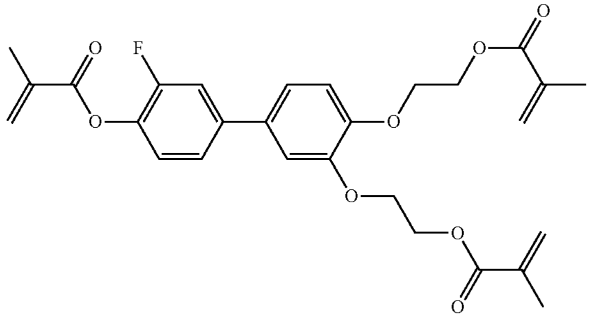 [SMILES: C=C(C)C(=O)OCCOc1ccc(-c2ccc(OC(=O)C(=C)C)c(F)c2)cc1OCCOC(=O)C(=C)C]
RM-122
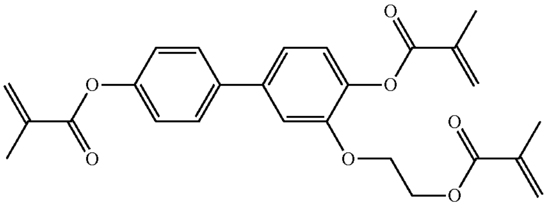 [SMILES: C=C(C)C(=O)OCCOc1cc(-c2ccc(OC(=O)C(=C)C)cc2)ccc1OC(=O)C(=C)C]
RM-123
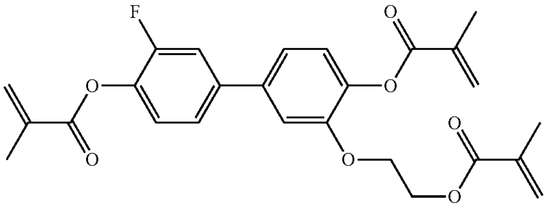 [SMILES: C=C(C)C(=O)OCCOc1cc(-c2ccc(OC(=O)C(=C)C)c(F)c2)ccc1OC(=O)C(=C)C]
RM-124
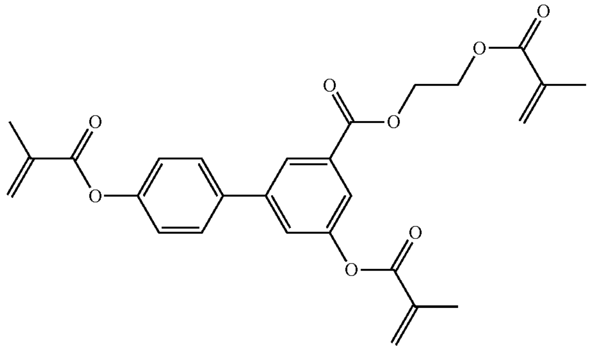 [SMILES: C=C(C)C(=O)OCCOC(=O)c1cc(OC(=O)C(=C)C)cc(-c2ccc(OC(=O)C(=C)C)cc2)c1]
RM-125

TABLE H-continued
Table H shows illustrative reactive mesogenic compounds (RMs) which can be used in the LC media in accordance with the present invention.
RM-126
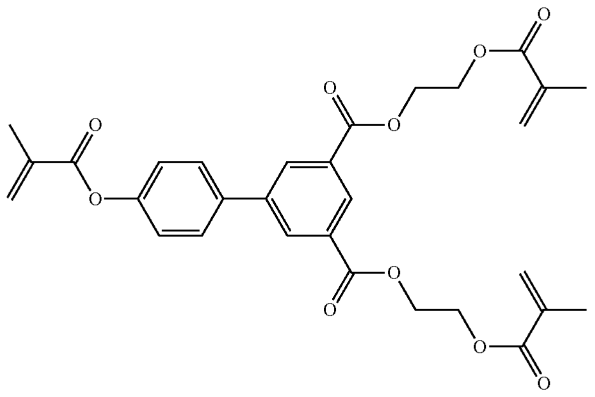 [SMILES: C=C(C)C(=O)OCCOC(=O)c1cc(C(=O)OCCOC(=O)C(=C)C)cc(-c2ccc(OC(=O)C(=C)C)cc2)c1]
RM-127
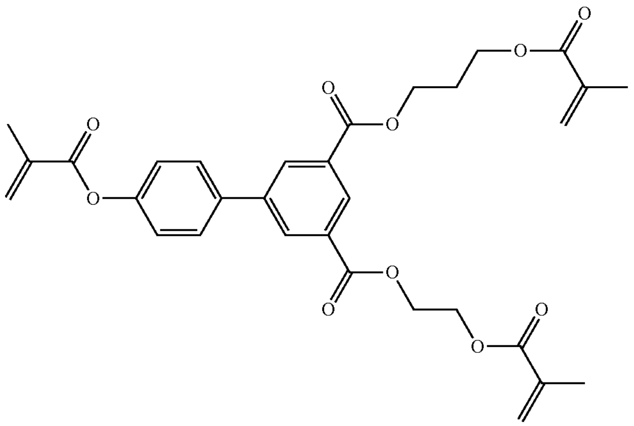 [SMILES: C=C(C)C(=O)OCCCOC(=O)c1cc(C(=O)OCCOC(=O)C(=C)C)cc(-c2ccc(OC(=O)C(=C)C)cc2)c1]
RM-128
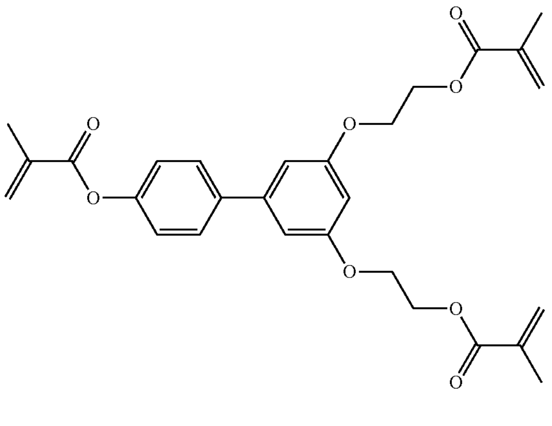 [SMILES: C=C(C)C(=O)OCCOc1cc(OCCOC(=O)C(=C)C)cc(-c2ccc(OC(=O)C(=C)C)cc2)c1]

TABLE H-continued
| Table H shows illustrative reactive mesogenic compounds (RMs) which can be used in the LC media in accordance with the present invention. |
| --- |
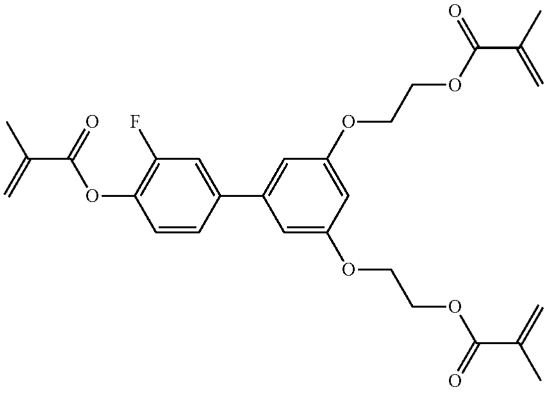 [SMILES: C=C(C)C(=O)OCCOc1cc(OCCOC(=O)C(=C)C)cc(-c2ccc(OC(=O)C(=C)C)c(F)c2)c1]
RM-129
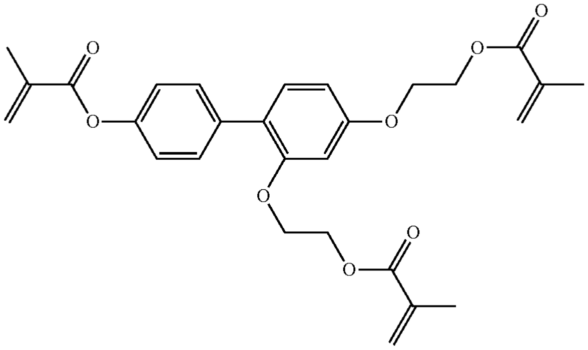 [SMILES: C=C(C)C(=O)OCCOc1ccc(-c2ccc(OC(=O)C(=C)C)cc2)c(OCCOC(=O)C(=C)C)c1]
RM-130
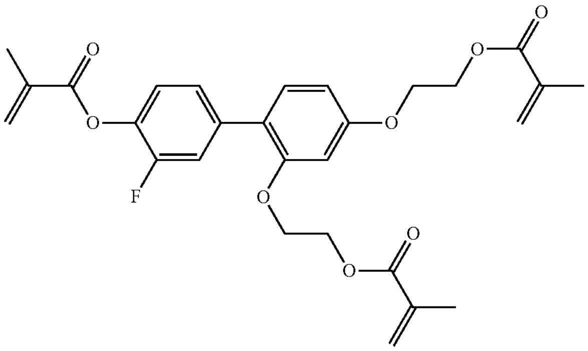 [SMILES: C=C(C)C(=O)OCCOc1ccc(-c2ccc(OC(=O)C(=C)C)c(F)c2)c(OCCOC(=O)C(=C)C)c1]
RM-131
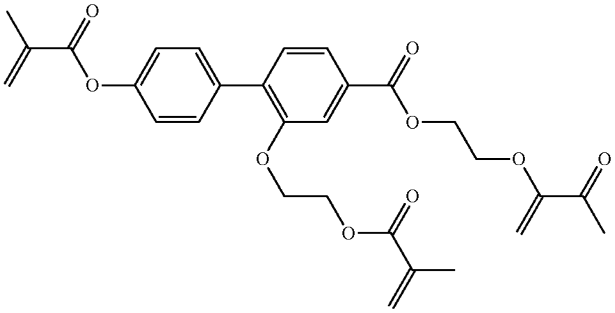 [SMILES: C=C(C)C(=O)OCCOc1cc(C(=O)OCCOC(=C)C(C)=O)ccc1-c1ccc(OC(=O)C(=C)C)cc1]
RM-132

TABLE H-continued
| Table H shows illustrative reactive mesogenic compounds (RMs) which can be used in the LC media in accordance with the present invention. |
| --- |
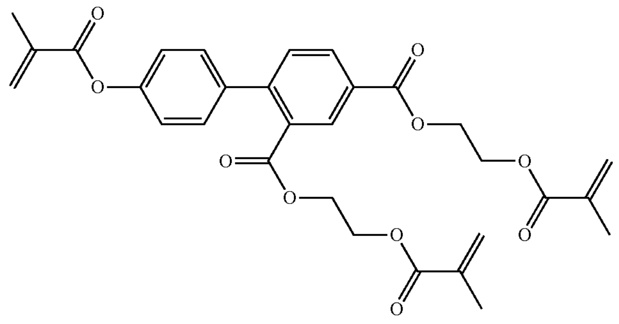 [SMILES: C=C(C)C(=O)OCCOC(=O)c1ccc(-c2ccc(OC(=O)C(=C)C)cc2)c(C(=O)OCCOC(=O)C(=C)C)c1]
RM-133
RM-134
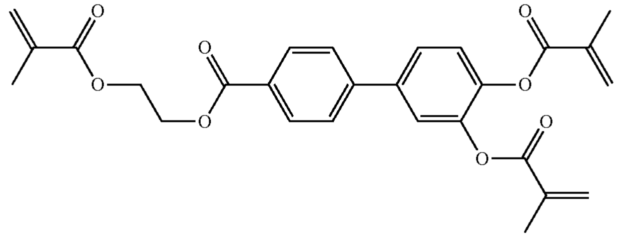 [SMILES: C=C(C)C(=O)OCCOC(=O)c1ccc(-c2ccc(OC(=O)C(=C)C)c(OC(=O)C(=C)C)c2)cc1]
RM-135
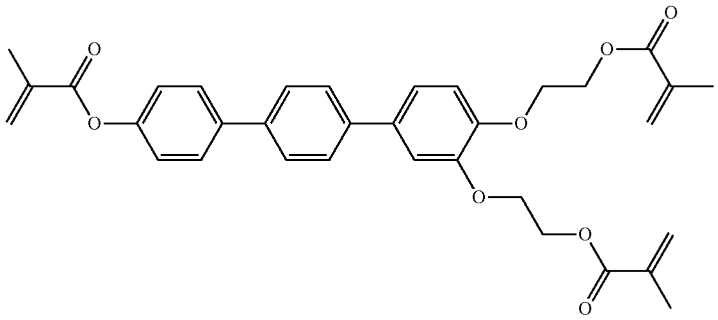 [SMILES: C=C(C)C(=O)OCCOc1ccc(-c2ccc(-c3ccc(OC(=O)C(=C)C)cc3)cc2)cc1OCCOC(=O)C(=C)C]
RM-136
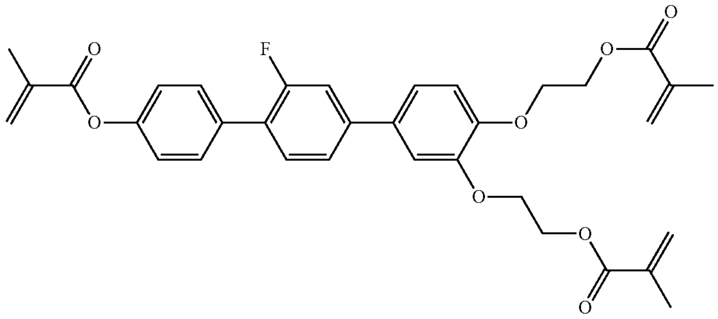 [SMILES: C=C(C)C(=O)OCCOc1ccc(-c2ccc(-c3ccc(OC(=O)C(=C)C)cc3)c(F)c2)cc1OCCOC(=O)C(=C)C]

TABLE H-continued
| Table H shows illustrative reactive mesogenic compounds (RMs) which can be used in the LC media in accordance with the present invention. |
|---|
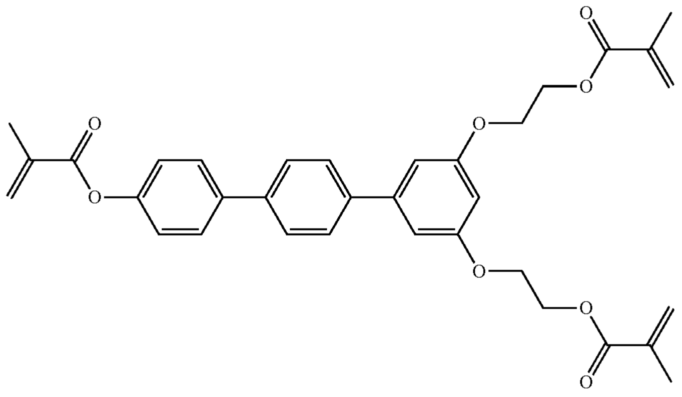 [SMILES: C=C(C)C(=O)OCCOc1cc(OCCOC(=O)C(=C)C)cc(-c2ccc(-c3ccc(OC(=O)C(=C)C)cc3)cc2)c1]
RM-137
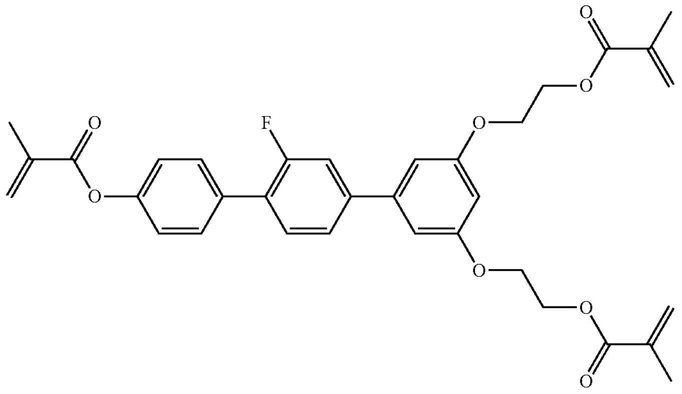 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-138
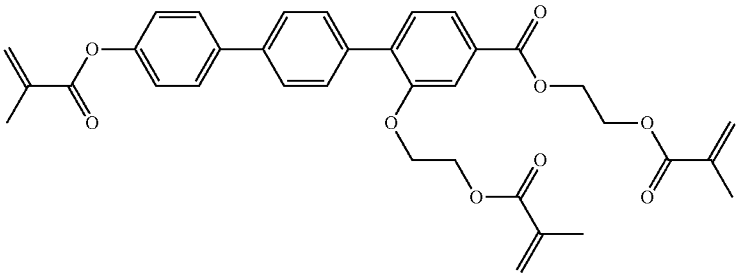 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-139
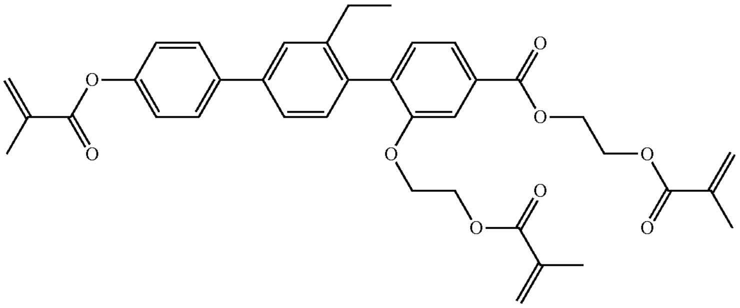 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-140

TABLE H-continued
| Table H shows illustrative reactive mesogenic compounds (RMs) which can be used in the LC media in accordance with the present invention. |
|---|
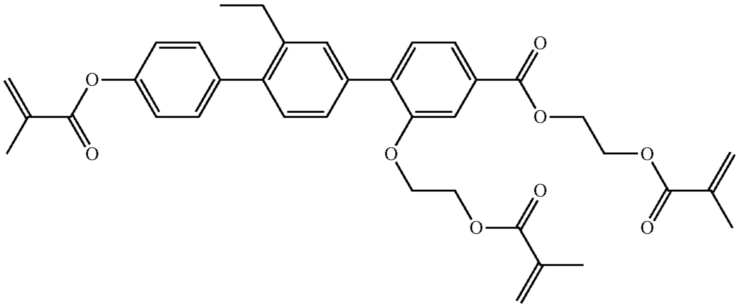 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-141
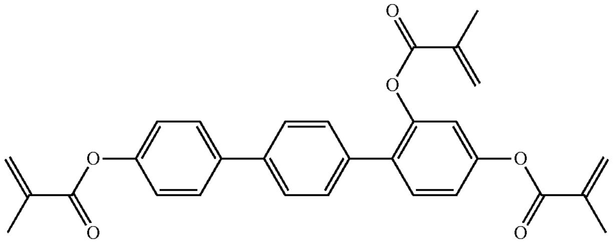 [SMILES: C=C(C)C(=O)Oc1ccc(-c2ccc(-c3ccc(OC(=O)C(=C)C)cc3OC(=O)C(=C)C)cc2)cc1]
RM-142
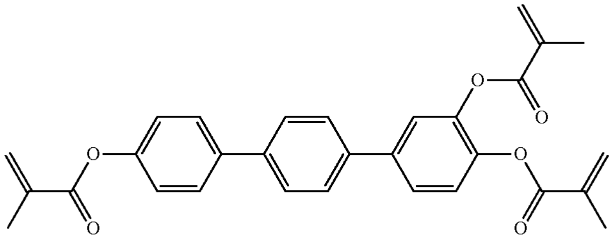 [SMILES: C=C(C)C(=O)Oc1ccc(-c2ccc(-c3ccc(OC(=O)C(=C)C)c(OC(=O)C(=C)C)c3)cc2)cc1]
RM-143
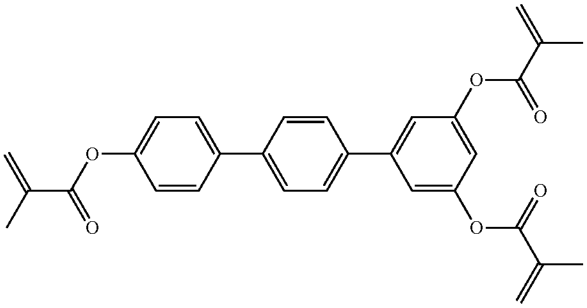 [SMILES: C=C(C)C(=O)Oc1ccc(-c2ccc(-c3cc(OC(=O)C(=C)C)cc(OC(=O)C(=C)C)c3)cc2)cc1]
RM-144
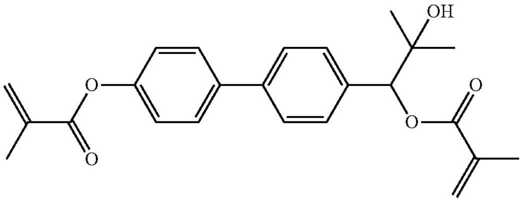 [SMILES: C=C(C)C(=O)Oc1ccc(-c2ccc(C(OC(=O)C(=C)C)C(C)(C)O)cc2)cc1]
RM-145
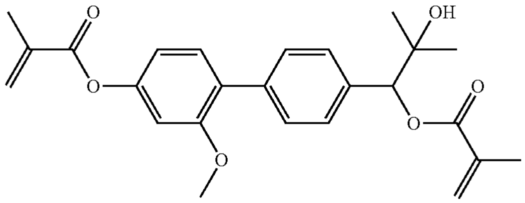 [SMILES: C=C(C)C(=O)Oc1ccc(-c2ccc(C(OC(=O)C(=C)C)C(C)(C)O)cc2)c(OC)c1]
RM-146

TABLE H-continued
Table H shows illustrative reactive mesogenic compounds (RMs) which can be used in the LC media in accordance with the present invention.
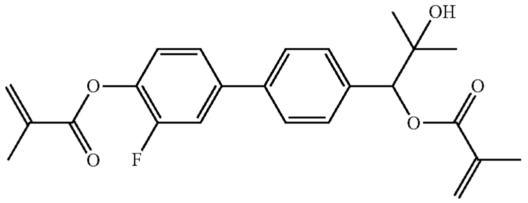 [SMILES: C=C(C)C(=O)Oc1ccc(-c2ccc(C(OC(=O)C(=C)C)C(C)(C)O)cc2)cc1F]
RM-147
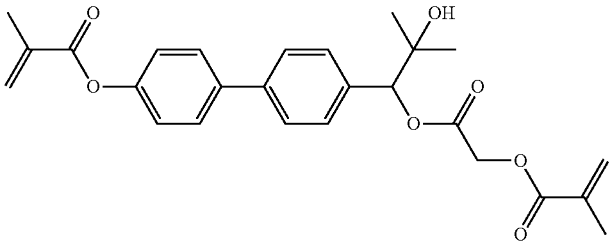 [SMILES: C=C(C)C(=O)OCC(=O)OC(c1ccc(-c2ccc(OC(=O)C(=C)C)cc2)cc1)C(C)(C)O]
RM-148
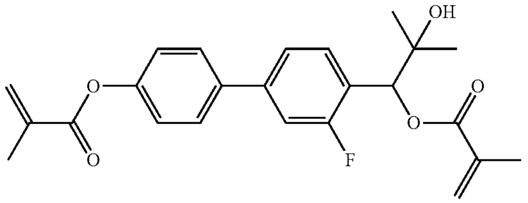 [SMILES: C=C(C)C(=O)Oc1ccc(-c2ccc(C(OC(=O)C(=C)C)C(C)(C)O)c(F)c2)cc1]
RM-149
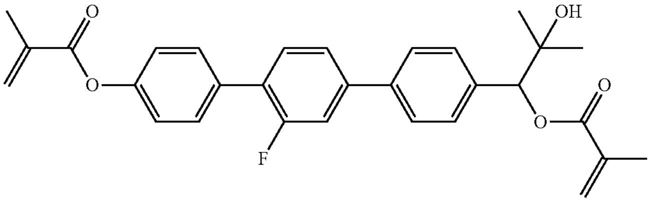 [SMILES: C=C(C)C(=O)Oc1ccc(-c2ccc(-c3ccc(C(OC(=O)C(=C)C)C(C)(C)O)cc3)cc2F)cc1]
RM-150
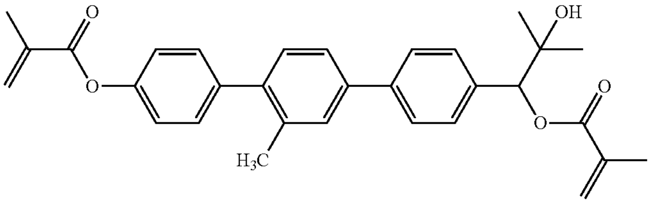 [SMILES: C=C(C)C(=O)Oc1ccc(-c2ccc(-c3ccc(C(OC(=O)C(=C)C)C(C)(C)O)cc3)cc2C)cc1]
RM-151
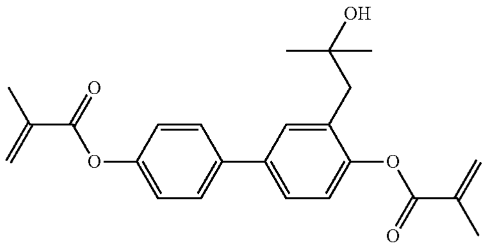 [SMILES: C=C(C)C(=O)Oc1ccc(-c2ccc(OC(=O)C(=C)C)c(CC(C)(C)O)c2)cc1]
RM-152
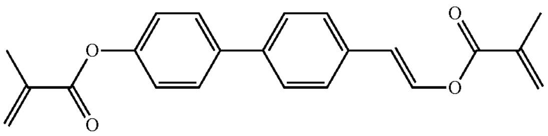 [SMILES: C=C(C)C(=O)O/C=C/c1ccc(-c2ccc(OC(=O)C(=C)C)cc2)cc1]
RM-153

TABLE H-continued
| Table H shows illustrative reactive mesogenic compounds (RMs) which can be used in the LC media in accordance with the present invention. |
| --- |
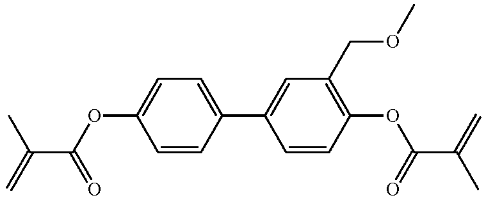 [SMILES: C=C(C)C(=O)Oc1ccc(-c2ccc(OC(=O)C(=C)C)c(COC)c2)cc1]
RM-154
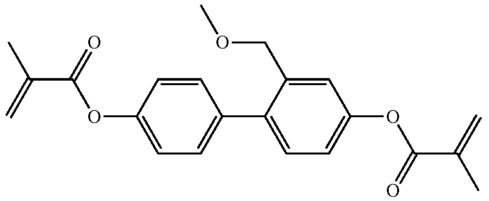 [SMILES: C=C(C)C(=O)Oc1ccc(-c2ccc(OC(=O)C(=C)C)cc2COC)cc1]
RM-155
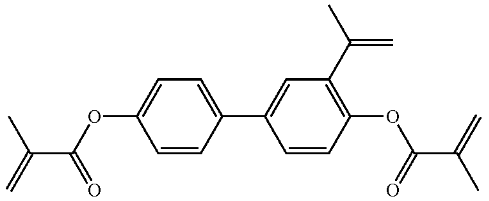 [SMILES: C=C(C)C(=O)Oc1ccc(-c2ccc(OC(=O)C(=C)C)c(C(=C)C)c2)cc1]
RM-156
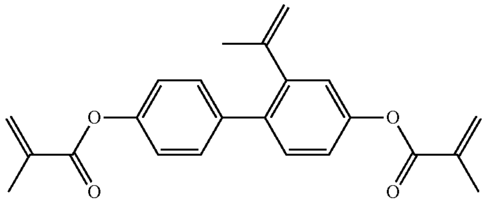 [SMILES: C=C(C)C(=O)Oc1ccc(-c2ccc(OC(=O)C(=C)C)cc2C(=C)C)cc1]
RM-157
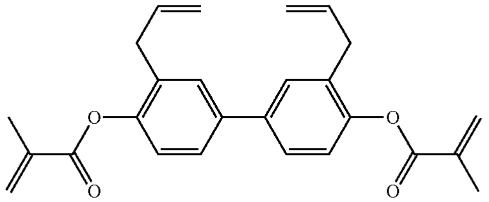 [SMILES: C=CCc1cc(-c2ccc(OC(=O)C(=C)C)c(CC=C)c2)ccc1OC(=O)C(=C)C]
RM-158
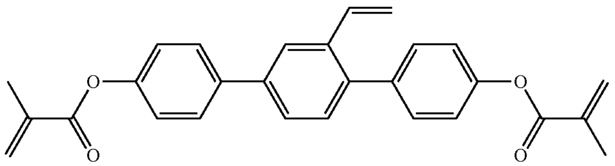 [SMILES: C=Cc1cc(-c2ccc(OC(=O)C(=C)C)cc2)ccc1-c1ccc(OC(=O)C(=C)C)cc1]
RM-159
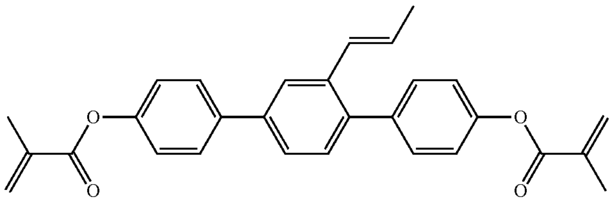 [SMILES: C=C(C)C(=O)Oc1ccc(-c2ccc(-c3ccc(OC(=O)C(=C)C)cc3)c(/C=C/C)c2)cc1]
RM-160

TABLE H-continued
Table H shows illustrative reactive mesogenic compounds (RMs) which can be used in the LC media in accordance with the present invention.
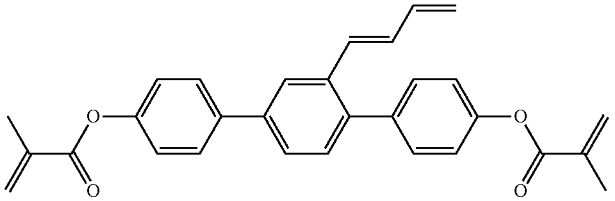 [SMILES: C=C/C=C/c1cc(-c2ccc(OC(=O)C(=C)C)cc2)ccc1-c1ccc(OC(=O)C(=C)C)cc1]
RM-161
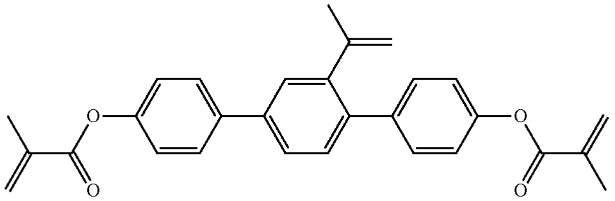 [SMILES: C=C(C)C(=O)Oc1ccc(-c2ccc(-c3ccc(OC(=O)C(=C)C)cc3)c(C(=C)C)c2)cc1]
RM-162
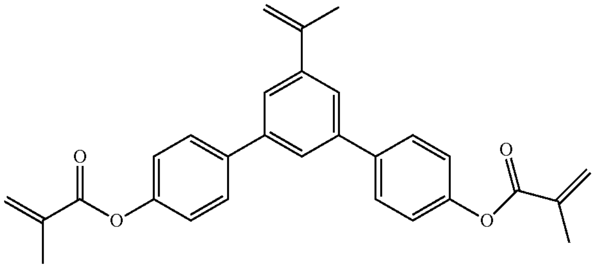 [SMILES: C=C(C)C(=O)Oc1ccc(-c2cc(C(=C)C)cc(-c3ccc(OC(=O)C(=C)C)cc3)c2)cc1]
RM-163
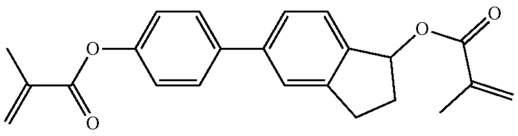 [SMILES: C=C(C)C(=O)Oc1ccc(-c2ccc3c(c2)CCC3OC(=O)C(=C)C)cc1]
RM-164
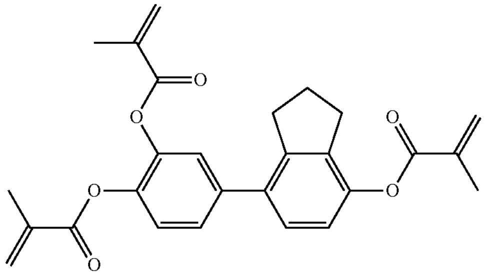 [SMILES: C=C(C)C(=O)Oc1ccc(-c2ccc(OC(=O)C(=C)C)c3c2CCC3)cc1OC(=O)C(=C)C]
RM-165
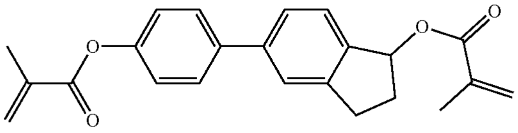 [SMILES: C=C(C)C(=O)Oc1ccc(-c2ccc3c(c2)CCC3OC(=O)C(=C)C)cc1]
RM-166
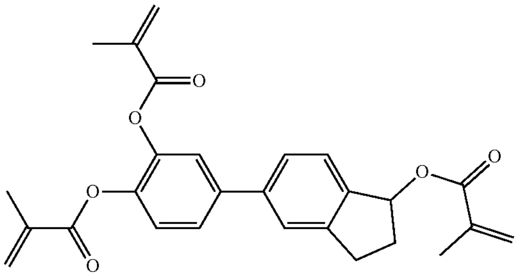 [SMILES: C=C(C)C(=O)Oc1ccc(-c2ccc3c(c2)CCC3OC(=O)C(=C)C)cc1OC(=O)C(=C)C]
RM-167

TABLE H-continued
Table H shows illustrative reactive mesogenic compounds (RMs) which can be used in the LC media in accordance with the present invention.
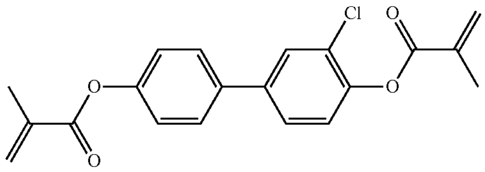 [SMILES: C=C(C)C(=O)Oc1ccc(-c2ccc(OC(=O)C(=C)C)c(Cl)c2)cc1]
RM-168
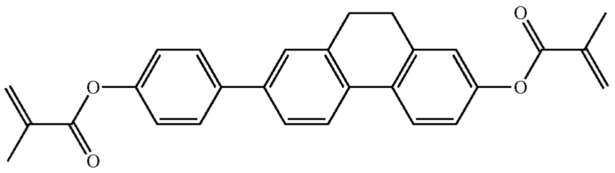 [SMILES: C=C(C)C(=O)Oc1ccc(-c2ccc3c(c2)CCc2cc(OC(=O)C(=C)C)ccc2-3)cc1]
RM-169
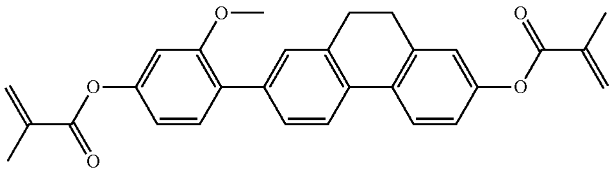 [SMILES: C=C(C)C(=O)Oc1ccc2c(c1)CCc1cc(-c3ccc(OC(=O)C(=C)C)cc3OC)ccc1-2]
RM-170
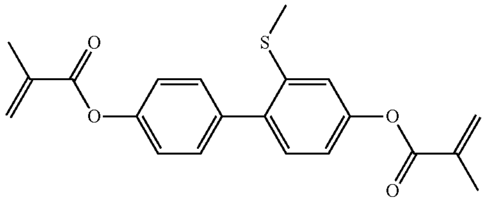 [SMILES: C=C(C)C(=O)Oc1ccc(-c2ccc(OC(=O)C(=C)C)cc2SC)cc1]
RM-171
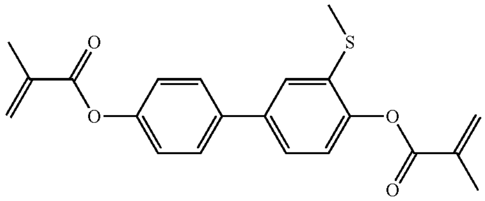 [SMILES: C=C(C)C(=O)Oc1ccc(-c2ccc(OC(=O)C(=C)C)c(SC)c2)cc1]
RM-172
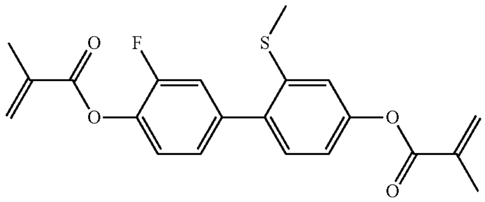 [SMILES: C=C(C)C(=O)Oc1ccc(-c2ccc(OC(=O)C(=C)C)c(F)c2)c(SC)c1]
RM-173
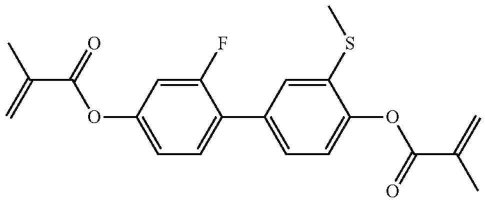 [SMILES: C=C(C)C(=O)Oc1ccc(-c2ccc(OC(=O)C(=C)C)c(SC)c2)c(F)c1]
RM-174

TABLE H-continued
| Table H shows illustrative reactive mesogenic compounds (RMs) which can be used in the LC media in accordance with the present invention. |
| --- |
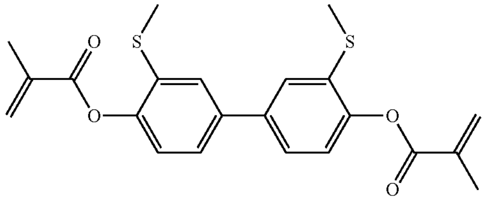 [SMILES: C=C(C)C(=O)Oc1ccc(-c2ccc(OC(=O)C(=C)C)c(SC)c2)cc1SC]
RM-175
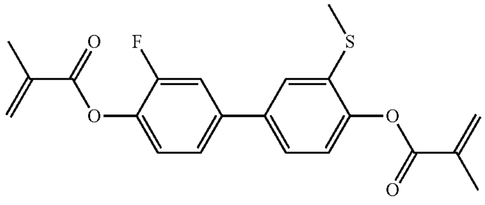 [SMILES: C=C(C)C(=O)Oc1ccc(-c2ccc(OC(=O)C(=C)C)c(SC)c2)cc1F]
RM-176
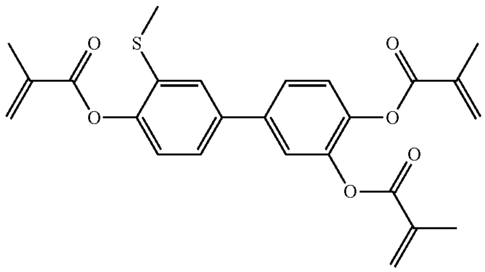 [SMILES: C=C(C)C(=O)Oc1ccc(-c2ccc(OC(=O)C(=C)C)c(SC)c2)cc1OC(=O)C(=C)C]
RM-177
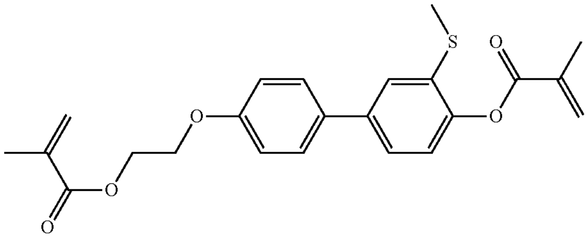 [SMILES: C=C(C)C(=O)OCCOc1ccc(-c2ccc(OC(=O)C(=C)C)c(SC)c2)cc1]
RM-178
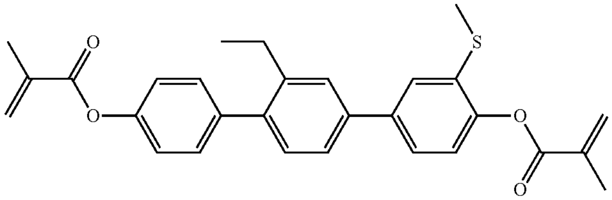 [SMILES: C=C(C)C(=O)Oc1ccc(-c2ccc(-c3ccc(OC(=O)C(=C)C)c(SC)c3)cc2CC)cc1]
RM-179
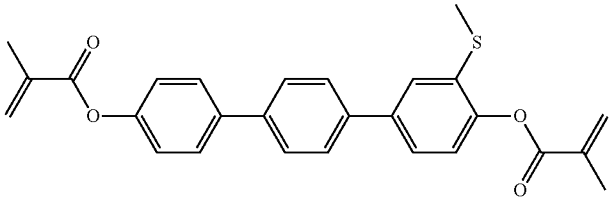 [SMILES: C=C(C)C(=O)Oc1ccc(-c2ccc(-c3ccc(OC(=O)C(=C)C)c(SC)c3)cc2)cc1]
RM-180
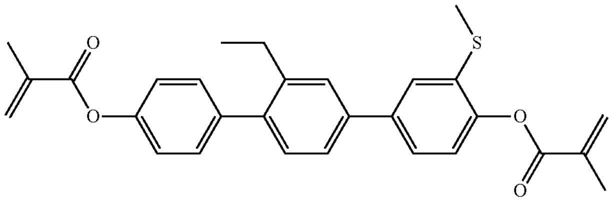 [SMILES: C=C(C)C(=O)Oc1ccc(-c2ccc(-c3ccc(OC(=O)C(=C)C)c(SC)c3)cc2CC)cc1]
RM-181

TABLE H-continued

Table H shows illustrative reactive mesogenic compounds (RMs) which can be used in the LC media in accordance with the present invention.

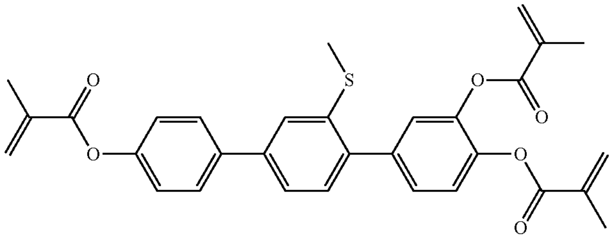 [SMILES: C=C(C)C(=O)Oc1ccc(-c2ccc(-c3ccc(OC(=O)C(=C)C)c(OC(=O)C(=C)C)c3)c(SC)c2)cc1]

RM-182

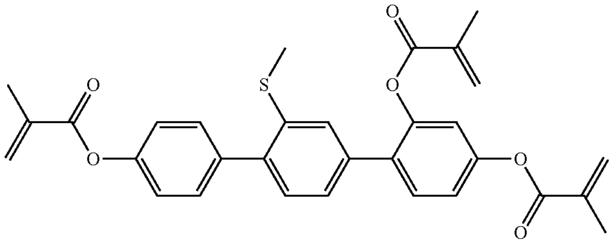 [SMILES: C=C(C)C(=O)Oc1ccc(-c2ccc(-c3ccc(OC(=O)C(=C)C)cc3OC(=O)C(=C)C)cc2SC)cc1]

RM-183

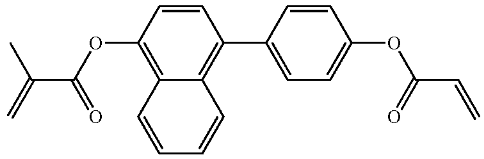 [SMILES: C=CC(=O)Oc1ccc(-c2ccc(OC(=O)C(=C)C)c3ccccc23)cc1]

RM-184

The LC media according to the invention may optionally comprise one or more polymerizable compounds, preferably selected from the polymerizable compounds of the Formulae RM-1 to RM-184. Of these, compounds RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-149, RM-156 to RM-163, RM-169, RM-170 and RM-171 to RM-184 are particularly preferred.

TABLE I

Table I shows self-alignment additives for vertical alignment which can be used in LC media for SA-FFS, SA-HB-FFS and SA-XB-FFS displays according to the present invention:

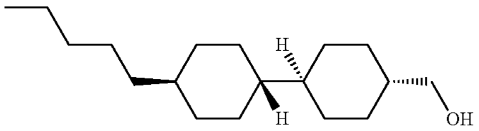

SA-1

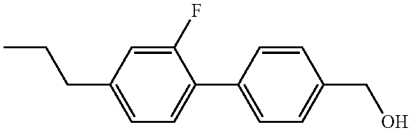 [SMILES: CCCc1ccc(-c2ccc(CO)cc2)c(F)c1]

SA-2

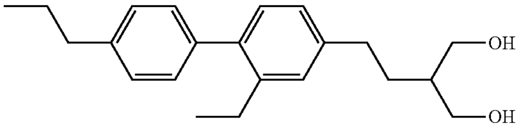 [SMILES: CCCc1ccc(-c2ccc(CCC(CO)CO)cc2CC)cc1]

SA-3

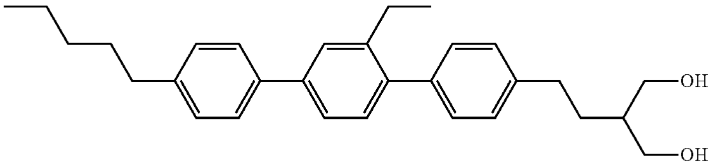 [SMILES: CCCCCc1ccc(-c2ccc(-c3ccc(CCC(CO)CO)cc3)c(CC)c2)cc1]

SA-4

TABLE I-continued
| Table I shows self-alignment additives for vertical alignment which can be used in LC media for SA-FFS, SA-HB-FFS and SA-XB-FFS displays according to the present invention: | |
|---|---|
| 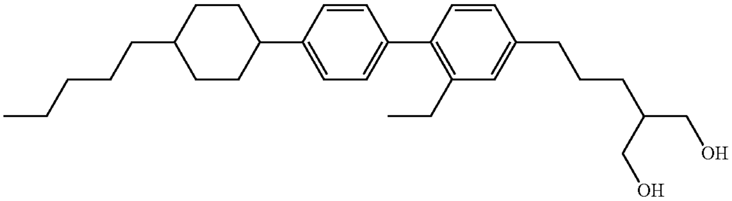 [SMILES: CCCCCC1CCC(c2ccc(-c3ccc(CCCC(CO)CO)cc3CC)cc2)CC1] | SA-5 |
| 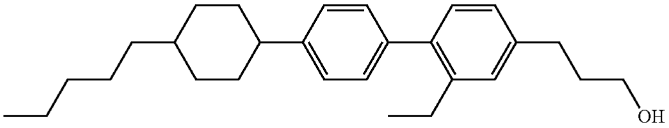 [SMILES: CCCCCC1CCC(c2ccc(-c3ccc(CCCO)cc3CC)cc2)CC1] | SA-6 |
| 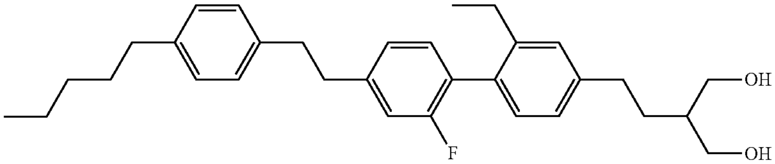 [SMILES: CCCCCc1ccc(CCc2ccc(-c3ccc(CCC(CO)CO)cc3CC)c(F)c2)cc1] | SA-7 |
| 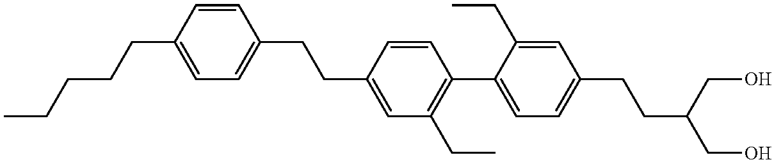 [SMILES: CCCCCc1ccc(CCc2ccc(-c3ccc(CCC(CO)CO)cc3CC)c(CC)c2)cc1] | SA-8 |
| 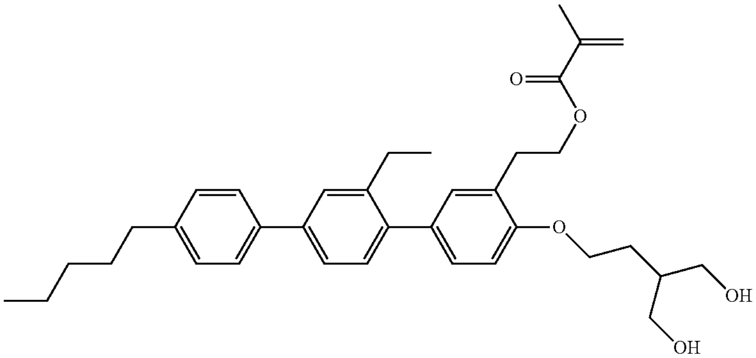 [SMILES: C=C(C)C(=O)OCCc1cc(-c2ccc(-c3ccc(CCCCC)cc3)cc2CC)ccc1OCCC(CO)CO] | SA-9 |
| 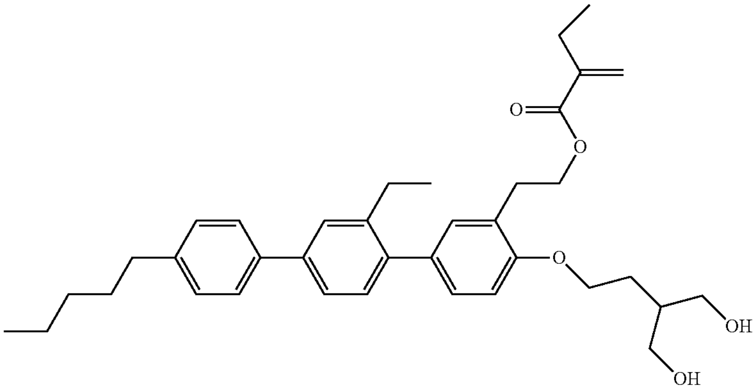 [SMILES: C=C(CC)C(=O)OCCc1cc(-c2ccc(-c3ccc(CCCCC)cc3)cc2CC)ccc1OCCC(CO)CO] | SA-10 |

TABLE I-continued
Table I shows self-alignment additives for vertical alignment which can be used in LC media for SA-FFS, SA-HB-FFS and SA-XB-FFS displays according to the present invention:
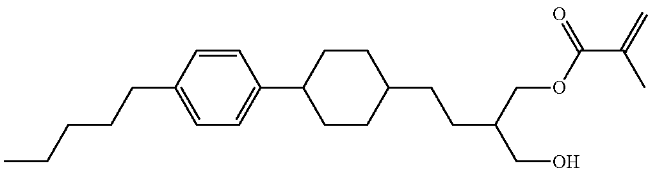 [SMILES: C=C(C)C(=O)OCC(CO)CCC1CCC(c2ccc(CCCCC)cc2)CC1]
SA-11
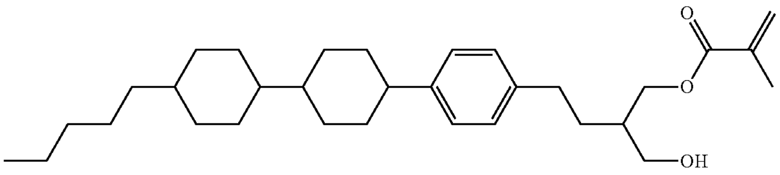 [SMILES: C=C(C)C(=O)OCC(CO)CCc1ccc(C2CCC(C3CCC(CCCCC)CC3)CC2)cc1]
SA-12
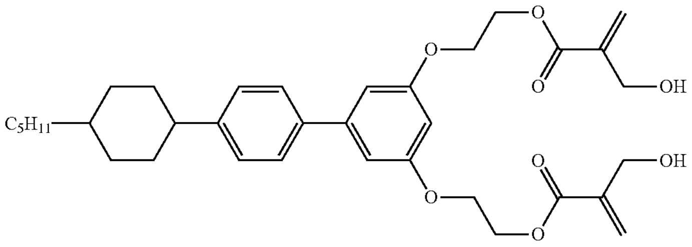
SA-13
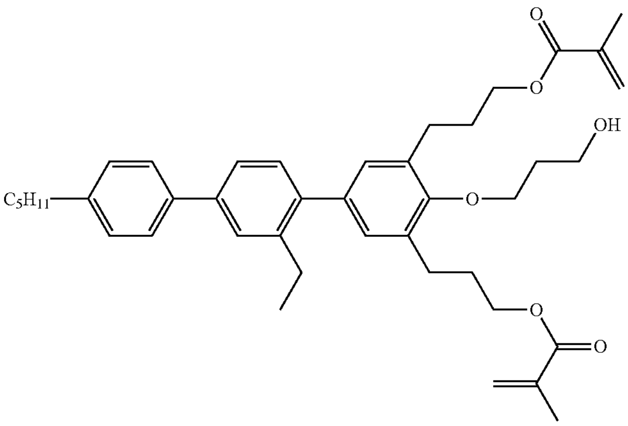
SA-14
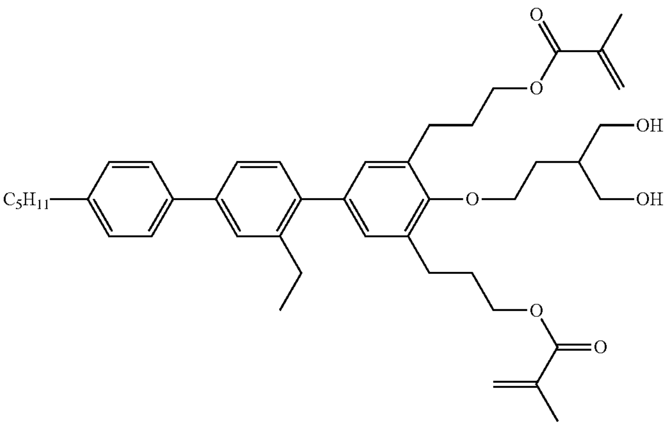
SA-15

TABLE I-continued
Table I shows self-alignment additives for vertical alignment which can be used in LC media for SA-FFS, SA-HB-FFS and SA-XB-FFS displays according to the present invention:
SA-16
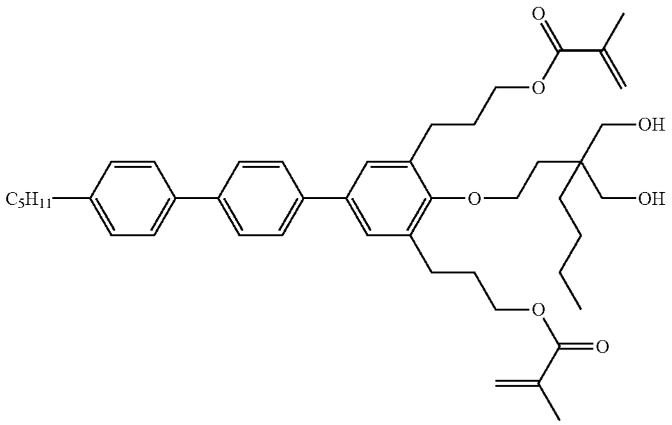
SA-17
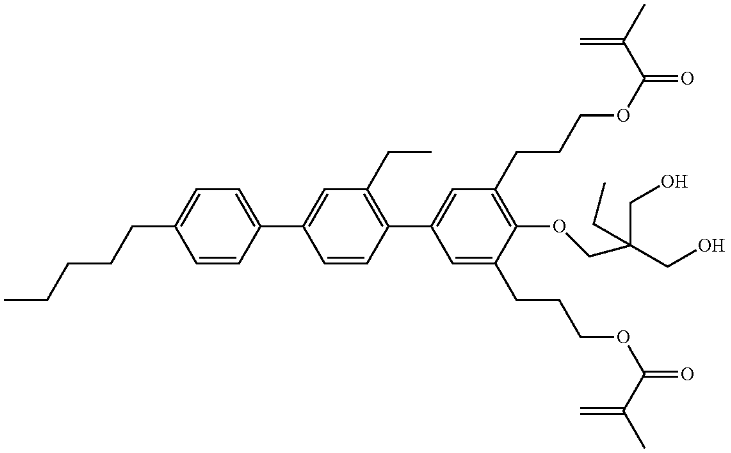 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-18
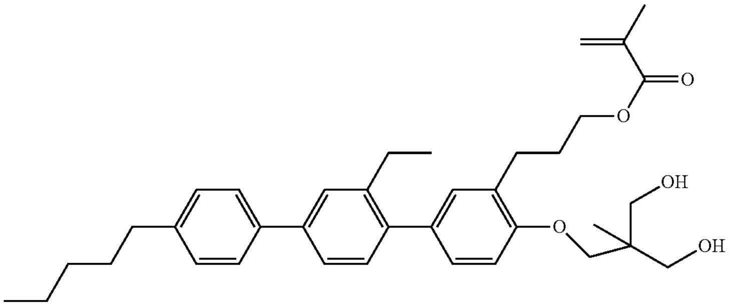 [SMILES: C=C(C)C(=O)OCCCc1cc(-c2ccc(-c3ccc(CCCCC)cc3)cc2CC)ccc1OCC(C)(CO)CO]

TABLE I-continued
Table I shows self-alignment additives for vertical alignment which can be used in LC media for SA-FFS, SA-HB-FFS and SA-XB-FFS displays according to the present invention:
SA-19
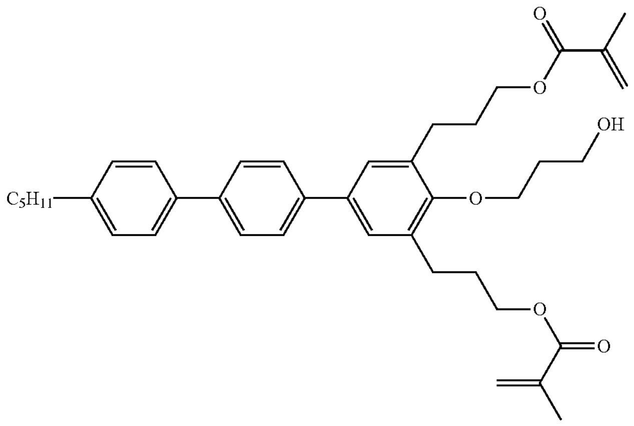
SA-20
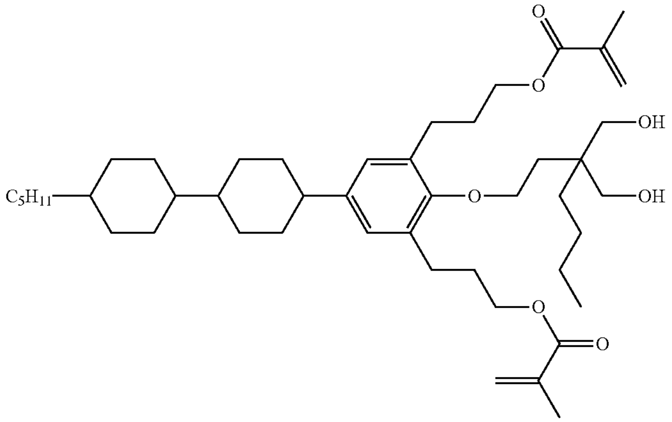
SA-21
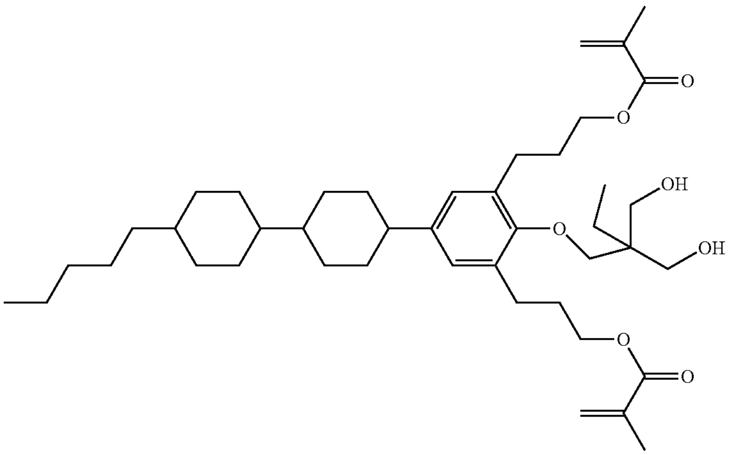 [SMILES: C=C(C)C(=O)OCCCc1cc(C2CCC(C3CCC(CCCCC)CC3)CC2)cc(CCCOC(=O)C(=C)C)c1OCC(CC)(CO)CO]

TABLE I-continued
| Table I shows self-alignment additives for vertical alignment which can be used in LC media for SA-FFS, SA-HB-FFS and SA-XB-FFS displays according to the present invention: |
|---|
| SA-22 |
| 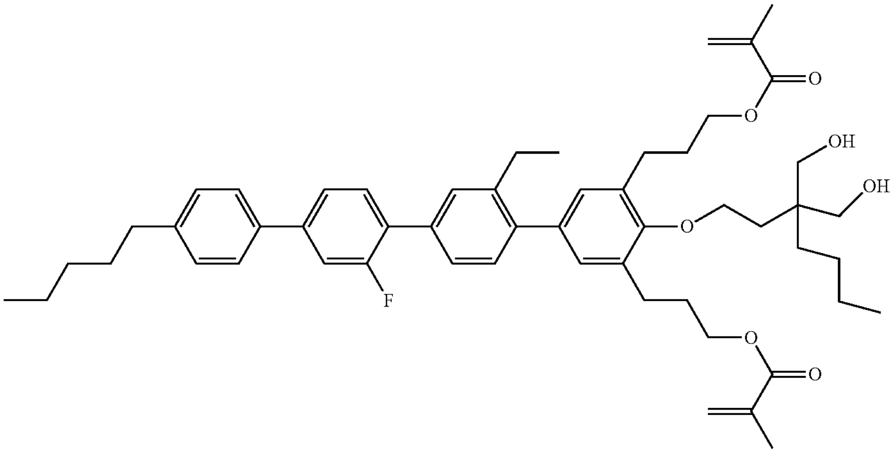 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC] |
| SA-23 |
| 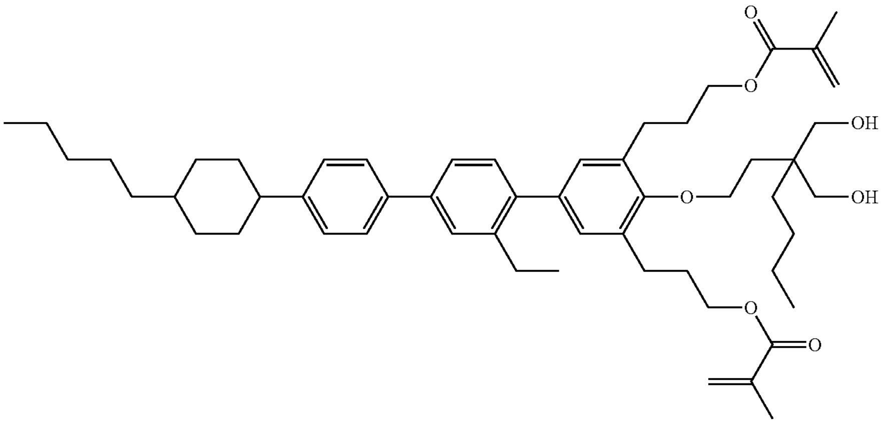 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC] |
| SA-24 |
| 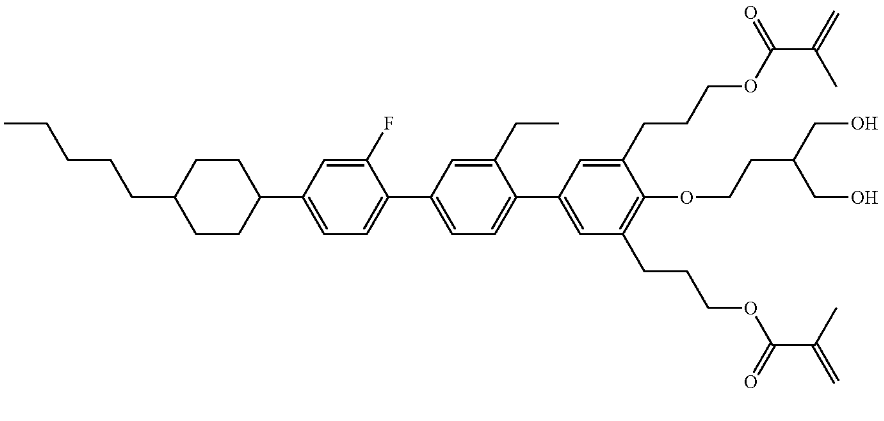 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO] |

TABLE I-continued
| Table I shows self-alignment additives for vertical alignment which can be used in LC media for SA-FFS, SA-HB-FFS and SA-XB-FFS displays according to the present invention: |
| --- |
| 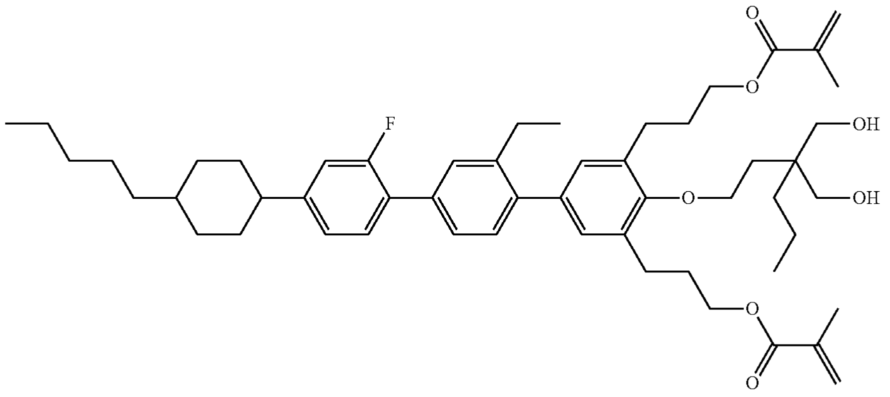 SA-25 |
| 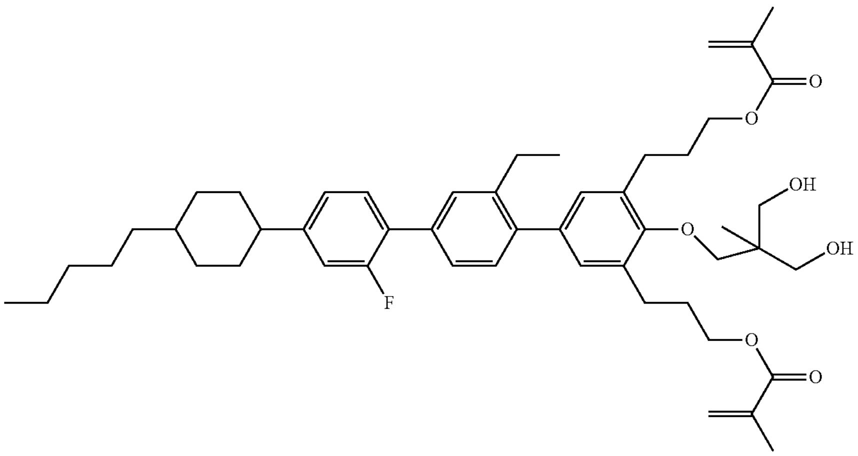 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO] SA-26 |
| 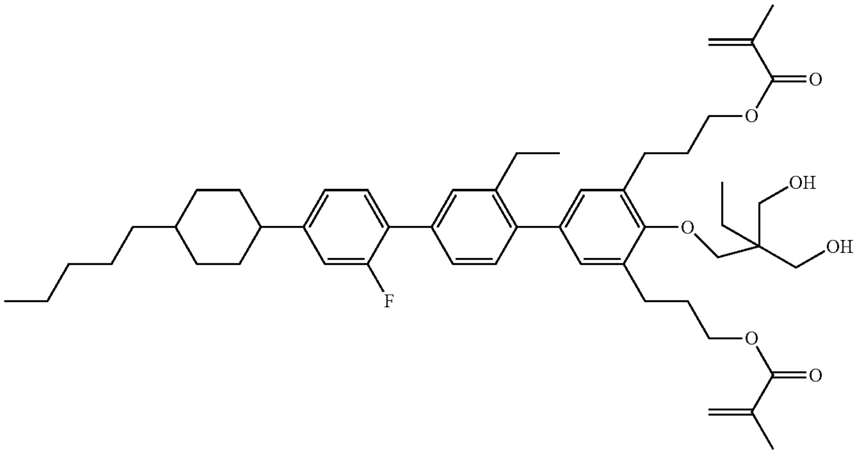 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO] SA-27 |

TABLE I-continued
Table I shows self-alignment additives for vertical alignment which can be used in LC media for SA-FFS, SA-HB-FFS and SA-XB-FFS displays according to the present invention:
SA-28
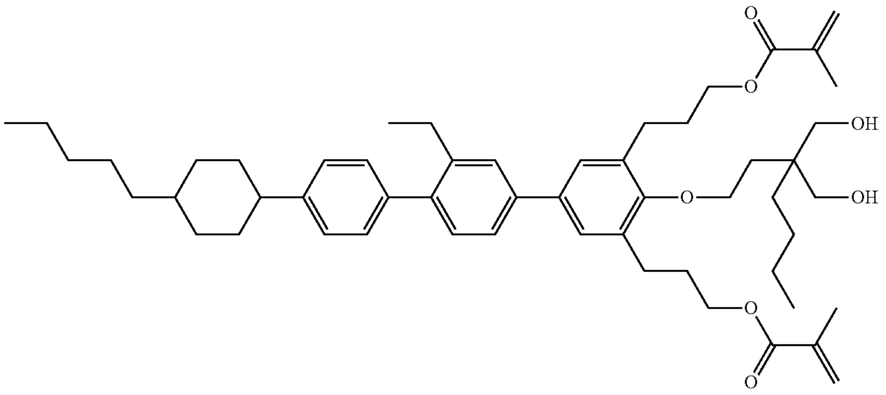 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-29
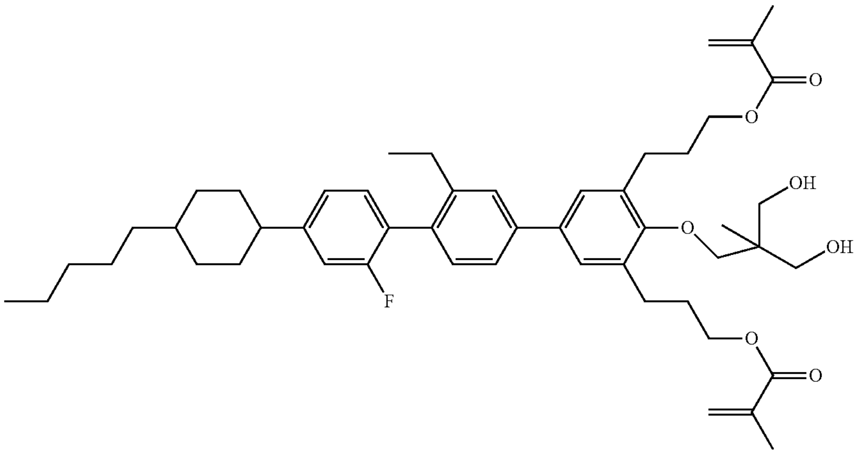 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]
SA-30
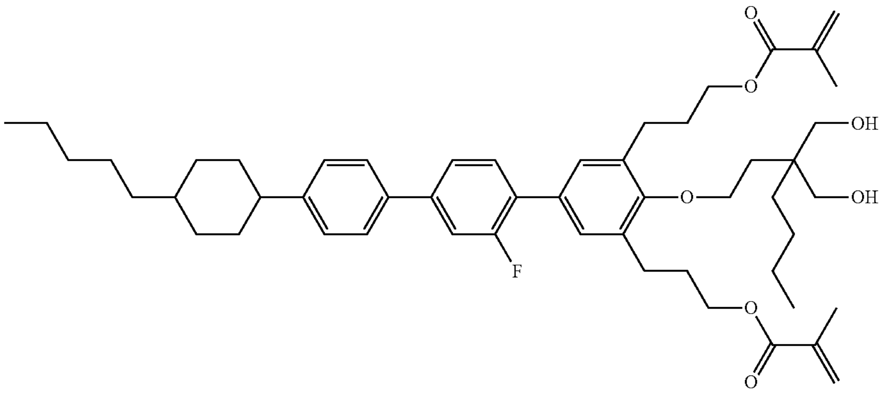 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]

TABLE I-continued
Table I shows self-alignment additives for vertical alignment which can be used in LC media for SA-FFS, SA-HB-FFS and SA-XB-FFS displays according to the present invention:
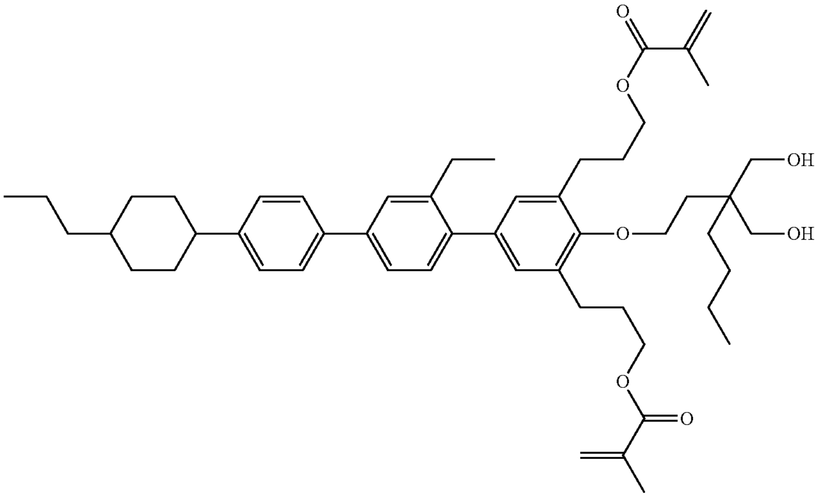 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-31
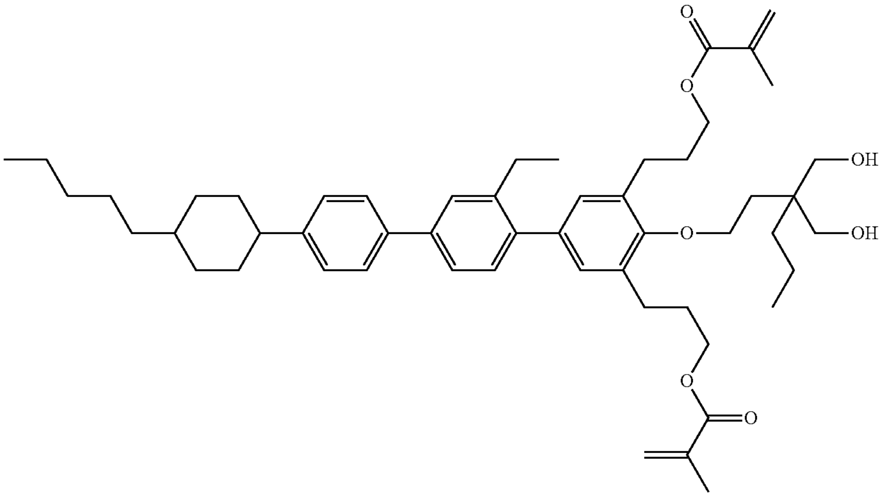 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]
SA-32
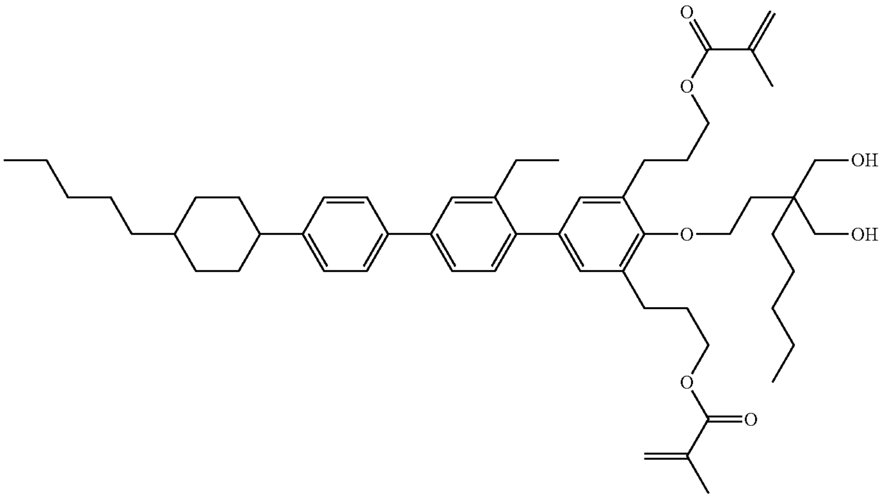 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-33

TABLE I-continued
| Table I shows self-alignment additives for vertical alignment which can be used in LC media for SA-FFS, SA-HB-FFS and SA-XB-FFS displays according to the present invention: |
|---|
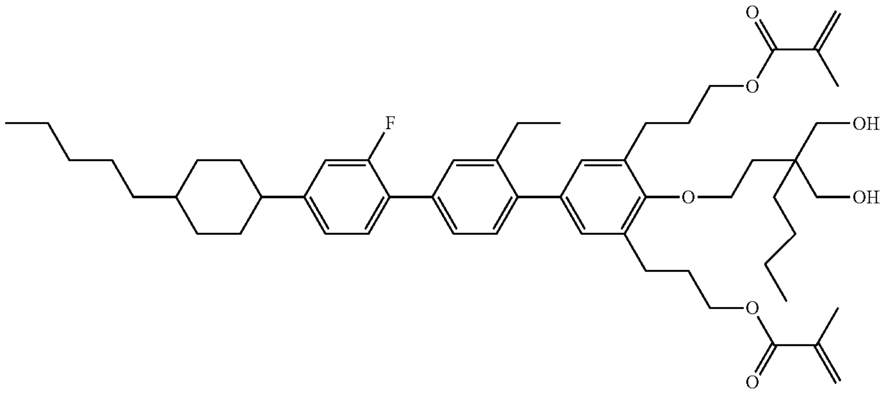 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]
SA-34
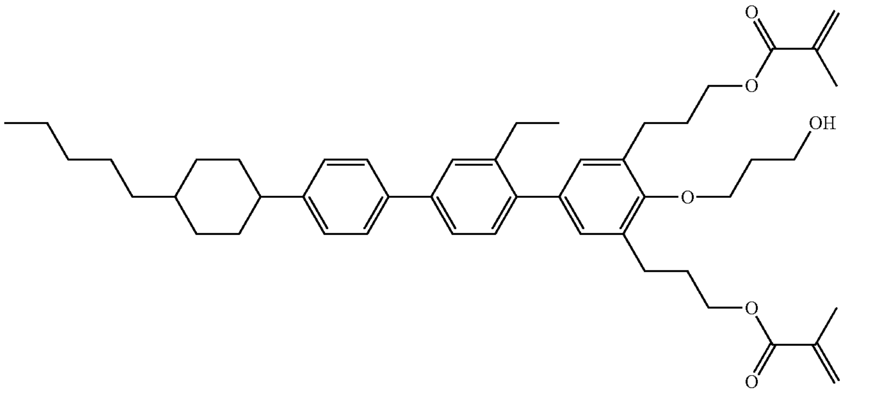 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-35
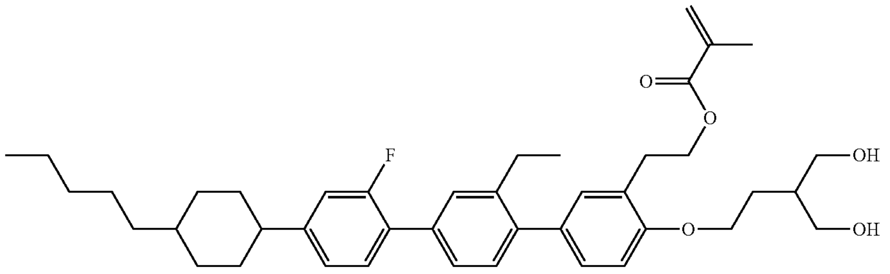 [SMILES: C=C(C)C(=O)OCCc1cc(-c2ccc(-c3ccc(C4CCC(CCCCC)CC4)cc3F)cc2CC)ccc1OCCC(CO)CO]
SA-36
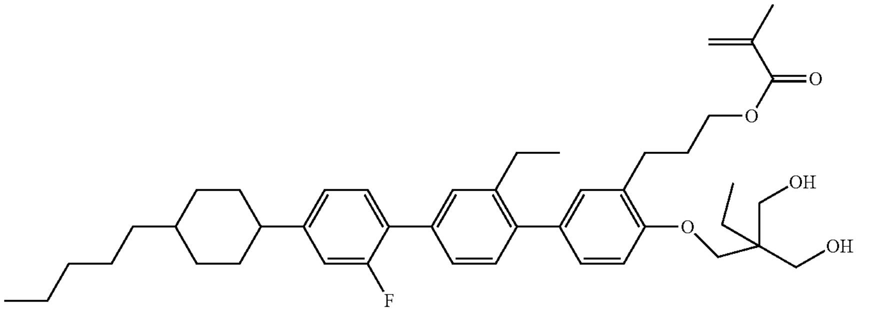 [SMILES: C=C(C)C(=O)OCCCc1cc(-c2ccc(-c3ccc(C4CCC(CCCCC)CC4)cc3F)cc2CC)ccc1OCC(CC)(CO)CO]
SA-37

TABLE I-continued
Table I shows self-alignment additives for vertical alignment which can be used in LC media for SA-FFS, SA-HB-FFS and SA-XB-FFS displays according to the present invention:
SA-38
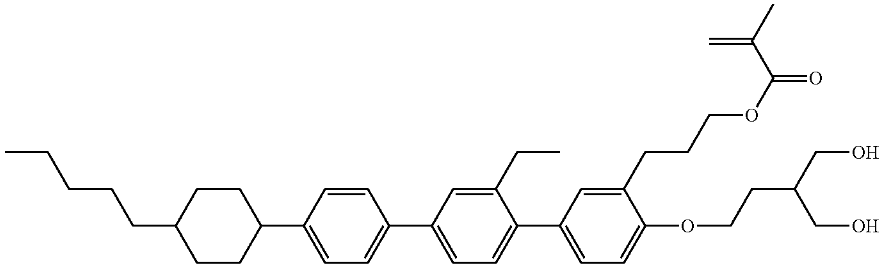 [SMILES: C=C(C)C(=O)OCCCc1cc(-c2ccc(-c3ccc(C4CCC(CCCCC)CC4)cc3)cc2CC)ccc1OCCC(CO)CO]
SA-39
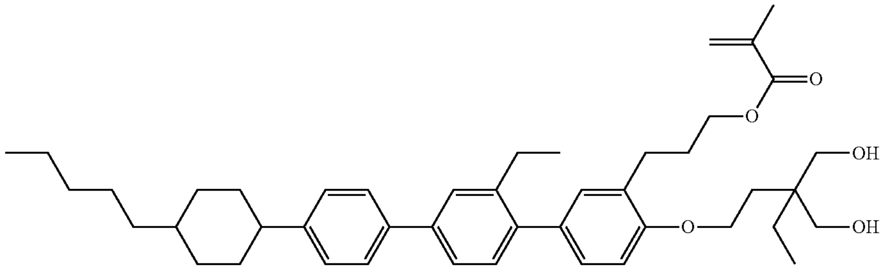 [SMILES: C=C(C)C(=O)OCCCc1cc(-c2ccc(-c3ccc(C4CCC(CCCCC)CC4)cc3)cc2CC)ccc1OCCC(CC)(CO)CO]
SA-40
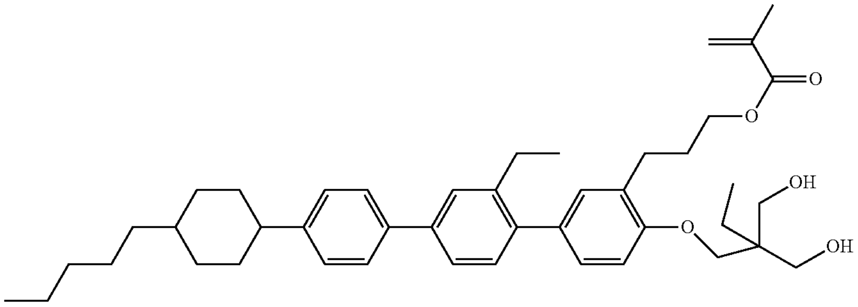 [SMILES: C=C(C)C(=O)OCCCc1cc(-c2ccc(-c3ccc(C4CCC(CCCCC)CC4)cc3)cc2CC)ccc1OCC(CC)(CO)CO]
SA-41
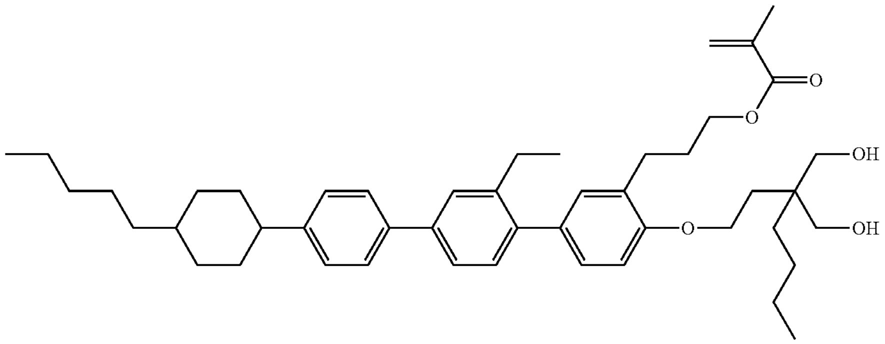 [SMILES: C=C(C)C(=O)OCCCc1cc(-c2ccc(-c3ccc(C4CCC(CCCCC)CC4)cc3)cc2CC)ccc1OCCC(CO)(CO)CCCC]
SA-42
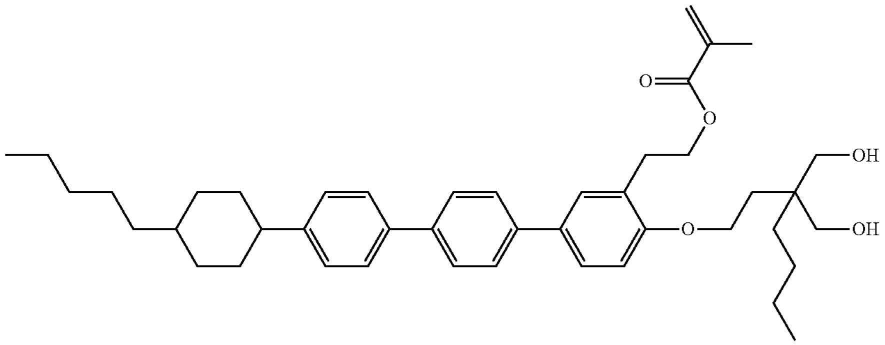 [SMILES: C=C(C)C(=O)OCCc1cc(-c2ccc(-c3ccc(C4CCC(CCCCC)CC4)cc3)cc2)ccc1OCCC(CO)(CO)CCCC]

TABLE I-continued
Table I shows self-alignment additives for vertical alignment which can be used in LC media for SA-FFS, SA-HB-FFS and SA-XB-FFS displays according to the present invention:
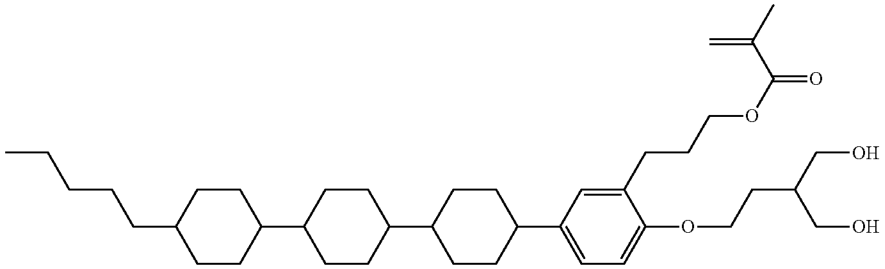 [SMILES: C=C(C)C(=O)OCCCc1cc(C2CCC(C3CCC(C4CCC(CCCCC)CC4)CC3)CC2)ccc1OCCC(CO)CO]
SA-43
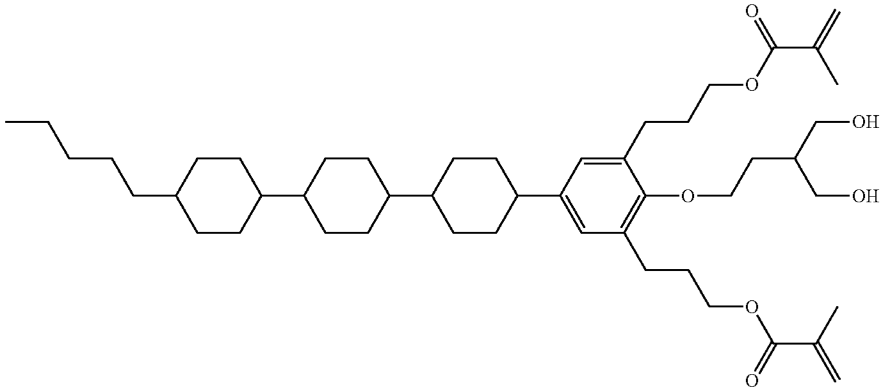 [SMILES: C=C(C)C(=O)OCCCc1cc(C2CCC(C3CCC(C4CCC(CCCCC)CC4)CC3)CC2)cc(CCCOC(=O)C(=C)C)c1OCCC(CO)CO]
SA-44
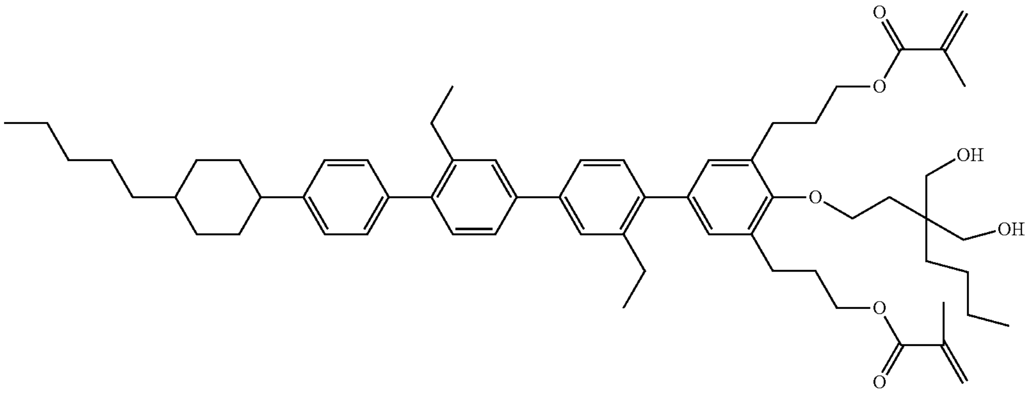 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]
SA-45
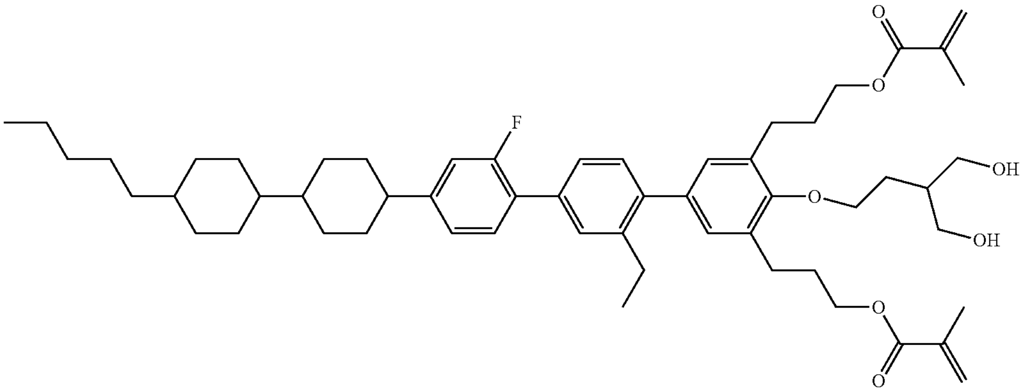 [SMILES: C=C(C)C(=O)OCCCc1cc(-c2ccc(-c3ccc(C4CCC(C5CCC(CCCCC)CC5)CC4)cc3F)cc2CC)cc(CCCOC(=O)C(=C)C)c1OCCC(CO)CO]
SA-46

TABLE I-continued

Table I shows self-alignment additives for vertical alignment which can be used in LC media for SA-FFS, SA-HB-FFS and SA-XB-FFS displays according to the present invention:

SA-47

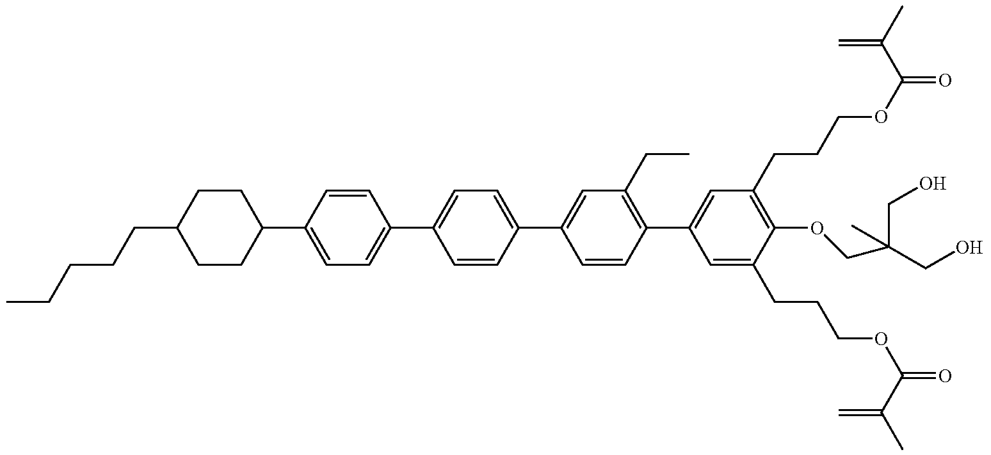 [SMILES: C=C(C)C(=O)OCCCc1cc(-c2ccc(-c3ccc(-c4ccc(C5CCC(CCCCC)CC5)cc4)cc3)cc2CC)cc(CCCOC(=O)C(=C)C)c1OCC(C)(CO)CO]

SA-48

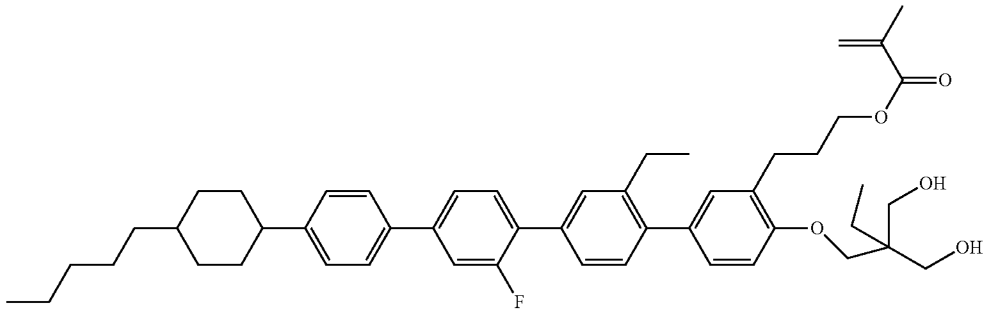 [SMILES: C=C(C)C(=O)OCCCc1cc(-c2ccc(-c3ccc(-c4ccc(C5CCC(CCCCC)CC5)cc4)cc3F)cc2CC)ccc1OCC(CC)(CO)CO]

SA-49

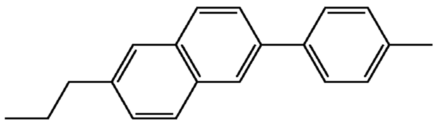 [SMILES: CCCc1ccc2cc(-c3ccc(C)cc3)ccc2c1]

In a preferred embodiment, the LC media, SA-VA and SA-FFS displays according to the present invention com¬prise one or more SA additives selected from the Formulae SA-1 to SA-49, preferably from the Formulae SA-14 to SA-49, very preferably from the Formulae SA-20 to SA-34 and SA-44, in combination with one or more RMs.

The following examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, the following symbols are used

| | |
|---|---|
| $V_0$ | Freedericks threshold voltage, capacitive [V] at 20° C., |
| $V_{10}$ | voltage [V] for 10% transmission, |
| $n_e$ | extraordinary refractive index measured at 20° C. and 589 nm, |
| $n_0$ | ordinary refractive index measured at 20° C. and 589 nm, |
| $\Delta n$ | optical anisotropy measured at 20° C. and 589 nm, |
| $\varepsilon_\perp$ | dielectric susceptibility (or "dielectric constant") perpendicular to the to the longitudinal axes of the molecules at 20° C. and 1 kHz, |

-continued

| | |
|---|---|
| $\varepsilon_\parallel$ | dielectric susceptibility (or "dielectric constant") parallel to the to the longitudinal axes of the molecules at 20° C. and 1 kHz, |
| $\Delta\varepsilon$ | dielectric anisotropy at 20° C. and 1 kHz, |
| cl. p. or T(N, I) | clearing point [° C.], |
| ν | flow viscosity measured at 20° C. [$mm^2 \cdot s^{-1}$], |
| $\gamma_1$ | rotational viscosity measured at 20° C. [mPa · s], |
| $K_1$ | elastic constant, "splay" deformation at 20° C. [pN], |
| $K_2$ | elastic constant, "twist" deformation at 20° C. [pN], |
| $K_3$ | elastic constant, "bend" deformation at 20° C. [pN], and |
| VHR | voltage holding ratio. |

All physical properties are determined in accordance with "Merck Liquid Crystals, Physical Properties of Liquid Crystals", status November 1997, Merck KGaA, Germany, and apply for a temperature of 20° C., unless explicitly indicated otherwise.

EXAMPLES

Example M1

A nematic LC medium is formulated as follows:

| Composition | | | |
|---|---|---|---|
| Nr. | Comp. | Conc., wt.-% | Properties |
| 1 | BCH-32 | 6.0 | T(N, I) = 80.7° C. |
| 2 | CC-3-V | 41.0 | Δn (589 nm, 20° C.): = 0.1121 |
| 3 | CC-3-V1 | 6.0 | $\varepsilon_{\parallel}$ (1 kHz, 20° C.): = 10.1 |
| 4 | CCP-3-1 | 5.0 | $\varepsilon_{\perp}$ (1 kHz, 20° C.): = 3.3 |
| 5 | CLU-3-F | 10.0 | Δε (1 kHz, 20° C.): = 6.8 |
| 6 | PGP-2-3 | 5.0 | $\gamma_1$ (20° C.): = 61 mPa · s |
| 7 | PGP-2-4 | 2.0 | $K_1$ (20° C.): = 13.2 pN |
| 8 | PGUQU-3-F | 5.0 | $K_3$ (20° C.): = 13.5 pN |
| 9 | PGUQU-4-F | 6.0 | $V_0$ (20° C.): = 1.47 V |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

Mixture Example S1 (Stabilised with Compounds of Formulae ST-2-3 and H-3-3)

A nematic LC mixture according to the invention is formulated as follows:

| Mixture M1 | 99.935 wt.-% |
|---|---|
| Compound of Formula ST-2-3 | 500 ppm |
| Compound of Formula H-3-3 | 150 ppm |

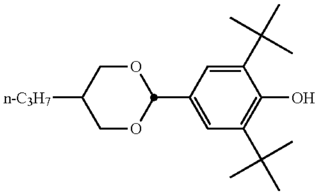

ST-2-3

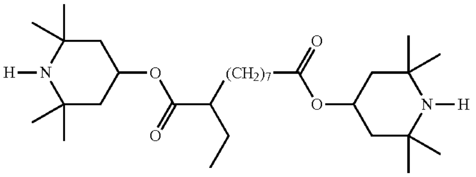

H-3-3

Example M2

A nematic $L^9$ medium is formulated as follows:

| Composition | | | |
|---|---|---|---|
| Nr. | Comp. | Conc., wt.-% | Properties |
| 1 | BCH-32 | 9.0 | T(N, I) = 78.8° C. |
| 2 | CC-3-V | 39.5 | Δn (589 nm, 20° C.): = 0.1141 |
| 3 | CC-3-V1 | 6.5 | $\varepsilon_{\parallel}$ (1 kHz, 20° C.): = 10.2 |
| 4 | CCP-3-1 | 5.0 | $\varepsilon_{\perp}$ (1 kHz, 20° C.): = 3.1 |
| 5 | CLU-3-F | 9.5 | Δε (1 kHz, 20° C.): = 7.2 |
| 6 | PGP-2-3 | 2.5 | $\gamma_1$ (20° C.): = 64 mPa · s |

-continued

| Composition | | | |
|---|---|---|---|
| Nr. | Comp. | Conc., wt.-% | Properties |
| 7 | PGP-2-4 | 5.0 | $K_1$ (20° C.): = 13.7 pN |
| 8 | PGUQU-3-F | 5.0 | $K_3$ (20° C.): = 13.6 pN |
| 9 | PGUQU-4-F | 5.0 | $V_0$ (20° C.): = 1.46 V |
| 10 | PGUQU-5-F | 3.5 | |
| 11 | PPGU-3-F | 1.0 | |
| 12 | PUQU-3-F | 8.5 | |

Mixture Example $S^2$ (Stabilised with Compounds of Formulae ST-2-3 and H-3-3)

A nematic LC mixture according to the invention is formulated as follows:

| Mixture M2 | 99.935 wt.-% |
|---|---|
| Compound of Formula ST-2-3 | 500 ppm |
| Compound of Formula H-3-3 | 150 ppm |

Example M3

A nematic LC medium is formulated as follows:

| Composition | | | |
|---|---|---|---|
| Nr. | Comp. | Conc., wt.-% | Properties |
| 1 | APUQU-3-F | 5.5 | T(N, I) = 76.3° C. |
| 2 | CC-3-V | 35.0 | Δn (589 nm, 20° C.): = 0.1097 |
| 3 | CC-3-V1 | 4.5 | $\varepsilon_{\parallel}$ (1 kHz, 20° C.): = 15.2 |
| 4 | CCP-3-1 | 7.0 | $\varepsilon_{\perp}$ (1 kHz, 20° C.): = 3.5 |
| 5 | CCP-30CF3 | 5.5 | Δε (1 kHz, 20° C.): = 11.7 |
| 6 | CLP-3-T | 1.0 | $\gamma_1$ (20° C.): = 76 mPa · s |
| 7 | CLU-3-F | 11.0 | $K_1$ (20° C.): = 12.2 pN |
| 8 | PGU-2-F | 5.0 | $K_3$ (20° C.): = 13.1 pN |
| 9 | PGU-3-F | 1.0 | $V_0$ (20° C.): = 1.07 V |
| 10 | PGUQU-3-F | 5.5 | |
| 11 | PGUQU-4-F | 7.5 | |
| 12 | PGUQU-5-F | 2.5 | |
| 13 | PPGU-3-F | 1.0 | |
| 14 | PUQU-3-F | 8.0 | |

Mixture Example S3 (Stabilised with Compounds of Formula ST-2-3)

A nematic LC mixture according to the invention is formulated as follows:

| Mixture M3 | 99.95 wt.-% |
|---|---|
| Compound of Formula ST-2-3 | 500 ppm |

Mixture Example S3a (Stabilised with Compounds of Formula ST-1-8)

A nematic LC mixture according to the invention is formulated as follows:

| Mixture M3 | 99.95 wt.- % |
|---|---|
| Compound of Formula ST-1-8 | 500 ppm |

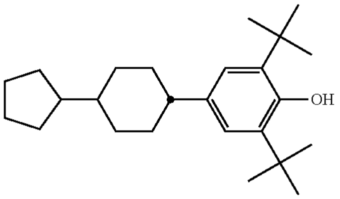

ST-1-8

Example M4

A nematic LC medium is formulated as follows:

| Composition | | | |
|---|---|---|---|
| Nr. | Comp. | Conc., wt.-% | Properties |
| 1 | CC-3-2V1 | 4.0 | T(N, I) = 93.3° C. |
| 2 | CC-3-V | 30.0 | Δn (589 nm, 20° C.): = 0.1120 |
| 3 | CC-3-V1 | 8.0 | $\varepsilon_{\parallel}$ (1 kHz, 20° C.): = 2.9 |
| 4 | CCP-3-1 | 5.0 | $\varepsilon_{\perp}$ (1 kHz, 20° C.): = 6.3 |
| 5 | CCP-30CF3 | 3.0 | Δε (1 kHz, 20° C.): = 6.8 |
| 6 | CCP-V2-1 | 3.0 | $\gamma_1$ (20° C.): = 76 mPa · s |
| 7 | CDUQU-3-F | 6.0 | $K_1$ (20° C.): = 18.5 pN |
| 8 | CLP-3-T | 5.0 | $K_3$ (20° C.): = 17.7 pN |
| 9 | CLP-V-1 | 5.0 | $V_0$ (20° C.): = 1.81 V |
| 10 | CLU-3-F | 5.0 | |
| 11 | DGUQU-4-F | 5.0 | |
| 12 | DLGU-3-F | 2.0 | |
| 13 | DPGU-4-F | 3.0 | |
| 14 | PGP-2-2V | 6.0 | |
| 15 | PP-1-2V1 | 8.5 | |
| 16 | PGUQU-3-F | 1.5 | |

Mixture Example S4 (Stabilised with Compounds of Formulae ST-2-3 and H-3-11)

A nematic LC mixture according to the invention is formulated as follows:

| Mixture M4 | 99.955 wt.-% |
|---|---|
| Compound of Formula ST-2-3 | 400 ppm |
| Compound of Formula H-3-11 | 50 ppm |

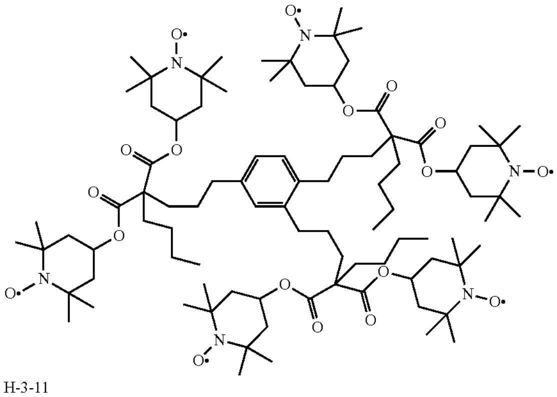

H-3-11

Example M5

A nematic LC medium is formulated as follows:

| Composition | | | |
|---|---|---|---|
| Nr. | Comp. | Conc., wt.-% | Properties |
| 1 | CC-3-2V1 | 4.0 | T(N, I) = 93.2° C. |
| 2 | CC-3-V | 30.0 | Δn (589 nm, 20° C.): = 0.1096 |
| 3 | CC-3-V1 | 8.0 | $\varepsilon_{\parallel}$ (1 kHz, 20° C.): = 9.6 |
| 4 | CCP-3-1 | 5.0 | $\varepsilon_{\perp}$ (1 kHz, 20° C.): = 3.0 |
| 5 | CCP-30CF3 | 3.0 | Δε (1 kHz, 20° C.): = 6.7 |
| 6 | CCP-V2-1 | 3.0 | $\gamma_1$ (20° C.): = 79 mPa · s |
| 7 | CDUQU-3-F | 6.0 | $K_1$ (20° C.): = 18.7 pN |
| 8 | CLP-3-T | 5.0 | $K_3$ (20° C.): = 18.1 pN |
| 9 | CLP-V-1 | 5.0 | $V_0$ (20° C.): = 1.77 V |
| 10 | CLU-3-F | 5.0 | |
| 11 | DGUQU-4-F | 5.0 | |
| 12 | DLGU-3-F | 2.0 | |
| 13 | DPGU-4-F | 3.0 | |
| 14 | PGP-2-2V | 5.0 | |
| 15 | PP-1-2V1 | 8.5 | |
| 16 | APUQU-3-F | 2.5 | |

Mixture Example S5 (Stabilised with Compounds of Formulae ST-2-3 and H-3-11)

A nematic LC mixture according to the invention is formulated as follows:

| Mixture M5 | 99.955 wt.-% |
|---|---|
| Compound of Formula ST-2-3 | 400 ppm |
| Compound of Formula H-3-11 | 50 ppm |

Example M6

A nematic LC medium is formulated as follows:

| Composition | | | |
|---|---|---|---|
| Nr. | Comp. | Conc., wt.-% | Properties |
| 1 | CC-3-2V1 | 4.0 | T(N, I) = 93.1° C. |
| 2 | CC-3-V | 30.0 | Δn (589 nm, 20° C.): = 0.1092 |
| 3 | CC-3-V1 | 8.0 | $\varepsilon_{\parallel}$ (1 kHz, 20° C.): = 9.8 |
| 4 | CCP-3-1 | 5.0 | $\varepsilon_{\perp}$ (1 kHz, 20° C.): = 2.9 |
| 5 | CCP-30CF3 | 3.0 | Δε (1 kHz, 20° C.): = 6.9 |
| 6 | CCP-V2-1 | 3.0 | $\gamma_1$ (20° C.): = 81 mPa · s |
| 7 | CDUQU-3-F | 7.5 | $K_1$ (20° C.): = 18.6 pN |
| 8 | CLP-3-T | 5.0 | $K_3$ (20° C.): = 18.1 pN |
| 9 | CLP-V-1 | 5.0 | $V_0$ (20° C.): = 1.74 V |
| 10 | CLU-3-F | 5.0 | |
| 11 | DGUQU-4-F | 5.0 | |
| 12 | DLGU-3-F | 2.0 | |
| 13 | DPGU-4-F | 3.0 | |
| 14 | PGP-2-2V | 4.5 | |
| 15 | PGUQU-3-F | 1.5 | |
| 16 | PP-1-2V1 | 8.5 | |

Mixture Example S6 (Stabilised with Compounds of Formulae ST-2-3 and H-3-11)

A nematic LC mixture according to the invention is formulated as follows:

| Mixture M6 | 99.955 wt.-% |
|---|---|
| Compound of Formula ST-2-3 | 400 ppm |
| Compound of Formula H-3-11 | 50 ppm |

Example M7

A nematic LC medium is formulated as follows:

| Composition | | | |
|---|---|---|---|
| Nr. | Comp. | Conc., wt.-% | Properties |
| 1 | APUQU-3-F | 4.9 | T(N, I) = 106° C. |
| 2 | CC-3-2V1 | 2.0 | Δn (589 nm, 20° C.):= |
| 3 | CC-3-V | 22.5 | $\varepsilon_{\parallel}$ (1 kHz, 20° C.):= |
| 4 | CC-3-V1 | 7.4 | $\varepsilon_{\perp}$ (1 kHz, 20° C.):= |
| 5 | CCP-V-1 | 15.0 | Δε (1 kHz, 20° C.):= |
| 6 | CCP-V2-1 | 6.6 | $\gamma_1$ (20° C.): = mPa · s |
| 7 | CCVC-3-V | 4.2 | $K_1$ (20° C.): = pN |
| 8 | CDUQU-3-F | 10.0 | $K_3$ (20° C.): = pN |
| 9 | CLP-V-1 | 6.0 | $V_0$ (20° C.): = V |
| 10 | PCH-302 | 3.0 | |
| 11 | PGP-1-2V | 6.0 | |
| 12 | PGP-3-2V | 3.9 | |
| 13 | PP-1-2V1 | 8.5 | |

Mixture Example S7 (Stabilised with Compounds of Formula ST-1-3)

A nematic LC mixture according to the invention is formulated as follows:

| Mixture M7 | 99.97 wt.-% |
|---|---|
| Compound of Formula ST-1-3 | 300 ppm |

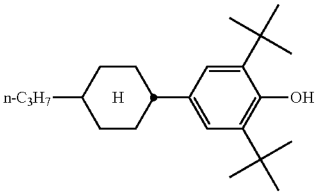

ST-1-3

Example M8

A nematic LC medium is formulated as follows:

| Composition | | | |
|---|---|---|---|
| Nr. | Comp. | Conc., wt.-% | Properties |
| 1 | APUQU-3-F | 5.0 | T(N, I) = ° C. |
| 2 | BCH-32 | 6.0 | Δn (589 nm, 20° C.):= |
| 3 | BCH-3F.F | 1.0 | $\varepsilon_{\parallel}$ (1 kHz, 20° C.):= |
| 4 | CC-3-V | 48.0 | $\varepsilon_{\perp}$ (1 kHz, 20° C.):= |
| 5 | CCP-V-1 | 14.0 | Δε (1 kHz, 20° C.):= |
| 6 | PGU-2-F | 2.3 | $\gamma_1$ (20° C.): = mPa · s |
| 7 | PGUQU-3-F | 4.6 | $K_1$ (20° C.): = pN |
| 8 | PGUQU-4-F | 2.1 | $K_3$ (20° C.): = pN |
| 9 | PP-1-2V1 | 2.5 | $V_0$ (20° C.): = V |
| 10 | PUQU-3-F | 7.5 | |
| 11 | PYP-2-3 | 4.0 | |
| 12 | CLU-3-F | 3.0 | |

Mixture Example S8 (Stabilised with Compounds of Formula ST-1-3)

A nematic LC mixture according to the invention is formulated as follows:

| Mixture M8 | 99.97 wt.-% |
|---|---|
| Compound of Formula ST-1-3 | 300 ppm |

Example M9

A nematic LC medium is formulated as follows:

| Composition | | | |
|---|---|---|---|
| Nr. | Comp. | Conc., wt.-% | Properties |
| 1 | BCH-3F.F | 2.5 | T(N, I) = ° C. |
| 2 | CC-3-V | 50.0 | Δn (589 nm, 20° C.):= |
| 3 | CCP-V-1 | 14.0 | $\varepsilon_{\parallel}$ (1 kHz, 20° C.):= |
| 4 | CLU-3-F | 9.5 | $\varepsilon_{\perp}$ (1 kHz, 20° C.):= |
| 5 | PGU-2-F | 6.0 | Δε (1 kHz, 20° C.):= |
| 6 | PGUQU-3-F | 6.0 | $\gamma_1$ (20° C.): = mPa · s |
| 7 | PGUQU-4-F | 6.0 | $K_1$ (20° C.): = pN |
| 8 | PP-1-2V1 | 1.5 | $K_3$ (20° C.): = pN |
| 9 | PYP-2-3 | 4.5 | $V_0$ (20° C.): = V |

Mixture Example S9 (Stabilised with Compounds of Formula ST-1-3)

A nematic LC mixture according to the invention is formulated as follows:

| Mixture M9 | 99.97 wt.-% |
|---|---|
| Compound of Formula ST-1-3 | 300 ppm |

Example M10

A nematic LC medium is formulated as follows:

| Composition | | | |
|---|---|---|---|
| Nr. | Comp. | Conc., wt.-% | Properties |
| 1 | BCH-32 | 8.5 | T(N, I) = ° C. |
| 2 | BCH-3F.F | 8.0 | Δn (589 nm, 20° C.):= |
| 3 | CC-3-V | 49.0 | $\varepsilon_{\parallel}$ (1 kHz, 20° C.):= |
| 4 | CCP-V-1 | 2.5 | $\varepsilon_{\perp}$ (1 kHz, 20° C.):= |
| 5 | CLU-3-F | 13.0 | Δε (1 kHz, 20° C.):= |
| 6 | PGU-2-F | 1.0 | $\gamma_1$ (20° C.): = mPa · s |
| 7 | PGUQU-3-F | 6.5 | $K_1$ (20° C.): = pN |
| 8 | PGUQU-4-F | 6.5 | $K_3$ (20° C.): = pN |
| 9 | PP-1-2V1 | 3.0 | $V_0$ (20° C.): = V |
| 10 | PYP-2-3 | 2.0 | |

Mixture Example S10 (Stabilised with Compounds of Formula ST-1-3)

A nematic LC mixture according to the invention is formulated as follows:

| Mixture M10 | 99.97 wt.-% |
|---|---|
| Compound of Formula ST-1-3 | 300 ppm |

Example M11

A nematic LC medium is formulated as follows:

| Composition | | | |
|---|---|---|---|
| Nr. | Comp. | Conc., wt.-% | Properties |
| 1 | BCH-3F.F | 5.0 | T(N, I) = 81° C. |
| 2 | CC-3-V | 48.5 | Δn (589 nm, 20° C.):= |
| 3 | CCP-3-1 | 10.5 | $\varepsilon_{\parallel}$ (1 kHz, 20° C.): = 5.9 |
| 4 | CLU-3-F | 10.0 | $\varepsilon_{\perp}$ (1 kHz, 20° C.): = 3.5 |
| 5 | CPY-2-O2 | 7.0 | Δε (1 kHz, 20° C.): = 2.5 |
| 6 | CPY-3-O2 | 7.5 | $\gamma_1$ (20° C.): = 67 mPa · s |
| 7 | PGUQU-3-F | 6.0 | $K_1$ (20° C.): = 14.2 pN |
| 8 | PP-1-2V1 | 5.5 | $K_3$ (20° C.): = 15.5 pN |
| | | | $V_0$ (20° C.): = 2.54 V |

Mixture Example S11 (Stabilised with Compounds of Formulae ST-2-3 and H-3-3)

A nematic LC mixture according to the invention is formulated as follows:

| Mixture M11 | 99.92 wt.-% |
|---|---|
| Compound of Formula ST-2-3 | 500 ppm |
| Compound of Formula H-3-3 | 300 ppm |

Example M12

A nematic LC medium is formulated as follows:

| Composition | | | |
|---|---|---|---|
| Nr. | Comp. | Conc., wt.-% | Properties |
| 1 | BCH-32 | 3.5 | T(N, I) = 80° C. |
| 2 | BCH-3F.F | 6.0 | Δn (589 nm, 20° C.):= |
| 3 | CC-3-V | 49.0 | $\varepsilon_{\parallel}$ (1 kHz, 20° C.): = 6.4 |
| 4 | CCP-3-1 | 4.5 | $\varepsilon_{\perp}$ (1 kHz, 20° C.): = 3.6 |
| 5 | CLU-3-F | 10.0 | Δε (1 kHz, 20° C.): = 2.7 |
| 6 | CPY-2-O2 | 5.5 | $\gamma_1$ (20° C.): = 66 mPa · s |
| 7 | CPY-3-O2 | 10.0 | $K_1$ (20° C.): = 13.7 pN |
| 8 | PCH-302 | 1.5 | $K_3$ (20° C.): = 14.8 pN |
| 9 | PGUQU-3-F | 5.5 | $V_0$ (20° C.): = 2.37 V |
| 10 | PGUQU-4-F | 1.5 | LTS bulk (−20° C.): 1000 h |
| 11 | PP-1-2V1 | 3.0 | |

Mixture Example S12 (Stabilised with Compounds of Formulae ST-2-3 and H-3-3)

A nematic LC mixture according to the invention is formulated as follows:

| Mixture M12 | 99.92 wt.-% |
|---|---|
| Compound of Formula ST-2-3 | 500 ppm |
| Compound of Formula H-3-3 | 300 ppm |

Example M13

A nematic LC medium is formulated as follows:

| Composition | | | |
|---|---|---|---|
| Nr. | Comp. | Conc., wt.-% | Properties |
| 1 | BCH-32 | 9.0 | T(N, I) = 78.8° C. |
| 2 | CC-3-V | 39.5 | Δn (589 nm, 20° C.): = 0.1141 |
| 3 | CC-3-V1 | 6.5 | $\varepsilon_{\parallel}$ (1 kHz, 20° C.): = 10.2 |
| 4 | CCP-3-1 | 5.0 | $\varepsilon_{\perp}$ (1 kHz, 20° C.): = 3.1 |
| 5 | CLU-3-F | 9.5 | Δε (1 kHz, 20° C.): = 7.2 |
| 6 | PGP-2-3 | 2.5 | $\gamma_1$ (20° C.): = 64 mPa · s |
| 7 | PGP-2-4 | 5.0 | $K_1$ (20° C.): = 13.7 pN |
| 8 | PGUQU-3-F | 5.0 | $K_3$ (20° C.): = 14.6 pN |
| 9 | PGUQU-4-F | 5.0 | $V_0$ (20° C.): = 1.46 V |
| 10 | PGUQU-5-F | 3.5 | |
| 11 | PPGU-3-F | 1.0 | |
| 12 | PUQU-3-F | 8.5 | |

Mixture Example S13 (Stabilised with Compounds of Formulae ST-2-3 and H-3-3)

A nematic LC mixture according to the invention is formulated as follows:

| Mixture M13 | 99.935 wt.-% |
|---|---|
| Compound of Formula ST-2-3 | 500 ppm |
| Compound of Formula H-3-3 | 150 ppm |

Mixture Example S13a (Stabilised with Compound of Formula ST-2-3)

A nematic LC mixture according to the invention is formulated as follows:

| | |
|---|---|
| Mixture M13 | 99.95 wt.-% |
| Compound of Formula ST-2-3 | 500 ppm |

Example M14

A nematic LC medium is formulated as follows:

| Composition | | | |
|---|---|---|---|
| Nr. | Comp. | Conc., wt.-% | Properties |
| 1 | CC-3-V | 41.5 | T(N, I) = 79.5° C. |
| 2 | PUQU-3-F | 6.0 | Δn (589 nm, 20° C.): = 0.1145 |
| 3 | CCP-V-1 | 5.0 | $\varepsilon_{\parallel}$ (1 kHz, 20° C.): = 10.2 |
| 4 | CLU-3-F | 15.0 | $\varepsilon_{\perp}$ (1 kHz, 20° C.): = 3.1 |
| 5 | CCP-3-1 | 2.5 | Δε (1 kHz, 20° C.): = 7.1 |
| 6 | BCH-32 | 5.0 | $\gamma_1$ (20° C.): = 68 mPa · s |
| 7 | PGP-2-3 | 5.0 | $K_1$ (20° C.): = 13.6 pN |
| 8 | PGP-2-4 | 5.0 | $K_3$ (20° C.): = 13.6 pN |
| 9 | APUQU-3-F | 4.0 | $V_0$ (20° C.): = 1.46 V |
| 10 | PGUQU-3-F | 5.0 | |
| 11 | PGUQU-4-F | 4.0 | |
| 12 | PPGU-3-F | 1.0 | |
| 13 | PP-1-2V1 | 1.0 | |

Mixture Example S14 (Stabilised with Compounds of Formulae ST-2-3 and H-3-3)

A nematic LC mixture according to the invention is formulated as follows:

| | |
|---|---|
| Mixture M14 | 99.935 wt.-% |
| Compound of Formula ST-2-3 | 500 ppm |
| Compound of Formula H-3-3 | 150 ppm |

Example M15

A nematic LC medium is formulated as follows:

| Composition | | | |
|---|---|---|---|
| Nr. | Comp. | Conc., wt.-% | Properties |
| 1 | CC-3-V | 41.5 | T (N, I) = 80.0° C. |
| 2 | PUQU-3-F(1) | 6.0 | Δn (589 nm, 20° C.): = 0.1117 |
| 3 | CCP-V-1 | 5.0 | $\epsilon_{\parallel}$ (1 kHz, 20° C.): = 10.1 |
| 4 | CLU-3-F | 15.0 | $\epsilon_{\perp}$ (1 kHz, 20° C.): = 3.1 |
| 5 | CCP-3-1 | 2.5 | Δϵ (1 kHz, 20° C.): = 7.0 |
| 6 | BCH-32 | 5.0 | $\gamma_1$ (20° C.): = 77 mPa · s |
| 7 | PGP-2-3 | 5.0 | $K_1$ (20° C.): = 13.4 pN |
| 8 | PGP-2-4 | 5.0 | $K_3$ (20° C.): = 13.8 pN |
| 9 | APUQU-3-F(1) | 4.0 | $V_0$ (20° C.): = 1.49 V |

-continued

| Composition | | | |
|---|---|---|---|
| Nr. | Comp. | Conc., wt.-% | Properties |
| 10 | PGUQU-3-F(1) | 5.0 | |
| 11 | PGUQU-4-F(1) | 4.0 | |
| 12 | PPGU-3-F | 1.0 | |
| 13 | PP-1-2V1 | 1.0 | |

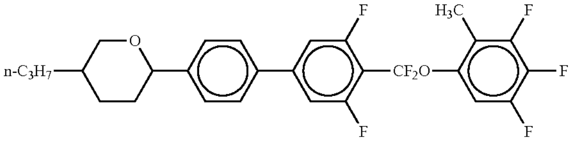

APUQU-3-F(1)

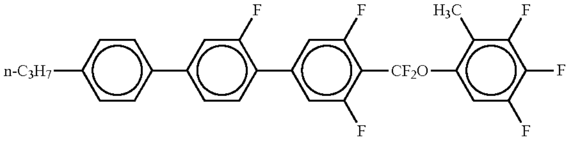

PGUQU-3-F(1)

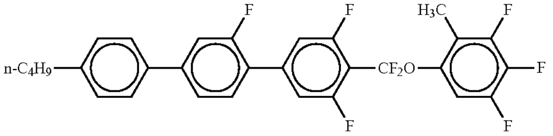

PGUQU-4-F(1)

Mixture Example S15 (Stabilised with Compounds of Formulae ST-2-3 and H-3-3)

A nematic LC mixture according to the invention is formulated as follows:

| | |
|---|---|
| Mixture M15 | 99.935 wt.-% |
| Compound of Formula ST-2-3 | 500 ppm |
| Compound of Formula H-3-3 | 150 ppm |

Example M16

A nematic LC medium is formulated as follows:

| Composition | | | |
|---|---|---|---|
| Nr. | Comp. | Conc., wt.-% | Properties |
| 1 | BCH-32 | 5.0 | T(N, I) = 81.4° C. |
| 2 | BCH-3F.F | 6.0 | Δn (589 nm, 20° C.): = 0.0998 |
| 3 | CC-3-V | 45.0 | $\varepsilon_{\parallel}$ (1 kHz, 20° C.): = 6.4 |
| 4 | CCH-23 | 4.0 | $\varepsilon_{\perp}$ (1 kHz, 20° C.): = 3.5 |
| 5 | CCP-3-1 | 10.0 | Δε (1 kHz, 20° C.): = 2.9 |
| 6 | CLU-3-F | 5.0 | $\gamma_1$ (20° C.): = 67 mPa · s |
| 7 | CPY-2-O2 | 10.0 | $K_1$ (20° C.): = 13.8 pN |
| 8 | CPY-3-O2 | 2.5 | $K_3$ (20° C.): = 14.5 pN |
| 9 | PGUQU-3-F | 6.0 | $V_0$ (20° C.): = 2.30 V |
| 10 | PUQU-3-F | 4.0 | LTS bulk (−20° C.): = 1000 h |
| 11 | PYP-2-3 | 2.5 | |

Mixture Example S16 (Stabilised with Compounds of Formulae ST-2-3 and H-3-3)

A nematic LC mixture according to the invention is formulated as follows:

| Mixture M16 | 99.92 wt.-% |
|---|---|
| Compound of Formula ST-2-3 | 500 ppm |
| Compound of Formula H-3-3 | 300 ppm |

Example M17

A nematic LC medium is formulated as follows:

| Composition | | | |
|---|---|---|---|
| Nr. | Comp. | Conc., wt.-% | Properties |
| 1 | BCH-32 | 5.0 | T(N, I) = 81.3° C. |
| 2 | BCH-3F.F | 5.0 | $\Delta n$ (589 nm, 20° C.): = 0.0993 |
| 3 | CC-3-V | 45.0 | $\varepsilon_{\parallel}$ (1 kHz, 20° C.): = 6.5 |
| 4 | CCH-23 | 1.5 | $\varepsilon_{\perp}$ (1 kHz, 20° C.): = 3.5 |
| 5 | CCP-3-1 | 10.0 | $\Delta\varepsilon$ (1 kHz, 20° C.): = 3.0 |
| 6 | CLU-3-F | 10.0 | $\gamma_1$ (20° C.): = 67 mPa · s |
| 7 | CPY-2-O2 | 10.0 | $K_1$ (20° C.): = 13.8 pN |
| 8 | CPY-3-O2 | 2.0 | $K_3$ (20° C.): = 14.4 pN |
| 9 | PGUQU-3-F | 3.5 | $V_0$ (20° C.): = 2.27 V |
| 10 | PUQU-3-F | 5.0 | LTS bulk (−20° C.): = 1000 h |
| 11 | PYP-2-3 | 3.0 | |

Mixture Example S17 (Stabilised with Compounds of Formulae ST-2-3 and H-3-3)

A nematic LC mixture according to the invention is formulated as follows:

| Mixture M17 | 99.92 wt.-% |
|---|---|
| Compound of Formula ST-2-3 | 500 ppm |
| Compound of Formula H-3-3 | 300 ppm |

Example M18

A nematic LC medium is formulated as follows:

| Composition | | | |
|---|---|---|---|
| Nr. | Comp. | Conc., wt.-% | Properties |
| 1 | CC-3-V | 42.0 | T(N, I) = 79.4° C. |
| 2 | CC-3-V1 | 5.0 | $\Delta n$ (589 nm, 20° C.): = 0.1121 |
| 3 | CCP-V-1 | 4.5 | $\varepsilon_{\parallel}$ (1 kHz, 20° C.): = 10.3 |
| 4 | CLU-3-F | 10.5 | $\varepsilon_{\perp}$ (1 kHz, 20° C.): = 3.2 |
| 5 | CPGU-3-OT | 5.0 | $\Delta\varepsilon$ (1 kHz, 20° C.): = 7.1 |
| 6 | APUQU-2-F | 5.0 | $\gamma_1$ (20° C.): = 66 mPa · s |
| 7 | APUQU-3-F | 7.5 | $K_1$ (20° C.): = 13.5 pN |
| 8 | PGP-2-3 | 6.0 | $K_3$ (20° C.): = 13.6 pN |
| 9 | PGP-2-4 | 8.0 | $V_0$ (20° C.): = 1.46 V |
| 10 | PPGU-3-F | 0.5 | |
| 11 | PUQU-3-F | 6.0 | |

Mixture Example S18 (Stabilised with Compound of Formula ST-2-3)

A nematic LC mixture according to the invention is formulated as follows:

| Mixture M18 | 99.95 wt.-% |
|---|---|
| Compound of Formula ST-2-3 | 500 ppm |

Example M19

A nematic LC medium is formulated as follows:

| Composition | | | |
|---|---|---|---|
| Nr. | Comp. | Conc., wt.-% | Properties |
| 1 | CC-3-V | 42.0 | T (N, I) = 79.6° C. |
| 2 | CC-3-V1 | 5.0 | $\Delta n$ (589 nm, 20° C.): = 0.1095 |
| 3 | CCP-V-1 | 4.5 | $\epsilon_{\parallel}$ (1 kHz, 20° C.): = 10.2 |
| 4 | CLU-3-F | 10.5 | $\epsilon_{\perp}$ (1 kHz, 20° C.): = 3.2 |
| 5 | CPGU-3-OT | 5.0 | $\Delta\epsilon$ (1 kHz, 20° C.): = 7.0 |
| 6 | APUQU-2-F(1) | 5.0 | $\gamma_1$ (20° C.): = 75 mPa · s |
| 7 | APUQU-3-F(1) | 7.5 | $K_1$ (20° C.): = 13.4 pN |
| 8 | PGP-2-3 | 6.0 | $K_3$ (20° C.): = 13.7 pN |
| 9 | PGP-2-4 | 8.0 | $V_0$ (20° C.): = 1.47 V |
| 10 | PPGU-3-F | 0.5 | |
| 11 | PUQU-3-F(1) | 6.0 | |

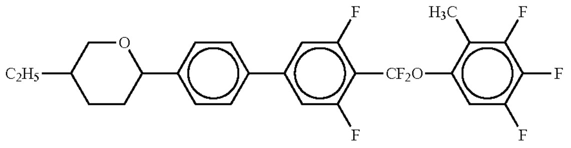

Mixture Example S19 (Stabilised with Compound of Formula ST-2-3)

A nematic LC mixture according to the invention is formulated as follows:

| Mixture M19 | 99.95 wt.-% |
|---|---|
| Compound of Formula ST-2-3 | 500 ppm |

Example M20

A nematic LC medium is formulated as follows:

| Composition | | | |
|---|---|---|---|
| Nr. | Comp. | Conc., wt.-% | Properties |
| 1 | CC-3-V | 40.5 | T(N, I) = 78.8° C. |
| 2 | CC-3-V1 | 2.0 | $\Delta n$ (589 nm, 20° C.): = 0.1122 |
| 3 | PUQU-3-F | 7.0 | $\varepsilon_{\parallel}$ (1 kHz, 20° C.): = 10.3 |
| 4 | CCP-V-1 | 6.0 | $\varepsilon_{\perp}$ (1 kHz, 20° C.): = 3.1 |
| 5 | CLU-3-F | 15.0 | $\Delta\varepsilon$ (1 kHz, 20° C.): = 7.2 |
| 6 | CCP-3-1 | 3.0 | $\gamma_1$ (20° C.): = 67 mPa · s |
| 7 | BCH-32 | 4.0 | $K_1$ (20° C.): = 13.1 pN |
| 8 | PGP-2-3 | 4.0 | $K_3$ (20° C.): = 13.8 pN |
| 9 | PGP-2-4 | 5.0 | $V_0$ (20° C.): = 1.42 V |

-continued

| Composition | | | |
|---|---|---|---|
| Nr. | Comp. | Conc., wt.-% | Properties |
| 10 | PGUQU-3-F | 5.0 | |
| 11 | PGUQU-4-F | 5.0 | |
| 12 | PGUQU-5-F | 3.0 | |
| 13 | PPGU-3-F | 0.5 | |

Mixture Example S20 (Stabilised with Compound of Formula ST-2-3)

A nematic LC mixture according to the invention is formulated as follows:

| | |
|---|---|
| Mixture M20 | 99.95 wt.-% |
| Compound of Formula ST-2-3 | 500 ppm |

Example M21

A nematic LC medium is formulated as follows:

| Composition | | | |
|---|---|---|---|
| Nr. | Comp. | Conc., wt.-% | Properties |
| 1 | CC-3-V | 40.5 | T(N, I) = 78.5° C. |
| 2 | CCP-3-1 | 5.0 | Δn (589 nm, 20° C.): = 0.1112 |
| 3 | CC-3-V1 | 8.0 | $\varepsilon_{\parallel}$ (1 kHz, 20° C.): = 10.3 |
| 4 | CCP-V-1 | 2.0 | $\varepsilon_{\perp}$ (1 kHz, 20° C.): = 3.1 |
| 5 | CCPC-33 | 2.0 | Δε (1 kHz, 20° C.): = 7.1 |
| 6 | CLU-3-F | 10.0 | $\gamma_1$ (20° C.): = 67 mPa · s |
| 7 | PGU-2-F | 5.5 | $K_1$ (20° C.): = 13.2 pN |
| 8 | PGUQU-3-F | 7.0 | $K_3$ (20° C.): = 13.9 pN |
| 9 | PGUQU-4-F | 7.0 | $V_0$ (20° C.): = 1.44 V |
| 10 | PUQU-3-F | 4.0 | |
| 11 | PGP-2-3 | 3.0 | |
| 12 | PGP-2-4 | 6.0 | |

Mixture Example S21 (Stabilised with Compound of Formula ST-2-3)

A nematic LC mixture according to the invention is formulated as follows:

| | |
|---|---|
| Mixture M21 | 99.95 wt.-% |
| Compound of Formula ST-2-3 | 500 ppm |

Example M22

A nematic LC medium is formulated as follows:

| Composition | | | |
|---|---|---|---|
| Nr. | Comp. | Conc., wt.-% | Properties |
| 1 | APUQU-3-F | 2.5 | T(N, I) = 85.3° C. |
| 2 | CC-3-V | 32.0 | Δn (589 nm, 20° C.): = 0.1135 |
| 3 | CC-3-V1 | 9.0 | $\varepsilon_{\parallel}$ (1 kHz, 20° C.): = 11.1 |

-continued

| Composition | | | |
|---|---|---|---|
| Nr. | Comp. | Conc., wt.-% | Properties |
| 4 | CCP-30CF3 | 2.0 | $\varepsilon_{\perp}$ (1 kHz, 20° C.): = 2.9 |
| 5 | CLP-3-T | 10.0 | Δε (1 kHz, 20° C.): = 8.2 |
| 6 | CLP-V-1 | 8.0 | $\gamma_1$ (20° C.): = 82 mPa · s |
| 7 | CLU-3-F | 13.0 | $K_1$ (20° C.): = 17.1 pN |
| 8 | PGUQU-3-F | 7.0 | $K_3$ (20° C.): = 17.4 pN |
| 9 | PGUQU-4-F | 5.0 | $V_0$ (20° C.): = 1.53 V |
| 10 | PGUQU-5-F | 4.0 | |
| 11 | PP-1-2V1 | 7.0 | |
| 12 | PPGU-3-F | 0.5 | |

Mixture Example S22 (Stabilised with Compounds of Formulae ST-2-3 and H-3-3)

A nematic LC mixture according to the invention is formulated as follows:

| | |
|---|---|
| Mixture M22 | 99.935 wt.-% |
| Compound of Formula ST-2-3 | 500 ppm |
| Compound of Formula H-3-3 | 150 ppm |

Example M23

A nematic LC medium is formulated as follows:

| Composition | | | |
|---|---|---|---|
| Nr. | Comp. | Conc., wt.-% | Properties |
| 1 | CC-3-V | 36.0 | T(N, I) = 78.4° C. |
| 2 | PP-1-2V1 | 12.0 | Δn (589 nm, 20° C.): = 0.1134 |
| 3 | CC-3-V1 | 10.0 | $\varepsilon_{\parallel}$ (1 kHz, 20° C.): = 6.5 |
| 4 | CLU-3-F | 11.0 | $\varepsilon_{\perp}$ (1 kHz, 20° C.): = 2.7 |
| 5 | CLP-3-T | 6.0 | Δε (1 kHz, 20° C.): = 3.9 |
| 6 | CCP-30CF3 | 5.0 | $\gamma_1$ (20° C.): = 56 mPa · s |
| 7 | CLP-V-1 | 5.0 | $K_1$ (20° C.): = 17.0 pN |
| 8 | PGP-2-2V | 9.0 | $K_3$ (20° C.): = 15.9 pN |
| 9 | PGUQU-3-F | 3.0 | $V_0$ (20° C.): = 2.21 V |
| 10 | PGUQU-4-F | 3.0 | |

Mixture Example S23 (Stabilised with Compound of Formula ST-2-3)

A nematic LC mixture according to the invention is formulated as follows:

| | |
|---|---|
| Mixture M23 | 99.95 wt.-% |
| Compound of Formula ST-2-3 | 500 ppm |

Example M24

A nematic LC medium is formulated as follows:

| Composition | | | |
|---|---|---|---|
| Nr. | Comp. | Conc., wt.-% | Properties |
| 1 | CC-3-V | 20.0 | T(N, I) = 102.7° C. |
| 2 | CC-3-V1 | 15.0 | Δn (589 nm, 20° C.): = 0.0864 |
| 3 | CC-3-2V1 | 8.0 | $\varepsilon_{\parallel}$ (1 kHz, 20° C.): = 8.2 |
| 4 | CCQU-3-F | 7.0 | $\varepsilon_{\perp}$ (1 kHz, 20° C.): = 2.7 |
| 5 | CLP-3-T | 6.0 | Δε (1 kHz, 20° C.): = 5.5 |
| 6 | CLU-3-F | 15.0 | $\gamma_1$ (20° C.): = 102 mPa · s |
| 7 | CCP-V-1 | 8.0 | $K_1$ (20° C.): = 19.3 pN |
| 8 | CLP-V-1 | 5.0 | $K_3$ (20° C.): = 22.8 pN |
| 9 | CCP-V2-1 | 8.0 | $V_0$ (20° C.): = 2.00 V |
| 10 | CDUQU-3-F | 6.0 | |
| 11 | DGUQU-4-F | 2.0 | |

Mixture Example S24 (Stabilised with Compounds of Formulae ST-2-3 and H-3-3)

A nematic LC mixture according to the invention is formulated as follows:

| Mixture M24 | 99.955 wt.-% |
|---|---|
| Compound of Formula ST-2-3 | 300 ppm |
| Compound of Formula H-3-3 | 150 ppm |

Example M25

A nematic LC medium is formulated as follows:

| Composition | | | |
|---|---|---|---|
| Nr. | Comp. | Conc., wt.-% | Properties |
| 1 | CC-3-V | 20.0 | T(N, I) = 103° C. |
| 2 | CC-3-V1 | 15.0 | Δn (589 nm, 20° C.): = 0.0848 |
| 3 | CC-3-2V1 | 8.0 | $\varepsilon_{\parallel}$ (1 kHz, 20° C.): = 8.1 |
| 4 | CCQU-3-F(1) | 7.0 | $\varepsilon_{\perp}$ (1 kHz, 20° C.): = 2.7 |
| 5 | CLP-3-T | 6.0 | Δε (1 kHz, 20° C.): = 5.5 |
| 6 | CLU-3-F | 15.0 | $\gamma_1$ (20° C.): = 111 mPa · s |
| 7 | CCP-V-1 | 8.0 | $K_1$ (20° C.): = 19.1 pN |
| 8 | CLP-V-1 | 5.0 | $K_3$ (20° C.): = 22.9 pN |
| 9 | CCP-V2-1 | 8.0 | $V_0$ (20° C.): = 2.02 V |
| 10 | CDUQU-3-F(1) | 6.0 | |
| 11 | DGUQU-4-F(1) | 2.0 | |

Mixture Example S25 (Stabilised with Compounds of Formulae ST-2-3 and H-3-3)

A nematic LC mixture according to the invention is formulated as follows:

| Mixture M25 | 99.955 wt.-% |
|---|---|
| Compound of Formula ST-2-3 | 300 ppm |
| Compound of Formula H-3-3 | 150 ppm |

Example M26

A nematic LC medium is formulated as follows:

| Composition | | | |
|---|---|---|---|
| Nr. | Comp. | Conc., wt.-% | Properties |
| 1 | BCH-32 | 3.0 | T(N, I) = ° C. |
| 2 | CC-3-V | 34.6 | Δn (589 nm, 20° C.):= |
| 3 | CC-3-V1 | 6.0 | $\varepsilon_{\parallel}$ (1 kHz, 20° C.):= |
| 4 | CCH-23 | 3.0 | $\varepsilon_{\perp}$ (1 kHz, 20° C.):= |
| 5 | CCH-34 | 3.0 | Δε (1 kHz, 20° C.):= |
| 6 | CCP-V-1 | 11.0 | $\gamma_1$ (20° C.): = mPa · s |
| 7 | CCP-V2-1 | 8.3 | $K_1$ (20° C.): = pN |
| 8 | CCVC-3-V | 6.0 | $K_3$ (20° C.): = pN |
| 9 | CDUQU-3-F | 4.8 | $V_0$ (20° C.): = V |
| 10 | CLP-V-1 | 6.0 | |
| 11 | CLU-3-F | 3.0 | |
| 12 | CPGU-3-OT | 3.3 | |
| 13 | DGUQU-4-F | 3.0 | |
| 14 | DLGU-3-F | 4.0 | |
| 15 | PP-1-2V1 | 1.0 | |

Mixture Example S26 (Stabilised with Compound of Formula ST-2-3)

A nematic LC mixture according to the invention is formulated as follows:

| Mixture M26 | 99.96 wt.-% |
|---|---|
| Compound of Formula ST-2-3 | 400 ppm |

Example M27

A nematic LC medium is formulated as follows:

| Composition | | | |
|---|---|---|---|
| Nr. | Comp. | Conc., wt.-% | Properties |
| 1 | APUQU-3-F | 1.6 | T(N, I) = ° C. |
| 2 | BCH-32 | 3.0 | Δn (589 nm, 20° C.):= |
| 3 | CC-3-V | 37.5 | $\varepsilon_{\parallel}$ (1 kHz, 20° C.):= |
| 4 | CC-3-V1 | 6.0 | $\varepsilon_{\perp}$ (1 kHz, 20° C.):= |
| 5 | CCP-V-1 | 12.0 | Δε (1 kHz, 20° C.):= |
| 6 | CCP-V2-1 | 8.0 | $\gamma_1$ (20° C.): = mPa · s |
| 7 | CCVC-3-V | 6.0 | $K_1$ (20° C.): = pN |
| 8 | CDUQU-3-F | 6.0 | $K_3$ (20° C.): = pN |
| 9 | CLP-V-1 | 6.0 | $V_0$ (20° C.): = V |
| 10 | CLU-3-F | 3.0 | |
| 11 | CLY-3-O2 | 3.0 | |
| 12 | DGUQU-4-F | 3.0 | |
| 13 | DLGU-3-F | 3.5 | |
| 14 | PP-1-2V1 | 1.4 | |

Mixture Example S27 (Stabilised with Compound of Formula ST-2-3)

A nematic LC mixture according to the invention is formulated as follows:

| Mixture M26 | 99.96 wt.-% |
|---|---|
| Compound of Formula ST-2-3 | 400 ppm |

Example M28

A nematic LC medium is formulated as follows:

| Composition | | | |
|---|---|---|---|
| Nr. | Comp. | Conc., wt.-% | Properties |
| 1 | BCH-32 | 6.5 | T(N, I) = 99.7° C. |
| 2 | CC-3-V | 27.5 | Δn (589 nm, 20° C.): = 0.1090 |
| 3 | CC-3-V1 | 3.0 | $\varepsilon_{\parallel}$ (1 kHz, 20° C.): = 8.7 |
| 4 | CCP-3-1 | 6.0 | $\varepsilon_{\perp}$ (1 kHz, 20° C.): = 2.9 |
| 5 | CCP-3-3 | 5.0 | Δε (1 kHz, 20° C.): = 5.9 |
| 6 | CCP-3F.F.F | 1.0 | $\gamma_1$ (20° C.): = 99 mPa · s |
| 7 | CCP-V-1 | 10.0 | $K_1$ (20° C.): = 17.5 pN |
| 8 | CCPC-33 | 2.0 | $K_3$ (20° C.): = 18.4 pN |
| 9 | CLP-3-T | 8.0 | $V_0$ (20° C.): = 1.82 V |
| 10 | CLU-3-F | 5.0 | |
| 11 | PCH-302 | 10.0 | |
| 12 | PGUQU-3-F | 7.0 | |
| 13 | PGUQU-4-F | 7.0 | |
| 14 | PGUQU-5-F | 2.0 | |

Mixture Example S28 (Stabilised with Compound of Formula ST-2-3)

A nematic LC mixture according to the invention is formulated as follows:

| Mixture M28 | 99.95 wt.-% |
|---|---|
| Compound of Formula ST-2-3 | 500 ppm |

Mixture Example S28a (Stabilised with Compounds of Formulae ST-2-3 and H-3-1)

A nematic LC mixture according to the invention is formulated as follows:

| Mixture M28 | 99.85 wt.-% |
|---|---|
| Compound of Formula ST-2-3 | 500 ppm |
| Compound of Formula H-3-1 | 1000 ppm |

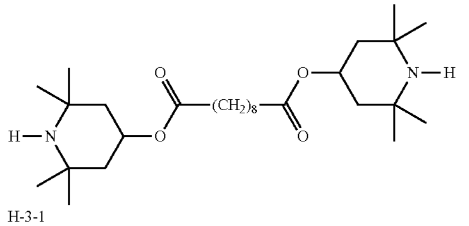

H-3-1

Example M29

A nematic LC medium is formulated as follows:

| Composition | | | |
|---|---|---|---|
| Nr. | Comp. | Conc., wt.-% | Properties |
| 1 | BCH-32 | 3.0 | T(N, I) = 99.9° C. |
| 2 | BCH-3F.F | 8.0 | Δn (589 nm, 20° C.): = 0.1092 |
| 3 | CC-3-V | 25.0 | $\varepsilon_{\parallel}$ (1 kHz, 20° C.): = 8.7 |
| 4 | CCP-3-1 | 6.0 | $\varepsilon_{\perp}$ (1 kHz, 20° C.): = 3.0 |
| 5 | CCP-3-3 | 5.0 | Δε (1 kHz, 20° C.): = 5.7 |
| 6 | CCP-V-1 | 7.5 | $\gamma_1$ (20° C.):112 mPa · s |
| 7 | CCPC-33 | 2.0 | $K_1$ (20° C.): = 17.5 pN |
| 8 | CCPC-34 | 2.0 | $K_3$ (20° C.): = 18.5 pN |
| 9 | CLP-3-T | 8.0 | $V_0$ (20° C.): = 1.84 V |
| 10 | CLU-3-F | 11.5 | |
| 11 | PCH-302 | 10.0 | |
| 12 | PGUQU-3-F | 7.5 | |
| 13 | PGUQU-4-F | 3.0 | |
| 14 | PP-1-2V1 | 1.5 | |

Mixture Example S29 (Stabilised with Compound of Formula ST-2-3)

A nematic LC mixture according to the invention is formulated as follows:

| Mixture M29 | 99.95 wt.-% |
|---|---|
| Compound of Formula ST-2-3 | 500 ppm |

Mixture Example S29a (Stabilised with Compounds of Formulae ST-2-3 and H-3-1)

A nematic LC mixture according to the invention is formulated as follows:

| Mixture M29 | 99.85 wt.-% |
|---|---|
| Compound of Formula ST-2-3 | 500 ppm |
| Compound of Formula H-3-1 | 1000 ppm |

Example M30

A nematic LC medium is formulated as follows:

| Composition | | | |
|---|---|---|---|
| Nr. | Comp. | Conc., wt.-% | Properties |
| 1 | BCH-32 | 4.5 | T(N, I) = 100.9° C. |
| 2 | BCH-3F.F | 10.0 | Δn (589 nm, 20° C.): = 0.1104 |
| 3 | CC-3-V | 24.0 | $\varepsilon_{\parallel}$ (1 kHz, 20° C.): = 8.9 |
| 4 | CCH-35 | 4.0 | $\varepsilon_{\perp}$ (1 kHz, 20° C.): = 3.0 |
| 5 | CCP-3-1 | 6.0 | Δε (1 kHz, 20° C.): = 5.9 |
| 6 | CCP-3-3 | 5.0 | $\gamma_1$ (20° C.): = 111 mPa · s |
| 7 | CCP-V-1 | 5.0 | $K_1$ (20° C.): = 18.1 pN |
| 8 | CCPC-33 | 2.0 | $K_3$ (20° C.): = 18.4 pN |
| 9 | CCPC-34 | 2.0 | $V_0$ (20° C.): = 1.83 V |
| 10 | CLP-3-T | 8.0 | |
| 11 | CLU-3-F | 6.0 | |
| 12 | PCH-302 | 10.0 | |
| 13 | PGUQU-3-F | 7.5 | |
| 14 | PGUQU-4-F | 5.5 | |
| 15 | PP-1-2V1 | 0.5 | |

Mixture Example S30 (Stabilised with Compound of Formula ST-2-3)

A nematic LC mixture according to the invention is formulated as follows:

| | |
|---|---|
| Mixture M30 | 99.95 wt.-% |
| Compound of Formula ST-2-3 | 500 ppm |

Mixture Example S30a (Stabilised with Compounds of Formulae ST-2-3 and H-3-1)

A nematic LC mixture according to the invention is formulated as follows:

| | |
|---|---|
| Mixture M30 | 99.85 wt.-% |
| Compound of Formula ST-2-3 | 500 ppm |
| Compound of Formula H-3-1 | 1000 ppm |

Example M31

A nematic LC medium is formulated as follows:

| Composition | | | |
|---|---|---|---|
| Nr. | Comp. | Conc., wt.-% | Properties |
| 1 | BCH-32 | 9.0 | T(N, I) = ° C. |
| 2 | CC-3-V | 24.5 | Δn (589 nm, 20° C.): = |
| 3 | CC-3-V1 | 7.0 | $\varepsilon_{\parallel}$ (1 kHz, 20° C.): = |
| 4 | CCP-3-1 | 6.5 | $\varepsilon_{\perp}$ (1 kHz, 20° C.): = |
| 5 | CCP-3-3 | 5.0 | Δε (1 kHz, 20° C.): = |
| 6 | CCP-V-1 | 9.0 | $\gamma_1$ (20° C.): = mPa · s |
| 7 | CCPC-33 | 1.0 | $K_1$ (20° C.): = pN |
| 8 | CLP-3-T | 6.0 | $K_3$ (20° C.): = pN |
| 9 | CLU-3-F | 6.5 | $V_0$ (20° C.): = V |
| 10 | PCH-302 | 9.0 | |
| 11 | PGUQU-3-F | 6.0 | |
| 12 | PGUQU-4-F | 7.0 | |
| 13 | PGUQU-5-F | 3.5 | |

Mixture Example S31 (Stabilised with Compound of Formula ST-2-3)

A nematic LC mixture according to the invention is formulated as follows:

| | |
|---|---|
| Mixture M31 | 99.95 wt.-% |
| Compound of Formula ST-2-3 | 500 ppm |

Mixture Example S31a (Stabilised with Compounds of Formulae ST-2-3 and H-3-1)

A nematic LC mixture according to the invention is formulated as follows:

| | |
|---|---|
| Mixture M31 | 99.85 wt.-% |
| Compound of Formula ST-2-3 | 500 ppm |
| Compound of Formula H-3-1 | 1000 ppm |

Example M32

A nematic LC medium is formulated as follows:

| Composition | | | |
|---|---|---|---|
| Nr. | Comp. | Conc., wt.-% | Properties |
| 1 | BCH-32 | 7.0 | T(N, I) = 100.2° C. |
| 2 | CC-3-V | 22.0 | Δn (589 nm, 20° C.): = 0.1115 |
| 3 | CC-3-V1 | 8.0 | $\varepsilon_{\parallel}$ (1 kHz, 20° C.): = 8.7 |
| 4 | CCP-3-1 | 7.0 | $\varepsilon_{\perp}$ (1 kHz, 20° C.): = 2.9 |
| 5 | CCP-3-3 | 5.0 | Δε (1 kHz, 20° C.): = 5.8 |
| 6 | CCP-V-1 | 13.0 | $\gamma_1$ (20° C.): = 97 mPa · s |
| 7 | CLP-3-T | 6.0 | $K_1$ (20° C.): = 17.9 pN |
| 8 | CLU-3-F | 5.0 | $K_3$ (20° C.): = 18.8 pN |
| 9 | PCH-302 | 10.0 | $V_0$ (20° C.): = 1.84 V |
| 10 | PGUQU-3-F | 6.0 | |
| 11 | PGUQU-4-F | 7.0 | |
| 12 | PGUQU-5-F | 4.0 | |

Mixture Example S32 (Stabilised with Compound of Formula ST-2-3)

A nematic LC mixture according to the invention is formulated as follows:

| | |
|---|---|
| Mixture M32 | 99.95 wt.-% |
| Compound of Formula ST-2-3 | 500 ppm |

Mixture Example S32a (Stabilised with Compounds of Formulae ST-2-3 and H-3-1)

A nematic LC mixture according to the invention is formulated as follows:

| | |
|---|---|
| Mixture M32 | 99.85 wt.-% |
| Compound of Formula ST-2-3 | 500 ppm |
| Compound of Formula H-3-1 | 1000 ppm |

Example M33

A nematic LC medium is formulated as follows:

| Composition | | | |
|---|---|---|---|
| Nr. | Comp. | Conc., wt.-% | Properties |
| 1 | BCH-32 | 9.0 | T(N, I) = ° C. |
| 2 | BCH-3F.F | 2.0 | Δn (589 nm, 20° C.): = |
| 3 | CC-3-V | 28.0 | $\varepsilon_{\parallel}$ (1 kHz, 20° C.): = |
| 4 | CCP-3-1 | 7.0 | $\varepsilon_{\perp}$ (1 kHz, 20° C.): = |
| 5 | CCP-3-3 | 3.5 | Δε (1 kHz, 20° C.): = |
| 6 | CCP-V-1 | 12.5 | $\gamma_1$ (20° C.): = mPa · s |

-continued

| Composition | | | |
|---|---|---|---|
| Nr. | Comp. | Conc., wt.-% | Properties |
| 7 | CLP-3-T | 8.0 | $K_1$ (20° C.): = pN |
| 8 | CLU-3-F | 9.0 | $K_3$ (20° C.): = pN |
| 9 | PCH-302 | 7.0 | $V_0$ (20° C.): = V |
| 10 | PGUQU-3-F | 6.0 | |
| 11 | PGUQU-4-F | 7.0 | |
| 12 | PGUQU-5-F | 1.0 | |

Mixture Example S33 (Stabilised with Compound of Formula ST-2-3)

A nematic LC mixture according to the invention is formulated as follows:

| Mixture M33 | 99.95 wt.-% |
|---|---|
| Compound of Formula ST-2-3 | 500 ppm |

Mixture Example S33a (Stabilised with Compounds of Formulae ST-2-3 and H-3-1)

A nematic LC mixture according to the invention is formulated as follows:

| Mixture M33 | 99.85 wt.-% |
|---|---|
| Compound of Formula ST-2-3 | 500 ppm |
| Compound of Formula H-3-1 | 1000 ppm |

Example M34

A nematic LC medium is formulated as follows:

| Composition | | | |
|---|---|---|---|
| Nr. | Comp. | Conc., wt.-% | Properties |
| 1 | BCH-32 | 7.0 | T(N, I) = 100.4° C. |
| 2 | CC-3-V | 26.5 | Δn (589 nm, 20° C.): = 0.1112 |
| 3 | CC-3-V1 | 1.0 | $\varepsilon_{\parallel}$ (1 kHz, 20° C.): = 8.7 |
| 4 | CCP-3-1 | 7.0 | $\varepsilon_{\perp}$ (1 kHz, 20° C.): = 2.9 |
| 5 | CCP-3-3 | 5.0 | Δε (1 kHz, 20° C.): = 5.9 |
| 6 | CCP-V-1 | 13.0 | $\gamma_1$ (20° C.): = 99 mPa · s |
| 7 | CCPC-33 | 0.5 | $K_1$ (20° C.): = 17.8 pN |
| 8 | CLP-3-T | 8.0 | $K_3$ (20° C.): = 18.7 pN |
| 9 | CLU-3-F | 6.0 | $V_0$ (20° C.): = 1.83 V |
| 10 | PCH-302 | 10.0 | |
| 11 | PGUQU-3-F | 5.0 | |
| 12 | PGUQU-4-F | 7.0 | |
| 13 | PGUQU-5-F | 4.0 | |

Mixture Example S34 (Stabilised with Compound of Formula ST-2-3)

A nematic LC mixture according to the invention is formulated as follows:

| Mixture M34 | 99.95 wt.-% |
|---|---|
| Compound of Formula ST-2-3 | 500 ppm |

Mixture Example S34a (Stabilised with Compounds of Formulae ST-2-3 and H-3-1)

A nematic LC mixture according to the invention is formulated as follows:

| Mixture M34 | 99.85 wt.-% |
|---|---|
| Compound of Formula ST-2-3 | 500 ppm |
| Compound of Formula H-3-1 | 1000 ppm |

Example M35

A nematic LC medium is formulated as follows:

| Composition | | | |
|---|---|---|---|
| Nr. | Comp. | Conc., wt.-% | Properties |
| 1 | BCH-32 | 8.0 | T(N, I) = 100° C. |
| 2 | CC-3-V | 25.5 | Δn (589 nm, 20° C.): = 0.1101 |
| 3 | CC-3-V1 | 4.5 | $\varepsilon_{\parallel}$ (1 kHz, 20° C.): = 8.7 |
| 4 | CCP-3-1 | 7.5 | $\varepsilon_{\perp}$ (1 kHz, 20° C.): = 2.9 |
| 5 | CCP-3-3 | 4.5 | Δε (1 kHz, 20° C.): = 5.9 |
| 6 | CCP-V-1 | 9.0 | $\gamma_1$ (20° C.): = 98 mPa · s |
| 7 | CCPC-33 | 1.5 | $K_1$ (20° C.): = 17.7 pN |
| 8 | CLP-3-T | 6.0 | $K_3$ (20° C.): = 18.6 pN |
| 9 | CLU-3-F | 7.5 | $V_0$ (20° C.): = 1.82 V |
| 10 | PCH-302 | 10.0 | |
| 11 | PGUQU-3-F | 5.5 | |
| 12 | PGUQU-4-F | 7.0 | |
| 13 | PGUQU-5-F | 3.5 | |

Mixture Example S35 (Stabilised with Compound of Formula ST-2-3)

A nematic LC mixture according to the invention is formulated as follows:

| Mixture M35 | 99.95 wt.-% |
|---|---|
| Compound of Formula ST-2-3 | 500 ppm |

Mixture Example S35a (Stabilised with Compounds of Formulae ST-2-3 and H-3-1)

A nematic LC mixture according to the invention is formulated as follows:

| Mixture M35 | 99.85 wt.-% |
|---|---|
| Compound of Formula ST-2-3 | 500 ppm |
| Compound of Formula H-3-1 | 1000 ppm |

Example M36

A nematic LC medium is formulated as follows:

| Composition | | | |
|---|---|---|---|
| Nr. | Comp. | Conc., wt.-% | Properties |
| 1 | BCH-32 | 8.0 | T(N, I) = ° C. |
| 2 | BCH-3F.F | 0.5 | Δn (589 nm, 20° C.): = |
| 3 | CC-3-V | 24.5 | $\varepsilon_{\parallel}$ (1 kHz, 20° C.): = |
| 4 | CC-3-V1 | 6.5 | $\varepsilon_{\perp}$ (1 kHz, 20° C.): = |
| 5 | CCP-3-1 | 7.0 | Δε (1 kHz, 20° C.): = |
| 6 | CCP-3-3 | 5.0 | $\gamma_1$ (20° C.): = mPa · s |
| 7 | CCP-V-1 | 8.5 | $K_1$ (20° C.): = pN |
| 8 | CCPC-33 | 1.5 | $K_3$ (20° C.): = pN |
| 9 | CLP-3-T | 6.0 | $V_0$ (20° C.): = V |
| 10 | CLU-3-F | 6.0 | |
| 11 | PCH-302 | 10.0 | |
| 12 | PGUQU-3-F | 4.0 | |
| 13 | PGUQU-4-F | 7.0 | |
| 14 | PGUQU-5-F | 5.5 | |

Mixture Example S36 (Stabilised with Compound of Formula ST-2-3)

A nematic LC mixture according to the invention is formulated as follows:

| | |
|---|---|
| Mixture M36 | 99.95 wt.-% |
| Compound of Formula ST-2-3 | 500 ppm |

Mixture Example S36a (Stabilised with Compounds of Formulae ST-2-3 and H-3-1)

A nematic LC mixture according to the invention is formulated as follows:

| | |
|---|---|
| Mixture M36 | 99.85 wt.-% |
| Compound of Formula ST-2-3 | 500 ppm |
| Compound of Formula H-3-1 | 1000 ppm |

Example M37

A nematic LC medium is formulated as follows:

| Composition | | | |
|---|---|---|---|
| Nr. | Comp. | Conc., wt.-% | Properties |
| 1 | BCH-32 | 7.5 | T(N, I) = ° C. |
| 2 | BCH-3F.F | 0.5 | Δn (589 nm, 20° C.): = |
| 3 | CC-3-V | 24.5 | $\varepsilon_{\parallel}$ (1 kHz, 20° C.): = |
| 4 | CC-3-V1 | 7.0 | $\varepsilon_{\perp}$ (1 kHz, 20° C.): = |
| 5 | CCP-3-1 | 7.0 | Δε (1 kHz, 20° C.): = |
| 6 | CCP-3-3 | 4.0 | $\gamma_1$ (20° C.): = mPa · s |
| 7 | CCP-V-1 | 9.0 | $K_1$ (20° C.): = pN |
| 8 | CCPC-33 | 2.0 | $K_3$ (20° C.): = pN |
| 9 | CLP-3-T | 6.0 | $V_0$ (20° C.): = V |
| 10 | CLU-3-F | 6.0 | |
| 11 | PCH-302 | 10.0 | |
| 12 | PGUQU-3-F | 4.5 | |

-continued

| Composition | | | |
|---|---|---|---|
| Nr. | Comp. | Conc., wt.-% | Properties |
| 13 | PGUQU-4-F | 7.0 | |
| 14 | PGUQU-5-F | 5.0 | |

Mixture Example S37 (Stabilised with Compound of Formula ST-2-3)

A nematic LC mixture according to the invention is formulated as follows:

| | |
|---|---|
| Mixture M37 | 99.95 wt.-% |
| Compound of Formula ST-2-3 | 500 ppm |

Mixture Example S37a (Stabilised with Compounds of Formulae ST-2-3 and H-3-1)

A nematic LC mixture according to the invention is formulated as follows:

| | |
|---|---|
| Mixture M37 | 99.85 wt.-% |
| Compound of Formula ST-2-3 | 500 ppm |
| Compound of Formula H-3-1 | 1000 ppm |

Example M38

A nematic LC medium is formulated as follows:

| Composition | | | |
|---|---|---|---|
| Nr. | Comp. | Conc., wt.-% | Properties |
| 1 | BCH-32 | 6.5 | T(N, I) = 101° C. |
| 2 | CC-3-V | 26.5 | Δn (589 nm, 20° C.): = 0.1097 |
| 3 | CC-3-V1 | 3.0 | $\varepsilon_{\parallel}$ (1 kHz, 20° C.): = 8.7 |
| 4 | CCP-3-1 | 6.0 | $\varepsilon_{\perp}$ (1 kHz, 20° C.): = 2.9 |
| 5 | CCP-3-3 | 5.0 | Δε (1 kHz, 20° C.): = 5.9 |
| 6 | CCP-3F.F.F | 1.0 | $\gamma_1$ (20° C.): = 99 mPa · s |
| 7 | CCP-V-1 | 11.0 | $K_1$ (20° C.): = 17.8 pN |
| 8 | CCPC-33 | 2.0 | $K_3$ (20° C.): = 18.9 pN |
| 9 | CLP-3-T | 8.0 | $V_0$ (20° C.): = 1.83 V |
| 10 | CLU-3-F | 5.0 | |
| 11 | PCH-302 | 10.0 | |
| 12 | PGUQU-3-F | 7.0 | |
| 13 | PGUQU-4-F | 7.0 | |
| 14 | PGUQU-5-F | 2.0 | |

Mixture Example S38 (Stabilised with Compounds of Formulae ST-2-3 and H-3-1)

A nematic LC mixture according to the invention is formulated as follows:

| | |
|---|---|
| Mixture M38 | 99.85 wt.-% |
| Compound of Formula ST-2-3 | 500 ppm |
| Compound of Formula H-3-1 | 1000 ppm |

Example M39

A nematic LC medium is formulated as follows:

| Composition | | | |
|---|---|---|---|
| Nr. | Comp. | Conc., wt.-% | Properties |
| 1 | BCH-32 | 7.0 | T(N, I) = 100.4° C. |
| 2 | CC-3-V | 28.5 | Δn (589 nm, 20° C.): = 0.1109 |
| 3 | CC-3-V1 | 0.5 | $\varepsilon_{\parallel}$ (1 kHz, 20° C.): = 8.8 |
| 4 | CCP-3-1 | 7.0 | $\varepsilon_{\perp}$ (1 kHz, 20° C.): = 2.9 |
| 5 | CCP-3-3 | 5.0 | Δε (1 kHz, 20° C.): = 5.9 |
| 6 | CCP-V-1 | 10.5 | $\gamma_1$ (20° C.): = 98 mPa · s |
| 7 | CCPC-33 | 2.0 | $K_1$ (20° C.): = 18.0 pN |
| 8 | CLP-3-T | 7.0 | $K_3$ (20° C.): = 18.6 pN |
| 9 | CLU-3-F | 5.0 | $V_0$ (20° C.): = 1.84 V |
| 10 | PCH-302 | 10.5 | |
| 11 | PGUQU-3-F | 5.0 | |
| 12 | PGUQU-4-F | 7.0 | |
| 13 | PGUQU-5-F | 5.0 | |

Mixture Example S39 (Stabilised with Compounds of Formulae ST-2-3 and H-3-1)

A nematic LC mixture according to the invention is formulated as follows:

| | |
|---|---|
| Mixture M39 | 99.85 wt.-% |
| Compound of Formula ST-2-3 | 500 ppm |
| Compound of Formula H-3-1 | 1000 ppm |

Example M40

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 101.1° C. |
| 2 | BCH-32 | 8.0 | Δn (589 nm, 20° C.): = 0.1110 |
| 3 | CC-3-V | 25.0 | $\varepsilon_{\parallel}$ (1 kHz, 20° C.): = 8.7 |
| 4 | CCP-3-1 | 6.0 | $\varepsilon_{\perp}$ (1 kHz, 20° C.): = 2.9 |
| 5 | CCP-3-3 | 5.0 | Δε (1 kHz, 20° C.): = 5.8 |
| 6 | CCP-30CF3 | 5.5 | $\gamma_1$ (20° C.): = 97 mPa · s |
| 7 | CCP-V-1 | 12.5 | $K_1$ (20° C.): = 18.0 pN |
| 8 | CLP-3-T | 6.5 | $K_3$ (20° C.): = 18.6 pN |
| 9 | CLU-3-F | 3.5 | $V_0$ (20° C.): = 1.84 V |

-continued

| Composition | | | |
|---|---|---|---|
| Nr. | Comp. | Conc., wt.-% | Properties |
| 10 | PCH-302 | 11.5 | |
| 11 | PGUQU-3-F | 3.0 | |
| 12 | PGUQU-4-F | 6.0 | |
| 13 | PGUQU-5-F | 5.5 | |

Mixture Example S40 (Stabilised with Compounds of Formulae ST-2-3 and H-3-1)

A nematic LC mixture according to the invention is formulated as follows:

| | |
|---|---|
| Mixture M40 | 99.85 wt.-% |
| Compound of Formula ST-2-3 | 500 ppm |
| Compound of Formula H-3-1 | 1000 ppm |

Example M41

A nematic LC medium is formulated as follows:

| Composition | | | |
|---|---|---|---|
| Nr. | Comp. | Conc., wt.-% | Properties |
| 1 | BCH-32 | 8.5 | T(N, I) = 101.4° C. |
| 2 | CC-3-V | 25.0 | Δn (589 nm, 20° C.): = 0.1108 |
| 3 | CC-3-V1 | 0.5 | $\varepsilon_{\parallel}$ (1 kHz, 20° C.): = 8.7 |
| 4 | CCP-3-1 | 7.0 | $\varepsilon_{\perp}$ (1 kHz, 20° C.): = 2.9 |
| 5 | CCP-3-3 | 2.0 | Δε (1 kHz, 20° C.): = 5.8 |
| 6 | CCP-30CF3 | 5.5 | $\gamma_1$ (20° C.): = 97 mPa · s |
| 7 | CCP-V-1 | 14.0 | $K_1$ (20° C.): = 17.8 pN |
| 8 | CLP-3-T | 6.5 | $K_3$ (20° C.): = 18.5 pN |
| 9 | CLU-3-F | 5.0 | $V_0$ (20° C.): = 1.83 V |
| 10 | DGUQU-4-F | 1.0 | |
| 11 | PCH-302 | 10.5 | |
| 12 | PGUQU-3-F | 3.0 | |
| 13 | PGUQU-4-F | 6.0 | |
| 14 | PGUQU-5-F | 5.5 | |

Mixture Example S41 (Stabilised with Compounds of Formulae ST-2-3 and H-3-1)

A nematic LC mixture according to the invention is formulated as follows:

| | |
|---|---|
| Mixture M41 | 99.85 wt.-% |
| Compound of Formula ST-2-3 | 500 ppm |
| Compound of Formula H-3-1 | 1000 ppm |

Example M42

A nematic LC medium is formulated as follows:

| Composition | | | |
|---|---|---|---|
| Nr. | Comp. | Conc., wt.-% | Properties |
| 1 | CC-3-V | 24.0 | T(N, I) = 100.4° C. |
| 2 | CCP-3-1 | 7.0 | Δn (589 nm, 20° C.): = 0.1110 |
| 3 | CCP-3-3 | 3.0 | $ε_{\|\|}$ (1 kHz, 20° C.): = 8.8 |
| 4 | CCP-30CF3 | 8.0 | $ε_⊥$ (1 kHz, 20° C.): = 2.9 |
| 5 | CCP-3F.F.F | 3.0 | Δε (1 kHz, 20° C.): = 5.9 |
| 6 | CCP-50CF3 | 1.5 | $γ_1$ (20° C.): = 98 mPa · s |
| 7 | CCP-V-1 | 13.5 | $K_1$ (20° C.): = 17.5 pN |
| 8 | CLP-3-T | 7.5 | $K_3$ (20° C.): = 18.7 pN |
| 9 | CLU-3-F | 3.0 | $V_0$ (20° C.): = 1.81 V |
| 10 | PCH-302 | 11.0 | |
| 11 | PGP-2-3 | 4.5 | |
| 12 | PGUQU-3-F | 8.0 | |
| 14 | PGUQU-4-F | 6.0 | |

Mixture Example S42 (Stabilised with Compounds of Formulae ST-2-3 and H-3-1)

A nematic LC mixture according to the invention is formulated as follows:

| | |
|---|---|
| Mixture M42 | 99.85 wt.-% |
| Compound of Formula ST-2-3 | 500 ppm |
| Compound of Formula H-3-1 | 1000 ppm |

Example M43

A nematic LC medium is formulated as follows:

| Composition | | | |
|---|---|---|---|
| Nr. | Comp. | Conc., wt.-% | Properties |
| 1 | BCH-32 | 4.0 | T(N, I) = 100.5° C. |
| 2 | CC-3-V | 26.0 | Δn (589 nm, 20° C.): = 0.1109 |
| 3 | CC-3-V1 | 4.5 | $ε_{\|\|}$ (1 kHz, 20° C.): = 8.7 |
| 4 | CCP-3-1 | 4.5 | $ε_⊥$ (1 kHz, 20° C.): = 2.9 |
| 5 | CCP-3-3 | 5.0 | Δε (1 kHz, 20° C.): = 5.8 |
| 6 | CCP-3F.F.F | 3.0 | $γ_1$ (20° C.): = 99 mPa · s |
| 7 | CCP-V-1 | 11.0 | $K_1$ (20° C.): = 17.3 pN |
| 8 | CCPC-33 | 3.0 | $K_3$ (20° C.): = 18.5 pN |
| 9 | CLP-3-T | 6.0 | $V_0$ (20° C.): = 1.80 V |
| 10 | CLU-3-F | 4.5 | |
| 11 | PCH-302 | 10.0 | |
| 12 | PGP-2-3 | 2.5 | |
| 13 | PGUQU-3-F | 7.0 | |
| 14 | BCH-32 | 4.0 | |
| 15 | CC-3-V | 26.0 | |

Mixture Example S43 (Stabilised with Compounds of Formulae ST-2-3 and H-3-1)

A nematic LC mixture according to the invention is formulated as follows:

| | |
|---|---|
| Mixture M43 | 99.85 wt.-% |
| Compound of Formula ST-2-3 | 500 ppm |
| Compound of Formula H-3-1 | 1000 ppm |

Example M44

A nematic LC medium is formulated as follows:

| Composition | | | |
|---|---|---|---|
| Nr. | Comp. | Conc., wt.-% | Properties |
| 1 | APUQU-3-F | 2.5 | T(N, I) = 100.3° C. |
| 2 | BCH-32 | 8.0 | Δn (589 nm, 20° C.): = 0.1105 |
| 3 | CC-3-V | 19.5 | $ε_{\|\|}$ (1 kHz, 20° C.): = 8.7 |
| 4 | CC-3-V1 | 8.0 | $ε_⊥$ (1 kHz, 20° C.): = 2.9 |
| 5 | CCP-3-1 | 6.0 | Δε (1 kHz, 20° C.): = 5.8 |
| 6 | CCP-3-3 | 5.0 | $γ_1$ (20° C.): = 98 mPa · s |
| 7 | CCP-3F.F.F | 3.5 | $K_1$ (20° C.): = 17.7 pN |
| 8 | CCP-V-1 | 13.0 | $K_3$ (20° C.): = 18.7 pN |
| 9 | CLP-3-T | 4.5 | $V_0$ (20° C.): = 1.83 V |
| 10 | CLU-3-F | 5.0 | |
| 11 | PCH-302 | 11.0 | |
| 12 | PGP-2-3 | 0.5 | |
| 13 | PGUQU-3-F | 5.5 | |
| 14 | PGUQU-4-F | 6.0 | |
| 15 | PGUQU-5-F | 2.0 | |

Mixture Example S44 (Stabilised with Compounds of Formulae ST-2-3 and H-3-1)

A nematic LC mixture according to the invention is formulated as follows:

| | |
|---|---|
| Mixture M44 | 99.85 wt.-% |
| Compound of Formula ST-2-3 | 500 ppm |
| Compound of Formula H-3-1 | 1000 ppm |

Example M45

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 100.7° C. |
| 2 | BCH-32 | 7.0 | Δn (589 nm, 20° C.): = 0.1097 |
| 3 | CC-3-V | 26.5 | $ε_{\|\|}$ (1 kHz, 20° C.): = 8.7 |
| 4 | CC-3-V1 | 1.0 | $ε_⊥$ (1 kHz, 20° C.): = 2.9 |
| 5 | CCP-3-1 | 7.0 | Δε (1 kHz, 20° C.): = 5.8 |
| 6 | CCP-3-3 | 5.0 | $γ_1$ (20° C.): = 100 mPa · s |
| 7 | CCP-V-1 | 13.0 | $K_1$ (20° C.): = 18.0 pN |
| 8 | CCPC-33 | 0.5 | $K_3$ (20° C.): = 18.7 pN |
| 9 | CLP-3-T | 8.0 | $V_0$ (20° C.): = 1.84 V |
| 10 | CLU-3-F | 6.0 | |
| 11 | PCH-302 | 10.0 | |
| 12 | PGUQU-3-F | 3.0 | |
| 13 | PGUQU-4-F | 5.0 | |
| 14 | PGUQU-5-F | 6.0 | |

Mixture Example S45 (Stabilised with Compounds of Formulae ST-2-3 and H-3-1)

A nematic LC mixture according to the invention is formulated as follows:

| Mixture M45 | 99.85 wt.-% |
|---|---|
| Compound of Formula ST-2-3 | 500 ppm |
| Compound of Formula H-3-1 | 1000 ppm |

Example M46

A nematic LC medium is formulated as follows:

| Composition | | | |
|---|---|---|---|
| Nr. | Comp. | Conc., wt.-% | Properties |
| 1 | APUQU-3-F | 3.0 | T(N, I) = ° C. |
| 2 | BCH-32 | 9.0 | Δn (589 nm, 20° C.):= |
| 3 | CC-3-V | 25.5 | $\varepsilon_{\parallel}$ (1 kHz, 20° C.):= |
| 4 | CCP-3-1 | 6.0 | $\varepsilon_{\perp}$ (1 kHz, 20° C.):= |
| 5 | CCP-3-3 | 3.0 | Δε (1 kHz, 20° C.):= |
| 6 | CCP-30CF3 | 2.5 | $\gamma_1$ (20° C.): = mPa · s |
| 7 | CCP-3F.F.F | 0.5 | $K_1$ (20° C.): = pN |
| 8 | CCP-V-1 | 14.0 | $K_3$ (20° C.): = pN |
| 9 | CCP-V2-1 | 1.0 | $V_0$ (20° C.): = V |
| 10 | CLP-3-T | 6.5 | |
| 11 | CLU-3-F | 6.0 | |
| 12 | PCH-302 | 10.0 | |
| 13 | PGUQU-3-F | 3.0 | |
| 14 | PGUQU-4-F | 5.0 | |
| 15 | PGUQU-5-F | 5.0 | |

Mixture Example S46 (Stabilised with Compounds of Formulae ST-2-3 and H-3-1)

A nematic LC mixture according to the invention is formulated as follows:

| Mixture M46 | 99.85 wt.-% |
|---|---|
| Compound of Formula ST-2-3 | 500 ppm |
| Compound of Formula H-3-1 | 1000 ppm |

Example M47

A nematic LC medium is formulated as follows:

| Composition | | | |
|---|---|---|---|
| Nr. | Comp. | Conc., wt.-% | Properties |
| 1 | BCH-32 | 9.0 | T(N, I) = ° C. |
| 2 | CC-3-V | 20.5 | Δn (589 nm, 20° C.):= |
| 3 | CC-3-V1 | 7.0 | $\varepsilon_{\parallel}$ (1 kHz, 20° C.): = |
| 4 | CCP-3-1 | 6.0 | $\varepsilon_{\perp}$ (1 kHz, 20° C.): = |
| 5 | CCP-3-3 | 5.0 | Δε (1 kHz, 20° C.): = |
| 6 | CCP-30CF3 | 2.5 | $\gamma_1$ (20° C.): = mPa · s |
| 7 | CCP-V-1 | 11.5 | $K_1$ (20° C.): = pN |
| 8 | CLP-3-T | 0.5 | $K_3$ (20° C.): = pN |
| 9 | CLU-3-F | 13.5 | $V_0$ (20° C.): = V |
| 10 | DGUQU-4-F | 1.0 | |
| 11 | PCH-302 | 10.0 | |
| 12 | PGU-2-F | 0.5 | |
| 13 | PGUQU-3-F | 3.0 | |
| 14 | PGUQU-4-F | 5.0 | |
| 15 | PGUQU-5-F | 4.0 | |
| 16 | PPGU-3-F | 1.0 | |

Mixture Example S47 (Stabilised with Compounds of Formulae ST-2-3 and H-3-1)

A nematic LC mixture according to the invention is formulated as follows:

| Mixture M47 | 99.85 wt.-% |
|---|---|
| Compound of Formula ST-2-3 | 500 ppm |
| Compound of Formula H-3-1 | 1000 ppm |

Example M48

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 100.4° C. |
| 2 | BCH-32 | 4.0 | Δn (589 nm, 20° C.): = 0.1113 |
| 3 | CC-3-V | 18.5 | $\varepsilon_{\parallel}$ (1 kHz, 20° C.): = 8.6 |
| 4 | CC-3-V1 | 8.5 | $\varepsilon_{\perp}$ (1 kHz, 20° C.): = 2.9 |
| 5 | CCP-3-1 | 5.0 | Δε (1 kHz, 20° C.): = 5.8 |
| 6 | CCP-3-3 | 5.0 | $\gamma_1$ (20° C.): = 99 mPa · s |
| 7 | CCP-V-1 | 20.0 | $K_1$ (20° C.): = 16.8 pN |
| 8 | CCPC-33 | 0.5 | $K_3$ (20° C.): = 18.8 pN |
| 9 | CLP-3-T | 1.5 | $V_0$ (20° C.): = 1.80 V |
| 10 | CLU-3-F | 9.0 | |
| 11 | PCH-302 | 10.0 | |
| 12 | PGU-3-F | 4.0 | |
| 13 | PGUQU-3-F | 2.0 | |
| 14 | PGUQU-4-F | 4.0 | |
| 15 | PGUQU-5-F | 6.0 | |

Mixture Example S48 (Stabilised with Compounds of Formulae ST-2-3 and H-3-1)

A nematic LC mixture according to the invention is formulated as follows:

| Mixture M48 | 99.85 wt.-% |
|---|---|
| Compound of Formula ST-2-3 | 500 ppm |
| Compound of Formula H-3-1 | 1000 ppm |

Example M49

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 101.2° C. |
| 2 | BCH-32 | 9.0 | Δn (589 nm, 20° C.): = 0.1106 |
| 3 | CC-3-V | 25.5 | $\varepsilon_{\parallel}$ (1 kHz, 20° C.): = 8.7 |
| 4 | CC-3-V1 | 3.5 | $\varepsilon_{\perp}$ (1 kHz, 20° C.): = 2.9 |
| 5 | CCP-3-1 | 5.5 | Δε (1 kHz, 20° C.): = 5.8 |
| 6 | CCP-V-1 | 14.5 | $\gamma_1$ (20° C.): = 99 mPa · s |
| 7 | CCPC-33 | 2.0 | $K_1$ (20° C.): = 17.6 pN |
| 8 | CLP-3-T | 7.0 | $K_3$ (20° C.): = 18.6 pN |
| 9 | CLU-3-F | 7.0 | $V_0$ (20° C.): = 1.82 V |
| 10 | PCH-302 | 10.0 | |
| 11 | PGUQU-3-F | 3.0 | |
| 12 | PGUQU-4-F | 5.0 | |
| 13 | PGUQU-5-F | 6.0 | |

Mixture Example S49 (Stabilised with Compounds of Formulae ST-2-3 and H-3-1)

A nematic LC mixture according to the invention is formulated as follows:

| Mixture M49 | 99.85 wt.-% |
|---|---|
| Compound of Formula ST-2-3 | 500 ppm |
| Compound of Formula H-3-1 | 1000 ppm |

Example M50

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 101.3° C. |
| 2 | BCH-32 | 9.0 | Δn (589 nm, 20° C.):= |
| 3 | CC-3-V | 19.5 | $\varepsilon_{\parallel}$ (1 kHz, 20° C.): = 8.7 |
| 4 | CC-3-V1 | 8.5 | $\varepsilon_{\perp}$ (1 kHz, 20° C.): = 2.9 |
| 5 | CCP-3-1 | 7.0 | $\Delta_{\varepsilon}$ (1 kHz, 20° C.): = 5.8 |
| 6 | CCP-3-3 | 1.5 | $\gamma_1$ (20° C.): = 100 mPa · s |
| 7 | CCP-3F.F.F | 4.0 | $K_1$ (20° C.): = 18.1 pN |
| 8 | CCP-V-1 | 14.0 | $K_3$ (20° C.): = 19.0 pN |
| 9 | CLP-3-T | 6.5 | $V_0$ (20° C.): = 1.85 V |
| 10 | CLU-3-F | 4.5 | |
| 11 | PCH-302 | 10.0 | |
| 12 | PGUQU-3-F | 3.0 | |
| 13 | PGUQU-4-F | 5.0 | |
| 14 | PGUQU-5-F | 5.5 | |

Mixture Example S50 (Stabilised with Compounds of Formulae ST-2-3 and H-3-1)

A nematic LC mixture according to the invention is formulated as follows:

| Mixture M50 | 99.85 wt.-% |
|---|---|
| Compound of Formula ST-2-3 | 500 ppm |
| Compound of Formula H-3-1 | 1000 ppm |

Example MP1

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 101° C. |
| 2 | BCH-32 | 5.0 | Δn (589 nm, 20° C.): = 0.1114 |
| 3 | CC-3-V | 21.5 | $\varepsilon_{\parallel}$ (1 kHz, 20° C.): = 8.7 |
| 4 | CC-3-V1 | 8.0 | $\varepsilon_{\perp}$ (1 kHz, 20° C.): = 2.9 |
| 5 | CCP-3-1 | 7.0 | Δε (1 kHz, 20° C.): = 5.8 |
| 6 | CCP-3-3 | 4.5 | $\gamma_1$ (20° C.): = 100 mPa · s |
| 7 | CCP-V-1 | 13.5 | $K_1$ (20° C.): = 18.0 pN |
| 8 | CCPC-33 | 1.5 | $K_3$ (20° C.): = 18.9 pN |
| 9 | CLP-3-T | 6.5 | $V_0$ (20° C.): = 1.85 V |
| 10 | CLU-3-F | 4.0 | |
| 11 | PCH-302 | 10.0 | |
| 12 | PGU-3-F | 4.0 | |
| 13 | PGUQU-3-F | 3.0 | |
| 14 | PGUQU-4-F | 5.0 | |
| 15 | PGUQU-5-F | 4.5 | |

Mixture Example S51 (Stabilised with Compounds of Formulae ST-2-3 and H-3-1)

A nematic LC mixture according to the invention is formulated as follows:

| Mixture M51 | 99.85 wt. % |
|---|---|
| Compound of Formula ST-2-3 | 500 ppm |
| Compound of Formula H-3-1 | 1000 ppm |

Example M52

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 100.6° C. |
| 2 | BCH-32 | 9.0 | Δn (589 nm, 20° C.): = 0.1107 |
| 3 | CC-3-V | 19.5 | $\varepsilon_{\parallel}$ (1 kHz, 20° C.): = 8.7 |
| 4 | CC-3-V1 | 10.0 | $\varepsilon_{\perp}$ (1 kHz, 20° C.): = 2.9 |
| 5 | CCP-3-1 | 7.0 | Δε (1 kHz, 20° C.): = 5.8 |
| 6 | CCP-V-1 | 14.0 | $\gamma_1$ (20° C.): = 98 mPa · s |
| 7 | CCPC-33 | 1.0 | $K_1$ (20° C.): = 17.5 pN |
| 8 | CLP-3-T | 2.5 | $K_3$ (20° C.): = 18.8 pN |
| 9 | CLU-3-F | 11.5 | $V_0$ (20° C.): = 1.81 V |
| 10 | PCH-302 | 10.0 | |
| 11 | PGUQU-3-F | 3.0 | |
| 12 | PGUQU-4-F | 4.5 | |
| 13 | PGUQU-5-F | 6.0 | |

Mixture Example S52 (Stabilised with Compounds of Formulae ST-2-3 and H-3-1)

A nematic LC mixture according to the invention is formulated as follows:

| Mixture M52 | 99.85 wt.-% |
|---|---|
| Compound of Formula ST-2-3 | 500 ppm |
| Compound of Formula H-3-1 | 1000 ppm |

Example M53

A nematic LC medium is formulated as follows:

| Composition | | | |
|---|---|---|---|
| Nr. | Comp. | Conc., wt.-% | Properties |
| 1 | APUQU-3-F(1) | 2.0 | T(N, I) = 101° C. |
| 2 | BCH-32 | 9.0 | Δn (589 nm, 20° C.): = 0.1086 |
| 3 | CC-3-V | 19.5 | $\varepsilon_{\parallel}$ (1 kHz, 20° C.): = 8.7 |
| 4 | CC-3-V1 | 10.0 | $\varepsilon_{\perp}$ (1 kHz, 20° C.): = 2.9 |
| 5 | CCP-3-1 | 7.0 | Δε (1 kHz, 20° C.): = 5.8 |
| 6 | CCP-V-1 | 14.0 | $\gamma_1$ (20° C.): = 107 mPa · s |
| 7 | CCPC-33 | 1.0 | $K_1$ (20° C.): = 17.2 pN |
| 8 | CLP-3-T | 2.5 | $K_3$ (20° C.): = 19.0 pN |
| 9 | CLU-3-F | 11.5 | $V_0$ (20° C.): = 1.83 V |
| 10 | PCH-302 | 10.0 | |
| 11 | PGUQU-3-F(1) | 3.0 | |
| 12 | PGUQU-4-F(1) | 4.5 | |
| 13 | PGUQU-5-F(1) | 6.0 | |

Mixture Example S53 (Stabilised with Compounds of Formulae ST-2-3 and H-3-1)

A nematic LC mixture according to the invention is formulated as follows:

| Mixture M53 | 99.85 wt.-% |
|---|---|
| Compound of Formula ST-2-3 | 500 ppm |
| Compound of Formula H-3-1 | 1000 ppm |

Example M54

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 101° C. |
| 2 | BCH-32 | 2.5 | Δn (589 nm, 20° C.): = 0.1108 |
| 3 | CC-3-V | 22.5 | $\varepsilon_{\parallel}$ (1 kHz, 20° C.): = 8.7 |
| 4 | CC-3-V1 | 6.5 | $\varepsilon_{\perp}$ (1 kHz, 20° C.): = 2.9 |
| 5 | CCP-3-1 | 7.0 | Δε (1 kHz, 20° C.): = 5.8 |
| 6 | CCP-3-3 | 4.0 | $\gamma_1$ (20° C.): = 103 mPa · s |
| 7 | CCP-V-1 | 13.0 | $K_1$ (20° C.): = 17.5 pN |
| 8 | CCP-V2-1 | 1.5 | $K_3$ (20° C.): = 18.9 pN |
| 9 | CCPC-33 | 3.0 | $V_0$ (20° C.): = 1.83 V |
| 10 | CLP-3-T | 6.5 | |
| 11 | CLU-3-F | 4.5 | |
| 12 | PCH-302 | 10.0 | |
| 13 | PGU-2-F | 3.5 | |
| 14 | PGU-3-F | 3.5 | |
| 15 | PGUQU-3-F | 3.0 | |
| 16 | PGUQU-4-F | 4.0 | |

Mixture Example S54 (Stabilised with Compounds of Formulae ST-2-3 and H-3-1)

A nematic LC mixture according to the invention is formulated as follows:

| Mixture M54 | 99.85 wt.-% |
|---|---|
| Compound of Formula ST-2-3 | 500 ppm |
| Compound of Formula H-3-1 | 1000 ppm |

Example M55

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 100.7° C. |
| 2 | BCH-32 | 2.5 | Δn (589 nm, 20° C.): = 0.1108 |
| 3 | CC-3-V | 22.0 | $\varepsilon_{\parallel}$ (1 kHz, 20° C.): = 8.7 |
| 4 | CC-3-V1 | 7.0 | $\varepsilon_{\perp}$ (1 kHz, 20° C.): = 2.9 |
| 5 | CCP-3-1 | 7.0 | Δε (1 kHz, 20° C.): = 5.8 |
| 6 | CCP-3-3 | 5.0 | $\gamma_1$ (20° C.): = 104 mPa · s |
| 7 | CCP-V-1 | 13.0 | $K_1$ (20° C.): = 17.5 pN |
| 8 | CCP-V2-1 | 0.5 | $K_3$ (20° C.): = 18.8 pN |
| 9 | CCPC-33 | 3.0 | $V_0$ (20° C.): = 1.83 V |
| 10 | CLP-3-T | 6.5 | |
| 11 | CLU-3-F | 4.0 | |
| 12 | PCH-302 | 10.0 | |
| 13 | PGU-2-F | 5.0 | |
| 14 | PGU-3-F | 2.5 | |
| 15 | PGUQU-4-F | 5.0 | |
| 16 | PGUQU-5-F | 5.0 | |

Mixture Example S55 (Stabilised with Compounds of Formulae ST-2-3 and H-3-1)

A nematic LC mixture according to the invention is formulated as follows:

| Mixture M55 | 99.85 wt.-% |
|---|---|
| Compound of Formula ST-2-3 | 500 ppm |
| Compound of Formula H-3-1 | 1000 ppm |

Example M56

A nematic LC medium is formulated as follows:

| Composition | | | |
|---|---|---|---|
| Nr. | Comp. | Conc., wt.-% | Properties |
| 1 | BCH-32 | 9.0 | T(N, I) = 99.7° C. |
| 2 | CC-3-V | 31.5 | Δn (589 nm, 20° C.): = 0.1104 |
| 3 | CCG-V-F | 4.0 | $\varepsilon_{\parallel}$ (1 kHz, 20° C.): = 8.6 |
| 4 | CCP-3-1 | 5.0 | $\varepsilon_{\perp}$ (1 kHz, 20° C.): = 2.9 |
| 5 | CCP-3-3 | 5.0 | Δε (1 kHz, 20° C.): = 5.8 |
| 6 | CCP-V-1 | 9.5 | $\gamma_1$ (20° C.): = 91 mPa · s |
| 7 | CCPC-33 | 3.0 | $K_1$ (20° C.): = 16.4 pN |
| 8 | CDUQU-3-F | 1.0 | $K_3$ (20° C.): = 17.4 pN |
| 9 | CLU-3-F | 13.0 | $V_0$ (20° C.): = 1.77 V |
| 10 | DGUQU-4-F | 1.0 | |
| 11 | PGU-2-F | 2.5 | |
| 12 | PGUQU-3-F | 3.5 | |
| 13 | PGUQU-4-F | 4.0 | |
| 14 | PGUQU-5-F | 3.0 | |
| 15 | PP-1-2V1 | 5.0 | |

Mixture Example S56 (Stabilised with Compounds of Formulae ST-2-3 and H-3-1)

A nematic LC mixture according to the invention is formulated as follows:

| Mixture M56 | 99.85 wt.-% |
|---|---|
| Compound of Formula ST-2-3 | 500 ppm |
| Compound of Formula H-3-1 | 1000 ppm |

Example M57

A nematic LC medium is formulated as follows:

| Composition | | | |
|---|---|---|---|
| Nr. | Comp. | Conc., wt.-% | Properties |
| 1 | BCH-32 | 8.0 | T(N, I) = 103.6° C. |
| 2 | BCH-5F.F.F | 2.5 | Δn (589 nm, 20° C.): = 0.1116 |
| 3 | CBC-33 | 0.5 | $\varepsilon_{\parallel}$ (1 kHz, 20° C.): = 8.6 |
| 4 | CC-3-V | 34.0 | $\varepsilon_{\perp}$ (1 kHz, 20° C.): = 2.8 |
| 5 | CC-3-V1 | 1.0 | Δε (1 kHz, 20° C.): = 5.8 |
| 6 | CCP-3-1 | 10.0 | $\gamma_1$ (20° C.): = 97 mPa · s |
| 7 | CCP-30CF3 | 8.0 | $K_1$ (20° C.): = 17.8 pN |
| 8 | CCP-V-1 | 0.5 | $K_3$ (20° C.): = 18.5 pN |
| 9 | CCPC-33 | 2.0 | $V_0$ (20° C.): = 1.84 V |
| 10 | CCPC-35 | 4.0 | |
| 11 | CLU-3-F | 9.0 | |
| 12 | PGUQU-3-F | 8.0 | |
| 13 | PGUQU-4-F | 4.0 | |
| 14 | PGUQU-5-F | 2.0 | |
| 15 | PP-1-2V1 | 6.5 | |

Mixture Example S57 (Stabilised with Compounds of Formulae ST-2-3 and H-3-1)

A nematic LC mixture according to the invention is formulated as follows:

| Mixture M57 | 99.85 wt.-% |
|---|---|
| Compound of Formula ST-2-3 | 500 ppm |
| Compound of Formula H-3-1 | 1000 ppm |

Example M58

A nematic LC medium is formulated as follows:

| Composition | | | |
|---|---|---|---|
| Nr. | Comp. | Conc., wt.-% | Properties |
| 1 | APUQU-3-F | 2.5 | T(N, I) = 100.3° C. |
| 2 | BCH-32 | 4.0 | Δn (589 nm, 20° C.): = 0.1119 |
| 3 | CC-3-V | 22.0 | $\varepsilon_{\parallel}$ (1 kHz, 20° C.): = 8.8 |
| 4 | CC-3-V1 | 8.0 | $\varepsilon_{\perp}$ (1 kHz, 20° C.): = 3.0 |
| 5 | CCP-3-1 | 7.0 | Δε (1 kHz, 20° C.): = 5.9 |
| 6 | CCP-3-3 | 5.0 | $\gamma_1$ (20° C.): = 99 mPa · s |
| 7 | CCP-V-1 | 12.0 | $K_1$ (20° C.): = 17.1 pN |
| 8 | CCP-V2-1 | 1.0 | $K_3$ (20° C.): = 18.6 pN |
| 9 | CCPC-33 | 2.5 | $V_0$ (20° C.): = 1.81 V |
| 10 | CLP-3-T | 6.0 | |
| 11 | CLU-3-F | 2.0 | |
| 12 | PCH-302 | 10.0 | |
| 13 | PGU-2-F | 7.0 | |
| 14 | PGUQU-3-F | 3.0 | |
| 15 | PGUQU-4-F | 5.0 | |
| 16 | PGUQU-5-F | 3.0 | |

Mixture Example S58 (Stabilised with Compounds of Formulae ST-2-3 and H-3-1)

A nematic LC mixture according to the invention is formulated as follows:

| Mixture M58 | 99.85 wt.-% |
|---|---|
| Compound of Formula ST-2-3 | 500 ppm |
| Compound of Formula H-3-1 | 1000 ppm |

Example M59

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = 100.4° C. |
| 2 | BCH-32 | 4.0 | Δn (589 nm, 20° C.): = 0.1113 |
| 3 | CC-3-V | 22.5 | $\varepsilon_{\parallel}$ (1 kHz, 20° C.): = 8.8 |
| 4 | CC-3-V1 | 8.0 | $\varepsilon_{\perp}$ (1 kHz, 20° C.): = 2.9 |
| 5 | CCP-3-1 | 7.0 | Δε (1 kHz, 20° C.): = 5.8 |
| 6 | CCP-3-3 | 5.0 | $\gamma_1$ (20° C.): = 99 mPa · s |
| 7 | CCP-V-1 | 12.0 | $K_1$ (20° C.): = 17.6 pN |
| 8 | CCP-V2-1 | 0.5 | $K_3$ (20° C.): = 18.7 pN |
| 9 | CCPC-33 | 2.5 | $V_0$ (20° C.): = 1.82 V |
| 10 | CLP-3-T | 6.5 | |
| 11 | CLU-3-F | 2.0 | |
| 12 | PCH-302 | 10.0 | |
| 13 | PGU-2-F | 6.0 | |
| 14 | PGUQU-3-F | 3.0 | |
| 15 | PGUQU-4-F | 5.0 | |
| 16 | PGUQU-5-F | 4.0 | |

Mixture Example S59 (Stabilised with Compounds of Formulae ST-2-3 and H-3-1)

A nematic LC mixture according to the invention is formulated as follows:

| Mixture M59 | 99.85 wt.-% |
|---|---|
| Compound of Formula ST-2-3 | 500 ppm |
| Compound of Formula H-3-1 | 1000 ppm |

Example M60

A nematic LC medium is formulated as follows:

| Nr. | Comp. | Conc., wt.-% | Properties |
|---|---|---|---|
| Composition | | | |
| 1 | BCH-32 | 7.5 | T(N, I) = 101° C. |
| 2 | CC-3-V | 27.0 | Δn (589 nm, 20° C.): = 0.1115 |
| 3 | CCG-V-F | 4.0 | $\varepsilon_{\parallel}$ (1 kHz, 20° C.): = 8.6 |
| 4 | CCP-3-1 | 7.0 | $\varepsilon_{\perp}$ (1 kHz, 20° C.): = 2.8 |
| 5 | CCP-3-3 | 5.0 | Δε (1 kHz, 20° C.): = 5.8 |
| 6 | CCP-V-1 | 8.0 | $\gamma_1$ (20° C.): = 98 mPa · s |
| 7 | CCPC-33 | 3.0 | $K_1$ (20° C.): = 17.5 pN |
| 8 | CDUQU-3-F | 1.0 | $K_3$ (20° C.): = 18.5 pN |
| 9 | CLU-3-F | 20.0 | $V_0$ (20° C.): = 1.82 V |
| 10 | DGUQU-4-F | 1.0 | |
| 11 | PGUQU-3-F | 3.0 | |
| 12 | PGUQU-4-F | 2.5 | |
| 13 | PGUQU-5-F | 3.5 | |
| 14 | PP-1-2V1 | 7.5 | |

Mixture Example S60 (Stabilised with Compounds of Formulae ST-2-3 and H-3-1)

A nematic LC mixture according to the invention is formulated as follows:

| Mixture M60 | 99.85 wt.-% |
|---|---|
| Compound of Formula ST-2-3 | 500 ppm |
| Compound of Formula H-3-1 | 1000 ppm |

Example M61

A nematic LC medium is formulated as follows:

| Nr. | Comp. | Conc., wt.-% | Properties |
|---|---|---|---|
| Composition | | | |
| 1 | BCH-32 | 8.5 | T(N, I) = 100.2° C. |
| 2 | BCH-5F.F.F | 3.5 | Δn (589 nm, 20° C.): = 0.1119 |
| 3 | CC-3-V | 32.5 | $\varepsilon_{\parallel}$ (1 kHz, 20° C.): = 8.5 |
| 4 | CCP-3-1 | 10.0 | $\varepsilon_{\perp}$ (1 kHz, 20° C.): = 2.8 |
| 5 | CCP-V-1 | 2.0 | Δε (1 kHz, 20° C.): = 5.7 |
| 6 | CCPC-33 | 2.5 | $\gamma_1$ (20° C.): = 100 mPa · s |
| 7 | CCPC-35 | 4.0 | $K_1$ (20° C.): = 17.4 pN |
| 8 | CLU-3-F | 19.0 | $K_3$ (20° C.): = 17.7 pN |
| 9 | PGUQU-3-F | 8.0 | $V_0$ (20° C.): = 1.83 V |

-continued

| Nr. | Comp. | Conc., wt.-% | Properties |
|---|---|---|---|
| Composition | | | |
| 10 | PGUQU-4-F | 2.5 | |
| 11 | PP-1-2V1 | 7.5 | |

Mixture Example S61 (Stabilised with Compounds of Formulae ST-2-3 and H-3-1)

A nematic LC mixture according to the invention is formulated as follows:

| Mixture M61 | 99.85 wt.-% |
|---|---|
| Compound of Formula ST-2-3 | 500 ppm |
| Compound of Formula H-3-1 | 1000 ppm |

Example M62

A nematic LC medium is formulated as follows:

| Nr. | Comp. | Conc., wt.-% | Properties |
|---|---|---|---|
| Composition | | | |
| 1 | BCH-32 | 9.0 | T(N, I) = 102.8° C. |
| 2 | CC-3-V | 30.0 | Δn (589 nm, 20° C.): = 0.1117 |
| 3 | CC-3-V1 | 1.0 | $\varepsilon_{\parallel}$ (1 kHz, 20° C.): = 8.6 |
| 4 | CCP-3-1 | 10.0 | $\varepsilon_{\perp}$ (1 kHz, 20° C.): = 2.8 |
| 5 | CCP-V-1 | 10.5 | Δε (1 kHz, 20° C.): = 5.8 |
| 6 | CCPC-33 | 3.0 | $\gamma_1$ (20° C.): = 97 mPa · s |
| 7 | CLU-3-F | 20.0 | $K_1$ (20° C.): = 17.5 pN |
| 8 | PGUQU-3-F | 5.0 | $K_3$ (20° C.): = 18.5 pN |
| 9 | PGUQU-4-F | 7.0 | $V_0$ (20° C.): = 1.81 V |
| 11 | PP-1-2V1 | 4.5 | |

Mixture Example S62 (Stabilised with Compounds of Formulae ST-2-3 and H-3-1)

A nematic LC mixture according to the invention is formulated as follows:

| Mixture M62 | 99.85 wt.-% |
|---|---|
| Compound of Formula ST-2-3 | 500 ppm |
| Compound of Formula H-3-1 | 1000 ppm |

Mixture Example S62a (Stabilised with Compounds of Formulae ST-2-3 and H-3-7)

A nematic LC mixture according to the invention is formulated as follows:

| Mixture M62 | 99.85 wt.-% |
|---|---|
| Compound of Formula ST-2-3 | 500 ppm |
| Compound of Formula H-3-7 | 1000 ppm |

-continued

| Mixture M62 | 99.85 wt.-% |
|---|---|

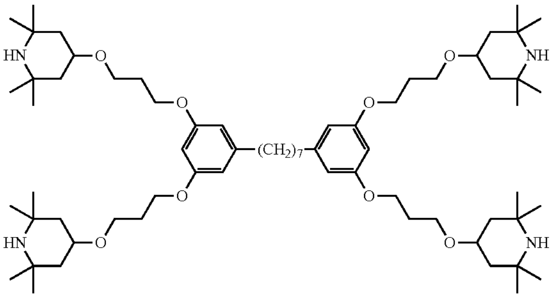

H-3-7

Mixture Example S62b (Stabilised with Compounds of Formulae ST-2-3 and H-3-1)

A nematic LC mixture according to the invention is formulated as follows:

| Mixture M62 | 99.925 wt.-% |
|---|---|
| Compound of Formula ST-2-3 | 500 ppm |
| Compound of Formula H-3-1 | 250 ppm |

Mixture Example S62c (Stabilised with Compounds of Formulae ST-2-3 and H-3-1)

A nematic LC mixture according to the invention is formulated as follows:

| Mixture M62 | 99.9 wt.-% |
|---|---|
| Compound of Formula ST-2-3 | 500 ppm |
| Compound of Formula H-3-1 | 500 ppm |

Mixture Example S62d (Stabilised with Compounds of Formulae ST-2-3 and H-3-22)

A nematic LC mixture according to the invention is formulated as follows:

| Mixture M62 | 99.925 wt.-% |
|---|---|
| Compound of Formula ST-2-3 | 500 ppm |
| Compound of Formula H-3-22 | 250 ppm |

-continued

| Mixture M62 | 99.925 wt.-% |
|---|---|

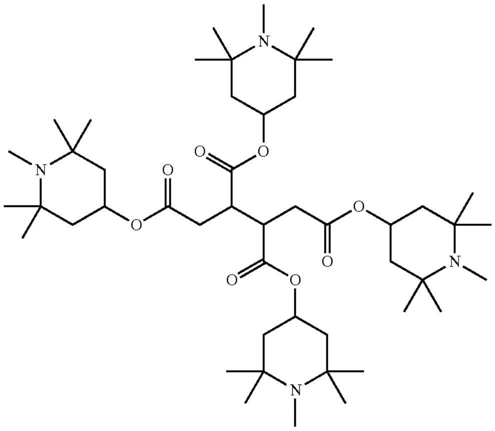

H-3-22

Mixture Example S62e (Stabilised with Compounds of Formulae ST-2-3 and H-3-22)

A nematic LC mixture according to the invention is formulated as follows:

| Mixture M62 | 99.9 wt.-% |
|---|---|
| Compound of Formula ST-2-3 | 500 ppm |
| Compound of Formula H-3-22 | 500 ppm |

Mixture Example S62f (Stabilised with Compounds of Formulae ST-2-3 and H-3-22)

A nematic LC mixture according to the invention is formulated as follows:

| Mixture M62 | 99.85 wt.-% |
|---|---|
| Compound of Formula ST-2-3 | 500 ppm |
| Compound of Formula H-3-22 | 1000 ppm |

Mixture Example S62q (Stabilised with Compounds of Formulae ST-2-3 and H-3-23)

A nematic LC mixture according to the invention is formulated as follows:

| Mixture M62 | 99.85 wt.-% |
|---|---|
| Compound of Formula ST-2-3 | 500 ppm |
| Compound of Formula H-3-23 | 1000 ppm |

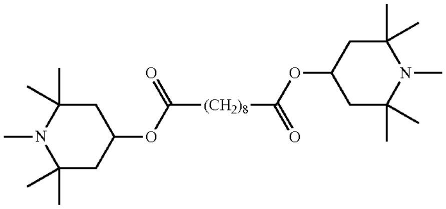

H-3-23

Mixture Example S62h (Stabilised with Compound of Formulae ST-2-3

A nematic LC mixture according to the invention is formulated as follows:

| Mixture M62 | 99.95 wt.-% |
|---|---|
| Compound of Formula ST-2-3 | 500 ppm |

Mixture Example S62i (Stabilised with Compounds of Formulae ST-2-3 and H-3-1)

A nematic LC mixture according to the invention is formulated as follows:

| Mixture M62 | 99.875 wt.-% |
|---|---|
| Compound of Formula ST-2-3 | 500 ppm |
| Compound of Formula H-3-1 | 750 ppm |

Example M63

A nematic LC medium is formulated as follows:

| Composition | | | |
|---|---|---|---|
| Nr. | Comp. | Conc., wt.-% | Properties |
| 1 | BCH-32 | 9.0 | T(N, I) = 103.1° C. |
| 2 | CC-3-V | 30.0 | Δn (589 nm, 20° C.): = 0.1101 |
| 3 | CC-3-V1 | 1.0 | $\varepsilon_{\parallel}$ (1 kHz, 20° C.): = 8.6 |
| 4 | CCP-3-1 | 10.0 | $\varepsilon_{\perp}$ (1 kHz, 20° C.): = 2.8 |
| 5 | CCP-V-1 | 10.5 | Δε (1 kHz, 20° C.): = 5.8 |
| 6 | CCPC-33 | 3.0 | $\gamma_1$ (20° C.): = 105 mPa · s |
| 7 | CLU-3-F | 20.0 | $K_1$ (20° C.): = 17.4 pN |
| 8 | PGUQU-3-F(1) | 5.0 | $K_3$ (20° C.): = 18.6 pN |
| 9 | PGUQU-4-F(1) | 7.0 | $V_0$ (20° C.): = 1.81 V |
| 11 | PP-1-2V1 | 4.5 | |

Mixture Example S63 (Stabilised with Compounds of Formulae ST-2-3 and H-3-1)

A nematic LC mixture according to the invention is formulated as follows:

| Mixture M63 | 99.875 wt.-% |
|---|---|
| Compound of Formula ST-2-3 | 500 ppm |
| Compound of Formula H-3-1 | 750 ppm |

Mixture Example S63a (Stabilised with Compounds of Formulae ST-2-3 and H-3-1)

A nematic LC mixture according to the invention is formulated as follows:

| Mixture M63 | 99.9 wt.-% |
|---|---|
| Compound of Formula ST-2-3 | 500 ppm |
| Compound of Formula H-3-1 | 500 ppm |

Mixture Example S63b (Stabilised with Compounds of Formulae ST-2-3 and H-3-1)

A nematic LC mixture according to the invention is formulated as follows:

| Mixture M63 | 99.925 wt.-% |
|---|---|
| Compound of Formula ST-2-3 | 500 ppm |
| Compound of Formula H-3-1 | 250 ppm |

Mixture Example S63c (Stabilised with Compounds of Formulae ST-2-3 and H-3-1)

A nematic LC mixture according to the invention is formulated as follows:

| Mixture M63 | 99.85 wt.-% |
|---|---|
| Compound of Formula ST-2-3 | 500 ppm |
| Compound of Formula H-3-1 | 1000 ppm |

Mixture Example S63d (Stabilised with Compound of Formulae ST-2-3)

A nematic LC mixture according to the invention is formulated as follows:

| Mixture M63 | 99.95 wt.-% |
|---|---|
| Compound of Formula ST-2-3 | 500 ppm |

Mixture Example S63e (Stabilised with Compounds of Formulae ST-2-3 and H-3-23)

A nematic LC mixture according to the invention is formulated as follows:

| Mixture M63 | 99.85 wt.-% |
|---|---|
| Compound of Formula ST-2-3 | 500 ppm |
| Compound of Formula H-3-23 | 1000 ppm |

Mixture Example S63f (Stabilised with Compounds of Formulae ST-2-3 and H-3-22)

A nematic LC mixture according to the invention is formulated as follows:

| Mixture M63 | 99.85 wt.-% |
|---|---|
| Compound of Formula ST-2-3 | 500 ppm |
| Compound of Formula H-3-22 | 1000 ppm |

Mixture Example S63q (Stabilised with Compounds of Formulae ST-2-3 and H-3-22)

A nematic LC mixture according to the invention is formulated as follows:

| Mixture M63 | 99.9 wt.-% |
|---|---|
| Compound of Formula ST-2-3 | 500 ppm |
| Compound of Formula H-3-22 | 500 ppm |

Mixture Example S63h (Stabilised with Compounds of Formulae ST-2-3 and H-3-22)

A nematic LC mixture according to the invention is formulated as follows:

| Mixture M63 | 99.925 wt.-% |
|---|---|
| Compound of Formula ST-2-3 | 500 ppm |
| Compound of Formula H-3-22 | 250 ppm |

Mixture Example S63i (Stabilised with Compounds of Formulae ST-2-3 and H-3-7)

A nematic LC mixture according to the invention is formulated as follows:

| Mixture M63 | 99.85 wt.-% |
|---|---|
| Compound of Formula ST-2-3 | 500 ppm |
| Compound of Formula H-3-7 | 1000 ppm |

Example M64

A nematic LC medium is formulated as follows:

| Composition | | | |
|---|---|---|---|
| Nr. | Comp. | Conc., wt.-% | Properties |
| 1 | BCH-32 | 8.0 | T(N, I) = 105.5° C. |
| 2 | BCH-5F.F.F | 4.0 | Δn (589 nm, 20° C.): = 0.1114 |
| 3 | CC-3-V | 27.0 | $ε_{\|\|}$ (1 kHz, 20° C.): = 8.7 |
| 4 | CC-3-V1 | 5.0 | $ε_⊥$ (1 kHz, 20° C.): = 2.8 |
| 5 | CCP-3-1 | 10.0 | Δε (1 kHz, 20° C.): = 5.9 |
| 6 | CCP-30CF3 | 8.0 | $γ_1$ (20° C.): = 97 mPa · s |
| 7 | CCP-V-1 | 9.5 | $K_1$ (20° C.): = 17.7 pN |
| 8 | CCPC-33 | 2.5 | $K_3$ (20° C.): = 18.6 pN |
| 9 | CLU-3-F | 9.0 | $V_0$ (20° C.): = 1.81 V |
| 10 | PGU-2-F | 3.0 | |
| 11 | PGUQU-3-F | 5.0 | |
| 12 | PGUQU-4-F | 5.0 | |
| 13 | PGUQU-5-F | 1.5 | |
| 14 | PP-1-2V1 | 2.5 | |

Mixture Example S64 (Stabilised with Compounds of Formulae ST-2-3 and H-3-1)

A nematic LC mixture according to the invention is formulated as follows:

| Mixture M64 | 99.85 wt.-% |
|---|---|
| Compound of Formula ST-2-3 | 500 ppm |
| Compound of Formula H-3-1 | 1000 ppm |

Example M65

A nematic LC medium is formulated as follows:

| Composition | | | |
|---|---|---|---|
| Nr. | Comp. | Conc., wt.-% | Properties |
| 1 | BCH-32 | 7.5 | T(N, I) = 102.3° C. |
| 2 | CC-3-V | 27.0 | Δn (589 nm, 20° C.): = 0.1115 |
| 3 | CC-3-V1 | 4.0 | $ε_{\|\|}$ (1 kHz, 20° C.): = 8.5 |
| 4 | CCP-3-1 | 10.0 | $ε_⊥$ (1 kHz, 20° C.): = 2.8 |
| 5 | CCP-3-3 | 4.5 | Δε (1 kHz, 20° C.): = 5.8 |
| 6 | CCP-V-1 | 7.0 | $γ_1$ (20° C.): = 99 mPa · s |
| 7 | CCPC-33 | 2.5 | $K_1$ (20° C.): = 18.5 pN |
| 8 | CLU-3-F | 20.0 | $K_3$ (20° C.): = 18.1 pN |
| 9 | PGUQU-3-F | 4.0 | $V_0$ (20° C.): = 1.85 V |
| 10 | PGUQU-4-F | 6.0 | |
| 11 | PGUQU-5-F | 2.0 | |
| 12 | PP-1-2V1 | 5.5 | |

Mixture Example S65 (Stabilised with Compounds of Formulae ST-2-3 and H-3-1)

A nematic LC mixture according to the invention is formulated as follows:

| Mixture M65 | 99.85 wt.-% |
|---|---|
| Compound of Formula ST-2-3 | 500 ppm |
| Compound of Formula H-3-1 | 1000 ppm |

Example M66

A nematic LC medium is formulated as follows:

| Composition | | | |
|---|---|---|---|
| Nr. | Comp. | Conc., wt.-% | Properties |
| 1 | BCH-32 | 4.0 | T(N, I) = 103.3° C. |
| 2 | CC-3-V | 24.5 | Δn (589 nm, 20° C.): = 0.1118 |
| 3 | CC-3-V1 | 7.0 | $ε_{\|\|}$ (1 kHz, 20° C.): = 8.6 |
| 4 | CCP-3-1 | 5.5 | $ε_⊥$ (1 kHz, 20° C.): = 2.8 |
| 5 | CCP-3-3 | 5.0 | Δε (1 kHz, 20° C.): = 5.8 |
| 6 | CCP-V-1 | 13.0 | $γ_1$ (20° C.): = 99 mPa · s |
| 7 | CCP-V2-1 | 3.0 | $K_1$ (20° C.): = 17.5 pN |
| 8 | CCPC-33 | 3.0 | $K_3$ (20° C.): = 18.9 pN |
| 9 | CLU-3-F | 15.0 | $V_0$ (20° C.): = 1.82 V |
| 10 | PGU-2-F | 2.0 | |
| 11 | PGU-3-F | 4.0 | |
| 12 | PGUQU-3-F | 3.0 | |
| 13 | PGUQU-4-F | 4.0 | |

-continued

| Composition | | | |
|---|---|---|---|
| Nr. | Comp. | Conc., wt.-% | Properties |
| 14 | PGUQU-5-F | 3.0 | |
| 15 | PP-1-2V1 | 4.0 | |

Mixture Example S66 (Stabilised with Compounds of Formulae ST-2-3 and H-3-1)

A nematic LC mixture according to the invention is formulated as follows:

| Mixture M66 | 99.85 wt.-% |
|---|---|
| Compound of Formula ST-2-3 | 500 ppm |
| Compound of Formula H-3-1 | 1000 ppm |

Example M67

A nematic LC medium is formulated as follows:

| Composition | | | |
|---|---|---|---|
| Nr. | Comp. | Conc., wt.-% | Properties |
| 1 | BCH-32 | 4.0 | T(N, I) = 102.8° C. |
| 2 | CC-3-V | 24.5 | Δn (589 nm, 20° C.): = 0.1123 |
| 3 | CC-3-V1 | 7.5 | $\varepsilon_{\parallel}$ (1 kHz, 20° C.): = 8.6 |
| 4 | CCP-3-1 | 5.0 | $\varepsilon_{\perp}$ (1 kHz, 20° C.): = 2.8 |
| 5 | CCP-3-3 | 5.0 | Δε (1 kHz, 20° C.): = 5.8 |
| 6 | CCP-V-1 | 13.0 | $\gamma_1$ (20° C.): = 99 mPa · s |
| 7 | CCP-V2-1 | 3.0 | $K_1$ (20° C.): = 17.4 pN |
| 8 | CCPC-33 | 3.0 | $K_3$ (20° C.): = 18.8 pN |
| 9 | CLU-3-F | 15.0 | $V_0$ (20° C.): = 1.82 V |
| 10 | PGU-2-F | 2.0 | |
| 11 | PGU-3-F | 4.0 | |
| 12 | PGUQU-3-F | 3.0 | |
| 13 | PGUQU-4-F | 4.0 | |
| 14 | PGUQU-5-F | 3.0 | |
| 15 | PP-1-2V1 | 4.0 | |

Mixture Example S67 (Stabilised with Compounds of Formulae ST-2-3 and H-3-1)

A nematic LC mixture according to the invention is formulated as follows:

| Mixture M67 | 99.85 wt.-% |
|---|---|
| Compound of Formula ST-2-3 | 500 ppm |
| Compound of Formula H-3-1 | 1000 ppm |

Example M68

A nematic LC medium is formulated as follows:

| Composition | | | |
|---|---|---|---|
| Nr. | Comp. | Conc., wt.-% | Properties |
| 1 | BCH-32 | 6.0 | T(N, I) = ° C. |
| 2 | CC-3-V | 17.5 | Δn (589 nm, 20° C.): = |
| 3 | CC-3-V1 | 8.0 | $\varepsilon_{\parallel}$ (1 kHz, 20° C.): = |
| 4 | CCH-301 | 8.0 | $\varepsilon_{\perp}$ (1 kHz, 20° C.): = |
| 5 | CCP-3-1 | 6.0 | Δε (1 kHz, 20° C.): = |
| 6 | CCP-30CF3 | 7.5 | $\gamma_1$ (20° C.): = mPa · s |
| 7 | CCP-V-1 | 13.0 | $K_1$ (20° C.): = pN |
| 8 | CLP-3-T | 5.0 | $K_3$ (20° C.): = pN |
| 9 | CLU-3-F | 13.5 | $V_0$ (20° C.): = V |
| 10 | PGP-2-4 | 3.5 | |
| 11 | PGU-2-F | 1.5 | |
| 12 | PGUQU-3-F | 5.0 | |
| 13 | PGUQU-4-F | 4.5 | |
| 14 | PPGU-3-F | 1.0 | |

Mixture Example S68 (Stabilised with Compounds of Formulae ST-2-3 and H-3-1)

A nematic LC mixture according to the invention is formulated as follows:

| Mixture M68 | 99.85 wt.-% |
|---|---|
| Compound of Formula ST-2-3 | 500 ppm |
| Compound of Formula H-3-1 | 1000 ppm |

Mixture Example S68a (Stabilised with Compound of Formulae ST-2-3)

A nematic LC mixture according to the invention is formulated as follows:

| Mixture M68 | 99.95 wt.-% |
|---|---|
| Compound of Formula ST-2-3 | 500 ppm |

Example M69

A nematic LC medium is formulated as follows:

| Composition | | | |
|---|---|---|---|
| Nr. | Comp. | Conc., wt.-% | Properties |
| 1 | BCH-32 | 9.0 | T(N, I) = ° C. |
| 2 | CC-3-V | 14.0 | Δn (589 nm, 20° C.): = |
| 3 | CC-3-V1 | 8.0 | $\varepsilon_{\parallel}$ (1 kHz, 20° C.): = |
| 4 | CCH-301 | 8.0 | $\varepsilon_{\perp}$ (1 kHz, 20° C.): = |
| 5 | CCH-35 | 5.0 | Δε (1 kHz, 20° C.): = |
| 6 | CCP-3-1 | 7.0 | $\gamma_1$ (20° C.): = mPa · s |
| 7 | CCP-30CF3 | 8.0 | $K_1$ (20° C.): = pN |
| 8 | CCP-V-1 | 13.0 | $K_3$ (20° C.): = pN |
| 9 | CLP-3-T | 5.5 | $V_0$ (20° C.): = V |
| 10 | CLU-3-F | 5.0 | |
| 11 | PGP-2-4 | 0.5 | |
| 12 | PGU-2-F | 6.0 | |

-continued

| Composition | | | |
|---|---|---|---|
| Nr. | Comp. | Conc., wt.-% | Properties |
| 13 | PGUQU-3-F | 5.0 | |
| 14 | PGUQU-4-F | 5.0 | |
| 15 | PPGU-3-F | 1.0 | |

Mixture Example S69 (Stabilised with Compounds of Formulae ST-2-3 and H-3-1)

A nematic LC mixture according to the invention is formulated as follows:

| Mixture M69 | 99.85 wt.-% |
|---|---|
| Compound of Formula ST-2-3 | 500 ppm |
| Compound of Formula H-3-1 | 1000 ppm |

Mixture Example S69a (Stabilised with Compound of Formulae ST-2-3)

A nematic LC mixture according to the invention is formulated as follows:

| Mixture M69 | 99.95 wt.-% |
|---|---|
| Compound of Formula ST-2-3 | 500 ppm |

Example M70

A nematic LC medium is formulated as follows:

| Composition | | | |
|---|---|---|---|
| Nr. | Comp. | Conc., wt.-% | Properties |
| 1 | BCH-32 | 9.0 | T(N, I) = ° C. |
| 2 | CC-3-V | 19.5 | Δn (589 nm, 20° C.): = |
| 3 | CC-3-V1 | 5.0 | $\varepsilon_{\parallel}$ (1 kHz, 20° C.): = |
| 4 | CCH-23 | 5.0 | $\varepsilon_{\perp}$ (1 kHz, 20° C.): = |
| 5 | CCH-34 | 2.0 | Δε (1 kHz, 20° C.): = |
| 6 | CCH-35 | 1.0 | $\gamma_1$ (20° C.): = mPa · s |
| 7 | CCP-3-1 | 7.0 | $K_1$ (20° C.): = pN |
| 8 | CCP-30CF3 | 3.0 | $K_3$ (20° C.): = pN |
| 9 | CCP-V-1 | 10.0 | $V_0$ (20° C.): = V |
| 10 | CCPC-33 | 2.0 | |
| 11 | CDUQU-3-F | 7.0 | |
| 12 | CLP-3-T | 5.0 | |
| 13 | CLU-3-F | 10.0 | |
| 14 | PGP-2-4 | 5.5 | |
| 15 | PGU-2-F | 6.5 | |
| 16 | PGUQU-3-F | 2.5 | |

Mixture Example S70 (Stabilised with Compounds of Formulae ST-2-3 and H-3-1)

A nematic LC mixture according to the invention is formulated as follows:

| Mixture M70 | 99.85 wt.-% |
|---|---|
| Compound of Formula ST-2-3 | 500 ppm |
| Compound of Formula H-3-1 | 1000 ppm |

Mixture Example S70a (Stabilised with Compound of Formulae ST-2-3)

A nematic LC mixture according to the invention is formulated as follows:

| Mixture M70 | 99.95 wt.-% |
|---|---|
| Compound of Formula ST-2-3 | 500 ppm |

Example M71

A nematic LC medium is formulated as follows:

| Composition | | | | | |
|---|---|---|---|---|---|
| Nr. | Comp. | Conc., wt.-% | Properties | | |
| 1 | BCH-32 | 3.5 | T(N, I)= | 100.9 | ° C. |
| 2 | CC-3-V | 25.5 | Δn (589 nm, 20° C.):= | 0.1104 | |
| 3 | CC-3-V1 | 8.0 | $\varepsilon_{\parallel}$ (1 kHz, 20° C.):= | 8.5 | |
| 4 | CCP-3-1 | 5.0 | $\varepsilon_{\perp}$ (1 kHz, 20° C.):= | 2.8 | |
| 5 | CCP-3-3 | 5.0 | Δε (1 kHz, 20° C.):= | 5.7 | |
| 6 | CCP-V-1 | 13.0 | γ1 (20° C.):= | | mPa · s |
| 7 | CCP-V2-1 | 2.0 | $K_1$ (20° C.):= | 17.1 | pN |
| 8 | CCPC-33 | 3.0 | $K_3$ (20° C.):= | 18.4 | pN |
| 9 | CLU-3-F | 15.0 | $V_0$ (20° C.):= | 1.81 | V |
| 10 | PGU-2-F | 2.5 | | | |
| 11 | PGU-3-F | 3.5 | | | |
| 12 | PGUQU-3-F | 3.0 | | | |
| 13 | PGUQU-4-F | 4.0 | | | |
| 14 | PGUQU-5-F | 3.0 | | | |
| 15 | PP-1-2V1 | 4.0 | | | |

Mixture Example S71 (Stabilised with Compounds of Formulae ST-2-3 and H-3-1)

A nematic LC mixture according to the invention is formulated as follows:

| Mixture M71 | 99.85 wt.-% |
|---|---|
| Compound of Formula ST-2-3 | 500 ppm |
| Compound of Formula H-3-1 | 1000 ppm |

Mixture Example S71a (Stabilised with Compound of Formulae ST-2-3)

A nematic LC mixture according to the invention is formulated as follows:

| Mixture M71 | 99.95 wt.-% |
|---|---|
| Compound of Formula ST-2-3 | 500 ppm |

Example M72

A nematic LC medium is formulated as follows:

| Composition | | | | | |
|---|---|---|---|---|---|
| Nr. | Comp. | Conc., wt.-% | Properties | | |
| 1 | BCH-32 | 9.0 | T(N, I)= | 101.6 | ° C. |
| 2 | CC-3-V | 25.0 | Δn (589 nm, 20° C.):= | 0.1091 | |
| 3 | CC-3-V1 | 4.0 | $\varepsilon_{\parallel}$ (1 kHz, 20° C.):= | 8.5 | |
| 4 | CCP-301 | 8.0 | $\varepsilon_{\perp}$ (1 kHz, 20° C.):= | 3.0 | |
| 5 | CCP-35 | 2.0 | Δε (1 kHz, 20° C.):= | 5.5 | |
| 6 | CCP-30CF3 | 6.5 | γ1 (20° C.):= | 95 | mPa · s |
| 7 | CCP-V-1 | 3.5 | $K_1$ (20° C.):= | 17.3 | pN |
| 8 | CCP-V2-1 | 5.5 | $K_3$ (20° C.):= | 16.8 | pN |
| 9 | CCPC-33 | 2.5 | $V_0$ (20° C.):= | 1.85 | V |
| 10 | CLU-3-F | 13.5 | | | |
| 11 | CPGP-4-3 | 1.5 | | | |
| 12 | CPGP-5-3 | 1.0 | | | |
| 13 | DGUQU-4-F | 4.5 | | | |
| 14 | DPGU-4-F | 4.0 | | | |
| 15 | PGP-2-2V | 3.0 | | | |
| 16 | PGUQU-3-F | 2.0 | | | |
| 17 | PGUQU-4-F | 1.0 | | | |
| 18 | PP-1-2V1 | 3.0 | | | |
| 19 | PPGU-3-F | 0.5 | | | |

Mixture Example S72 (Stabilised with Compounds of Formulae ST-2-3 and H-3-1)

A nematic LC mixture according to the invention is formulated as follows:

| Mixture M72 | 99.85 wt.-% |
|---|---|
| Compound of Formula ST-2-3 | 500 ppm |
| Compound of Formula H-3-1 | 1000 ppm |

Mixture Example S72a (Stabilised with Compound of Formulae ST-2-3)

A nematic LC mixture according to the invention is formulated as follows:

| Mixture M72 | 99.95 wt.-% |
|---|---|
| Compound of Formula ST-2-3 | 500 ppm |

Example M73

A nematic LC medium is formulated as follows:

| Composition | | | | | |
|---|---|---|---|---|---|
| Nr. | Comp. | Conc., wt.-% | Properties | | |
| 1 | BCH-32 | 9.0 | T(N, I)= | 103.4 | ° C. |
| 2 | CC-3-V | 25.5 | Δn (589 nm, 20° C.):= | 0.1124 | |
| 3 | CC-3-V1 | 1.5 | $\varepsilon_{\parallel}$ (1 kHz, 20° C.):= | 8.7 | |
| 4 | CCP-35 | 1.0 | $\varepsilon_{\perp}$ (1 kHz, 20° C.):= | 2.8 | |
| 5 | CCP-3-1 | 7.0 | Δε (1 kHz, 20° C.):= | 5.9 | |
| 6 | CCP-30CF3 | 6.5 | γ1 (20° C.):= | 96 | mPa · s |
| 7 | CCP-V-1 | 10.0 | $K_1$ (20° C.):= | 19.0 | pN |
| 8 | CCPC-33 | 2.5 | $K_3$ (20° C.):= | 18.4 | pN |
| 9 | CDUQU-3-F | 7.0 | $V_0$ (20° C.):= | 1.88 | V |
| 10 | CLU-3-F | 14.5 | | | |
| 11 | PGP-2-4 | 2.0 | | | |
| 12 | PGU-2-F | 1.5 | | | |
| 13 | PGUQU-3-F | 3.0 | | | |
| 14 | PGUQU-4-F | 2.0 | | | |
| 15 | PP-1-2V1 | 7.0 | | | |

Mixture Example S73 (Stabilised with Compounds of Formulae ST-2-3 and H-3-1)

A nematic LC mixture according to the invention is formulated as follows:

| Mixture M73 | 99.85 wt.-% |
|---|---|
| Compound of Formula ST-2-3 | 500 ppm |
| Compound of Formula H-3-1 | 1000 ppm |

Mixture Example S73a (Stabilised with Compound of Formulae ST-2-3)

A nematic LC mixture according to the invention is formulated as follows:

| Mixture M73 | 99.95 wt.-% |
|---|---|
| Compound of Formula ST-2-3 | 500 ppm |

Example M74

A nematic LC medium is formulated as follows:

| Composition | | | | | |
|---|---|---|---|---|---|
| Nr. | Comp. | Conc., wt.-% | Properties | | |
| 1 | BCH-32 | 9.0 | T(N, I)= | | ° C. |
| 2 | CC-3-V | 25.0 | Δn (589 nm, 20° C.):= | | |
| 3 | CCP-3-1 | 4.5 | $\varepsilon_{\parallel}$ (1 kHz, 20° C.):= | | |
| 4 | CCP-3-3 | 4.0 | $\varepsilon_{\perp}$ (1 kHz, 20° C.):= | | |
| 5 | CCP-V-1 | 13.0 | Δε (1 kHz, 20° C.):= | | |
| 6 | CCPC-33 | 1.0 | γ1 (20° C.):= | | mPa · s |
| 7 | CDUQU-3-F | 7.0 | $K_1$ (20° C.):= | | pN |
| 8 | CLP-3-T | 5.0 | $K_3$ (20° C.):= | | pN |
| 9 | CLU-3-F | 13.0 | $V_0$ (20° C.):= | | V |
| 10 | PCH-302 | 7.0 | | | |
| 11 | PGP-2-3 | 3.0 | | | |
| 12 | PGU-2-F | 1.5 | | | |
| 13 | PGUQU-3-F | 2.5 | | | |
| 14 | PGUQU-4-F | 2.5 | | | |
| 15 | PP-1-2V1 | 2.0 | | | |

Mixture Example S74 (Stabilised with Compounds of Formulae ST-2-3 and H-3-1)

A nematic LC mixture according to the invention is formulated as follows:

| Mixture M74 | 99.85 wt.-% |
|---|---|
| Compound of Formula ST-2-3 | 500 ppm |
| Compound of Formula H-3-1 | 1000 ppm |

Mixture Example S74a (Stabilised with Compound of Formulae ST-2-3)

A nematic LC mixture according to the invention is formulated as follows:

| Mixture M74 | 99.95 wt.-% |
|---|---|
| Compound of Formula ST-2-3 | 500 ppm |

Example M75

A nematic LC medium is formulated as follows:

| Composition | | | | | |
|---|---|---|---|---|---|
| Nr. | Comp. | Conc., wt.-% | Properties | | |
| 1 | BCH-32 | 6.5 | T(N, I)= | | ° C. |
| 2 | CC-3-V | 25.0 | Δn (589 nm, 20° C.):= | 0.1104 | |
| 3 | CCP-3-V1 | 9.0 | $\varepsilon_{\|}$ (1 kHz, 20° C.):= | 8.6 | |
| 4 | CCG-V-F | 3.0 | $\varepsilon_{\perp}$ (1 kHz, 20° C.):= | 2.8 | |
| 5 | CCP-3-1 | 5.0 | Δε (1 kHz, 20° C.):= | 5.8 | |
| 6 | CCP-3-3 | 5.0 | γ1 (20° C.):= | | mPa · s |
| 7 | CCP-V-1 | 7.5 | $K_1$ (20° C.):= | 17.2 | pN |
| 8 | CCP-V2-1 | 2.0 | $K_3$ (20° C.):= | 18.2 | pN |
| 9 | CCPC-33 | 3.0 | $V_0$ (20° C.):= | 1.82 | V |
| 10 | CLU-3-F | 15.0 | | | |
| 11 | PGU-2-F | 1.0 | | | |
| 12 | PGU-3-F | 3.0 | | | |
| 13 | PGUQU-3-F | 3.0 | | | |
| 14 | PGUQU-4-F | 4.0 | | | |
| 15 | PGUQU-5-F | 4.0 | | | |
| 16 | PP-1-2V1 | 4.0 | | | |

Mixture Example S75 (Stabilised with Compounds of Formulae ST-2-3 and H-3-1)

A nematic LC mixture according to the invention is formulated as follows:

| Mixture M75 | 99.85 wt.-% |
|---|---|
| Compound of Formula ST-2-3 | 500 ppm |
| Compound of Formula H-3-1 | 1000 ppm |

Example M76

A nematic LC medium is formulated as follows:

-continued

| Composition | | | |
|---|---|---|---|
| Nr. | Comp. | Conc., wt.-% | Properties |
| 1 | BCH-32 | 7.0 | T(N, I) = 102.2° C. |
| 2 | CC-3-V | 28.0 | Δn (589 nm, 20° C.): = 0.1109 |
| 3 | CC-3-V1 | 2.5 | $\varepsilon_{\|}$ (1 kHz, 20° C.): = 8.5 |
| 4 | CCP-3-1 | 10.0 | ε⊥ (1 kHz, 20° C.): = 2.8 |
| 5 | CCP-3-3 | 3.5 | Δε (1 kHz, 20° C.): = 5.8 |
| 6 | CCP-V-1 | 8.0 | $\gamma_1$ (20° C.): = 99 mPa · s |
| 7 | CCP-V2-1 | 1.0 | $K_1$ (20° C.): = 17.7 pN |
| 8 | CCPC-33 | 2.5 | $K_3$ (20° C.): = 18.4 pN |
| 9 | CLU-3-F | 20.0 | $V_0$ (20° C.): = 1.84 V |
| 10 | PGUQU-3-F | 4.0 | |
| 11 | PGUQU-4-F | 6.0 | |
| 12 | PGUQU-5-F | 2.0 | |
| 13 | PP-1-2V1 | 5.5 | |

Mixture Example S76 (Stabilised with Compounds of Formulae ST-2-3 and H-3-1)

A nematic LC mixture according to the invention is formulated as follows:

| Mixture M76 | 99.85 wt.-% |
|---|---|
| Compound of Formula ST-2-3 | 500 ppm |
| Compound of Formula H-3-1 | 1000 ppm |

Example M77

A nematic LC medium is formulated as follows:

| Composition | | | |
|---|---|---|---|
| Nr. | Comp. | Conc., wt.-% | Properties |
| 1 | BCH-32 | 7.5 | T(N, I) = 100.9° C. |
| 2 | CC-3-V | 28.5 | Δn (589 nm, 20° C.): = 0.1116 |
| 3 | CC-3-V1 | 1.0 | $\varepsilon_{\|}$ (1 kHz, 20° C.): = 8.6 |
| 4 | CCP-3-1 | 10.0 | ε⊥ (1 kHz, 20° C.): = 2.8 |
| 5 | CCP-3-3 | 5.0 | Δε (1 kHz, 20° C.): = 5.8 |
| 6 | CCP-V-1 | 8.0 | $\gamma_1$ (20° C.): = 94 mPa · s |
| 7 | CCPC-33 | 2.0 | $K_1$ (20° C.): = 17.7 pN |
| 8 | CLU-3-F | 20.0 | $K_3$ (20° C.): = 18.1 pN |
| 9 | PGUQU-3-F | 4.0 | $V_0$ (20° C.): = 1.83 V |
| 10 | PGUQU-4-F | 6.0 | |
| 11 | PGUQU-5-F | 2.0 | |
| 12 | PP-1-2V1 | 6.0 | |

Mixture Example S77 (Stabilised with Compounds of Formulae ST-2-3 and H-3-1)

A nematic LC mixture according to the invention is formulated as follows:

| Mixture M77 | 99.85 wt.-% |
|---|---|
| Compound of Formula ST-2-3 | 500 ppm |
| Compound of Formula H-3-1 | 1000 ppm |

Example M78

A nematic LC medium is formulated as follows:

| Composition | | | |
|---|---|---|---|
| Nr. | Comp. | Conc., wt.-% | Properties |
| 1 | BCH-32 | 9.0 | T(N, I) = 101.8° C. |
| 2 | CC-3-V | 24.5 | Δn (589 nm, 20° C.): = 0.1116 |
| 3 | CC-3-V1 | 7.0 | $\varepsilon_{\parallel}$ (1 kHz, 20° C.): = 8.7 |
| 4 | CCP-3-1 | 10.0 | ε⊥ (1 kHz, 20° C.): = 2.8 |
| 5 | CCP-3-3 | 5.0 | Δε (1 kHz, 20° C.): = 6.0 |
| 6 | CCP-V-1 | 7.0 | $\gamma_1$ (20° C.): = 94 mPa · s |
| 7 | CCPC-33 | 1.0 | $K_1$ (20° C.): = 18.1 pN |
| 8 | CLU-3-F | 20.0 | $K_3$ (20° C.): = 18.3 pN |
| 9 | PGU-2-F | 1.5 | $V_0$ (20° C.): = 1.83 V |
| 10 | PGUQU-3-F | 4.0 | LTS (−20° C.) 936 h |
| 11 | PGUQU-4-F | 6.0 | |
| 12 | PGUQU-5-F | 1.5 | |
| 13 | PP-1-2V1 | 3.5 | |

Mixture Example S78 (Stabilised with Compounds of Formulae ST-2-3 and H-3-1)

A nematic LC mixture according to the invention is formulated as follows:

| | | |
|---|---|---|
| Mixture M78 | 99.85 | wt.-% |
| Compound of Formula ST-2-3 | 500 | ppm |
| Compound of Formula H-3-1 | 1000 | ppm |

Example M79

A nematic LC medium is formulated as follows:

| Composition | | | |
|---|---|---|---|
| Nr. | Comp. | Conc., wt.-% | Properties |
| 1 | BCH-32 | 7.5 | T(N, I) = 104.9° C. |
| 2 | CC-3-V | 24.0 | Δn (589 nm, 20° C.): = 0.1117 |
| 3 | CC-3-V1 | 8.0 | $\varepsilon_{\parallel}$ (1 kHz, 20° C.): = 8.6 |
| 4 | CCP-3-1 | 7.0 | ε⊥ (1 kHz, 20° C.): = 2.8 |
| 5 | CCP-3-3 | 5.0 | Δε (1 kHz, 20° C.): = 5.8 |
| 6 | CCP-V-1 | 13.5 | $\gamma_1$ (20° C.): = 99 mPa · s |
| 7 | CCPC-33 | 2.0 | $K_1$ (20° C.): = 17.6 pN |
| 8 | CLU-3-F | 16.0 | $K_3$ (20° C.): = 18.5 pN |
| 9 | PGU-2-F | 5.0 | $V_0$ (20° C.): = 1.82 V |
| 10 | PGU-3-F | 0.5 | |
| 11 | PGUQU-3-F | 3.0 | |
| 12 | PGUQU-4-F | 4.0 | |
| 13 | PGUQU-5-F | 3.0 | |
| 14 | PP-1-2V1 | 1.5 | |

Mixture Example S79 (Stabilised with Compounds of Formulae ST-2-3 and H-3-1)

A nematic LC mixture according to the invention is formulated as follows:

| | | |
|---|---|---|
| Mixture M79 | 99.85 | wt.-% |
| Compound of Formula ST-2-3 | 500 | ppm |
| Compound of Formula H-3-1 | 1000 | ppm |

Example M80

A nematic LC medium is formulated as follows:

| Composition | | | |
|---|---|---|---|
| Nr. | Comp. | Conc., wt.-% | Properties |
| 1 | APUQU-3-F | 2.0 | T(N, I) = ° C. |
| 2 | BCH-32 | 9.0 | Δn (589 nm, 20° C.): = |
| 3 | CC-3-V | 19.5 | $\varepsilon_{\parallel}$ (1 kHz, 20° C.): = |
| 4 | CC-3-V1 | 10.0 | ε⊥ (1 kHz, 20° C.): = |
| 5 | CCP-3-1 | 7.0 | Δε (1 kHz, 20° C.): = |
| 6 | CCP-V-1 | 14.0 | $\gamma_1$ (20° C.): = mPa · s |
| 7 | CCPC-33 | 1.0 | $K_1$ (20° C.): = pN |
| 8 | CLP-3-T | 2.5 | $K_3$ (20° C.): = pN |
| 9 | CLU-3-F | 11.5 | $V_0$ (20° C.): = V |
| 10 | PCH-302 | 10.0 | |
| 11 | PGUQU-3-F | 3.0 | |
| 12 | PGUQU-4-F | 4.5 | |
| 13 | PGUQU-5-F | 6.0 | |

Mixture Example S80 (Stabilised with Compounds of Formulae ST-2-3 and H-3-1)

A nematic LC mixture according to the invention is formulated as follows:

| | | |
|---|---|---|
| Mixture M80 | 99.85 | wt.-% |
| Compound of Formula ST-2-3 | 500 | ppm |
| Compound of Formula H-3-1 | 1000 | ppm |

Example M81

A nematic LC medium is formulated as follows:

| Composition | | | |
|---|---|---|---|
| Nr. | Comp. | Conc., wt.-% | Properties |
| 1 | BCH-32 | 9.0 | T(N, I) = 102.4° C. |
| 2 | CC-3-V | 25.5 | Δn (589 nm, 20° C.): = 0.1111 |
| 3 | CC-3-V1 | 6.0 | $\varepsilon_{\parallel}$ (1 kHz, 20° C.): = 8.5 |
| 4 | CCP-3-1 | 10.0 | ε⊥ (1 kHz, 20° C.): = 2.7 |
| 5 | CCP-3-3 | 5.0 | Δε (1 kHz, 20° C.): = 5.8 |
| 6 | CCP-V-1 | 6.5 | $\gamma_1$ (20° C.): = 97 mPa · s |
| 7 | CCPC-33 | 1.5 | $K_1$ (20° C.): = 18.3 pN |
| 8 | CLU-3-F | 20.0 | $K_3$ (20° C.): = 18.5 pN |
| 9 | PGUQU-3-F | 4.0 | $V_0$ (20° C.): = 1.87 V |
| 10 | PGUQU-4-F | 6.0 | |
| 11 | PGUQU-5-F | 2.0 | |
| 12 | PP-1-2V1 | 4.5 | |

Mixture Example S81 (Stabilised with Compounds of Formulae ST-2-3 and H-3-1)

A nematic LC mixture according to the invention is formulated as follows:

| | | |
|---|---|---|
| Mixture M81 | 99.85 | wt.-% |
| Compound of Formula ST-2-3 | 500 | ppm |
| Compound of Formula H-3-1 | 1000 | ppm |

Example M82

A nematic LC medium is formulated as follows:

| Nr. | Comp. | Conc., wt.-% | Properties |
|---|---|---|---|
| 1 | APUQU-3-F | 5.0 | T(N, I) = 79.6° C. |
| 2 | CC-3-V | 37.5 | Δn (589 nm, 20° C.): = 0.1099 |
| 3 | CCP-3-1 | 10.0 | $\varepsilon_{\parallel}$ (1 kHz, 20° C.): = 15.3 |
| 4 | CCP-3-3 | 1.0 | ε⊥ (1 kHz, 20° C.): = 3.6 |
| 5 | CCP-30CF3 | 1.0 | Δε (1 kHz, 20° C.): = 11.7 |
| 6 | CCP-3F.F.F | 1.0 | $\gamma_1$ (20° C.): = 79 mPa · s |
| 7 | CCP-V-1 | 3.5 | $K_1$ (20° C.): = 12.2 pN |
| 8 | CCPC-33 | 2.0 | $K_3$ (20° C.): = 13.4 pN |
| 9 | CLU-3-F | 5.5 | $V_0$ (20° C.): = 1.07 V |
| 10 | DGUQU-4-F | 0.5 | |
| 11 | PGU-2-F | 4.5 | |
| 12 | PGUQU-3-F | 5.0 | |
| 13 | PGUQU-4-F | 7.0 | |
| 14 | PGUQU-5-F | 4.0 | |
| 15 | PUQU-3-F | 12.5 | |

Mixture Example S82 (Stabilised with Compound of Formula ST-2-3)

A nematic LC mixture according to the invention is formulated as follows:

| | |
|---|---|
| Mixture M82 | 99.95 wt.-% |
| Compound of Formula ST-2-3 | 500 ppm |

Example M83

A nematic LC medium is formulated as follows:

| Nr. | Comp. | Conc., wt.-% | Properties |
|---|---|---|---|
| 1 | APUQU-3-F | 5.5 | T(N, I) = 76.3° C. |
| 2 | CC-3-V | 35.0 | Δn (589 nm, 20° C.): = 0.1097 |
| 3 | CC-3-V1 | 4.5 | $\varepsilon_{\parallel}$ (1 kHz, 20° C.): = 15.2 |
| 4 | CCP-3-1 | 7.0 | ε⊥ (1 kHz, 20° C.): = 3.5 |
| 5 | CCP-30CF3 | 5.5 | Δε (1 kHz, 20° C.): = 11.7 |
| 6 | CLP-3-T | 1.0 | $\gamma_1$ (20° C.): = 76 mPa · s |
| 7 | CLU-3-F | 11.0 | $K_1$ (20° C.): = 12.2 pN |
| 8 | PGU-2-F | 5.0 | $K_3$ (20° C.): = 13.1 pN |
| 9 | PGU-3-F | 1.0 | $V_0$ (20° C.): = 1.07 V |
| 10 | PGUQU-3-F | 5.5 | |
| 11 | PGUQU-4-F | 7.5 | |
| 12 | PGUQU-5-F | 2.5 | |
| 13 | PPGU-3-F | 1.0 | |
| 14 | PUQU-3-F | 8.0 | |

Mixture Example S83 (Stabilised with Compound of Formula ST-2-3)

A nematic LC mixture according to the invention is formulated as follows:

| | |
|---|---|
| Mixture M83 | 99.95 wt.-% |
| Compound of Formula ST-2-3 | 500 ppm |

Example M84

A nematic LC medium is formulated as follows:

| Nr. | Comp. | Conc., wt.-% | Properties |
|---|---|---|---|
| 1 | BCH-32 | 6.5 | T(N, I) = 100° C. |
| 2 | CC-3-V1 | 11.5 | Δn (589 nm, 20° C.): = 0.1109 |
| 3 | CCG-V-F | 2.0 | $\varepsilon_{\parallel}$ (1 kHz, 20° C.): = 8.8 |
| 4 | CCH-23 | 7.0 | ε⊥ (1 kHz, 20° C.): = 2.9 |
| 5 | CCH-301 | 7.0 | Δε (1 kHz, 20° C.): = 5.8 |
| 6 | CCP-3-1 | 7.0 | $\gamma_1$ (20° C.): = 103 mPa · s |
| 7 | CCP-30CF3 | 8.0 | $K_1$ (20° C.): = 17.6 pN |
| 8 | CCP-V-1 | 13.5 | $K_3$ (20° C.): = 18.1 pN |
| 9 | CLU-3-F | 14.0 | $V_0$ (20° C.): = 1.82 V |
| 10 | CPGP-4-3 | 1.0 | LTS (−20° C.) 1000 h |
| 11 | PCH-302 | 7.0 | |
| 12 | PGUQU-3-F | 7.0 | |
| 13 | PGUQU-4-F | 5.5 | |
| 14 | PP-1-2V1 | 3.0 | |

Mixture Example S84 (Stabilised with Compound of Formula ST-2-3)

A nematic LC mixture according to the invention is formulated as follows:

| | |
|---|---|
| Mixture M84 | 99.95 wt.-% |
| Compound of Formula ST-2-3 | 500 ppm |

Mixture Example S84a (Stabilised with Compounds of Formulae ST-2-3 and H-3-22)

A nematic LC mixture according to the invention is formulated as follows:

| | |
|---|---|
| Mixture M84 | 99.85 wt.-% |
| Compound of Formula ST-2-3 | 500 ppm |
| Compound of Formula H-3-22 | 1000 ppm |

Mixture Example S84b (Stabilised with Compounds of Formulae ST-2-3 and H-3-22)

A nematic LC mixture according to the invention is formulated as follows:

| | |
|---|---|
| Mixture M84 | 99.925 wt.-% |
| Compound of Formula ST-2-3 | 500 ppm |
| Compound of Formula H-3-22 | 250 ppm |

Example M85

A nematic LC medium is formulated as follows:

| Nr. | Comp. | Conc., wt.-% | Properties |
|---|---|---|---|
| 1 | BCH-32 | 6.5 | T(N, I) = 100.5° C. |
| 2 | CC-3-V1 | 11.5 | Δn (589 nm, 20° C.): = 0.1092 |
| 3 | CCG-V-F | 2.0 | $\varepsilon_{\parallel}$ (1 kHz, 20° C.): = 8.8 |
| 4 | CCH-23 | 7.0 | ε⊥ (1 kHz, 20° C.): = 2.9 |
| 5 | CCH-301 | 7.0 | Δε (1 kHz, 20° C.): = 5.8 |
| 6 | CCP-3-1 | 7.0 | $\gamma_1$ (20° C.): = 112 mPa · s |
| 7 | CCP-30CF3 | 8.0 | $K_1$ (20° C.): = 17.5 pN |
| 8 | CCP-V-1 | 13.5 | $K_3$ (20° C.): = 18.1 pN |
| 9 | CLU-3-F | 14.0 | $V_0$ (20° C.): = 1.82 V |
| 10 | CPGP-4-3 | 1.0 | LTS (−20° C.) 1000 h |
| 11 | PCH-302 | 7.0 | |
| 12 | PGUQU-3-F(1) | 7.0 | |
| 13 | PGUQU-4-F(1) | 5.5 | |
| 14 | PP-1-2V1 | 3.0 | |

Mixture Example S85 (Stabilised with Compound of Formula ST-2-3)

A nematic LC mixture according to the invention is formulated as follows:

| | |
|---|---|
| Mixture M85 | 99.95 wt.-% |
| Compound of Formula ST-2-3 | 500 ppm |

Mixture Example S85a (Stabilised with Compounds of Formulae ST-2-3 and H-3-22)

A nematic LC mixture according to the invention is formulated as follows:

| | |
|---|---|
| Mixture M85 | 99.85 wt.-% |
| Compound of Formula ST-2-3 | 500 ppm |
| Compound of Formula H-3-22 | 1000 ppm |

Mixture Example S85b (Stabilised with Compounds of Formulae ST-2-3 and H-3-22)

A nematic LC mixture according to the invention is formulated as follows:

| | |
|---|---|
| Mixture M85 | 99.925 wt.-% |
| Compound of Formula ST-2-3 | 500 ppm |
| Compound of Formula H-3-22 | 250 ppm |

| Nr. | Comp. | Conc., wt.-% | Properties |
|---|---|---|---|
| 1 | BCH-32 | 6.0 | T (N, I) = 80.5° C. |
| 2 | CC-3-V | 41.0 | Δn (589 nm, 20° C.): = 0.1120 |
| 3 | CC-3-V1 | 6.0 | $\epsilon_{\parallel}$ (1 kHz, 20° C.): = 10.1 |
| 4 | CCP-3-1 | 5.0 | $\epsilon_{\perp}$ (1 kHz, 20° C.): = 3.3 |
| 5 | CLU-3-F | 10.0 | Δϵ (1 kHz, 20° C.): = 6.8 |
| 6 | PGP-2-3 | 5.0 | $\gamma_1$ (20° C.): = 62 mPa · s |
| 7 | PGP-2-4 | 2.0 | $K_1$ (20° C.): = 13.2 pN |
| 8 | PGUQU-3-F | 5.0 | $K_3$ (20° C.): = 13.4 pN |
| 9 | PGUQU-4-F | 6.0 | $V_0$ (20° C.): = 1.47 V |
| 10 | PGUQU-5-F | 4.5 | |
| 11 | PPGU-(c5)-F | 1.0 | |
| 12 | PUQU-3-F | 6.0 | |
| 13 | CCP-3-3 | 2.5 | |

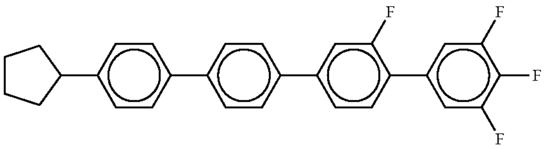

PPGU-(c5)-F

Example M86

A nematic LC medium is formulated as follows:

| | |
|---|---|
| Mixture M86 | 99.95 wt.-% |
| Compound of Formula ST-2-3 | 500 ppm |

Example M87

A nematic LC medium is formulated as follows:

| Nr. | Comp. | Conc., wt.-% | Properties |
|---|---|---|---|
| 1 | BCH-32 | 6.0 | T (N, I) = 80.5° C. |
| 2 | CC-3-V | 41.0 | Δn (589 nm, 20° C.): = 0.1119 |
| 3 | CC-3-V1 | 6.0 | $\epsilon_{\parallel}$ (1 kHz, 20° C.): = 10.1 |
| 4 | CCP-3-1 | 5.0 | $\epsilon_{\perp}$ (1 kHz, 20° C.): = 3.3 |
| 5 | CLU-3-F(1) | 10.0 | Δϵ (1 kHz, 20° C.): = 6.8 |
| 6 | PGP-2-3 | 5.0 | $\gamma_1$ (20° C.): = 66 mPa · s |
| 7 | PGP-2-4 | 2.0 | $K_1$ (20° C.): = 13.1 pN |
| 8 | PGUQU-3-F | 5.0 | $K_3$ (20° C.): = 13.4 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

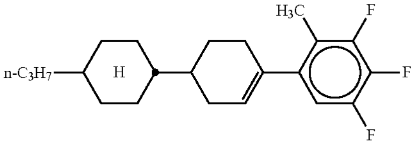

CLU-3-F(1)

Mixture Example S87 (Stabilised with Compounds of Formulae ST-2-3)

A nematic LC mixture according to the invention is formulated as follows:

| | |
|---|---|
| Mixture M87 | 99.95 wt.-% |
| Compound of Formula ST-2-3 | 500 ppm |

Example M88

A nematic LC medium is formulated as follows:

| Composition | | | |
|---|---|---|---|
| Nr. | Comp. | Conc., wt.-% | Properties |
| 1 | BCH-32 | 6.0 | T (N, I) = 81° C. |
| 2 | CC-3-V | 41.0 | Δn (589 nm, 20° C.): = 0.1098 |
| 3 | CC-3-V1 | 6.0 | $\epsilon_{\|}$ (1 kHz, 20° C.): = 10.0 |
| 4 | CCP-3-1 | 5.0 | $\epsilon_{\perp}$ (1 kHz, 20° C.): = 3.3 |
| 5 | CLU-3-F | 10.0 | Δε (1 kHz, 20° C.): = 6.7 |
| 6 | PGP-2-3 | 5.0 | $\gamma_1$ (20° C.): = 63 mPa · s |
| 7 | PGP-2-4 | 2.0 | $K_1$ (20° C.): = 13.1 pN |
| 8 | PGUQU-3-F | 5.0 | $K_3$ (20 C.): = 13.5 pN |
| 9 | PGUQU-4-F | 6.0 | |
| 10 | APUQU-(c5)-F | 4.5 | |
| 11 | PPGU-3-F | 1.0 | |
| 12 | PUQU-3-F | 6.0 | |
| 13 | CCP-3-3 | 2.5 | |

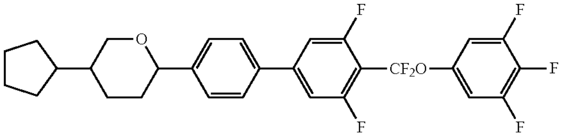

APUQU-(c5)-F

Mixture Example S88 (Stabilised with Compounds of Formulae ST-1-3)

A nematic LC mixture according to the invention is formulated as follows:

| | |
|---|---|
| Mixture M88 | 99.97 wt.-% |
| Compound of Formula ST-1-3 | 300 ppm |

Example M89

A nematic LC medium is formulated as follows:

| Composition | | | |
|---|---|---|---|
| Nr. | Comp. | Conc., wt.-% | Properties |
| 1 | BCH-32 | 6.0 | T(N, I) = 80.5° C. |
| 2 | CC-3-V | 41.0 | Δn (589 nm, 20° C.): = 0.1104 |
| 3 | CC-3-V1 | 6.0 | ε\|\| (1 kHz, 20° C.): = 9.9 |
| 4 | CCP-3-1 | 5.0 | ε⊥ (1 kHz, 20° C.): = 3.3 |
| 5 | CLU-3-F | 10.0 | Δε (1 kHz, 20° C.): = 6.6 |
| 6 | PGP-2-3 | 5.0 | $\gamma_1$ (20° C.): = 64 mPa•s |
| 7 | PGP-2-4 | 2.0 | $K_1$ (20° C.): = 13.6 pN |
| 8 | PGUQU-3-F | 5.0 | $K_3$ (20° C.): = 13.7 pN |
| 9 | PGUQU-4-F | 6.0 | |
| 10 | PGUQU-5-F | 4.5 | |
| 11 | PPGU-3-F | 1.0 | |
| 12 | PUQU-(c5)-F | 6.0 | |
| 13 | CCP-3-3 | 2.5 | |

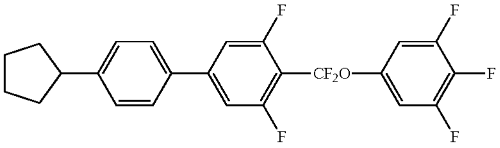

PUQU-(c5)-F

Mixture Example S89 (Stabilised with Compounds of Formulae ST-1-3 and H-3-7)

A nematic LC mixture according to the invention is formulated as follows:

| | |
|---|---|
| Mixture M89 | 99.85 wt.-% |
| Compound of Formula ST-1-3 | 500 ppm |
| Compound of Formula H-3-7 | 1000 ppm |

Example M90

A nematic LC medium is formulated as follows:

| Composition | | | |
|---|---|---|---|
| Nr. | Comp. | Conc., wt.-% | Properties |
| 1 | BCH-32 | 6.0 | T(N, I) = 80° C. |
| 2 | CC-3-V | 41.0 | Δn (589 nm, 20° C.): = 0.1091 |
| 3 | CC-3-V1 | 6.0 | ε\|\| (1 kHz, 20° C.): = 10.4 |
| 4 | CCP-3-1 | 5.0 | ε⊥ (1 kHz, 20° C.): = 3.3 |
| 5 | CLU-3-F | 10.0 | Δε (1 kHz, 20° C.): = 7.1 |
| 6 | PGP-2-3 | 5.0 | $\gamma_1$ (20° C.): = 64 mPa•s |
| 7 | PGP-2-4 | 2.0 | $K_1$ (20° C.): = 12.8 pN |
| 8 | PGUQU-3-F | 5.0 | $K_3$ (20° C.): = 13.2 pN |
| 9 | PGUQU-4-F | 6.0 | |
| 10 | DGUQU-(c5)-F | 4.5 | |
| 11 | PPGU-3-F | 1.0 | |
| 12 | PUQU-3-F | 6.0 | |
| 13 | CCP-3-3 | 2.5 | |

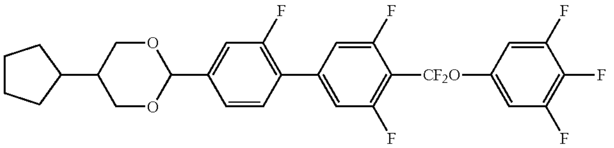

DGUQU-(c5)-F

Mixture Example S90 (Stabilised with Compounds of Formulae ST-1-3 and H-3-22)

A nematic LC mixture according to the invention is formulated as follows:

| | |
|---|---|
| Mixture M90 | 99.85 wt.-% |
| Compound of Formula ST-1-3 | 500 ppm |
| Compound of Formula H-3-22 | 1000 ppm |

Example M91

A nematic LC medium is formulated as follows:

| Composition | | | |
|---|---|---|---|
| Nr. | Comp. | Conc., wt.-% | Properties |
| 1 | BCH-32 | 6.0 | T(N, I) = 83.5° C. |
| 2 | CC-3-V | 41.0 | $\Delta n$ (589 nm, 20° C.): = 0.1123 |
| 3 | CC-3-V1 | 6.0 | $\varepsilon_{\parallel}$ (1 kHz, 20° C.): = 10.0 |
| 4 | CCP-3-1 | 5.0 | $\varepsilon_{\perp}$ (1 kHz, 20° C.): = 3.3 |
| 5 | CLU-3-F | 10.0 | $\Delta\varepsilon$ (1 kHz, 20° C.): = 6.7 |
| 6 | PGP-2-3 | 5.0 | $\gamma_1$ (20° C.): = 65 mPa•s |
| 7 | PGP-2-4 | 2.0 | $K_1$ (20° C.): = 13.7 pN |
| 8 | PGUQU-3-F | 5.0 | $K_3$ (20° C.): = 13.4 pN |
| 9 | PGUQU-4-F | 6.0 | |
| 10 | DPGU-(c5)-F | 4.5 | |
| 11 | PPGU-3-F | 1.0 | |
| 12 | PUQU-3-F | 6.0 | |
| 13 | CCP-3-3 | 2.5 | |

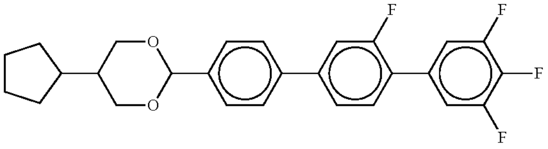

DPGU-(c5)-F

Mixture Example S91 (Stabilised with Compounds of Formulae ST-1-3 and H-3-23)

A nematic LC mixture according to the invention is formulated as follows:

| Mixture M91 | 99.85 wt.-% |
|---|---|
| Compound of Formula ST-1-3 | 500 ppm |
| Compound of Formula H-3-23 | 1000 ppm |

Example M92

A nematic LC medium is formulated as follows:

-continued

| Composition | | | |
|---|---|---|---|
| Nr. | Comp. | Conc., wt.-% | Properties |
| 1 | BCH-32 | 6.0 | T(N, I) = 82.5° C. |
| 2 | CC-3-V | 41.0 | $\Delta n$ (589 nm, 20° C.): = 0.1109 |
| 3 | CC-3-V1 | 6.0 | $\varepsilon_{\parallel}$ (1 kHz, 20° C.): = 9.9 |
| 4 | CCP-3-1 | 5.0 | $\varepsilon_{\perp}$ (1 kHz, 20° C.): = 3.3 |
| 5 | CLU-3-F | 10.0 | $\Delta\varepsilon$ (1 kHz, 20° C.): = 6.6 |
| 6 | PGP-2-3 | 5.0 | $\gamma_1$ (20° C.): = 66 mPa•s |
| 7 | PGP-2-4 | 2.0 | $K_1$ (20° C.): = 13.8 pN |
| 8 | PGUQU-3-F | 5.0 | $K_3$ (20° C.): = 13.4 pN |
| 9 | PGUQU-4-F | 6.0 | |
| 10 | DLGU-(c5)-F | 4.5 | |
| 11 | PPGU-3-F | 1.0 | |
| 12 | PUQU-3-F | 6.0 | |
| 13 | CCP-3-3 | 2.5 | |

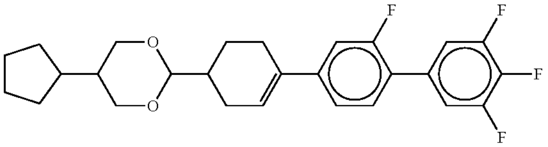

DLGU-(c5)-F

Mixture Example S92 (Stabilised with Compounds of Formulae ST-1-3 and H-3-7)

A nematic LC mixture according to the invention is formulated as follows:

| Mixture M92 | 99.85 wt.-% |
|---|---|
| Compound of Formula ST-1-3 | 500 ppm |
| Compound of Formula H-3-7 | 1000 ppm |

Example M93

A nematic LC medium is formulated as follows:

| Composition | | | |
|---|---|---|---|
| Nr. | Comp. | Conc., wt.-% | Properties |
| 1 | BCH-32 | 6.0 | T(N, I) = 79.5° C. |
| 2 | CC-3-V | 41.0 | $\Delta n$ (589 nm, 20° C.): = 0.1131 |
| 3 | CC-3-V1 | 6.0 | $\varepsilon_{\parallel}$ (1 kHz, 20° C.): = 10.1 |
| 4 | CCP-3-1 | 5.0 | $\varepsilon_{\perp}$ (1 kHz, 20° C.): = 3.3 |
| 5 | CLU-3-F | 10.0 | $\Delta\varepsilon$ (1 kHz, 20° C.): = 6.8 |
| 6 | PUS-3-2 | 5.0 | $\gamma_1$ (20° C.): = 57 mPa · s |
| 7 | PGP-2-4 | 2.0 | $K_1$ (20° C.): = 13.2 pN |
| 8 | PGUQU-3-F | 5.0 | $K_3$ (20° C.): = 13.3 pN |
| 9 | PGUQU-4-F | 6.0 | |
| 10 | DUQU-5-F | 4.5 | |
| 11 | PPGU-3-F | 1.0 | |
| 12 | PUQU-3-F | 6.0 | |
| 13 | CCP-3-3 | 2.5 | |

Mixture Example S93 (Stabilised with Compounds of Formulae ST-2-3 and H-3-1)

A nematic LC mixture according to the invention is formulated as follows:

| Mixture M93 | 99.925 wt.-% |
|---|---|
| Compound of Formula ST-2-3 | 500 ppm |
| Compound of Formula H-3-1 | 250 ppm |

Example M94

A nematic LC medium is formulated as follows:

| Composition | | | |
|---|---|---|---|
| Nr. | Comp. | Conc., wt.-% | Properties |
| 1 | BCH-32 | 6.0 | T(N, I) = 80° C. |
| 2 | CC-3-V | 41.0 | Δn (589 nm, 20° C.): = 0.1133 |
| 3 | CC-3-V1 | 6.0 | ε‖ (1 kHz, 20° C.): = 10.1 |
| 4 | CCP-3-1 | 5.0 | ε⊥ (1 kHz, 20° C.): = 3.3 |
| 5 | CLU-3-F | 10.0 | Δε (1 kHz, 20° C.): = 6.8 |
| 6 | PUS-(c5)-2 | 5.0 | $\gamma_1$ (20° C.): = 60 mPa•s |
| 7 | PGP-2-4 | 2.0 | $K_1$ (20° C.): = 13.1 pN |
| 8 | PGUQU-3-F | 5.0 | $K_3$ (20° C.): = 13.3 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

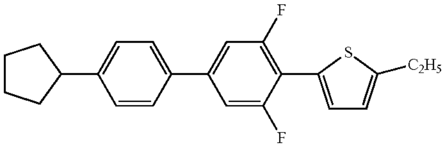 [SMILES: CCc1ccc(-c2c(F)cc(-c3ccc(C4CCCC4)cc3)cc2F)s1]

PUS-(c5)-2

Mixture Example S94 (Stabilised with Compounds of Formulae ST-1-3 and H-3-1)

A nematic LC mixture according to the invention is formulated as follows:

| Mixture M94 | 99.925 wt.-% |
|---|---|
| Compound of Formula ST-1-3 | 500 ppm |
| Compound of Formula H-3-1 | 250 ppm |

Example M95

A nematic LC medium is formulated as follows:

| Composition | | | |
|---|---|---|---|
| Nr. | Comp. | Conc., wt.-% | Properties |
| 1 | BCH-32 | 6.0 | T(N, I) = 79.5° C. |
| 2 | CC-3-V | 41.0 | Δn (589 nm, 20° C.): = 0.1123 |
| 3 | CC-3-V1 | 6.0 | ε‖ (1 kHz, 20° C.): = 10.1 |
| 4 | CCP-3-1 | 5.0 | ε⊥ (1 kHz, 20° C.): = 3.3 |
| 5 | CLU-3-F | 10.0 | Δε (1 kHz, 20° C.): = 6.8 |
| 6 | PUS-3-(c5) | 5.0 | $\gamma_1$ (20° C.): = 59 mPa•s |
| 7 | PGP-2-4 | 2.0 | $K_1$ (20° C.): = 13.1 pN |
| 8 | PGUQU-3-F | 5.0 | $K_3$ (20° C.): = 13.0 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

-continued

| Composition | | | |
|---|---|---|---|
| Nr. | Comp. | Conc., wt.-% | Properties |

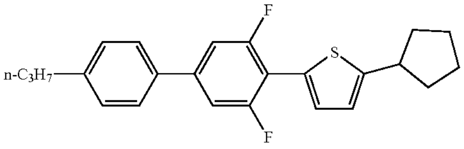

PUS-3-(c5)

Mixture Example S95 (Stabilised with Compounds of Formulae ST-2-3 and H-3-23)

A nematic LC mixture according to the invention is formulated as follows:

| Mixture M95 | 99.85 wt.-% |
|---|---|
| Compound of Formula ST-2-3 | 500 ppm |
| Compound of Formula H-3-23 | 1000 ppm |

Example M96

A nematic LC medium is formulated as follows:

| Composition | | | |
|---|---|---|---|
| Nr. | Comp. | Conc., wt.-% | Properties |
| 1 | BCH-32 | 6.0 | T(N, I) = 78° C. |
| 2 | CC-3-V | 41.0 | Δn (589 nm, 20° C.): = 0.1108 |
| 3 | CC-3-V1 | 6.0 | ε‖ (1 kHz, 20° C.): = 10.1 |
| 4 | CCP-3-1 | 5.0 | ε⊥ (1 kHz, 20° C.): = 3.3 |
| 5 | CLU-3-F | 10.0 | Δε (1 kHz, 20° C.): = 6.8 |
| 6 | PUS-3-1(c5) | 5.0 | $\gamma_1$ (20° C.): = 59 mPa•s |
| 7 | PGP-2-4 | 2.0 | $K_1$ (20° C.): = 12.7 pN |
| 8 | PGUQU-3-F | 5.0 | $K_3$ (20° C.): = 12.5 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

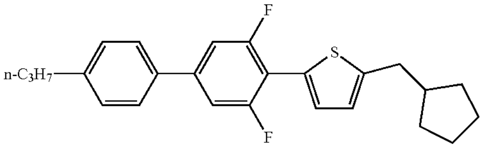

PUS-3-1(c5)

Mixture Example S96 (Stabilised with Compound of Formulae ST-1-3

A nematic LC mixture according to the invention is formulated as follows:

| Mixture M96 | 99.95 wt.-% |
|---|---|
| Compound of Formula ST-1-3 | 500 ppm |

Example M97

A nematic LC medium is formulated as follows:

| Nr. | Comp. | Conc., wt.-% | Properties |
|---|---|---|---|
| 1 | BCH-32 | 6.0 | T(N, I) = 79° C. |
| 2 | CC-3-V | 41.0 | Δn (589 nm, 20° C.): = 0.1123 |
| 3 | CC-3-V1 | 6.0 | ε\|\| (1 kHz, 20° C.): = 10.0 |
| 4 | CCP-3-1 | 5.0 | ε⊥ (1 kHz, 20° C.): = 3.3 |
| 5 | CLU-3-F | 10.0 | Δε (1 kHz, 20° C.): = 6.7 |
| 6 | PUS-3-O(c5) | 5.0 | $\gamma_1$ (20° C.): = 60 mPa•s |
| 7 | PGP-2-4 | 2.0 | $K_1$ (20° C.): = 12.9 pN |
| 8 | PGUQU-3-F | 5.0 | $K_3$ (20° C.): = 12.9 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

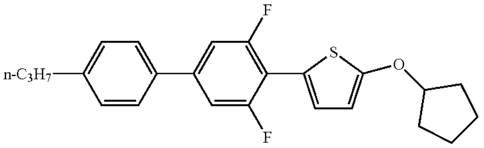

PUS-3-O(c5)

Mixture Example S97 (Stabilised with Compound of Formulae ST-2-3

A nematic LC mixture according to the invention is formulated as follows:

| | |
|---|---|
| Mixture M97 | 99.96 wt.-% |
| Compound of Formula ST-2-3 | 400 ppm |

Example M98

A nematic LC medium is formulated as follows:

| Nr. | Comp. | Conc., wt.-% | Properties |
|---|---|---|---|
| 1 | BCH-32 | 6.0 | T(N, I) = 79.5° C. |
| 2 | CC-3-V | 41.0 | Δn (589 nm, 20° C.): = 0.1123 |
| 3 | CC-3-V1 | 6.0 | ε\|\| (1 kHz, 20° C.): = 10.0 |
| 4 | CCP-3-1 | 5.0 | ε⊥ (1 kHz, 20° C.): = 3.3 |
| 5 | CLU-3-F | 10.0 | Δε (1 kHz, 20° C.): = 6.7 |
| 6 | PUS-3-O1(c5) | 5.0 | $\gamma_1$ (20° C.): = 61 mPa•s |
| 7 | PGP-2-4 | 2.0 | $K_1$ (20° C.): = 12.9 pN |
| 8 | PGUQU-3-F | 5.0 | $K_3$ (20° C.): = 13.3 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

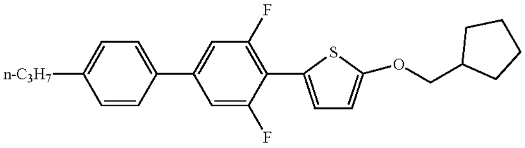

PUS-3-O1(c5)

Mixture Example S98 (Stabilised with Compound of Formulae ST-4-1

A nematic LC mixture according to the invention is formulated as follows:

| | |
|---|---|
| Mixture M98 | 99.96 wt.-% |
| Compound of Formula ST-4-1 | 400 ppm |

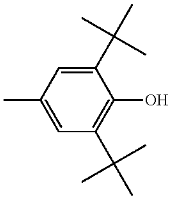 [SMILES: Cc1cc(C(C)(C)C)c(O)c(C(C)(C)C)c1]

ST-4-1

Example M99

A nematic LC medium is formulated as follows:

| Nr. | Comp. | Conc., wt.-% | Properties |
|---|---|---|---|
| 1 | BCH-32 | 6.0 | T(N, I) = 81.5° C. |
| 2 | CC-3-V | 41.0 | Δn (589 nm, 20° C.): = 0.1148 |
| 3 | CC-3-V1 | 6.0 | $\varepsilon_{\|}$ (1 kHz, 20° C.): = 10.1 |
| 4 | CCP-3-1 | 5.0 | $\varepsilon_{\perp}$ (1 kHz, 20° C.): = 3.3 |
| 5 | CLU-3-F | 10.0 | Δε (1 kHz, 20° C.): = 6.8 |
| 6 | PGS-2-1 | 5.0 | $\gamma_1$ (20° C.): = 58 mPa · s |
| 7 | PGP-2-4 | 2.0 | $K_1$ (20° C.): = 13.7 pN |
| 8 | PGUQU-3-F | 5.0 | $K_3$ (20° C.): = 13.5 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

Mixture Example S99 (Stabilised with Compound of Formulae ST-4-2

A nematic LC mixture according to the invention is formulated as follows:

| | |
|---|---|
| Mixture M99 | 99.96 wt.-% |
| Compound of Formula ST-4-2 | 400 ppm |

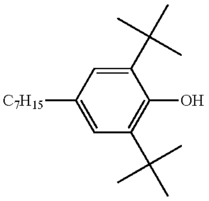

ST-4-2

Example M100

A nematic LC medium is formulated as follows:

| Composition | | | |
|---|---|---|---|
| Nr. | Comp. | Conc., wt.-% | Properties |
| 1 | BCH-32 | 6.0 | T(N, I) = 81.5° C. |
| 2 | CC-3-V | 41.0 | Δn (589 nm, 20° C.): = 0.1150 |
| 3 | CC-3-V1 | 6.0 | $\varepsilon_{\|\|}$ (1 kHz, 20° C.): = 10.1 |
| 4 | CCP-3-1 | 5.0 | $\varepsilon_{\perp}$ (1 kHz, 20° C.): = 3.3 |
| 5 | CLU-3-F | 10.0 | Δε (1 kHz, 20° C.): = 6.8 |
| 6 | PGS-(c5)-1 | 5.0 | $\gamma_1$ (20° C.): = 61 mPa•s |
| 7 | PGP-2-4 | 2.0 | $K_1$ (20° C.): = 13.5 pN |
| 8 | PGUQU-3-F | 5.0 | $K_3$ (20° C.): = 13.4 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

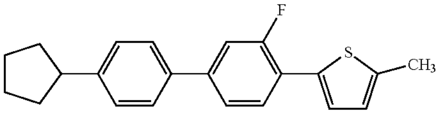 [SMILES: Cc1ccc(-c2ccc(-c3ccc(C4CCCC4)cc3)cc2F)s1]

PGS-(c5)-1

Mixture Example S100 (Stabilised with Compounds of Formulae ST-4-2 and H-3-1)

A nematic LC mixture according to the invention is formulated as follows:

| Mixture M100 | 99.85 wt.-% |
|---|---|
| Compound of Formula ST-4-2 | 500 ppm |
| Compound of Formula H-3-1 | 1000 ppm |

Example M101

A nematic LC medium is formulated as follows:

| Composition | | | |
|---|---|---|---|
| Nr. | Comp. | Conc., wt.-% | Properties |
| 1 | BCH-32 | 6.0 | T(N, I) = 81° C. |
| 2 | CC-3-V | 41.0 | Δn (589 nm, 20° C.): = 0.1141 |
| 3 | CC-3-V1 | 6.0 | $\varepsilon_{\|\|}$ (1 kHz, 20° C.): = 10.1 |
| 4 | CCP-3-1 | 5.0 | $\varepsilon_{\perp}$ (1 kHz, 20° C.): = 3.3 |
| 5 | CLU-3-F | 10.0 | Δε (1 kHz, 20° C.): = 6.8 |
| 6 | PGS-2-(c5) | 5.0 | $\gamma_1$ (20° C.): = 60 mPa•s |
| 7 | PGP-2-4 | 2.0 | $K_1$ (20° C.): = 13.5 pN |
| 8 | PGUQU-3-F | 5.0 | $K_3$ (20° C.): = 13.1 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

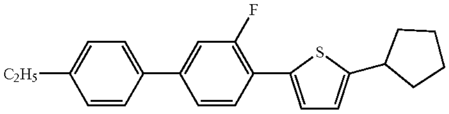 [SMILES: CCc1ccc(-c2ccc(-c3ccc(C4CCCC4)s3)c(F)c2)cc1]

PGS-2-(c5)

Mixture Example S101 (Stabilised with Compounds of Formulae ST-4-1 and H-3-1)

A nematic LC mixture according to the invention is formulated as follows:

| Mixture M101 | 99.85 wt.-% |
|---|---|
| Compound of Formula ST-4-1 | 500 ppm |
| Compound of Formula H-3-1 | 1000 ppm |

Example M102

A nematic LC medium is formulated as follows:

| Composition | | | |
|---|---|---|---|
| Nr. | Comp. | Conc., wt.-% | Properties |
| 1 | BCH-32 | 6.0 | T(N, I) = 80.5° C. |
| 2 | CC-3-V | 41.0 | Δn (589 nm, 20° C.): = 0.1139 |
| 3 | CC-3-V1 | 6.0 | $\varepsilon_{\|\|}$ (1 kHz, 20° C.): = 10.0 |
| 4 | CCP-3-1 | 5.0 | $\varepsilon_{\perp}$ (1 kHz, 20° C.): = 3.3 |
| 5 | CLU-3-F | 10.0 | Δε (1 kHz, 20° C.): = 6.7 |
| 6 | PUS-2-O(c5) | 5.0 | $\gamma_1$ (20° C.): = 61 mPa•s |
| 7 | PGP-2-4 | 2.0 | $K_1$ (20° C.): = 13.3 pN |
| 8 | PGUQU-3-F | 5.0 | $K_3$ (20° C.): = 13.0 pN |
| 9 | PGUQU-4-F | 6.0 | |
| 10 | PGUQU-5-F | 4.5 | |
| 11 | PPGU-3-F | 1.0 | |
| 12 | PUQU-3-F | 6.0 | |
| 13 | CCP-3-3 | 2.5 | |

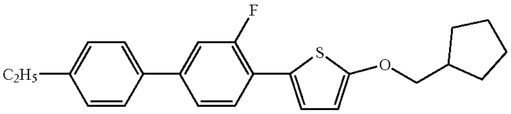 [SMILES: CCc1ccc(-c2ccc(-c3ccc(OCC4CCCC4)s3)c(F)c2)cc1]

PGS-2-O(c5)

Mixture Example S102 (Stabilised with Compounds of Formulae ST-1-3 and H-3-7)

A nematic LC mixture according to the invention is formulated as follows:

| Mixture M102 | 99.85 wt.-% |
|---|---|
| Compound of Formula ST-1-3 | 500 ppm |
| Compound of Formula H-3-7 | 1000 ppm |

Example M103

A nematic LC medium is formulated as follows:

| Composition | | | |
|---|---|---|---|
| Nr. | Comp. | Conc., wt.-% | Properties |
| 1 | BCH-32 | 6.0 | T(N, I) = 81.5° C. |
| 2 | CC-3-V | 41.0 | Δn (589 nm, 20° C.): = 0.1090 |
| 3 | CC-3-V1 | 6.0 | $\varepsilon_{\|\|}$ (1 kHz, 20° C.): = 10.2 |
| 4 | CCP-3-1 | 5.0 | $\varepsilon_{\perp}$ (1 kHz, 20° C.): = 3.3 |
| 5 | CLU-3-F | 10.0 | Δε (1 kHz, 20° C.): = 6.9 |
| 6 | PGP-2-3 | 5.0 | $\gamma_1$ (20° C.): = 62 mPa · s |
| 7 | PGP-2-4 | 2.0 | $K_1$ (20° C.): = 13.5 pN |

-continued

| Composition | | | |
|---|---|---|---|
| Nr. | Comp. | Conc., wt.-% | Properties |
| 8 | PGUQU-3-F | 5.0 | $K_3$ (20° C.): = 13.4 pN |
| 9 | PGUQU-4-F | 6.0 | |
| 10 | PGUQU-5-F | 4.5 | |
| 11 | PPGU-3-F | 1.0 | |
| 12 | DUQU-3-F | 6.0 | |
| 13 | CCP-3-3 | 2.5 | |

Mixture Example S103 (Stabilised with Compounds of Formulae ST-4-1 and H-3-7)

A nematic LC mixture according to the invention is formulated as follows:

| Mixture M103 | 99.85 wt.-% |
|---|---|
| Compound of Formula ST-4-1 | 500 ppm |
| Compound of Formula H-3-7 | 1000 ppm |

Example M104

A nematic LC medium is formulated as follows:

| Composition | | | |
|---|---|---|---|
| Nr. | Comp. | Conc., wt.-% | Properties |
| 1 | BCH-32 | 6.0 | T(N, I) = 81.5° C. |
| 2 | CC-3-V | 41.0 | Δn (589 nm, 20° C.): = 0.1088 |
| 3 | CC-3-V1 | 6.0 | ε∥ (1 kHz, 20° C.): = 10.2 |
| 4 | CCP-3-1 | 5.0 | ε⊥ (1 kHz, 20° C.): = 3.3 |
| 5 | CLU-3-F | 10.0 | Δε (1 kHz, 20° C.): = 6.9 |
| 6 | PGP-2-3 | 5.0 | $\gamma_1$ (20° C.): = 65 mPa•s |
| 7 | PGP-2-4 | 2.0 | $K_1$ (20° C.): = 13.4 pN |
| 8 | PGUQU-3-F | 5.0 | $K_3$ (20° C.): = 13.4 pN |
| 9 | PGUQU-4-F | 6.0 | |
| 10 | PGUQU-5-F | 4.5 | |
| 11 | PPGU-3-F | 1.0 | |
| 12 | DUQU-(c5)-F | 6.0 | |
| 13 | CCP-3-3 | 2.5 | |

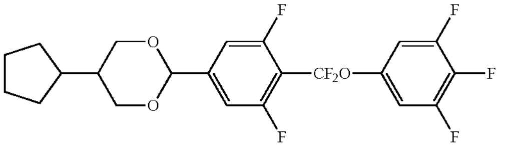

DUQU-(c5)-F

Mixture Example S104 (Stabilised with Compounds of Formulae ST-2-3 and H-3-1)

A nematic LC mixture according to the invention is formulated as follows:

| Mixture M104 | 99.925 wt.-% |
|---|---|
| Compound of Formula ST-2-3 | 500 ppm |
| Compound of Formula H-3-1 | 250 ppm |

The invention claimed is:

1. A liquid-crystalline medium containing no pleochroic dyes, comprising one or more compounds of Formula I

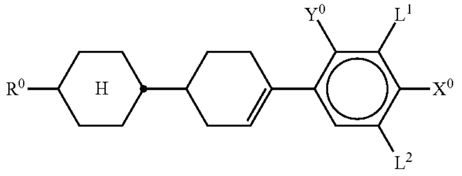

I in which the individual substituents, on each occurrence identically or differently, and each, independently of one another, have the following meaning:

$R^0$ an alkyl group having 1 to 12 C atoms or an alkenyl group having 2 to 12 C atoms in which one or more $CH_2$ groups are optionally substituted by —C≡C—, —$CF_2$O—, —O$CF_2$—, —CH=CH—,

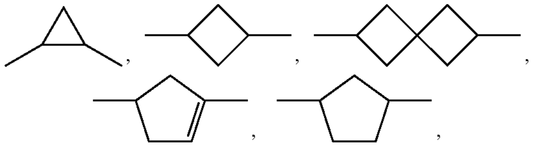

—O—, —CO—O— or —O—CO— in such a way that O atoms are not linked directly to one another, and in which one or more H atoms may be substituted by a halogen atom;

$X^0$ a halogen atom, —CN, —SCN, —NCS or an alkyl or an alkoxy group having 1 to 6 C atoms or an alkenyl or an alkenyloxy group having 2 to 6 C atoms in which one or more H atoms is substituted by a halogen atom;

$L^1$ and $L^2$ each, independently of one another, H, F or Cl, wherein $L^1$ and $L^2$ do not simultaneously denote H;

$Y^0$ H or $CH_3$;

one or more compounds of Formula LP2:

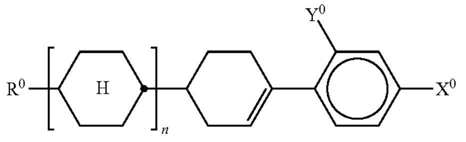

LP2 in which:

$R^0$ denotes an alkyl or an alkoxy group having 1 to 12 C atoms or an alkenyl or an alkenyloxy group having 2 or 12 C atoms in which one or more non-adjacent $CH_2$ groups are optionally substituted by —C≡C—, —$CF_2$O—, —O$CF_2$—, —CH=CH—,

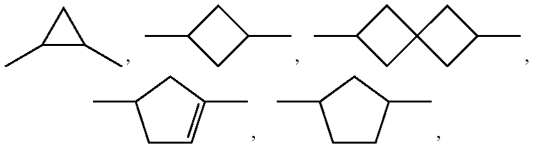

—O—, —CO—O— or —O—CO— in such a way that O atoms are not linked directly to one another, and in which one or more H atoms may be substituted by a cycloalkyl or a cycloalkoxy group having 3 to 12 C atoms;

$X^0$ a halogen atom, —CN, —SCN, —NCS or an alkyl or an alkoxy group having 1 to 6 C atoms or an alkenyl or an alkenyloxy group having 2 to 6 C atoms in which one or more H atoms is substituted by a halogen atom;

$Y^0$ denotes H or $CH_3$; and n denotes 0 or 1, one or more antioxidants comprising one or more compounds of Formula ST:

ST

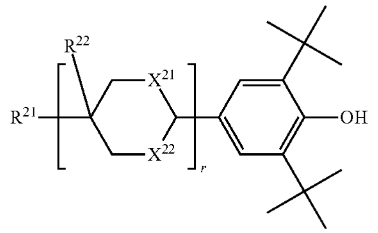

in which the individual substituents have the following meanings:

$X^{21}$ and $X^{22}$ each, independently of one another, denote —O—, —$CH_2$—, —$CHR^{23}$— or —N—$R^{23}$—;

$R^{21}$ and $R^{22}$ each, independently of one another, denote a H atom or an alkyl- or alkoxy group having 1 to 12 C atoms, an alkenyl, alkynyl, alkenyloxy or alkoxyalkyl group having 2 to 12 C atoms or a cycloalkyl group having 3 to 12 C atoms, in which one or more non-adjacent $CH_2$ groups are optionally substituted by —C≡C—, —$CF_2$O—, —O$CF_2$—, —CH═CH—,

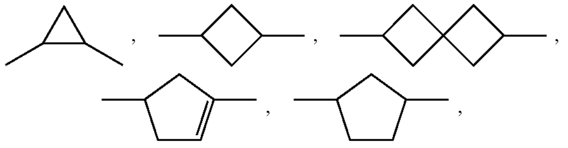

—O—, —CO—O— or —O—CO— in such a way that O atoms are not linked directly to one another, and in which one or more H atoms may be substituted by a halogen atom or a cycloalkyl or a cycloalkoxy group having 3 to 12 C atoms, in which one or more H atoms may be substituted by a halogen atom;

$R^{23}$ denotes a H atom, an alkyl or alkoxy group having 1 to 10 C atoms;

r denotes 0 or 1 and, optionally, one or more light stabilizers comprising one or more compounds of Formula H:

H

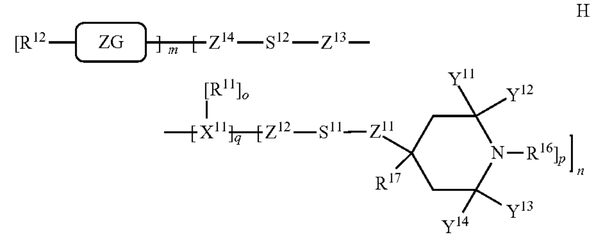

in which $R^{11}$ each, independently of one another, denote a H atom, F, an alkyl group having 1 to 20 C atoms, in which one or more $CH_2$ groups are optionally substituted by —C≡C—, —$CF_2$O—, —O$CF_2$—, —CH≡CH—,

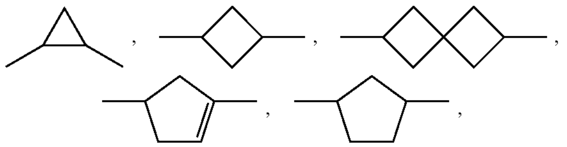

—O—, —CO—O—, —O—CO—, —$NR^{13}$—, —CO—$NR^{13}$— or —$NR^{13}$—CO— in such a way that O and N atoms are not linked directly to one another and in which one H atom or a plurality of H atoms may be substituted by F, $OR^{13}$, $N(R^{13})(R^{14})$ or $R^{15}$;

$R^{12}$ each, independently of one another, denote a H atom, an alkyl group having 1 to 20 C atoms, in which one or more $CH_2$ groups are optionally substituted by —C≡C—, —$CF_2$O—, —O$CF_2$—, —CH≡CH—,

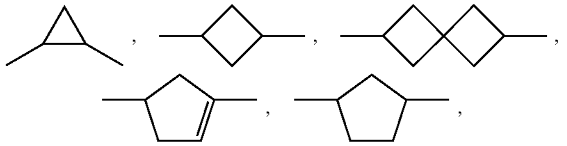

—O—, —CO—O—, —O—CO—, —$NR^{13}$—, —CO—$NR^{13}$— or —$NR^{13}$—CO— in such a way that O atoms are not linked directly to one another, a hydrocarbon group which contains a cycloalkyl or alkylcycloalkyl group and in which one or more $CH_2$ groups are optionally substituted by —C≡C—, —$CF_2$O—, —O$CF_2$—, —CH═CH—,

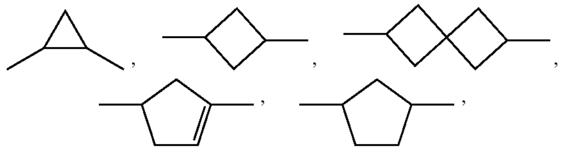

—O—, —CO—O—, —O—CO—, —$NR^{13}$—, —CO—$NR^{13}$— or —$NR^{13}$—CO— in such a way that O atoms are not linked directly to one another, and in which one H atom or a plurality of H atoms may be substituted by F, $OR^{13}$, $N(R^{13})(R^{14})$ or $R^{15}$, or an aromatic or heteroaromatic hydrocarbon group, in which one H atom or a plurality of H atoms may be substituted by $OR^{13}$, $N(R^{13})(R^{14})$ or $R^{15}$:

$R^{13}$, $R^{14}$ each, independently of one another, denote an alkyl or acyl group and $R^{15}$ having 1 to 10 C atoms or an aromatic hydrocarbon or carboxylic acid group having 6 to 12 C atoms in which one or more $CH_2$ groups are optionally substituted by —C≡C—, —$CF_2$O—, —O$CF_2$—, —CH═CH—,

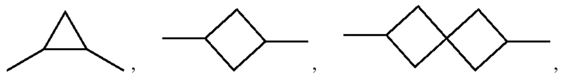

-continued

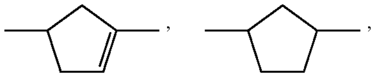

—O—, —CO—O—, —O—CO—, —$NR^{13}$—, —CO—$NR^{13}$— or —$NR^{13}$—CO— in such a way that O atoms are not linked directly to one another;

$R^{16}$ each, independently of one another, denote a H atom, an alkyl group or an alkoxy group having 1 to 10 C atoms in which one or more $CH_2$ groups are optionally substituted by —C═C—, —$CF_2O$—, —$OCF_2$—, —CH═CH—,

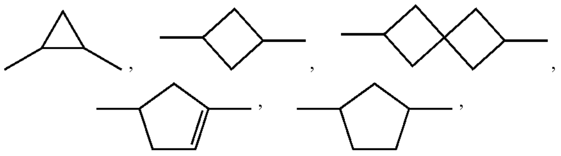

—O—, —CO—O—, —O—CO—, —$NR^{13}$—, —CO—$NR^{13}$— or —$NR^{13}$—CO— in such a way that O atoms are not linked directly to one another, O-cycloalkyl group having 3 to 12 C atoms, O' or OH;

$R^{17}$ each, independently of one another, a H atom, an alkyl group or an alkoxy group having 1 to 10 C atoms, or an alkylene group or a single bond, wherein $R^{17}$ together with $S^{11}$ may form a ring structure;

$S^{11}$ and $S^{12}$ each, independently of one another, denote an alkylene group having 1 to 20 C atoms, in which one or more $CH_2$ groups are optionally substituted by —C≡C—, —$CF_2O$—, —$OCF_2$—, —CH═CH—,

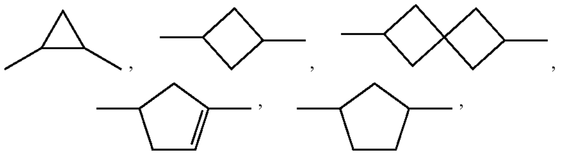

—O—, —CO—O—, —O—CO—, —$NR^{13}$—, —CO—$NR^{13}$— or —$NR^{13}$—CO— in such a way that O and N atoms are not linked directly to one another and in which one H atom or a plurality of H atoms may be substituted by F, $OR^{13}$, $N(R^{13})(R^{14})$ or $R^{15}$, or a single bond;

$Y^{11}$ to $Y^{14}$ each, independently of one another, denote methyl or ethyl;

$X^{11}$ C;

$Z^{11}$ to $Z^{14}$ each, independently of one another, denote —O—, —(C═O)—, —O—(C═O)—, —(C═O)—O—, —O—(C═O)—O—, —($NR^{13}$), —$NR^{13}$—(C═O)—, —(C═O)—$NR^{13}$— or a single bond and if $S^{11}$ is a single bond, both $Z^{11}$ and $Z^{12}$ do not simultaneously denote —O—; if $S^{12}$ is a single bond, both $Z^{13}$ and $Z^{14}$ do not simultaneously denote —O—; and, if q denotes 0, both $Z^{12}$ and $Z^{13}$ do not simultaneously denote —O—;

p 1 or 2;

q 0 or 1;

0 (3−p);

n an integer from 1 to 10;

m an integer from 0 to 8; wherein n*p an integer from 1 to 10, and

an organic moeity having (m+n) bonding sites.

2. The medium according to claim 1, wherein the one or more compounds of the Formula I is selected from one of the following:

I-1

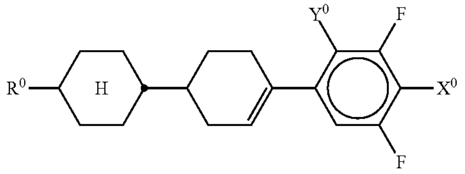

I-2

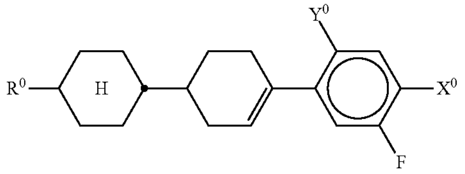

I-3

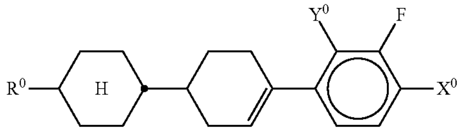

in which $R^0$ an alkyl group having 1 to 6 C atoms or an alkenyl group having 2 to 6 C atoms in which one or more $CH_2$ groups are optionally substituted by —C≡C—, —$CF_2O$—, —$OCF_2$—, —CH═CH—,

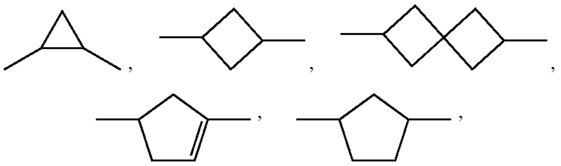

—O—, —CO—O— or —O—CO— in such a way that O atoms are not linked directly to one another, and in which one or more H atoms may be substituted by a halogen atom;

$X^0$ a F atom or an alkyl or an alkoxy group having 1 to 3 C atoms or an alkenyl or an alkenyloxy group having 2 or 3 C atoms in which one or more H atoms are substituted by a F atom; and $Y^0$ H or $CH_3$.

3. The medium according to claim 1, wherein the one or more compounds of the Formula H is selected from one of the following:

H-2-1
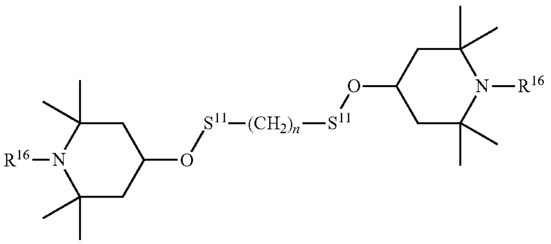
H-2-2
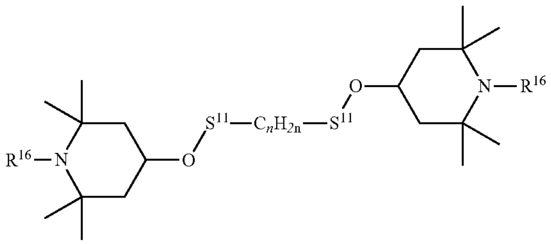
H-2-3
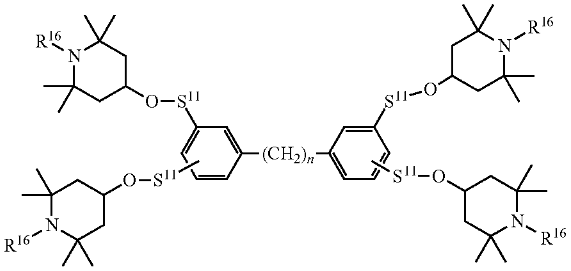
H-2-4
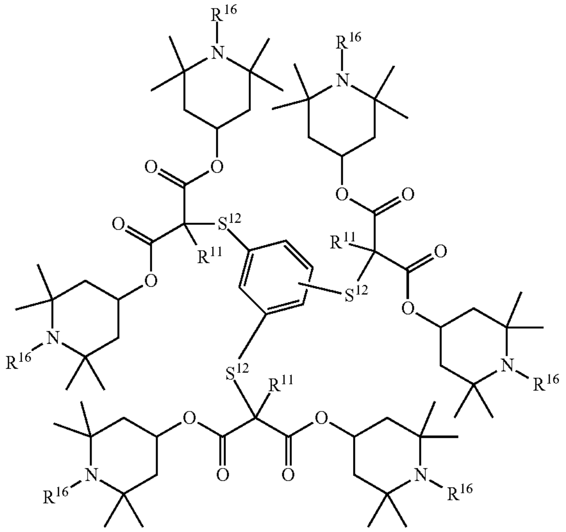
H-2-5
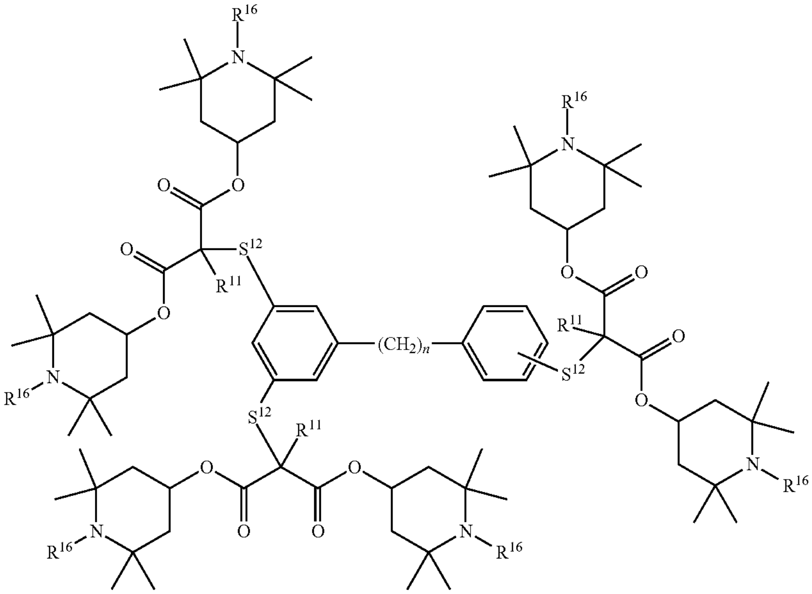

-continued

H-2-6

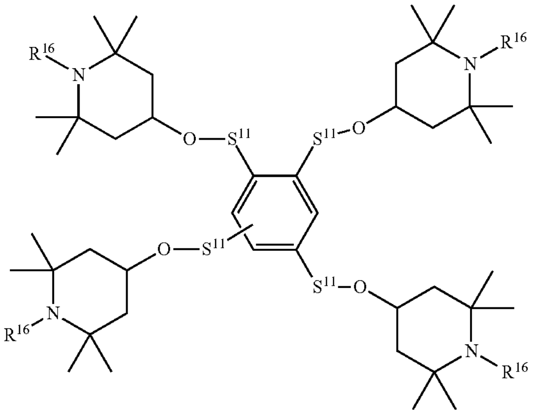

in which $R^{11}$ each, independently of one another, a H atom, an alkyl group having 1 to 20 C atoms, in which one or more $CH_2$ groups are optionally substituted by —C≡C—, —$CF_2$O—, —O$CF_2$—, —CH═CH—,

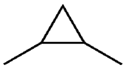 , 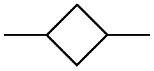 , 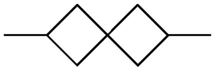 , 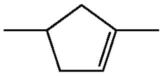 , 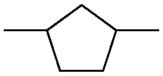 ,

—O—, —CO—O— or —O—CO— in such a way that O atoms are not linked directly to one another and in which one H atom or a plurality of H atoms may be substituted by F, $OR^{13}$, $N(R^{13})(R^{14})$ or $R^{15}$;

$R^{16}$ a H atom or O*:

$S^{11}$ and $S^{12}$ each, independently of one another, an alkylene group having 1 to 20 C atoms, in which one or more $CH_2$ groups are optionally substituted by —C≡C—, —$CF_2$O—, —O$CF_2$—, —CH═CH—,

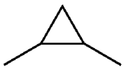 , 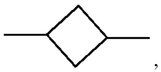 , 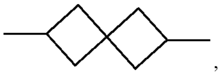 , 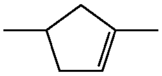 , 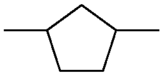 ,

—O—, —CO—O— or —O—CO— in such a way that O atoms are not linked directly to one another and in which one H atom or a plurality of H atoms may be substituted by F, $OR^{13}$, $N(R^{13})(R^{14})$ or $R^{15}$, or a single bond; and n an integer from 0 to 8.

4. The medium according to claim 1, wherein it comprises one or more compounds selected from the following formulae:

Z1

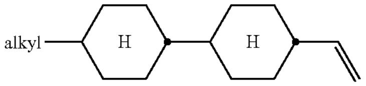

-continued

Z2

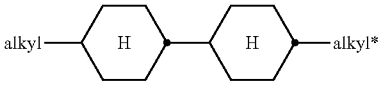

Z3

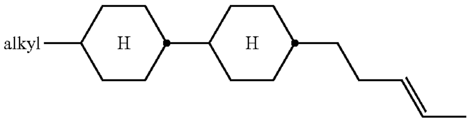

Z4

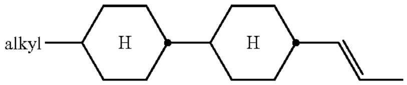

Z5

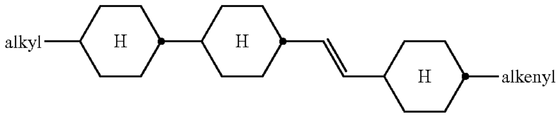

Z6

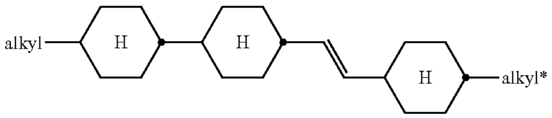

Z7

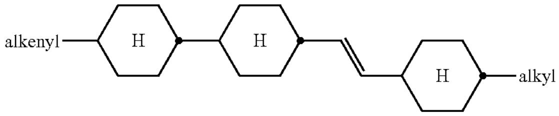

Z8

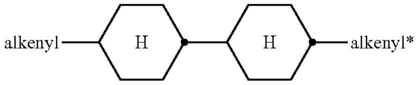

Z9

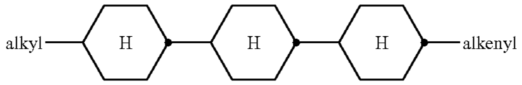

Z10

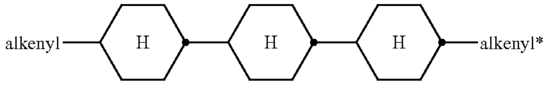

-continued

Z11

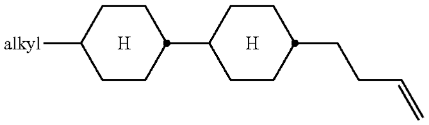

in which the individual substituents have the following meanings:

"alkyl" and "alkyl*" each, independently from one another, an alkyl group having 1 to 6 C atoms;

"alkenyl" and "alkenyl*" each, independently of one another, alkenyl group having 2 to 6 C atoms.

5. The medium according to claim 1, comprising one or more compounds selected from the group consisting of the following formulae:

XII

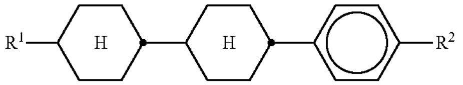

XIV

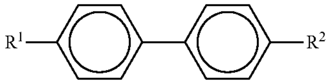

XVI

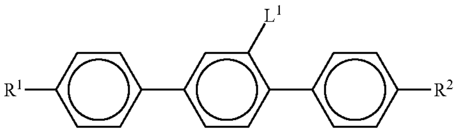

XVIIa

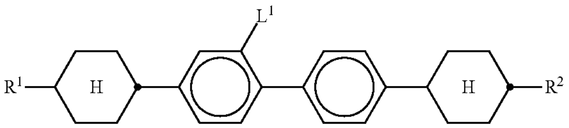

XVIIb

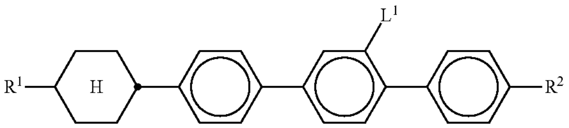

XVIIc

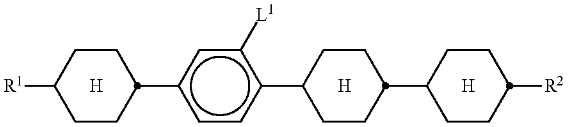

in which $R^1$ and $R^2$ each, independently of one another, n-alkyl, alkoxy, oxaalkyl, fluoroalkyl or alkenyl, each having up to 6 C atoms, and $L^1$ denotes, H, F or Cl.

6. The medium according to claim 1, comprising one or more compounds selected from the group consisting of the following formulae:

II

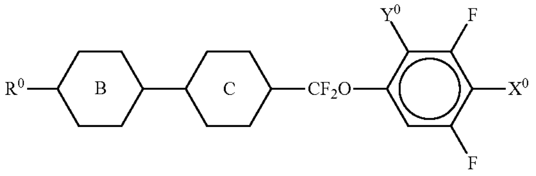

III

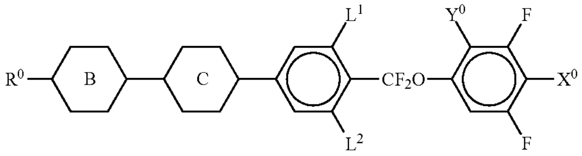

in which the individual substituents have the following meanings:

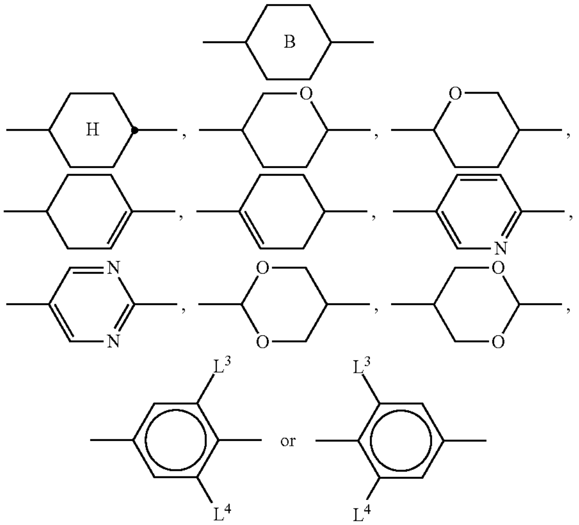

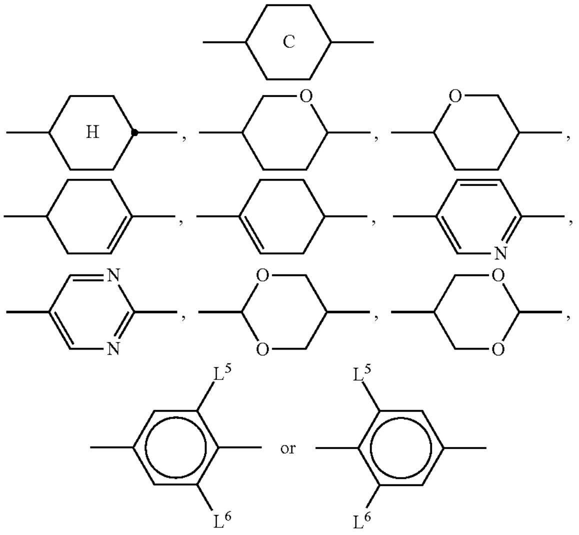

in which $R^0$ denotes an alkyl group having 1 to 12 C atoms or an alkenyl group having 2 to 12 C atoms in which one or more $CH_2$ groups are optionally substituted by —C≡C—, —$CF_2O$—, —$OCF_2$—, —CH═CH—,

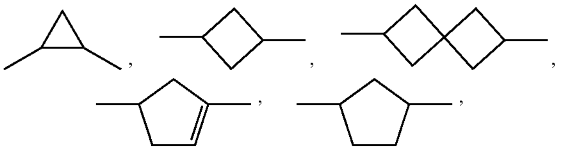

—O—, —CO—O— or —O—CO— in such a way that O atoms are not linked directly to one another, and in which one or more H atoms may be substituted by a halogen atom, $L^1$ to $L^6$ denote each, independently of one another, H, F or Cl, wherein $L^1$ and $L^2$ do not simultaneously denote H, $X^0$ denotes a halogen atom, —CN, —SCN, —NCS or an alkyl or an alkoxy group having 1 to 6 C atoms or an alkenyl or an alkenyloxy group having 2 to 6 C atoms in which one or more H atoms is substituted by a halogen atom, and $Y^0$ denotes H or $CH_3$.

7. The medium according to claim 6, wherein the one or more compounds of Formula II are selected from the following subformulae:

II-1

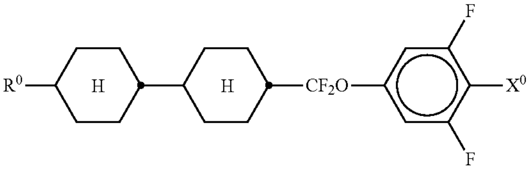

II-2

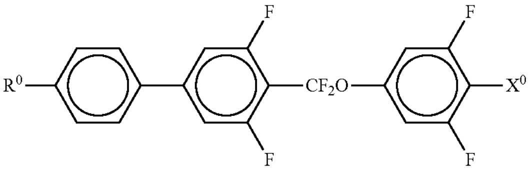

II-3

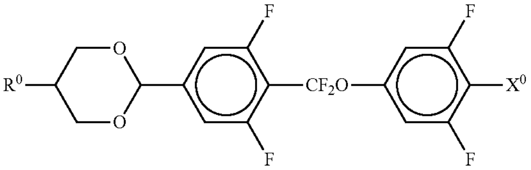

II-4

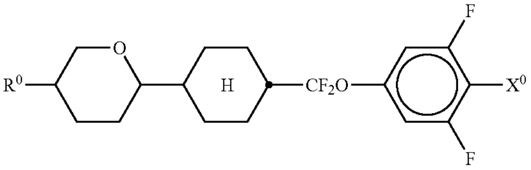

II-5

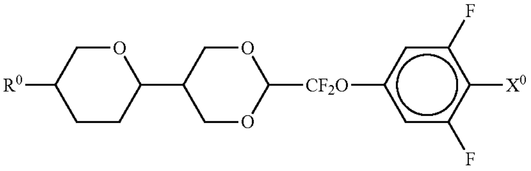

-continued

II-6

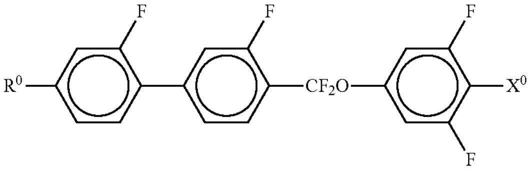

II-7

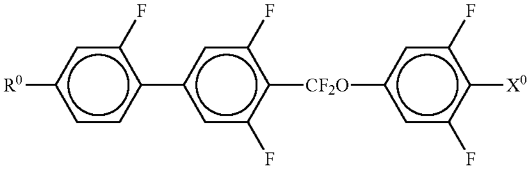

in which $R^0$ denotes an alkyl group having 1 to 12 C atoms or an alkenyl group having 2 to 12 C atoms in which one or more $CH_2$ groups are optionally substituted by —C≡C—, —$CF_2$O—, —O$CF_2$—, —CH=CH—,

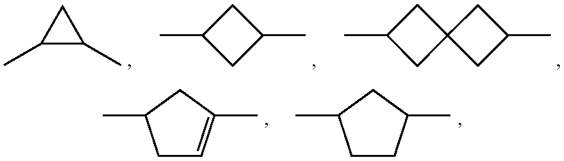

—O—, —CO—O— or —O—CO— in such a way that O atoms are not linked directly to one another, and in which one or more H atoms may be substituted by a halogen atom, and $X^0$ denotes a halogen atom, —CN, —SCN, —NCS or an alkyl or an alkoxy group having 1 to 6 C atoms or an alkenyl or an alkenyloxy group having 2 to 6 C atoms in which one or more H atoms is substituted by a halogen atom.

8. The medium according to claim 6, wherein the one or more compounds of Formula III are selected from the following subformulae:

III-1

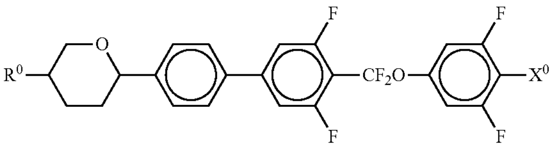

III-2

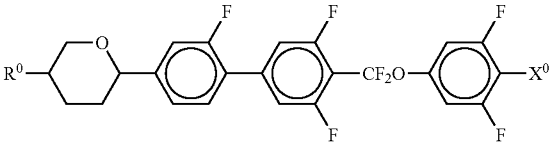

-continued
III-3
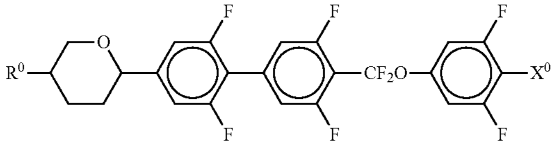
III-4
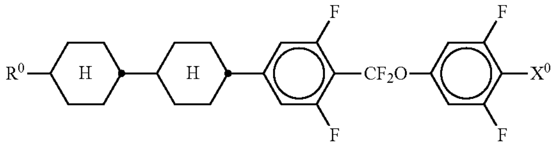
III-5
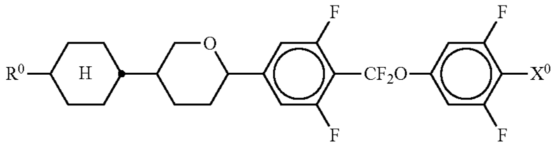
III-6
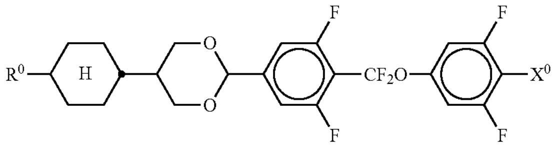
III-7
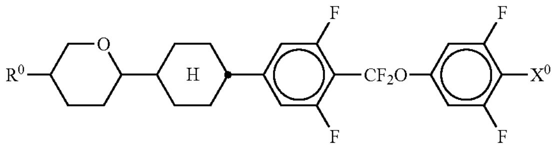
III-8
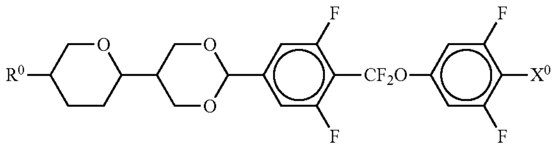
III-9
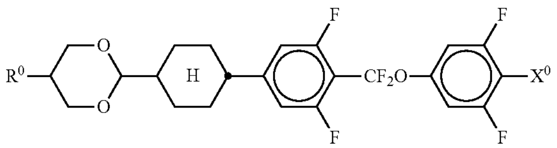
III-10
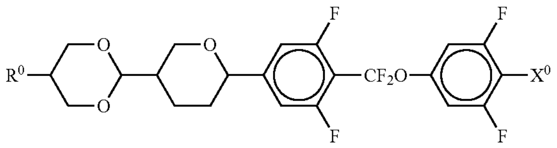
III-11
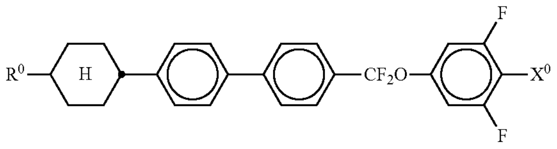
-continued
III-12
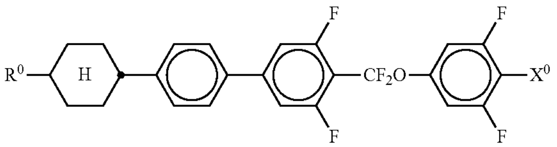
III-13
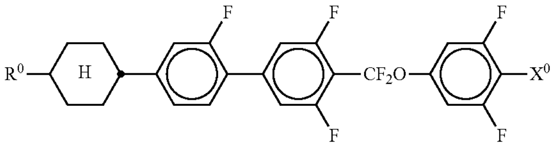
III-14
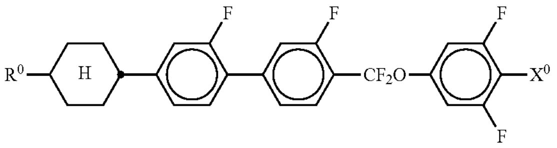
III-15
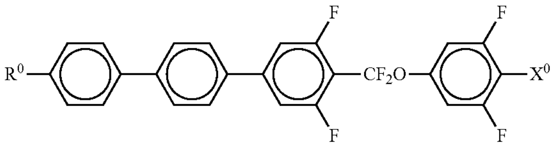
III-16
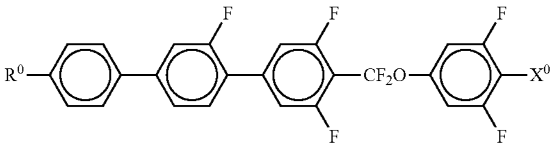
III-17
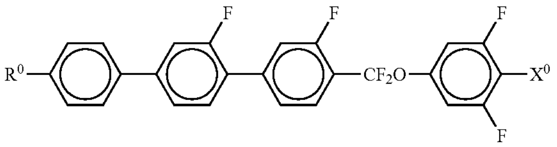
III-18
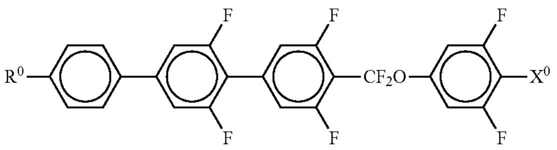
III-19
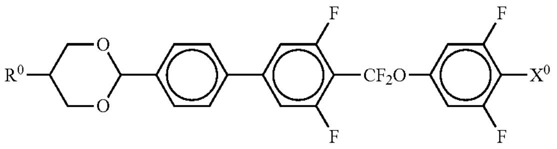
III-20
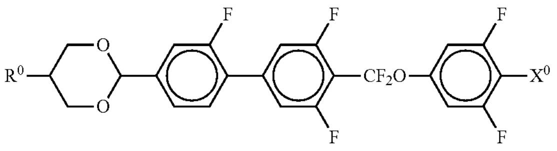

-continued

III-21

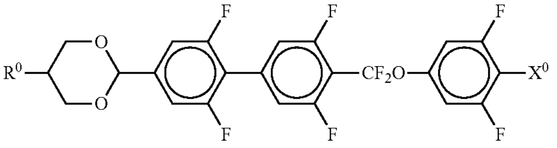

III-22

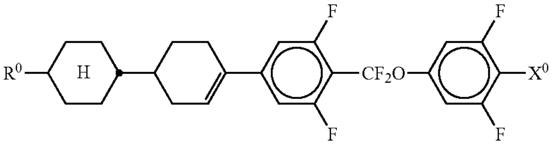

in which $R^0$ denotes an alkyl group having 1 to 12 C atoms or an alkenyl group having 2 to 12 C atoms in which one or more $CH_2$ groups are optionally substituted by —C≡C—, —$CF_2O$—, —$OCF_2$—, —CH═CH—,

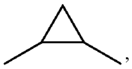, 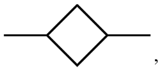, 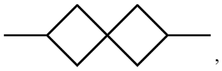, 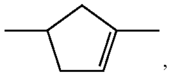, 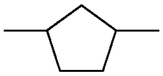,

—O—, —CO—O— or —O—CO— in such a way that O atoms are not linked directly to one another, and in which one or more H atoms may be substituted by a halogen atom, and $X^0$ denotes a halogen atom, —CN, —SCN, —NCS or an alkyl or an alkoxy group having 1 to 6 C atoms or an alkenyl or an alkenyloxy group having 2 to 6 C atoms in which one or more H atoms is substituted by a halogen atom.

9. The medium according to claim 1, wherein it additionally comprises one or more compounds selected from the group consisting of the following formulae:

IV

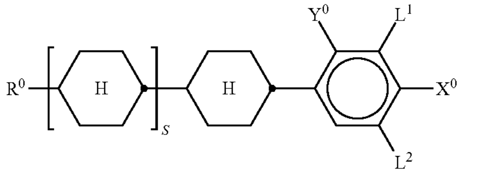

V

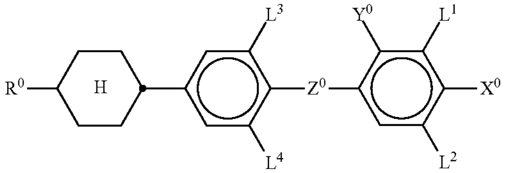

-continued

VI

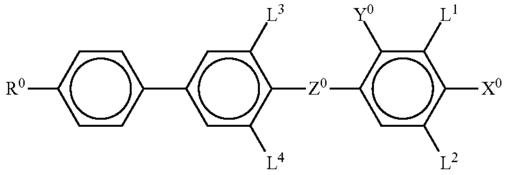

VII

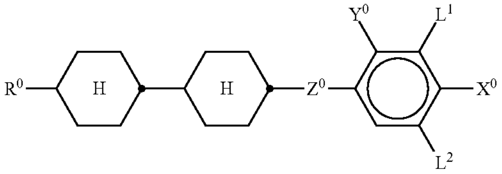

VIII

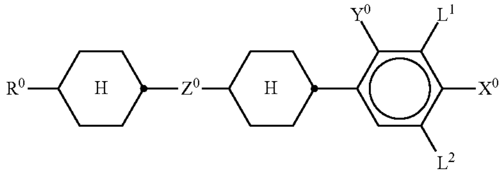

in which $R^0$ denotes an alkyl group having 1 to 12 C atoms or an alkenyl group having 2 to 12 C atoms in which one or more $CH_2$ groups are optionally substituted by —C≡C—, —$CF_2O$—, —$OCF_2$—, —CH═CH—,

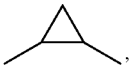, 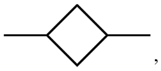, 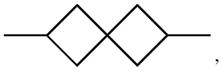, 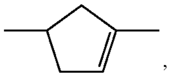, 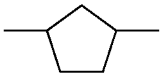,

—O—, —CO—O— or —O—CO— in such a way that O atoms are not linked directly to one another, and in which one or more H atoms may be substituted by a halogen atom, $X^0$ denotes a halogen atom, —CN, —SCN, —NCS or an alkyl or an alkoxy group having 1 to 6 C atoms or an alkenyl or an alkenyloxy group having 2 to 6 C atoms in which one or more H atoms is substituted by a halogen atom, $L^1$, $L^2$ denote each, independently of one another, H, F or Cl, wherein $L^1$ and $L^2$ do not simultaneously denote H, and $Y^0$ H or $CH_3$;

$L^3$ and $L^4$ each, independently of one another, have the meanings given for $L^1$;

$Z^0$ denotes —$C_2H_4$—, —$(CH_2)_4$—, —CH═CH—, —CF═CF—, —$C_2F_4$—, —$CH_2CF_2$—, —$CF_2CH_2$—, —$CH_2O$—, —$OCH_2$—, —COO—, —$CF_2O$—, or —$OCF_2$—, in the Formulae V and VI also a single bond; and S denotes 0 or 1.

10. The medium according to claim 1, wherein it comprises one or more compounds selected from the group consisting of the following formulae

XVIII

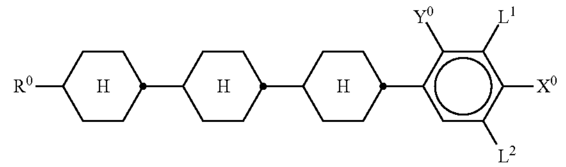

XIX

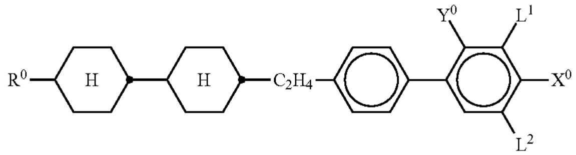

XX

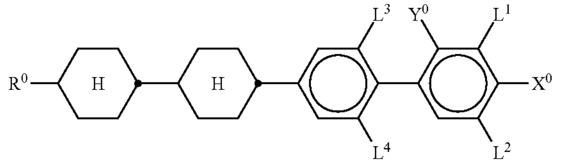

XXI

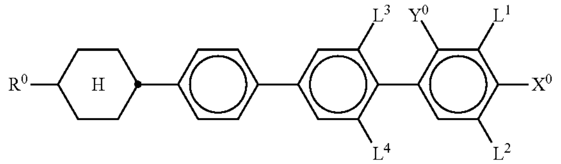

XXII

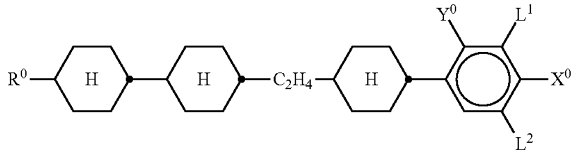

XXIII

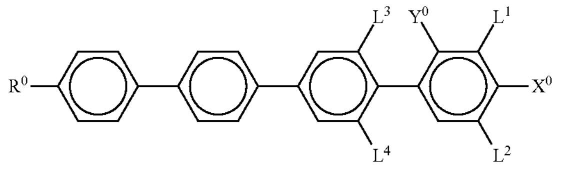

in which $R^0$ denotes an alkyl group having 1 to 12 C atoms or an alkenyl group having 2 to 12 C atoms in which one or more $CH_2$ groups are optionally substituted by —C≡C—, —$CF_2O$—, —$OCF_2$—, —CH═CH—,

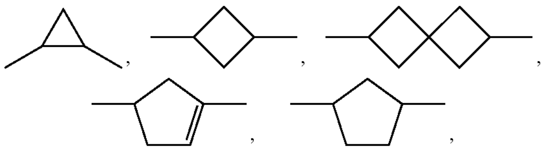

—O—, —CO—O— or —O—CO— in such a way that O atoms are not linked directly to one another, and in which one or more H atoms may be substituted by a halogen atom $L^1$ to $L^4$ denote each, independently of one another, H, F or Cl, wherein $L^1$ and $L^2$ do not simultaneously denote H $X^0$ denotes a halogen atom, —CN, —SCN, —NCS or an alkyl or an alkoxy group having 1 to 6 C atoms or an alkenyl or an alkenyloxy group having 2 to 6 C atoms in which one or more H atoms is substituted by a halogen atom, and $Y^0$ denotes H or $CH_3$.

11. The medium according to claim 1, comprising one or more compounds selected from the group consisting of the following formulae:

XXVII

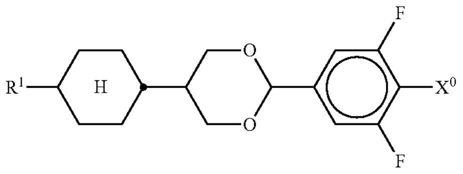

XXVIII

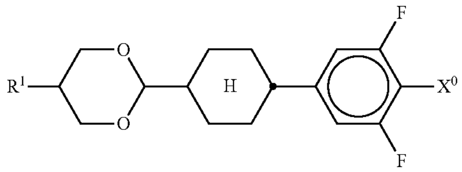

XXIX

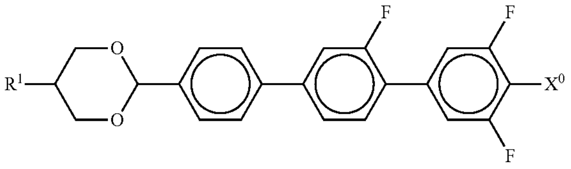

XXX

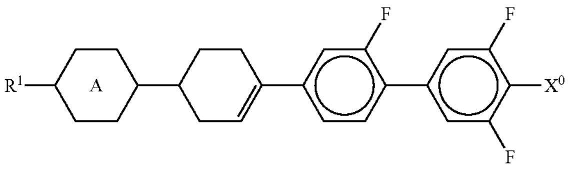

in which

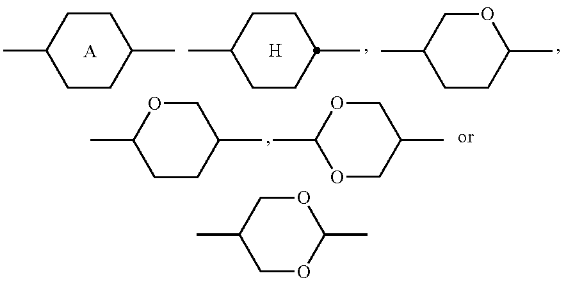

and in which $R^1$ denotes an alkyl group having 1 to 12 C atoms or an alkenyl group having 2 to 12 C atoms in which one or more CH, groups are optionally substituted by —C≡C—, —$CF_2O$—, —$OCF_2$—, —CH═CH—,

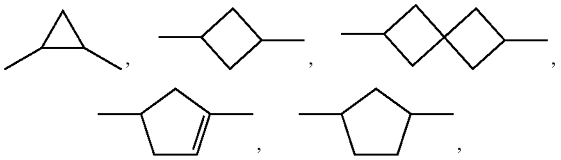

—O—, —CO—O— or —O—CO— in such a way that O atoms are not linked directly to one another, and in which one or more H atoms may be substituted by a halogen atom, and $X^0$ denotes a halogen atom, —CN, —SCN, —NCS or an alkyl or an alkoxy group having 1 to 6 C atoms or an alkenyl or an alkenyloxy group having 2 to 6 C atoms in which one or more H atoms is substituted by a halogen atom.

12. The medium according to claim 1, further comprising one or more compounds selected from the group consisting of Formulae Z1, Z2, Z3, Z4, Z5, II, III, IV, VI, XIV, XX, XII, XXIII, XXIX, XVI, XVIIa, XVIIb, and XVIIc:

Z1

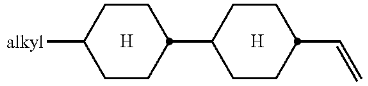

Z2

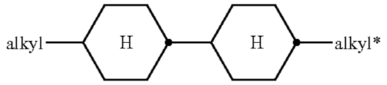

Z3

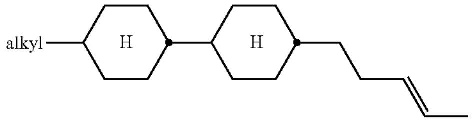

Z4

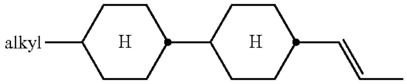

Z5

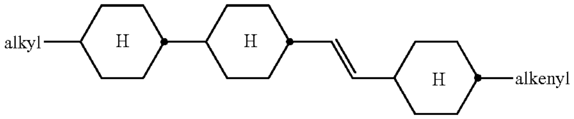

wherein

"alkyl" and "alkyl*" each, independently from one another, denote an alkyl group having 1 to 6 C atoms;

"alkenyl" and "alkenyl*" each, independently of one another, denote an alkenyl group having 2 to 6 C atoms,

II

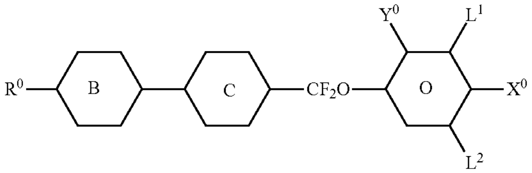

-continued

III

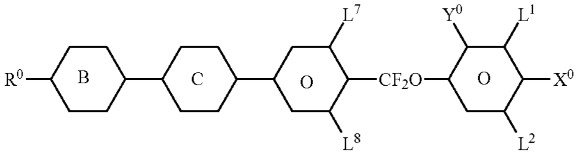

wherein the individual substituents, independently of each other and on each occurrence identically or differently, have the following meanings:

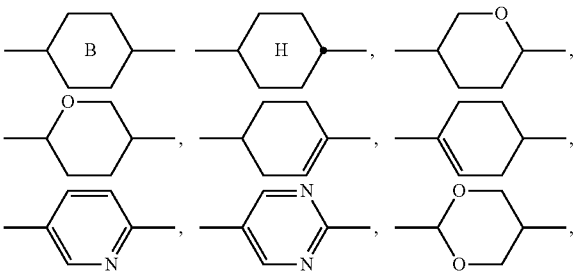

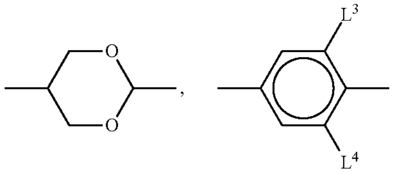

or

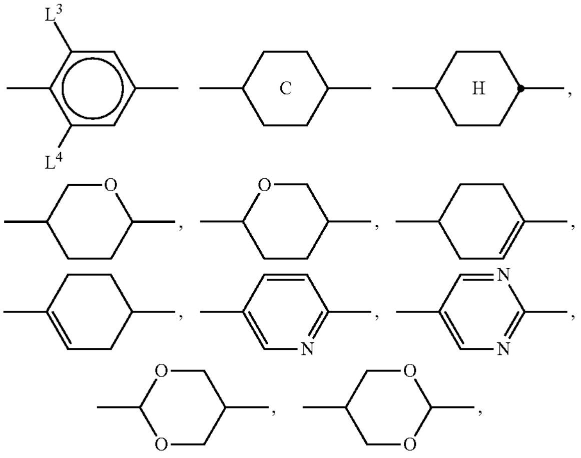

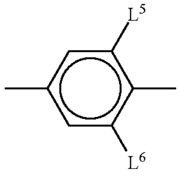

or

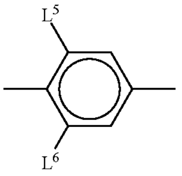

$R^0$ an alkyl group having 1 to 12 C atoms or an alkenyl group having 2 to 12 C atoms in which one or more $CH_2$ groups are optionally substituted by —C≡C—, —$CF_2O$—, —$OCF_2$—, —CH=CH—,

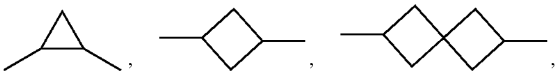

-continued

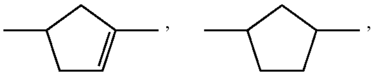

—O—, —CO—O— or —O—CO— in such a way that O atoms are not linked directly to one another, and in which one or more H atoms may be substituted by a halogen atom, $X^0$ independently of one another F, Cl, an alkyl group or an alkoxy group having 1 to 6 C atoms or an alkenyl group or an alkenyloxy group having 2 to 6 C atoms, in which one or more H atoms is substituted by a halogen atom, $L^{1-8}$ independently of one another H, F or Cl, and $Y^0$ H or $CH_3$,

IV

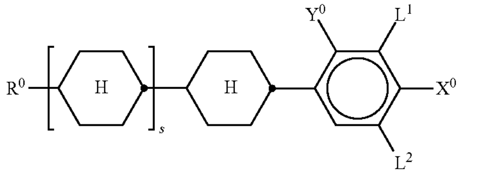

VI

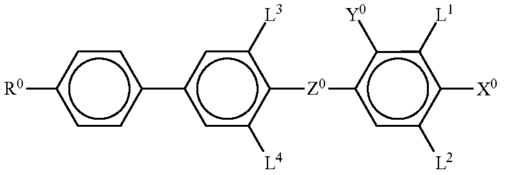

in which $R^0$ an alkyl group having 1 to 12 C atoms or an alkenyl group having 2 to 12 C atoms in which one or more $CH_2$ groups are optionally substituted by —C≡C—, —$CF_2O$—, —$OCF_2$—, —CH═CH—,

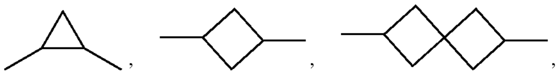

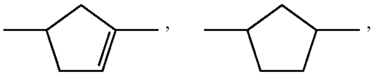

—O—, —CO—O— or —O—CO— in such a way that O atoms are not linked directly to one another, and in which one or more H atoms may be substituted by a halogen atom, $X^0$ independently of one another F, Cl, an alkyl group or an alkoxy group having 1 to 6 C atoms or an alkenyl group or an alkenyloxy group having 2 to 6 C atoms, in which one or more H atoms is substituted by a halogen atom, $L^{1-4}$ independently of one another H, F or Cl, $Y^0$ H or $CH_3$, $Z^0$ denotes —$C_2H_4$—, —$(CH_2)_4$—, —CH═CH—, —CF═CF—, —$C_2F_4$—, —$CH_2CF_2$—, —$CF_2CH_2$—, —$CH_2O$—, —$OCH_2$—, —COO—, —$CF_2O$—, —$OCF_2$—, or a single bond, and s denotes 0 or 1

XIV

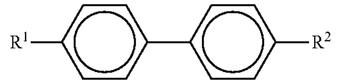

in which $R^1$ and $R^2$ each, independently of one another, denote n-alkyl, cycloalkyl, alkoxy, oxaalkyl, or fluoroalkyl, each having up to 6 C atoms, or alkenyl having 2 to 6 C atoms,

XX

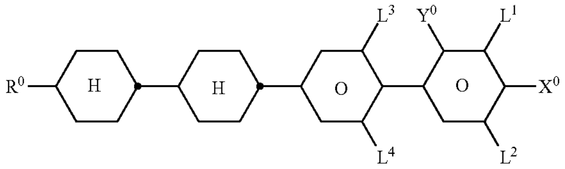

XXIII

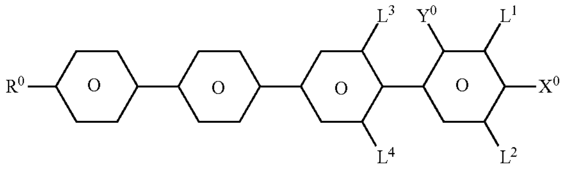

in which $R^0$ an alkyl group having 1 to 12 C atoms or an alkenyl group having 2 to 12 C atoms in which one or more $CH_2$ groups are optionally substituted by —C≡C—, —CF2O—, —OCF2-, —CH═CH—,

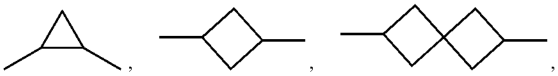

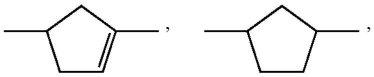

—O—, —CO—O— or —O—CO— in such a way that O atoms are not linked directly to one another, and in which one or more H atoms may be substituted by a halogen atom, $X^0$ independently of one another F, Cl, an alkyl group or an alkoxy group having 1 to 6 C atoms or an alkenyl group or an alkenyloxy group having 2 to 6 C atoms, in which one or more H atoms is substituted by a halogen atom, $L^{1-4}$ each, independently of one another, denote H or F, and $Y^0$ denotes H or $CH_3$,

XII

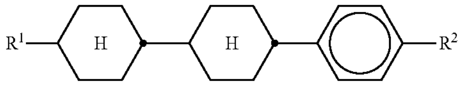

in which $R^1$ and $R^2$ each, independently from one another, denote $C_{1-6}$-alkyl, $C_{1-6}$-alkoxy or $C_{2-6}$-alkenyl,

XXIX

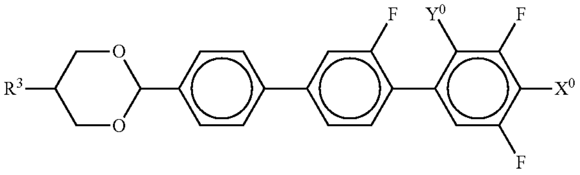

in which $R^1$ denotes an alkyl group having 1 to 12 C atoms or an alkenyl group having 2 to 12 C atoms in which one or more $CH_2$ groups are optionally substituted by —C≡C—, —$CF_2$O—, —$OCF_2$—, —CH=CH—,

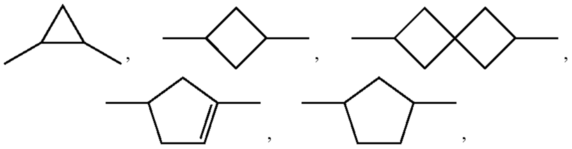

—O—, —CO—O— or —O—CO— in such a way that O atoms are not linked directly to one another, and in which one or more H atoms may be substituted by a halogen atom $X^0$ denotes independently of one another F, Cl, an alkyl group or an alkoxy group having 1 to 6 C atoms or an alkenyl group or an alkenyloxy group having 2 to 6 C atoms, in which one or more H atoms is substituted by a halogen atom, and $Y^0$ H or $CH_3$,

XVI

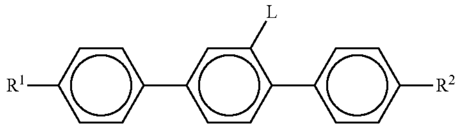

in which $R^1$ and $R^2$ independently denote an alkyl group having 1 to 12 C atoms or an alkenyl group having 2 to 12 C atoms in which one or more $CH_2$ groups are optionally substituted by —C≡C—, —$CF_2$O—, —$OCF_2$—, —CH=CH—,

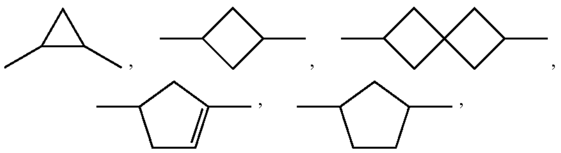

—O—, —CO—O— or —O—CO— in such a way that O atoms are not linked directly to one another, and in which one or more H atoms may be substituted by a halogen atom, and L denotes H or F, XVIIa

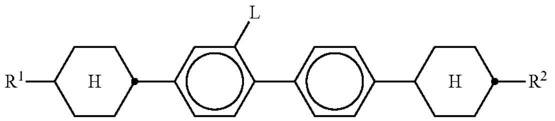

XVIIb

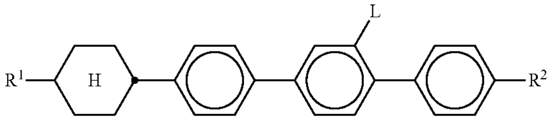

XVIIc

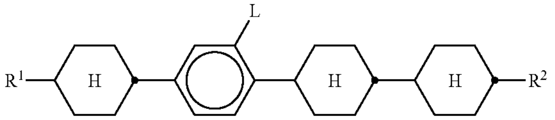

in which $R^1$ and $R^2$ independently denote an alkyl group having 1 to 12 C atoms or an alkenyl group having 2 to 12 C atoms in which one or more $CH_2$ groups are optionally substituted by —C=C—, —$CF_2$O—, —$OCF_2$—, —CH=CH—,

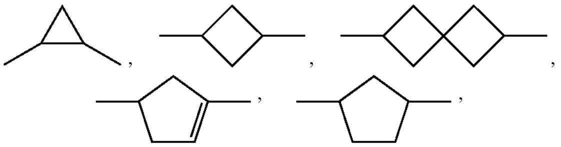

—O—, —CO—O— or —O—CO— in such a way that O atoms are not linked directly to one another, and in which one or more H atoms may be substituted by a halogen atom, and L denotes H or F.

13. The medium according to claim 1, further comprising one or more compounds of Formula LP1:

LP1

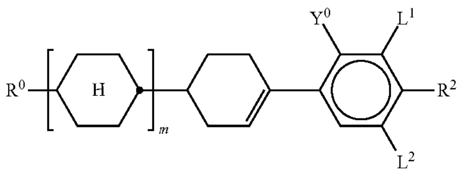

in which:

$R^0$ and $R^2$ independently denote an alkyl or an alkoxy group having 1 to 12 C atoms or an alkenyl or an alkenyloxy group having 2 or 12 C atoms in which one or more non-adjacent $CH_2$ groups are optionally substituted by —C≡C—,

—$CF_2$O—, —$OCF_2$—, —CH=CH—,

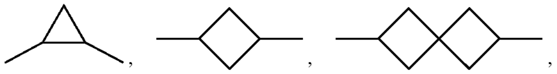

-continued

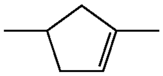, 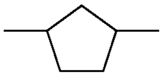,

—O—, —CO—O— or —O—CO— in such a way that O atoms are not linked directly to one another, and in which one or more H atoms may be substituted by a cycloalkyl or a cycloalkoxy group having 3 to 12 C atoms;

$Y^0$ denotes H or $CH_3$; and m denotes 0 or 1.

14. The medium according to claim 1, further comprising one or more compounds selected from the group consisting of the Formulae XXIX, XXX, and XXVIIIa:

XXIX

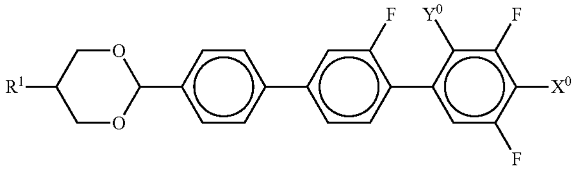

XXX

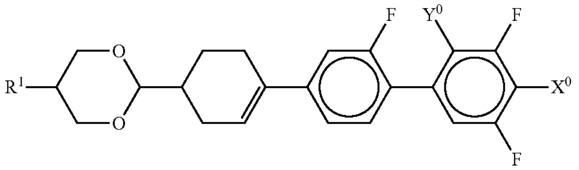

XXVIIIa

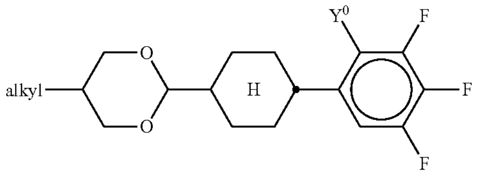

in which $R^1$ denotes an alkyl group having 1 to 12 C atoms or an alkenyl group having 2 to 12 C atoms in which one or more $CH_2$ groups are optionally substituted by —C≡C—, —$CF_2$O—, —O$CF_2$—, —CH═CH—,

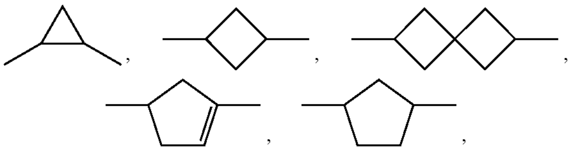

—O—, —CO—O— or —O—CO— in such a way that O atoms are not linked directly to one another, and in which one or more H atoms may be substituted by a halogen atom $X^0$ denotes independently of one another F, Cl, an alkyl group or an alkoxy group having 1 to 6 C atoms or an alkenyl group or an alkenyloxy group having 2 to 6 C atoms, in which one or more H atoms is substituted by a halogen atom, and $Y^0$ H or $CH_3$.

15. A process for the preparation of a liquid-crystalline medium according to claim 1, wherein one or more antioxidants and one or more light stabilizers are mixed with one or more mesogenic compounds and optionally one or more polymerizable compounds and/or one or more additives.

16. An electro-optical liquid-crystal display or an AR/VR headset containing a liquid-crystalline medium according to claim 1.

17. The electro-optical liquid-crystal display according to claim 16, wherein it comprises a TN, PS-TN, STN, TN-TFT, OCB, IPS, PS-IPS, FFS, HB-FFS, XB-FFS, PS-HB-FFS, PS-XB-FFS, SA-HB-FFS, SA-XB-FS, polymer stabilised SA-HB-FFS, polymer stabilised SA-XB-FFS, positive VA or positive PS-VA display.

* * * * *